US012699763B1

(12) United States Patent
Forbes

(10) Patent No.: US 12,699,763 B1
(45) Date of Patent: Aug. 4, 2026

(54) PORTABLE ELECTRONIC DEVICE MANAGEMENT SYSTEM

(71) Applicant: Pioneer Square Brands, Inc., High Point, NC (US)

(72) Inventor: Quentin Wade Forbes, Winston Salem, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/359,540

(22) Filed: Oct. 15, 2025

(51) Int. Cl.
*G06F 21/44* (2013.01)
*G06F 21/32* (2013.01)

(52) U.S. Cl.
CPC .............. *G06F 21/44* (2013.01); *G06F 21/32* (2013.01)

(58) Field of Classification Search
CPC ........ G06F 13/105; G06F 13/16; G06F 13/36; G06F 13/4068; G06F 15/7867; G06F 21/75; G06F 2221/2125; G06F 9/30145; G06F 21/71; G06F 15/7807; G06F 21/572; G06F 21/44; G09C 1/00; H04L 2209/12; H04L 9/002; H04L 9/16
USPC .......... 726/18, 2, 21, 36; 713/150, 163, 181; 380/255, 264, 276
See application file for complete search history.

(56) References Cited

U.S. PATENT DOCUMENTS 6,356,869 B1 * 3/2002 Chapados ............... G10L 15/22
704/E15.04
8,171,309 B1 * 5/2012 Poo ..................... G06F 11/3648
713/192

8,918,679 B2 * 12/2014 Janke .................. G06F 11/2215
714/25
9,178,514 B1 * 11/2015 Carlson ............ H03K 19/17768
10,162,985 B1 * 12/2018 Carlson .................. H04L 9/002
10,678,535 B2 * 6/2020 Gore .................. G06F 9/44589
10,725,853 B2 * 7/2020 Zhang ................. G06F 11/1666
10,726,162 B2 * 7/2020 Sastry ..................... G06F 21/85
11,310,198 B2 * 4/2022 Couillard .............. G06F 21/606
11,930,604 B1 * 3/2024 Lynch .................. H05K 5/0086
11,936,800 B1 * 3/2024 Balutkar ............... H04M 1/026
12,075,895 B1 * 9/2024 Lynch .................. A45F 5/1026
12,089,705 B1 * 9/2024 Lynch .................. A45C 11/00

(Continued)

*Primary Examiner* — Sharif E Ullah
(74) *Attorney, Agent, or Firm* — Grandview Law

(57) ABSTRACT

A method for managing docking and authentication of computing devices includes detecting when a computing device docks with a docking station, identifying the device by extracting a unique identifier, and authenticating a user via an external interface. Upon successful authentication, a configuration profile is retrieved from a centralized management server and transmitted to the device over a secure channel. The device applies the profile, which may include application restrictions, wireless network settings, and user interface preferences. Session metadata is synchronized with a management system, and events may be logged for compliance tracking. In response to an undocking event, the system may issue a lock command encrypted using AES-256, enforcing local access restrictions. Administrative features include override capabilities, grace period enforcement, and notification handling. Configuration and enforcement actions may be backed up to cloud storage. Additional embodiments and variations are described in the detailed description and illustrated in the accompanying figures.

19 Claims, 90 Drawing Sheets

(56)        References Cited

U.S. PATENT DOCUMENTS

| | | | |
|---|---|---|---|
| 12,117,869 B1 * | 10/2024 | Lynch | G06F 1/1635 |
| 12,119,691 B1 * | 10/2024 | Lynch | H02J 7/50 |
| 2007/0162653 A1 * | 7/2007 | Janke | G07F 7/086 |
| | | | 710/34 |
| 2007/0194421 A1 * | 8/2007 | Janke | H10W 42/40 |
| | | | 257/679 |
| 2007/0200215 A1 * | 8/2007 | Janke | H10W 70/699 |
| | | | 257/679 |
| 2008/0016135 A1 * | 1/2008 | Janke | G06F 7/588 |
| | | | 380/46 |
| 2008/0022398 A1 * | 1/2008 | Janke | G06K 19/073 |
| | | | 726/20 |
| 2008/0164907 A1 * | 7/2008 | Mercaldi-Kim | H03K 19/177 |
| | | | 326/41 |
| 2009/0219051 A1 * | 9/2009 | Zhang | H03K 19/17758 |
| | | | 716/132 |
| 2011/0145547 A1 * | 6/2011 | Vorbach | G06F 9/30036 |
| | | | 326/41 |
| 2013/0173970 A1 * | 7/2013 | Kleveland | G11C 29/50 |
| | | | 714/710 |
| 2013/0297948 A1 * | 11/2013 | Lee | G06F 21/72 |
| | | | 713/193 |
| 2014/0108825 A1 * | 4/2014 | O'Loughlin | G06F 21/73 |
| | | | 713/193 |
| 2014/0223569 A1 * | 8/2014 | Gail | G06F 21/60 |
| | | | 726/26 |
| 2015/0019803 A1 * | 1/2015 | Miller | G06F 3/0611 |
| | | | 711/125 |
| 2015/0082420 A1 * | 3/2015 | Love | G06F 21/71 |
| | | | 726/16 |
| 2015/0278670 A1 * | 10/2015 | Laackmann | G06K 19/06206 |
| | | | 235/492 |
| 2015/0358314 A1 * | 12/2015 | Glik | H04M 1/72412 |
| | | | 726/7 |
| 2016/0011801 A1 * | 1/2016 | Goldberg | G06F 3/0655 |
| | | | 711/114 |
| 2016/0378996 A1 * | 12/2016 | Smith | G06F 21/72 |
| | | | 713/190 |
| 2017/0012952 A1 * | 1/2017 | Cocchi | H04L 63/062 |
| 2017/0090935 A1 * | 3/2017 | Falsafi | G06F 12/0862 |
| 2017/0115350 A1 * | 4/2017 | Zhang | G01R 31/3177 |
| 2017/0359897 A1 * | 12/2017 | Pueschner | G06K 19/07737 |
| 2019/0220419 A1 * | 7/2019 | Lin | G06Q 50/184 |
| 2019/0278886 A1 * | 9/2019 | Li | H04L 63/0428 |
| 2019/0310685 A1 * | 10/2019 | Steinmetz | H04W 12/08 |
| 2019/0392120 A1 * | 12/2019 | Lattin | G06F 21/12 |
| 2020/0004933 A1 * | 1/2020 | Cocchi | G06F 21/121 |
| 2022/0229468 A1 * | 7/2022 | Roose | G06F 1/1637 |
| 2023/0074708 A1 * | 3/2023 | Shen | H04L 9/0894 |
| 2023/0367912 A1 * | 11/2023 | Janke | G06F 21/64 |

* cited by examiner

250g

280

Figure 67:
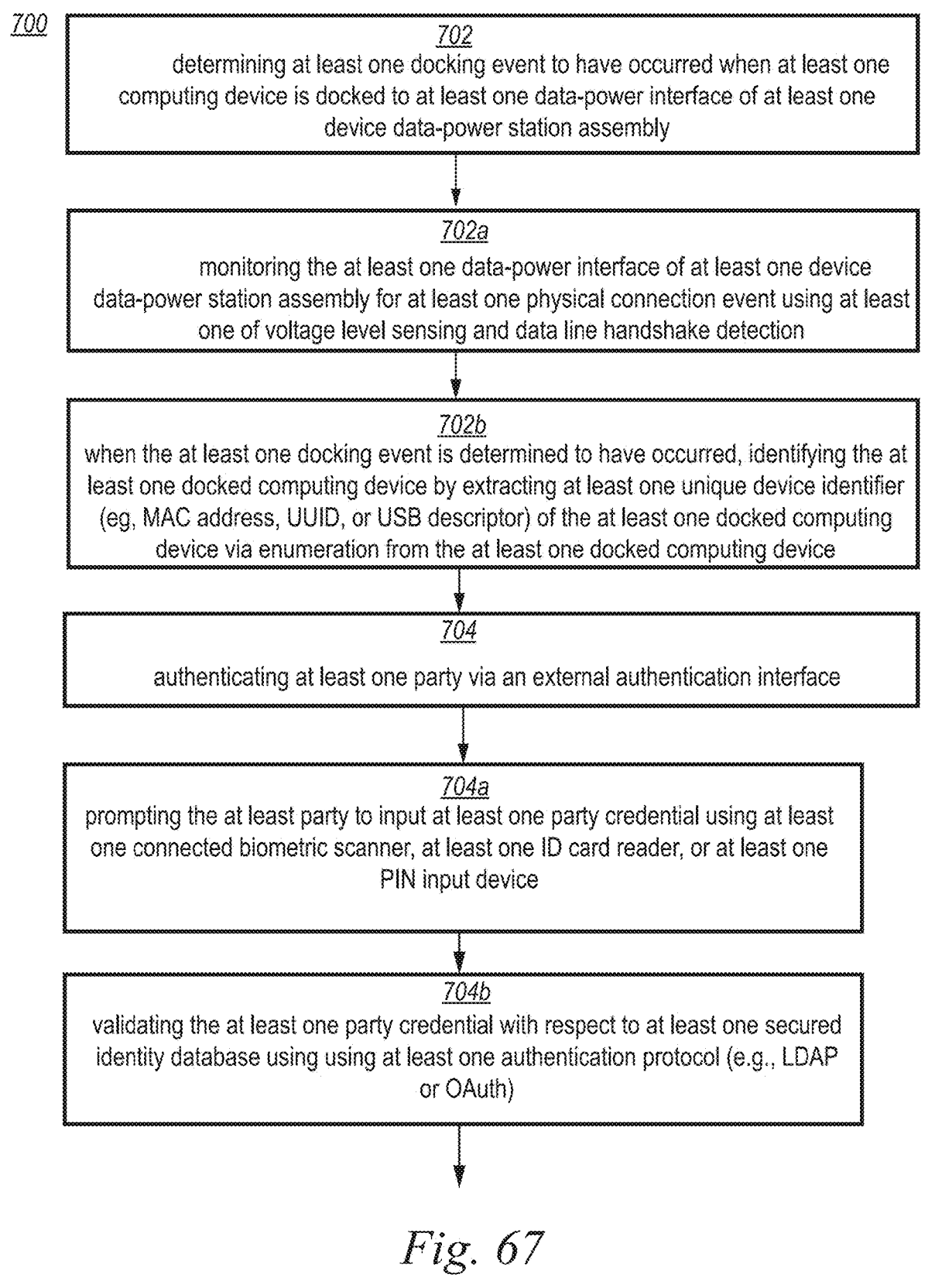

_700_

_702_
determining at least one docking event to have occurred when at least one computing device is docked to at least one data-power interface of at least one device data-power station assembly

_702a_
monitoring the at least one data-power interface of at least one device data-power station assembly for at least one physical connection event using at least one of voltage level sensing and data line handshake detection

_702b_
when the at least one docking event is determined to have occurred, identifying the at least one docked computing device by extracting at least one unique device identifier (eg, MAC address, UUID, or USB descriptor) of the at least one docked computing device via enumeration from the at least one docked computing device

_704_
authenticating at least one party via an external authentication interface

_704a_
prompting the at least party to input at least one party credential using at least one connected biometric scanner, at least one ID card reader, or at least one PIN input device

_704b_
validating the at least one party credential with respect to at least one secured identity database using using at least one authentication protocol (e.g., LDAP or OAuth)

Figure 67A:
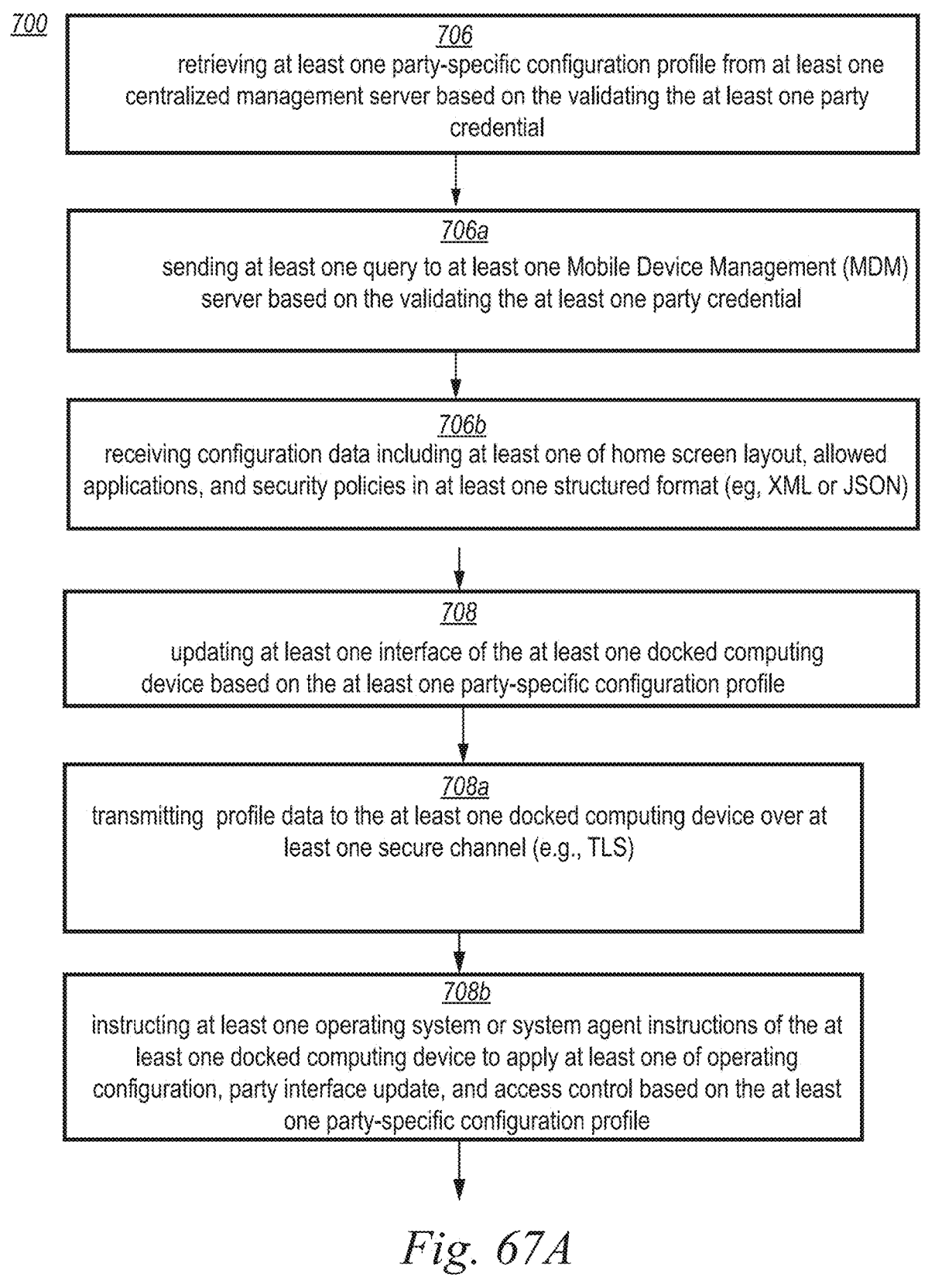

*706*
retrieving at least one party-specific configuration profile from at least one centralized management server based on the validating the at least one party credential

*706a*
sending at least one query to at least one Mobile Device Management (MDM) server based on the validating the at least one party credential

*706b*
receiving configuration data including at least one of home screen layout, allowed applications, and security policies in at least one structured format (eg, XML or JSON)

*708*
updating at least one interface of the at least one docked computing device based on the at least one party-specific configuration profile

*708a*
transmitting profile data to the at least one docked computing device over at least one secure channel (e.g., TLS)

*708b*
instructing at least one operating system or system agent instructions of the at least one docked computing device to apply at least one of operating configuration, party interface update, and access control based on the at least one party-specific configuration profile

Figure 67B:
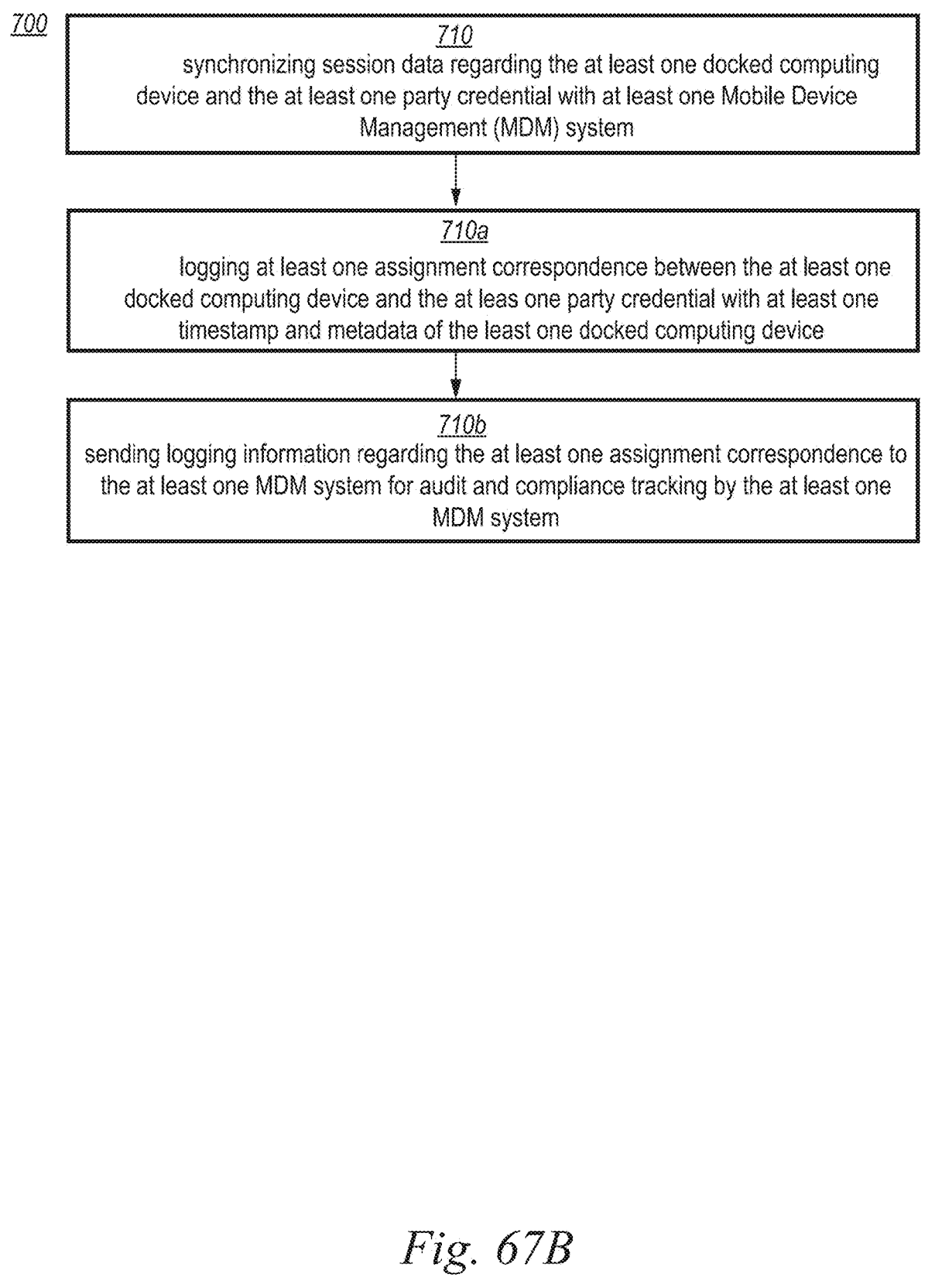

> _710_
> synchronizing session data regarding the at least one docked computing device and the at least one party credential with at least one Mobile Device Management (MDM) system > _710a_
> logging at least one assignment correspondence between the at least one docked computing device and the at leas one party credential with at least one timestamp and metadata of the least one docked computing device > _710b_
> sending logging information regarding the at least one assignment correspondence to the at least one MDM system for audit and compliance tracking by the at least one MDM system _Fig. 67B_

<u>720</u>

<u>722</u>
authenticating party data associated with at least one party of the at least one docked computer device via an external authentication interface including via at least one identification card reader <u>722a</u>
initiating at least one scanning session with the at least one identification card reader via at least one USB-connected smart card reader using CCID protocol to receive scanned identification card data from the at least one identification card reader <u>722b</u>
encrypting the identification card data using RSA <u>722c</u>
sending the identification card data to at least one LDAP-based directory service for identity verification

Figure 69:
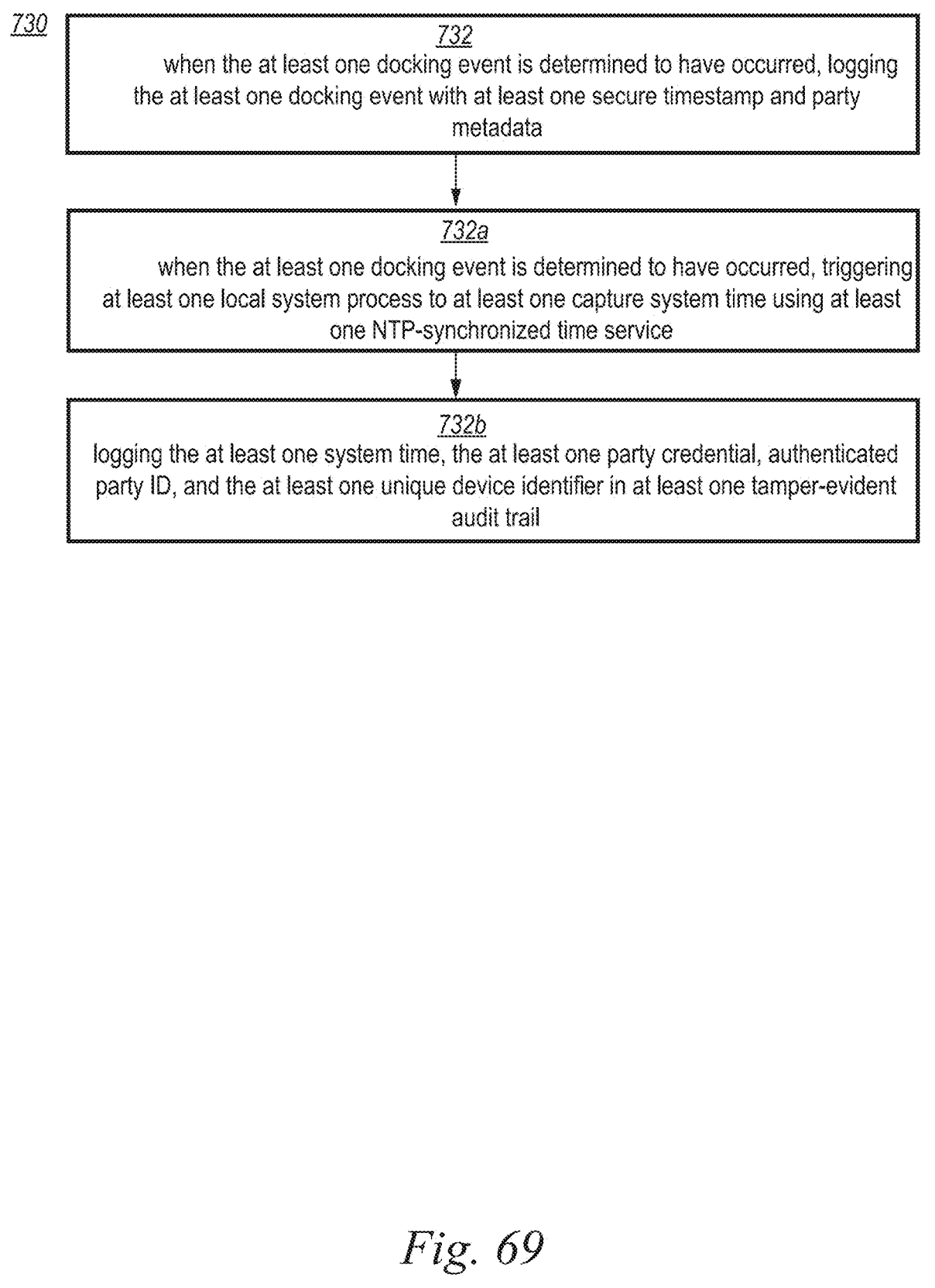

┌─────────────────────────────────────────────────────────┐
│                          *732*                          │
│  when the at least one docking event is determined to    │
│  have occurred, logging the at least one docking event   │
│  with at least one secure timestamp and party metadata   │
└─────────────────────────────────────────────────────────┘
                            │
                            ▼
┌─────────────────────────────────────────────────────────┐
│                         *732a*                          │
│  when the at least one docking event is determined to    │
│  have occurred, triggering at least one local system     │
│  process to at least one capture system time using at    │
│  least one NTP-synchronized time service                 │
└─────────────────────────────────────────────────────────┘
                            │
                            ▼
┌─────────────────────────────────────────────────────────┐
│                         *732b*                          │
│  logging the at least one system time, the at least one  │
│  party credential, authenticated party ID, and the at    │
│  least one unique device identifier in at least one      │
│  tamper-evident audit trail                              │
└─────────────────────────────────────────────────────────┘

Figure 70:
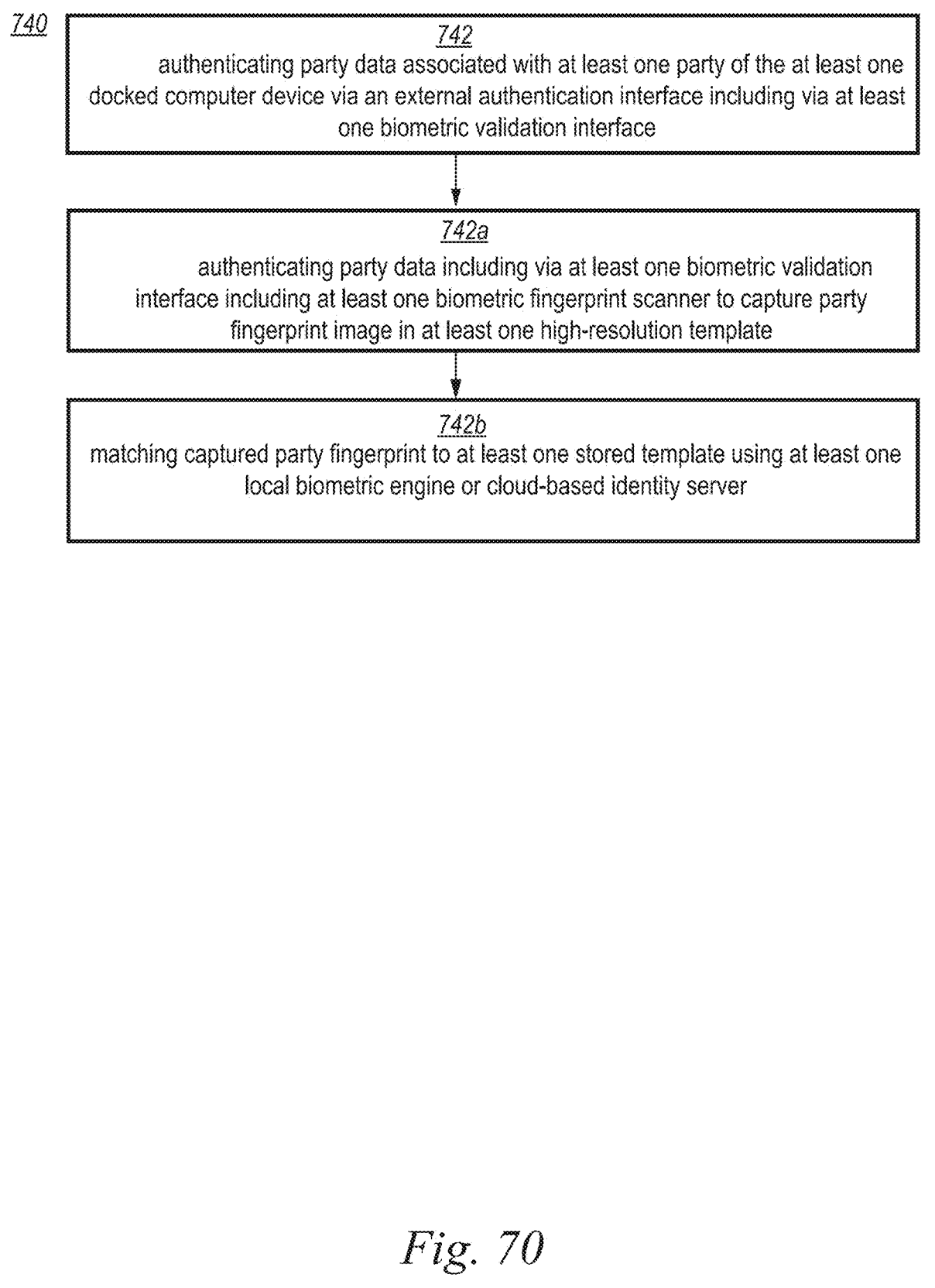

_742_
authenticating party data associated with at least one party of the at least one docked computer device via an external authentication interface including via at least one biometric validation interface _742a_
authenticating party data including via at least one biometric validation interface including at least one biometric fingerprint scanner to capture party fingerprint image in at least one high-resolution template _742b_
matching captured party fingerprint to at least one stored template using at least one local biometric engine or cloud-based identity server

752
concurrently managing a plurality of the at least one computing device 752a
using at least one polling service or interrupt-driven daemon to monitor each of the plurality of the at least one computing device 752b
queuing a plurality of the at least one docking events in at least one message bus utilizing at least one thread-safe, non-blocking event processing

770

772
wherein manual party-device assignments are supported by the administrator 772a
the host GUI provides at least one dropdown menu of available partys and connected computing devices 772b
upon selection, the host manually binds the computing device to the selected party, overriding automatic authentication routines

*810*

*812*
wherein the lock command is encrypted using at least one secure cryptographic algorithm

*812a*
the lock command payload is encrypted using AES-256-GCM with at least one rotating key managed by the host system

*812b*
the encryption key is exchanged with the computing device's agent software using at least one secure key exchange protocol such as Diffie-Hellman

_820_

_822_
wherein an administrator is notified upon successful lock of the computing device _822a_
the host system generates at least one lock event log entry containing the party, computing device ID, and timestamp _822b_
an automated email or webhook is triggered to alert an administrative monitoring dashboard of the lock event

830

832
wherein the computing device automatically locks immediately upon undocking 832a
the host detects voltage drop and triggers at least one lock instruction without party intervention or confirmation 832b
the computing device agent immediately enforces lock policies through preconfigured MDM profiles or internal API calls

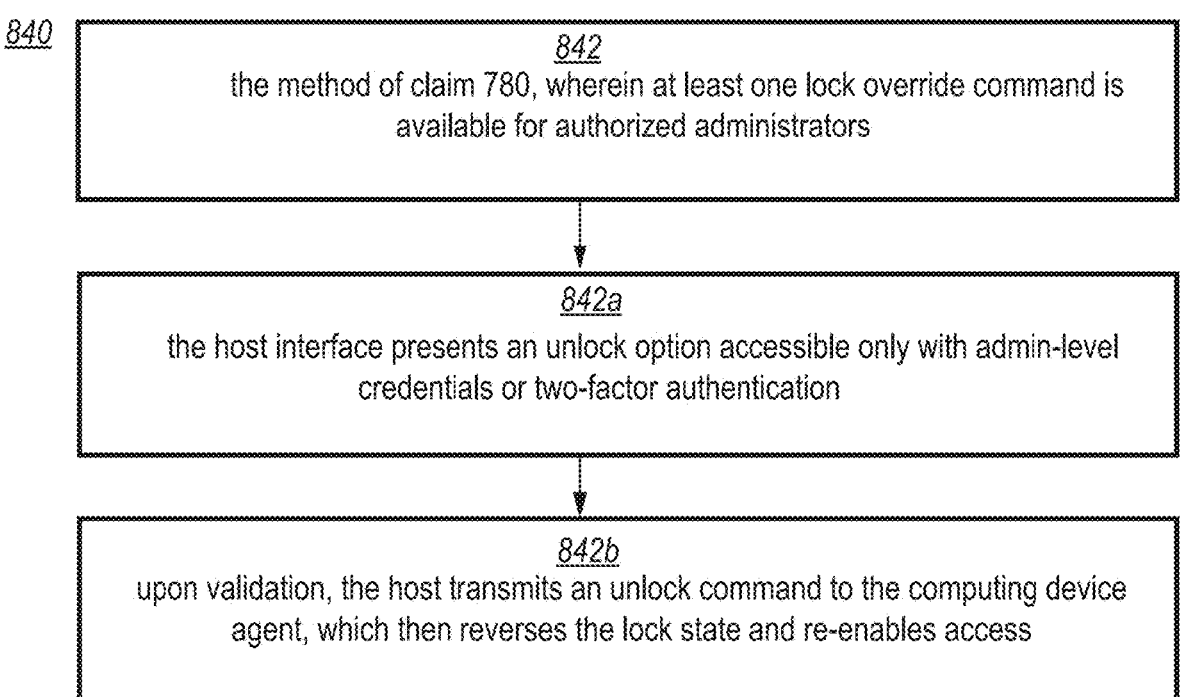

_840_

_842_
the method of claim 780, wherein at least one lock override command is available for authorized administrators _842a_
the host interface presents an unlock option accessible only with admin-level credentials or two-factor authentication _842b_
upon validation, the host transmits an unlock command to the computing device agent, which then reverses the lock state and re-enables access

*Fig. 79*

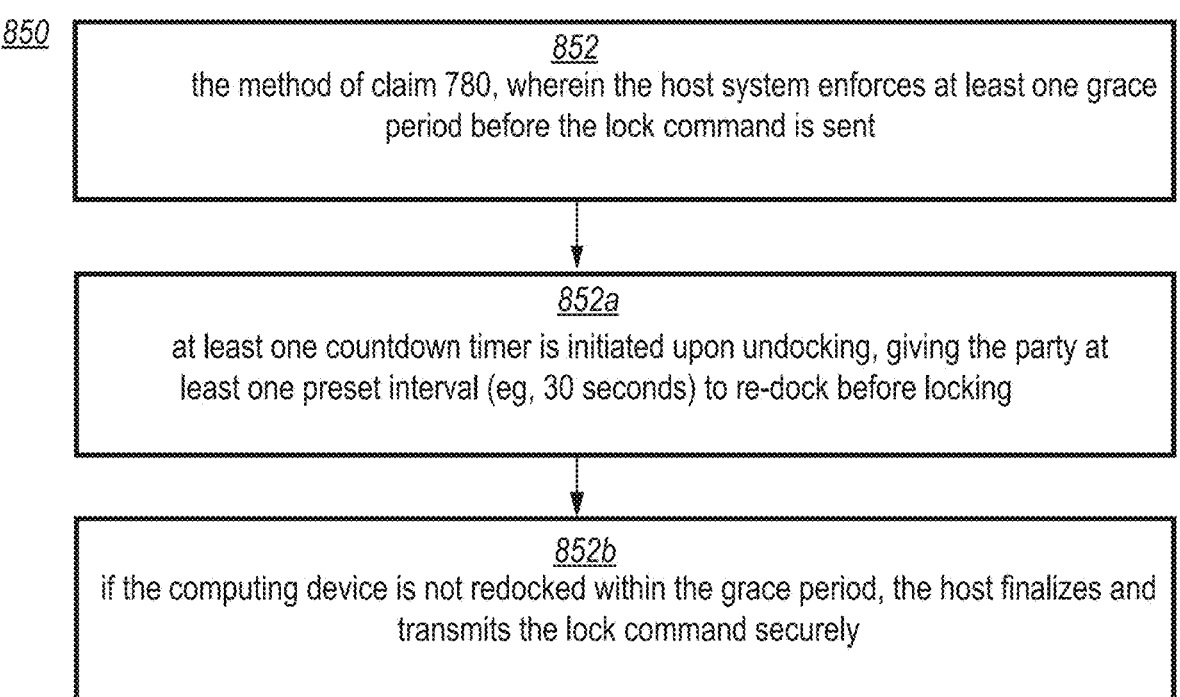

_850_

_852_
the method of claim 780, wherein the host system enforces at least one grace period before the lock command is sent _852a_
at least one countdown timer is initiated upon undocking, giving the party at least one preset interval (eg, 30 seconds) to re-dock before locking _852b_
if the computing device is not redocked within the grace period, the host finalizes and transmits the lock command securely _Fig. 80_

920

922
wherein the configuration profile includes Wi-Fi settings for enterprise networks 922a
the host retrieves WPA2-Enterprise Wi-Fi configuration (SSID, authentication method, certificates) from the MDM server 922b
the configuration is delivered to the computing device with digital signing to prevent unauthorized network configuration injection

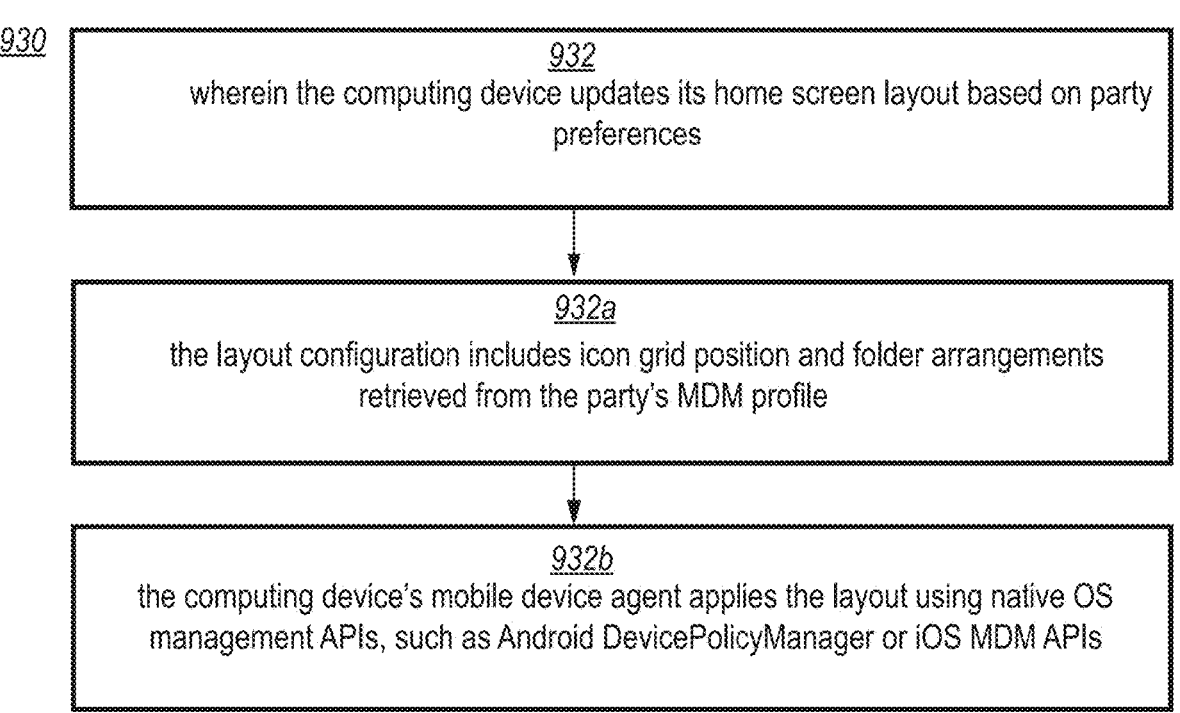

930

932
wherein the computing device updates its home screen layout based on party preferences 932a
the layout configuration includes icon grid position and folder arrangements retrieved from the party's MDM profile 932b
the computing device's mobile device agent applies the layout using native OS management APIs, such as Android DevicePolicyManager or iOS MDM APIs

*Fig. 83*

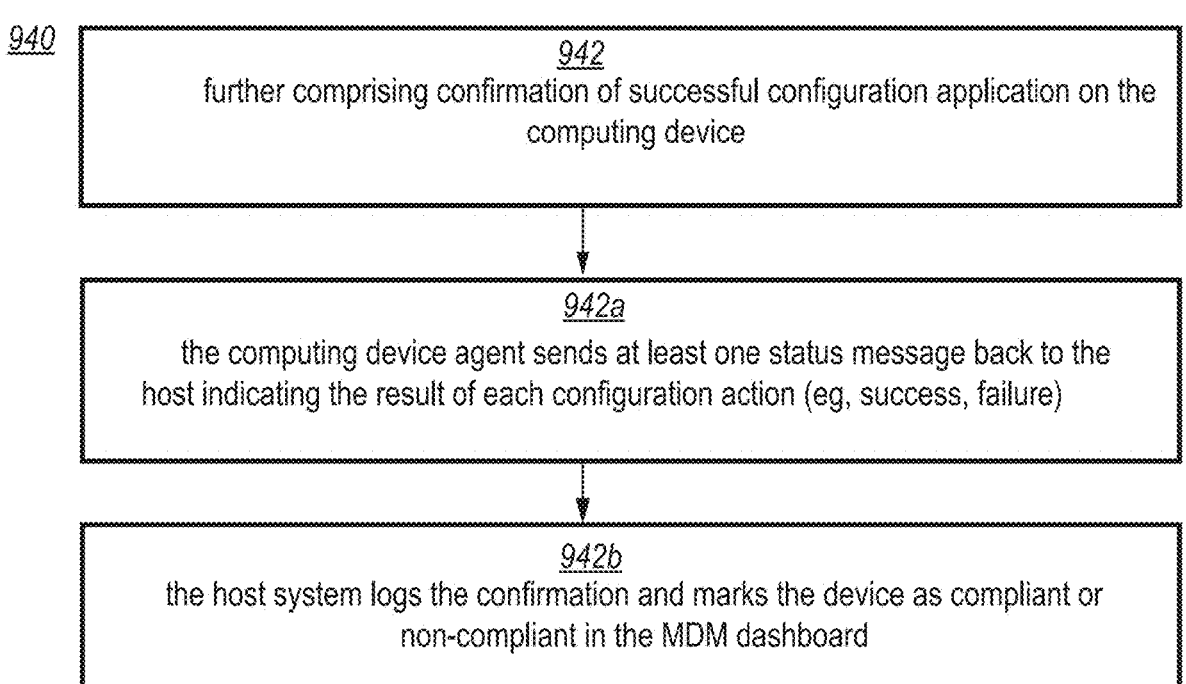

940

942
further comprising confirmation of successful configuration application on the computing device 942a
the computing device agent sends at least one status message back to the host indicating the result of each configuration action (eg, success, failure)

942b
the host system logs the confirmation and marks the device as compliant or non-compliant in the MDM dashboard

962
wherein the computing device receives application restrictions as part of the configuration

962a
the host retrieves at least one list of allowed and disallowed applications from the MDM policy engine

962b
the computing device enforces application-level restrictions by disabling apps via OS-level restrictions or sandboxing features

PORTABLE ELECTRONIC DEVICE MANAGEMENT SYSTEM

In one or more aspects a method for managing the docking and authentication of a tablet computing device in a multi-device charging environment includes determining at least one docking event to have occurred when at least one computing device being uniquely identified is docked to at least one data-power interface of at least one device data-power station assembly; authenticating at least one party associated with the at least one docked computing device via an external authentication interface; retrieving at least one party-specific configuration profile from at least one centralized management server based on the validating the at least one party credential; updating at least one interface of the at least one docked computing device based on the at least one party-specific configuration profile; and synchronizing session data regarding the at least one docked computing device and the at least one party credential with at least one Mobile Device Management (MDM) system.

In implementations the authenticating party data associated with at least one party of the at least one docked computer device via an external authentication interface includes authenticating via at least one identification card reader.

Implementations further include when the at least one docking event is determined to have occurred, logging the at least one docking event with at least one secure timestamp and party metadata.

Implementations further include the authenticating party data associated with at least one party of the at least one docked computer device via an external authentication interface includes authenticating via at least one biometric validation interface.

Implementations further include concurrently managing a plurality of the at least one computing device.

In implementations the party's access attempt is recorded with metadata.

In implementations manual party-device assignments are supported by an administrator module.

Implementations further include In implementations receiving computing device reports regarding battery and health statistics upon docking of the computing device.

In one or more aspects a method for managing the docking and authentication of a tablet computing device in a multi-device charging environment includes detecting when the computing device is undocked; communicating the undocking event to at least one host computer; issuing at least one remote lock command from the host computer to the computing device; and locking the computing device.

In implementations the lock command is encrypted using at least one secure cryptographic algorithm.

In implementations an administrator is notified upon successful lock of the computing device.

In implementations the computing device automatically locks immediately upon undocking.

In implementations at least one lock override command is available for authorized administrators.

In implementations the host system enforces at least one grace period before the lock command is sent.

In one or more aspects a method for managing the docking and authentication of a tablet computing device in a multi-device charging environment includes detecting when the computing device is docked; authenticating the party through at least one connected external authentication mechanism; retrieving the authenticated party's configuration from at least one management server; transmitting the configuration to the computing device computing device; and applying the configuration to the computing device.

In implementations the configuration profile includes Wi-Fi settings for enterprise networks.

In implementations the computing device updates its home screen layout based on party preferences.

Implementations further include generating confirmation of successful configuration application on the computing device.

In implementations the host synchronizes party profiles with at least one cloud-based backup system.

In implementations the computing device receives application restrictions as part of the configuration.

The present disclosure relates generally to the field of computing device management systems and, more specifically, to methods and systems for managing docking events, user authentication, configuration enforcement, session synchronization, and remote access control for portable computing devices in managed environments. The described methods provide for automatic detection of device docking and undocking, multi-factor authentication of associated users or administrators, secure configuration transmission and enforcement via mobile device management (MDM) protocols, and tamper-resistant audit logging of access and state transitions. These methods are particularly suited for enterprise, military, educational, or high-security deployment scenarios involving managed tablet computing devices.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Portable Electronic Device Management System, articles of manufacture, compositions of matter for same that may provide context, for instance, in introducing one or more processes and/or devices described herein.

FIG. 67 is a representative flow diagram associated with aspects of computing device management system of FIG. 66.

FIG. 67A is a representative flow diagram associated with aspects of computing device management system of FIG. 66.

FIG. 67B is a representative flow diagram associated with aspects of computing device management system of FIG. 66.

FIG. 68 is a representative flow diagram associated with aspects of the accessory assembly of FIG. 66.

FIG. 69 is a representative flow diagram associated with aspects of the accessory assembly of FIG. 66.

FIG. 70 is a representative flow diagram associated with aspects of the accessory assembly of FIG. 66.

FIG. 79 is a representative flow diagram associated with aspects of the accessory assembly of FIG. 66.

FIG. 80 is a representative flow diagram associated with aspects of the accessory assembly of FIG. 66.

FIG. 83 is a representative flow diagram associated with aspects of the accessory assembly of FIG. 66.

FIG. 84 is a representative flow diagram associated with aspects of the accessory assembly of FIG. 66.

DETAILED DESCRIPTION

Figure 1:
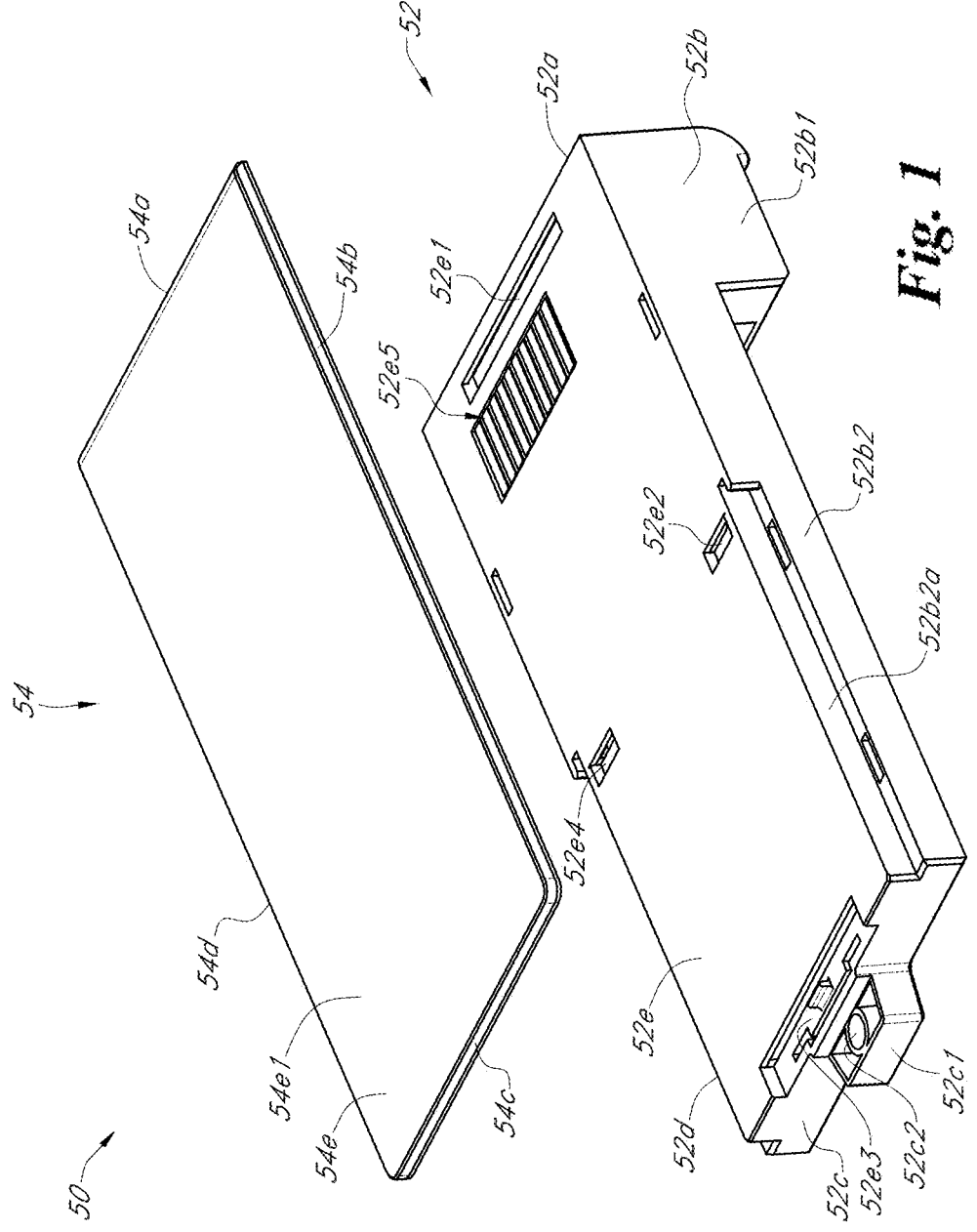
FIG. 1 is an exploded front-bottom-perspective view of an accessory assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

The disclosed embodiments provide a flexible and secure system for managing portable computing devices through physical docking interfaces and centralized configuration enforcement. In various embodiments, the system includes methods for:

Docking Detection and Identification: Monitoring electrical signals or data-line handshakes to detect when a computing device is physically docked. Upon detection, the system identifies the computing device via unique identifiers such as USB descriptors, MAC addresses, or digital certificates.

User Authentication: Prompting for user credentials via external authentication interfaces, including biometric scanners, smart card readers, or PIN entry devices. Credentials are verified using secure authentication protocols against centralized identity directories.

Profile Retrieval and Enforcement: Querying a mobile device management (MDM) server to retrieve user-specific configuration profiles. These profiles may include enterprise Wi-Fi credentials, application restrictions, security policies, and user interface preferences. Configuration data is encrypted and transmitted over secure channels, then applied using platform-native APIs.

Session Logging and Synchronization: Capturing metadata about each docking session, including timestamps, user assignments, and device identifiers. Logs are formatted and transmitted to centralized systems such as SIEM platforms or MDM dashboards for audit and compliance tracking.

Undocking Response and Device Locking: Detecting undocking events and initiating remote lock commands via secure cryptographic channels. The system may also support administrator notifications, lock override mechanisms, or grace periods prior to lock enforcement.

Manual Administrative Controls: Allowing administrators to manually assign users to devices, override lock states, or monitor multiple docking stations concurrently. These actions are securely logged and integrated into compliance workflows.

Cloud Synchronization and Compliance Feedback: Enabling cloud-based backup of configuration profiles and feedback from the device regarding successful application of policies, including application of Wi-Fi settings, app restrictions, and layout changes.

Collectively, these features provide a robust framework for lifecycle control, security enforcement, and policy compliance for managed computing devices in institutional or enterprise deployments.

The present invention relates to systems and methods for managing tablet devices in multi-user environments. More specifically, it pertains to the management of tablet docking, authentication, configuration, and security in enterprise or shared-use environments. As organizations and institutions increasingly deploy tablet devices for temporary or multi-user usage, it becomes essential to streamline user access, enforce security policies, and ensure proper configuration management without manual intervention. Traditional methods often involve cumbersome logins and manual device configuration, which are inefficient, error-prone, and do not scale well for environments with a large number of mobile devices. This invention provides an automated solution to manage tablets by leveraging docking stations and remote authentication systems, thereby optimizing both security and user experience.

The present invention relates to systems and methods for managing tablet computing devices in shared-use environments. More particularly, the invention pertains to techniques for detecting docking and undocking events, authenticating users through external input mechanisms, retrieving and applying user-specific configuration profiles from centralized management systems, and enforcing device security policies upon disconnection. The invention further integrates with Mobile Device Management (MDM) platforms to maintain compliance, streamline deployment, and enhance enterprise-level control over mobile endpoints.

The system described in this invention addresses the need for seamless user authentication, personalized configuration, and secure session management in environments such as educational labs, hospitals, enterprise offices, and public kiosks. It does so by leveraging docking stations (Smart Locking Electronic Docks, or SLEDs) and host computers (e.g., Mac or PC), which enable dynamic device configuration and locking mechanisms when devices are docked or undocked. Additionally, the invention is designed to integrate with existing Mobile Device Management (MDM) systems, ensuring that security policies and configuration profiles are consistently applied across all devices.

The invention provides an automated method and system for managing tablet computing devices in a shared-use environment. It includes the following key components:

Tablet Docking: A docking station (SLED) is used to detect the connection of tablets via USB or other interfaces, ensuring seamless docking detection.

User Authentication: Upon docking, an external authentication device (e.g., biometric scanner, smart card reader) is used to authenticate the user. The host system communicates with centralized identity management servers to verify credentials.

Profile Retrieval and Application: Once the user is authenticated, a configuration profile is retrieved from a centralized server or MDM system. This profile includes personalized settings such as applications, access restrictions, network settings, and security policies.

Device Locking and Security: Upon undocking, the device is locked remotely to ensure that sensitive data is protected, and access is restricted.

MDM Integration: All device events (e.g., docking, authentication, undocking) are logged and synchronized with an MDM system to ensure compliance with security policies.

This invention reduces administrative overhead, improves user experience, and strengthens security by automating critical functions such as user authentication, device configuration, and security enforcement. It is highly scalable and can be deployed across various environments, from small office setups to large institutional deployments.

The invention utilizes a combination of hardware and software components to automate the docking and undocking process. The host computer (Mac or PC) executes a suite of software modules responsible for handling the tablet docking events, user authentication, configuration management, and security enforcement. The software modules interact with the SLED (Smart Locking Electronic Dock) hardware, which provides the physical interface for docking tablets. When a tablet is docked, the host software detects the event, triggers user authentication, and applies the user's profile. Upon undocking, the software initiates a secure lock command to prevent unauthorized access to the device.

Tablet Detection

The Docking Detection Module continuously polls USB or proprietary connection points on the host computer for any changes in device connectivity. This is achieved through monitoring of device descriptors (e.g., serial number, UUID, device type) sent from the tablet. Once a connection event is detected, the module retrieves unique identifiers such as the device's Universal Serial Bus (USB) descriptor or Unique Device Identifier (UUID) to confirm that a tablet device is docked. The module also verifies that the device is a tablet by inspecting device descriptors or other identifiers associated with tablet form factors.

Authentication Workflow

Upon docking, the Authentication Interface Module activates, prompting the user for authentication. Depending on the system configuration, the authentication mechanism can be a biometric scan (e.g., fingerprint, facial recognition), an ID card swipe, or PIN input. The module securely transmits the collected credentials to the Authentication Engine, which verifies the data against a centralized identity management system (e.g., Lightweight Directory Access Protocol (LDAP), OAuth-based identity services). If the credentials are valid, the Authentication Engine sends a confirmation token to the Configuration Engine, allowing the configuration retrieval process to begin.

Profile Retrieval and Configuration

Once the user is authenticated, the Profile Retrieval Module sends a request to the Mobile Device Management (MDM) system to fetch the user's configuration profile. This profile contains settings such as: App Whitelists: A list of permitted applications for the user. Network Settings: Wi-Fi, VPN, or other network-related configurations. Device Policies: Security policies, screen lock settings, and other restrictions.

The Configuration Dispatcher Module then formats the profile data into a device-compatible structure (e.g., JavaScript Object Notation (JSON) or Extensible Markup Language (XML)) and securely transmits it to the tablet using Transport Layer Security (TLS) or similar encryption protocols. The tablet receives the configuration data, applies the settings, and sends an acknowledgment back to the host system.

Session Management and Synchronization. Throughout the process, the MDM Sychronization Module maintains a session log, recording events such as docking, authentication, profile application, and undocking. This log is transmitted to the MDM system for audit and compliance purposes. The MDM Synchronization Client ensures that all session events are synchronized with the MDM system, providing IT administrators with real-time visibility into device status and user sessions.

Locking Upon Undocking. Upon undocking, the Lock Enforcement Module detects the disconnection event and immediately triggers a lock command. The lock command is encrypted and transmitted to the tablet, instructing it to lock the screen, disable user input, and enforce full disk encryption if required. The lock command is verified by the tablet's internal MDM client and executed according to the security policies defined in the configuration profile.

Audit and Compliance Logging. The Event Logger Module continuously records docking, authentication, and undocking events, including metadata such as timestamps, device identifiers, user identifiers, and action results. These logs are stored securely and can be exported to centralized logging systems (e.g., Security Information and Event Management (SIEM) systems) for compliance tracking.

Multi-Tablet Support. In environments with multiple docking stations, the system supports the simultaneous management of multiple tablets. The Event Logger Module tracks each docking station's state and ensures that all connected devices are properly authenticated and configured. Each docking station is assigned a unique identifier, and the system tracks which user is assigned to each device during the session.

Automatic Lock Upon Undocking. The system can also be configured to automatically lock the tablet upon undocking without requiring additional user input. The Lock Enforcement Module monitors for disconnection events and triggers the lock sequence immediately upon detecting that a tablet has been undocked, reducing the window of time in which the device is left unsecured.

Administrative Control. The Admin Notification Module allows IT administrators to manually assign users to tablets, override lock commands, and remotely unlock devices. Administrators can interact with the system via a graphical user interface (GUI), which provides an overview of all active devices, user sessions, and security states.

Cloud Synchronization. To support remote environments and users who may be off-site, the system supports synchronization of user profiles and configurations with cloud storage systems. The MDM Syncchronization Module enables the system to upload and download user data securely via cloud-based storage solutions, ensuring that device configurations are consistent across different physical locations.

The invention provides a comprehensive and automated method for managing tablet computing devices in environments where devices are shared among multiple users. The core components of the system include:

Docking Detection: The invention utilizes electrical signal monitoring and USB enumeration to detect when a tablet is docked to a SLED unit. The system retrieves unique identifiers such as Universal Serial Bus (USB) descriptors or Unique Device Identifiers (UUIDs) to recognize the device.

External Authentication: Upon docking, the user is prompted to authenticate using an external mechanism such as a smart card reader, biometric scanner, or PIN input device. Authentication data is transmitted securely to an identity management system (e.g., Lightweight Directory Access Protocol (LDAP) or OAuth-compliant server) and evaluated in real time.

Profile Retrieval: Following successful authentication, the host queries a centralized configuration server or MDM system for a user-specific profile. The profile may include network settings, app permissions, visual themes, and security policies.

Configuration Application: The retrieved profile is formatted into a compatible payload (e.g., JavaScript Object Notation (JSON) or Extensible Markup Language (XML)) and transmitted to the tablet via a secure channel. A client agent on the tablet applies the profile settings using system-level interfaces.

Security Enforcement and Locking: When the tablet is undocked, the system automatically initiates a lock sequence, sending a digitally signed and encrypted lock command to the tablet to restrict access, enforce encryption, or initiate other security measures as configured.

MDM Integration and Logging: All session events-including docking, authentication, configuration delivery, and undocking—are logged by the host software and synchronized with an MDM platform. Logs include timestamps, user IDs, and device metadata, providing IT administrators with a complete audit trail.

The disclosed method improves security, reduces administrative burden, and enhances usability in institutional or enterprise environments where tablets are deployed for shared access. The modular architecture allows for easy integration with existing infrastructure and supports scalability across multiple docking stations and users.

Turning to FIG. 1, depicted therein is an exploded front-bottom-perspective view of accessory assembly 50. Depicted implementation of accessory assembly 50 is shown to include main assembly 52, and cover assembly 54. Depicted implementation of main assembly 52 is shown to include side 52*a*, side 52*b*, side 52*c*, side 52*d*, and back side 52*e*.

Depicted implementation of side 52*b* is shown to include base portion 52*b*1, extended portion 52*b*2, and elongated groove 52*b*2*a*, which can be seen as having an L-shaped side profile. Depicted implementation of side 52*c* is shown to include protrusion 52*c*1, and aperture 52*c*2. Depicted implementation of back side 52*e* is shown to include notch 52*e*1, notch 52*e*2, notch 52*e*3, notch 52*e*4, and electric contacts interface 52*e*5.

Depicted implementation of cover assembly 54 is shown to include side 54*a*, side 54*b*, side 54*c*, side 54*d*, base 54*e*, and exterior side 54*e*1. In implementations, accessory assembly 50 can include various service functions for portable electronic tablet device implementation 100 (shown in FIG. 17) or portable electronic phone device implementation 120 (shown in FIG. 27) such as storage of electrical power and electronic-based communication.

Figure 2:
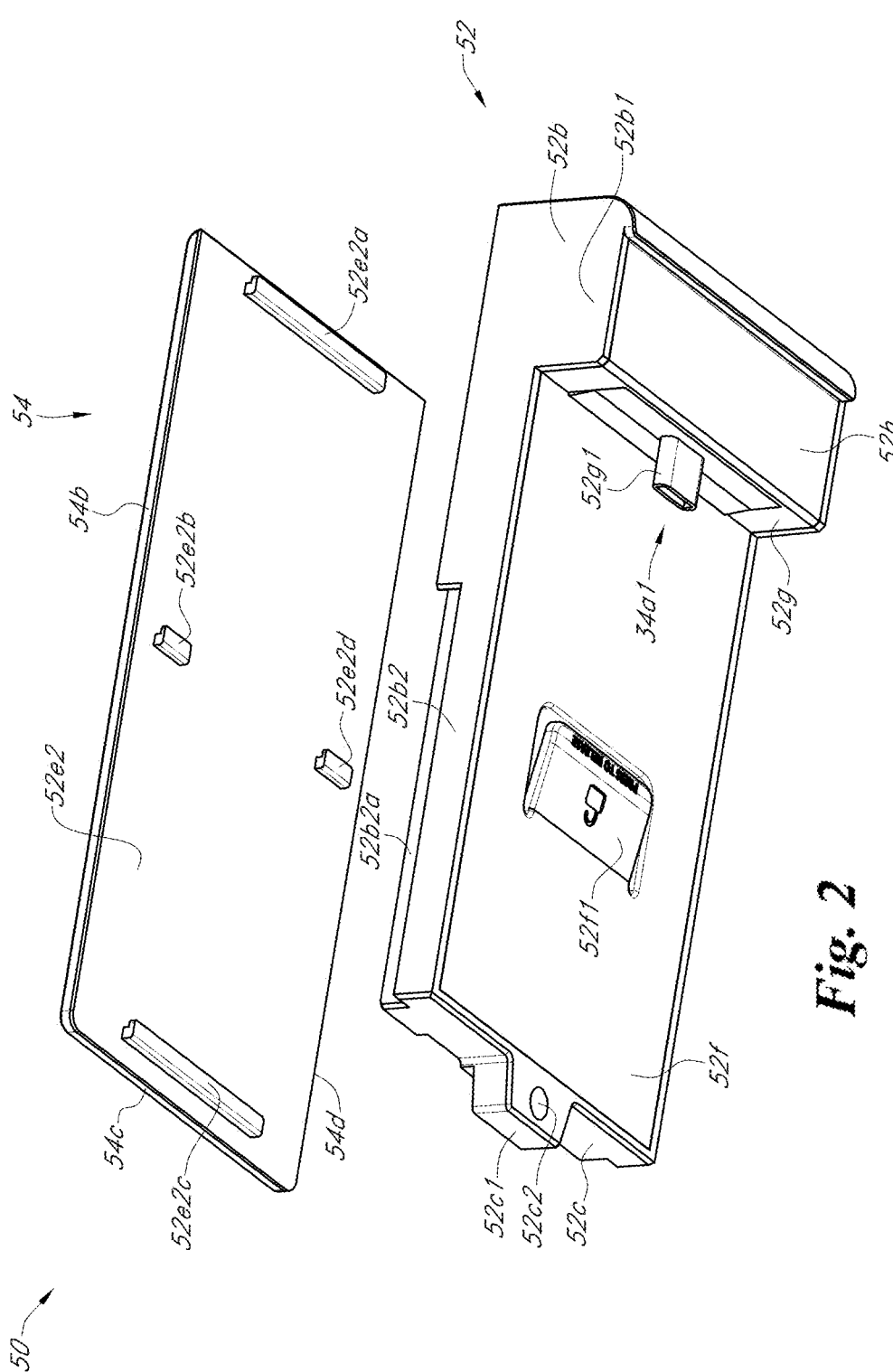
FIG. 2 is an exploded front-top-perspective view of the accessory assembly of FIG. 1.

Turning to FIG. 2, depicted therein is an exploded front-top-perspective view of accessory assembly 50. Depicted implementation of back side 52*e* is shown to include notch 52*e*2, protrusion 52*e*2*a*, protrusion 52*e*2*b*, protrusion 52*e*2*c*, and protrusion 52*e*2*d*. Depicted implementation of main assembly 52 is shown to include front portion 52*f* with hinged tab 52*f*1, coupling side 52*g* with electric plug 52*g*1, and front portion 52*h*.

Figure 3:
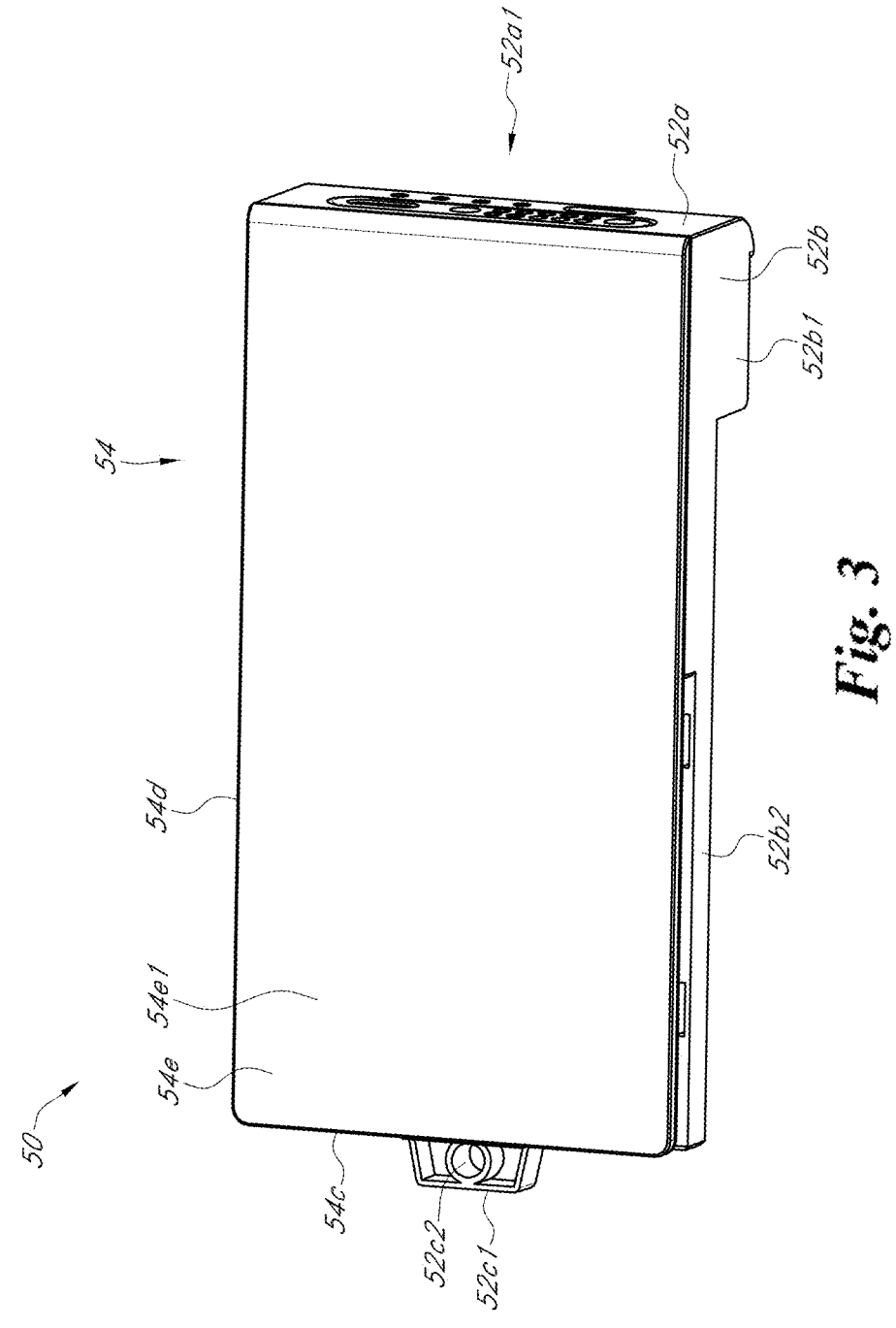
FIG. 3 is a bottom-perspective view of the accessory assembly of FIG. 1.

Turning to FIG. 3, depicted therein is a bottom-perspective view of accessory assembly 50. Depicted implementation of main assembly 52 is shown to include exterior electric interface 52*a*1.

Figure 4:
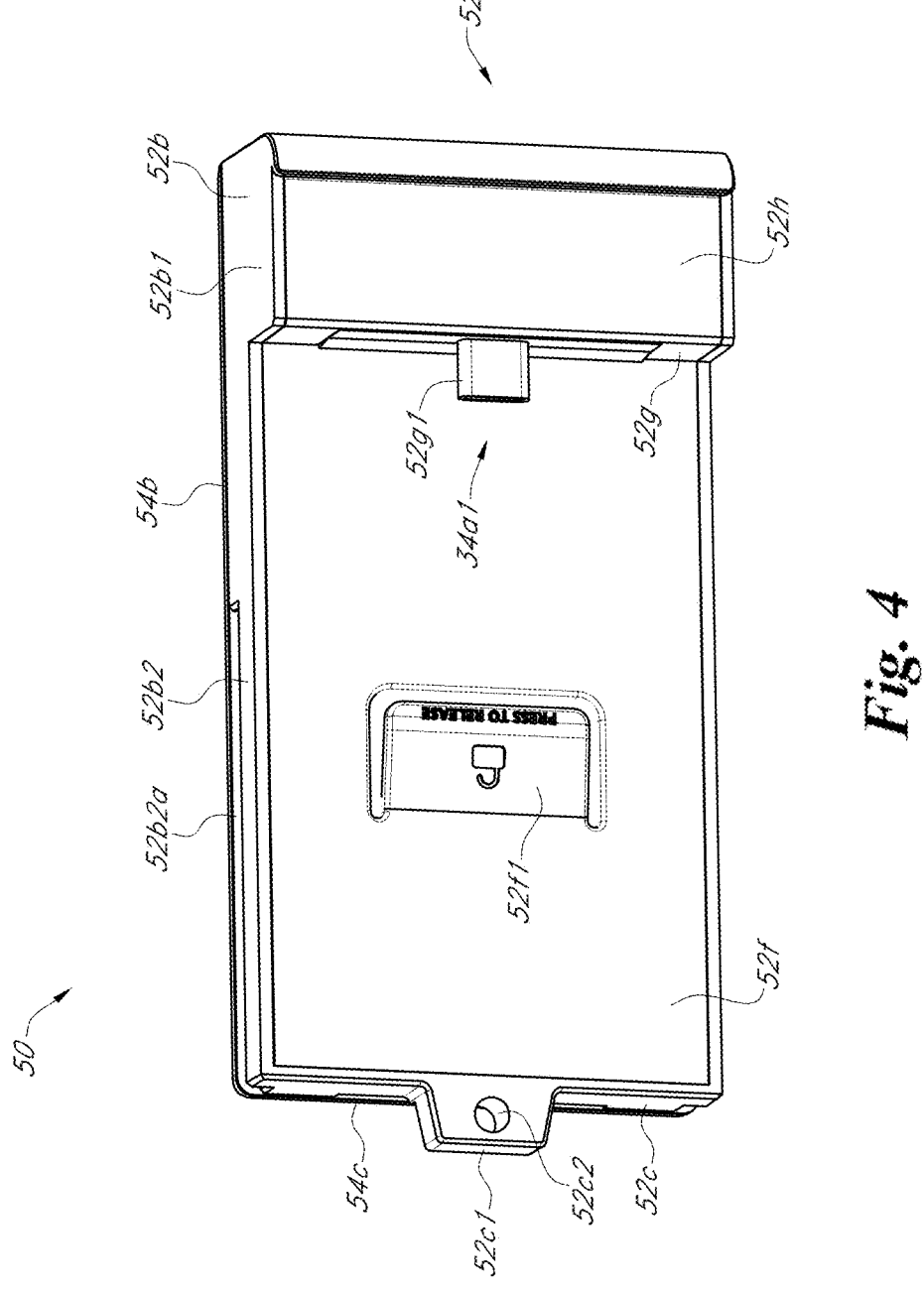
FIG. 4 is a top-perspective view of the accessory assembly of FIG. 1.

Turning to FIG. 4, depicted therein is a top-perspective view of accessory assembly 50.

Figure 5:
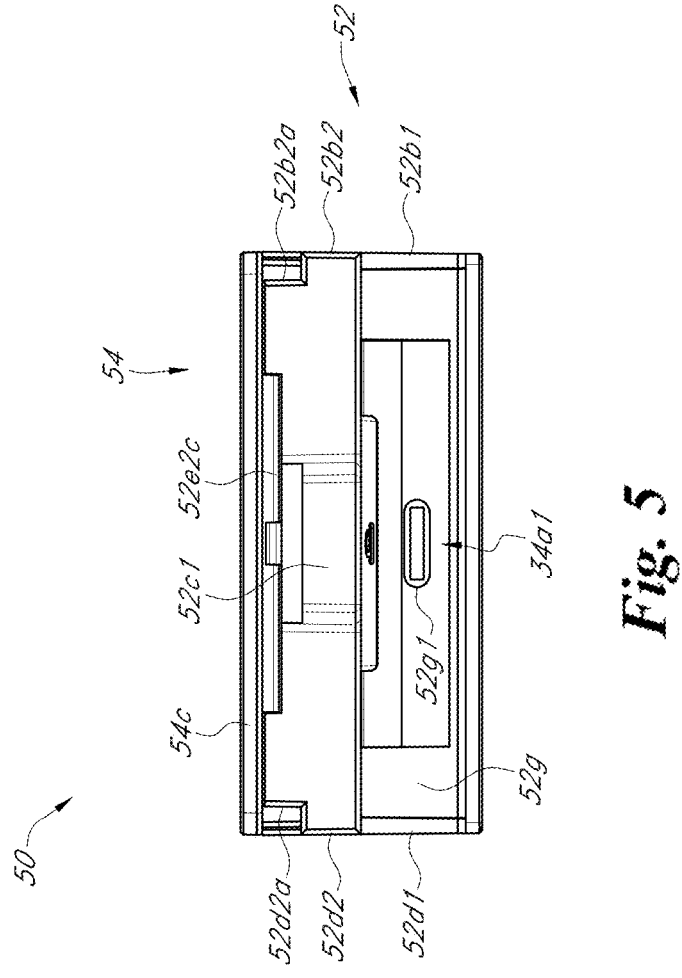
FIG. 5 is a front-elevational view of the accessory assembly of FIG. 1.

Turning to FIG. 5, depicted therein is a front-elevational view of accessory assembly 50. Depicted implementation of main assembly 52 is shown to include base portion 52*d*1, extended portion 52*d*2, and elongated groove 52*d*2*a*.

Figure 6:
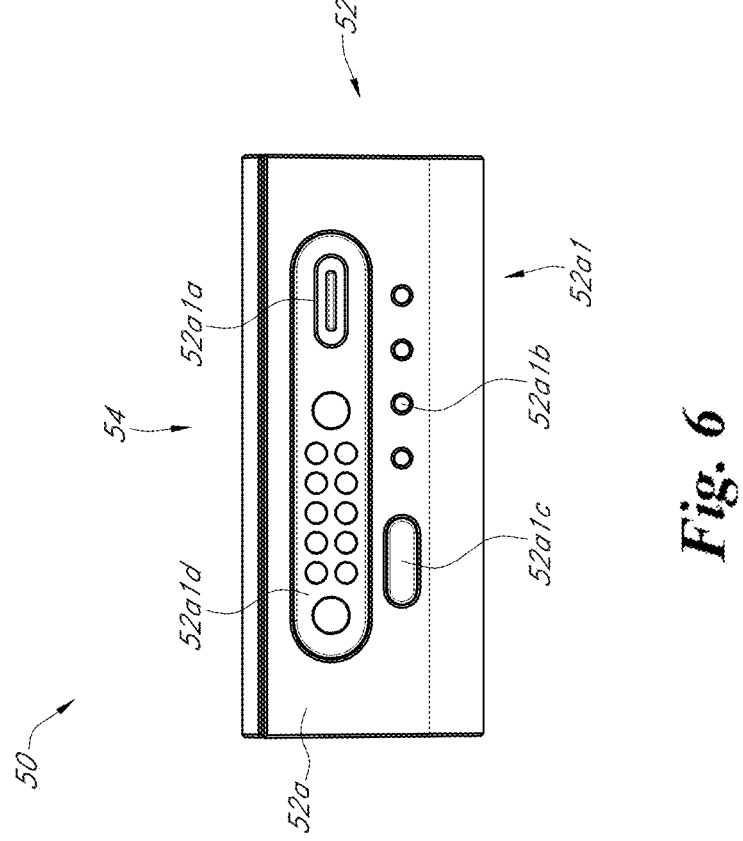
FIG. 6 is a rear-elevational view of the accessory assembly of FIG. 1.

Turning to FIG. 6, depicted therein is a rear-elevational view of accessory assembly 50. Depicted implementation of exterior electric interface 52*a*1 is shown to include interface portion 52*a*1*a*, interface portion 52*a*1*b*, interface portion 52*a*1*c*, and interface portion 52*a*1*d*.

Figure 7:
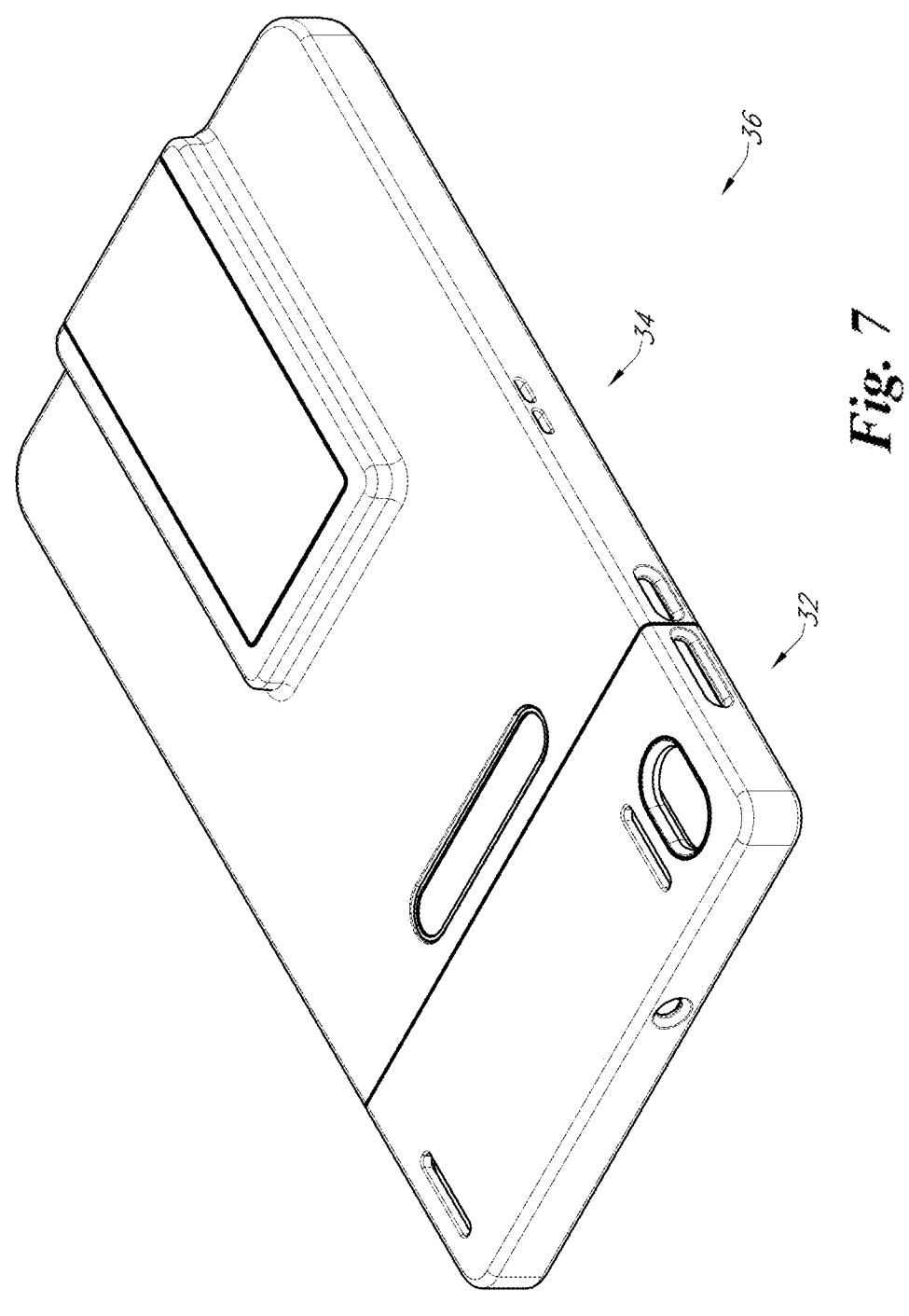
FIG. 7 is a front-bottom-perspective view of the case assembly of FIG. 12.

Turning to FIG. 7, depicted therein is a front-bottom-perspective view of device case assembly 30.

Figure 8:
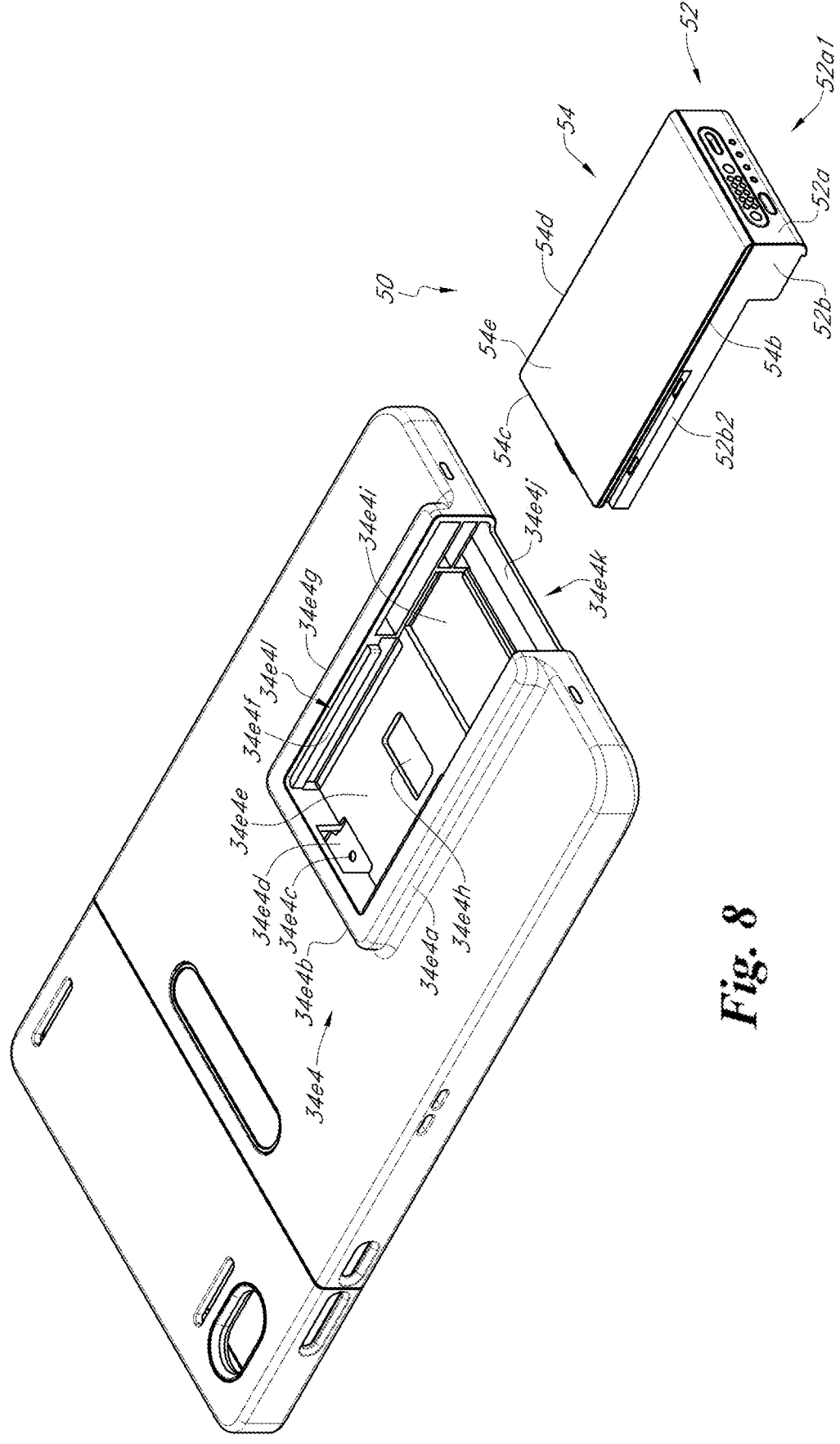
FIG. 8 is a rear-bottom perspective view of the accessory assembly of FIG. 1 uncoupled from the case assembly of FIG. 12.

Turning to FIG. 8, depicted therein is a rear-bottom perspective view of accessory assembly 50 uncoupled from device case assembly 30. Depicted implementation of coupler assembly 34e4 is shown to include side wall 34e4a, side wall 34e4b, aperture 34e4c, aperture 34e4d, raised base portion 34e4e, elongated protrusion 34e4f, side wall 34e4g, aperture 34e4h, aperture 34e4i, recessed base portion 34e4j, opening 34e4k, and interior area 34e4l. As depicted, interior area 34e4l is in part bounded by side wall 34e4a, side wall 34e4b, raised base portion 34e4e, side wall 34e4g, and recessed base portion 34e4j to couple with accessory assembly 50.

Figure 9:
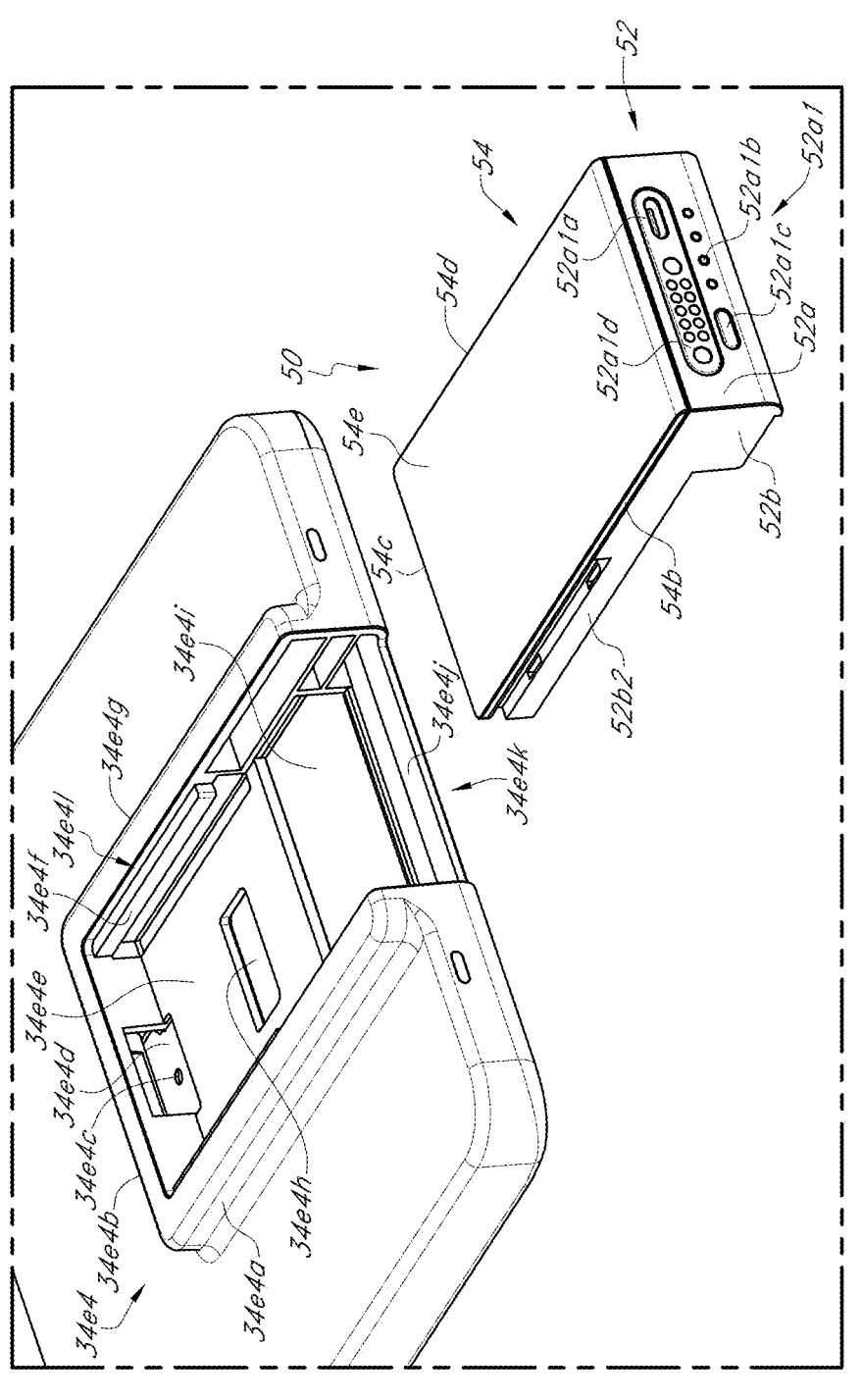
FIG. 9 is a rear-bottom perspective view of the accessory assembly of FIG. 1 uncoupled from a portion of the case assembly of FIG. 12.

Turning to FIG. 9, depicted therein is a rear-bottom perspective view of accessory assembly 50 uncoupled from a portion of device case assembly 30.

Figure 10:
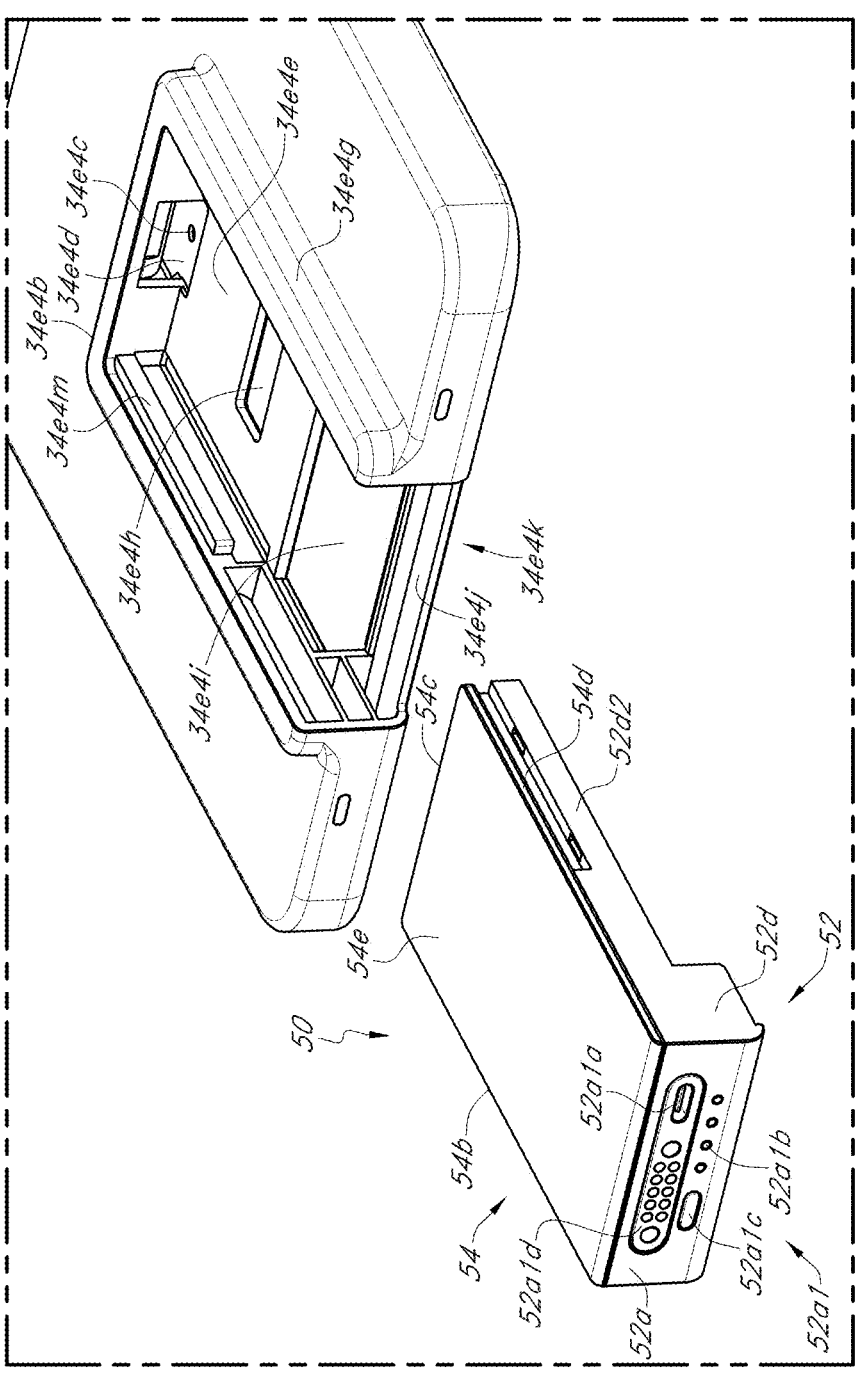
FIG. 10 is a rear-bottom perspective view of the accessory assembly of FIG. 1 uncoupled from a portion of the case assembly of FIG. 12.

Turning to FIG. 10, depicted therein is a rear-bottom perspective view of accessory assembly 50 uncoupled from a portion of device case assembly 30. Depicted implementation of coupler assembly 34e4 is shown to include elongated protrusion 34e4m.

Figure 11:
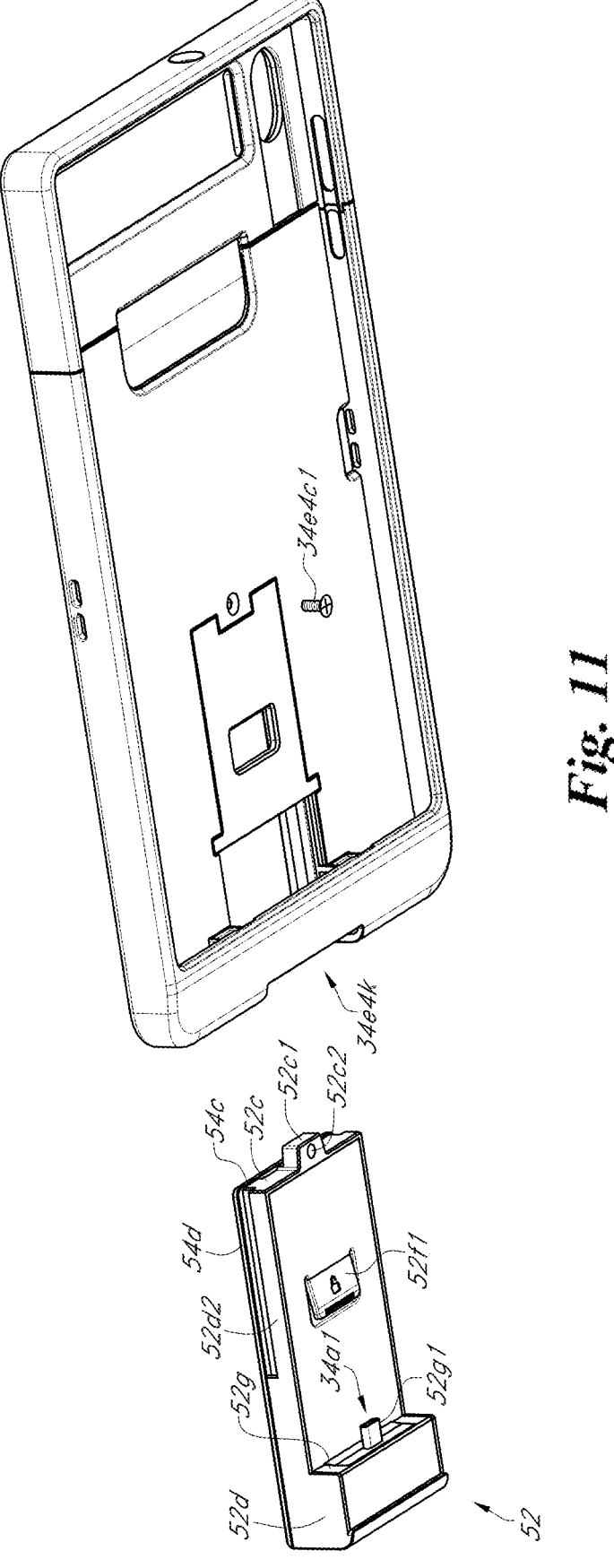
FIG. 11 is a front-top perspective view of the accessory assembly of FIG. 1 uncoupled from the case assembly of FIG. 12.

Turning to FIG. 11, depicted therein is a front-top perspective view of accessory assembly 50 uncoupled from device case assembly 30. Depicted implementation of aperture 34e4c is shown to include threaded coupler 34e4c1.

Figure 12:
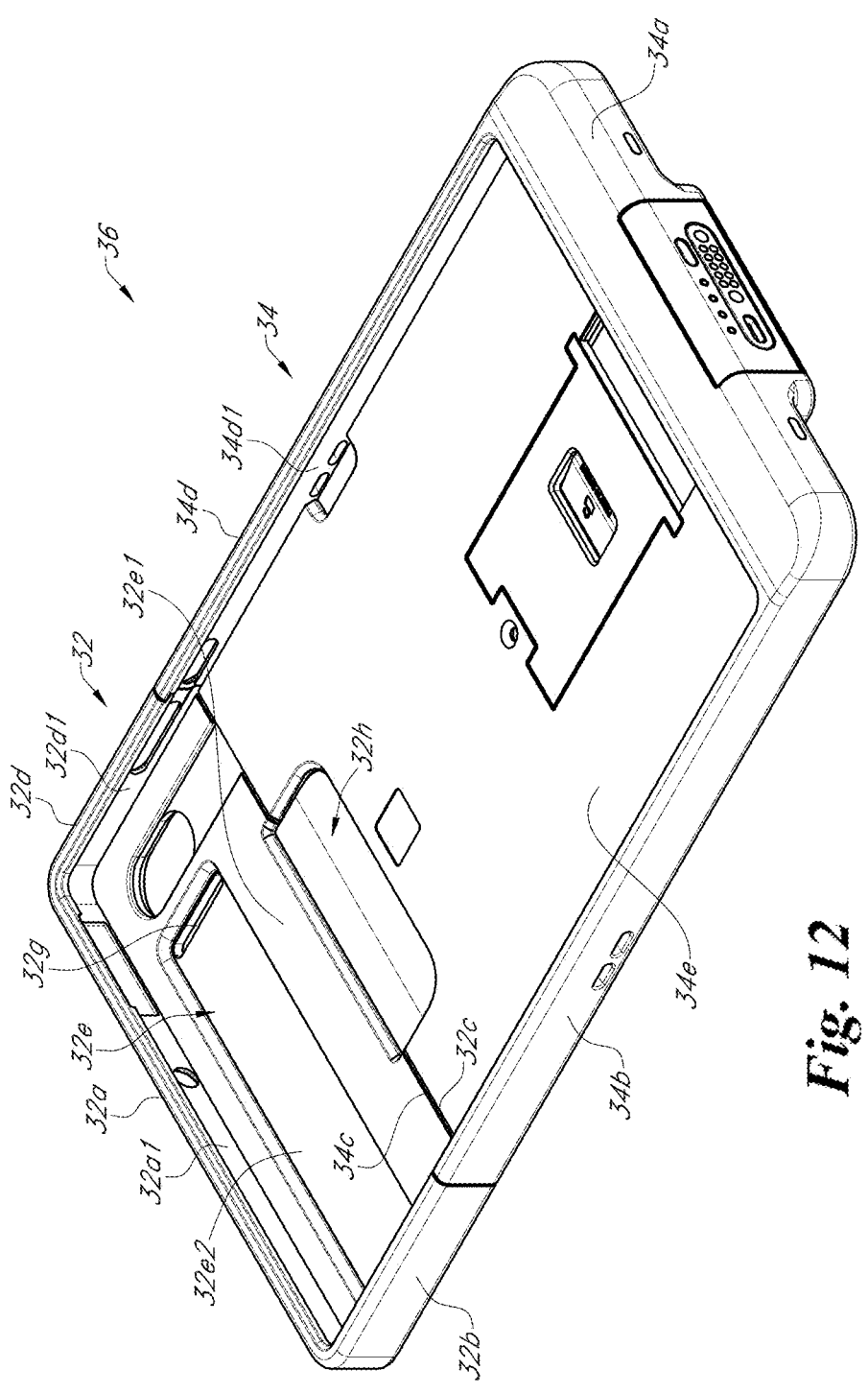
FIG. 12 is a rear-top-perspective view of the cap assembly of FIG. 56 and a main assembly coupled together to form a case assembly.

Turning to FIG. 12, depicted therein is a rear top perspective view of cap assembly 32 and main assembly 34 coupled together to form device case assembly 30. Depicted implementation of cap assembly 32 is shown to include elongated groove 32d1, raised portion 32e1, and recessed portion 32e2. As depicted, side wall 32b and side wall 32d extend perpendicular with respect to side wall 32a. As depicted, side edge 32c extends parallel with respect to side wall 32a. As depicted, side edge 32c is spaced from side wall 32a along side wall 32b and side wall 32d.

Depicted implementation of main assembly 34 is shown to include side wall 34a, side wall 34b, side edge 34c, side wall 34d, groove 34d1, and base 34e. As depicted, side wall 34b and side wall 34d extend perpendicular with respect to side wall 34a. As depicted, side edge 34c extends parallel with respect to side wall 34a. As depicted, when cap assembly 32, and cap assembly 32, are coupled together, side wall 32a, side wall 32b, side wall 32d, and base 32e of cap assembly 32, and side wall 34a, side wall 34b, side wall 32d, and base 34e of main assembly 34 form an interior area to couple with portable electronic tablet device implementation 100 (shown in FIG. 16).

Figure 13:
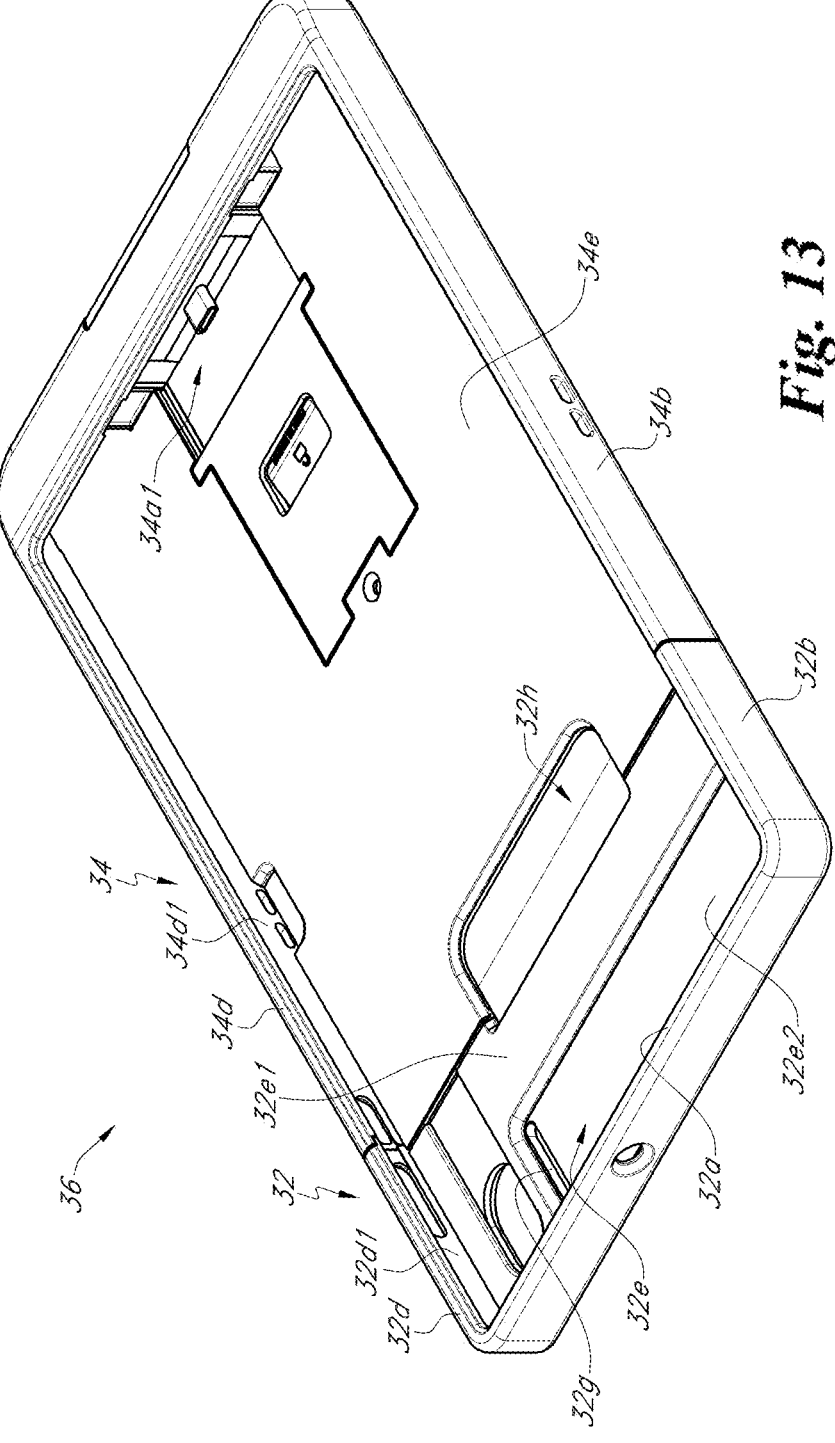
FIG. 13 is a front-top-perspective view of the case assembly of FIG. 12.

Turning to FIG. 13, depicted therein is a front-top-perspective view of device case assembly 30. Depicted implementation of main assembly 34 is shown to include portable electric interface 34a1.

Figure 14:
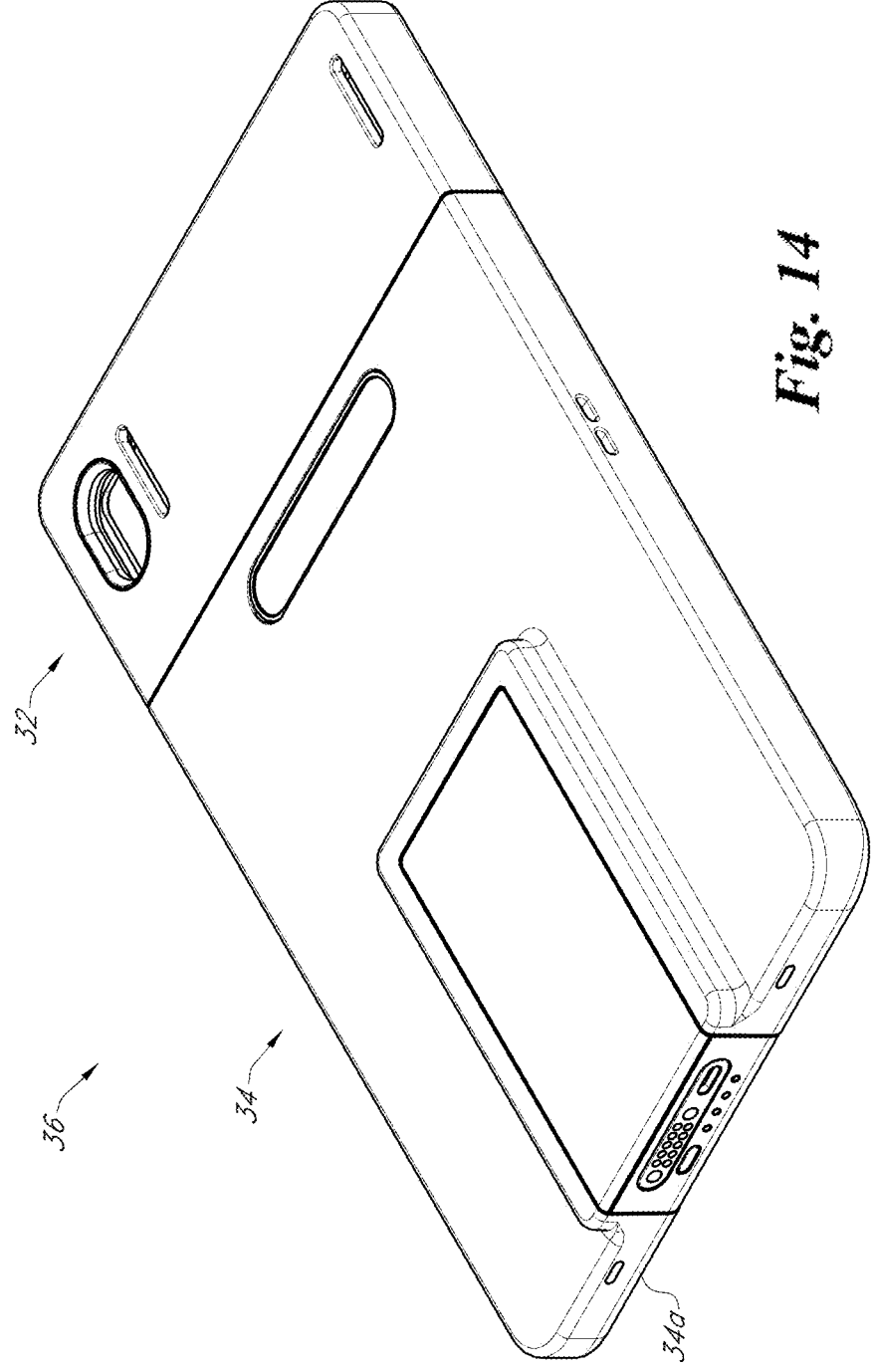
FIG. 14 is a rear-bottom-perspective view of the case assembly of FIG. 12.

Turning to FIG. 14, depicted therein is a rear-bottom-perspective view of device case assembly 30.

Figure 15:
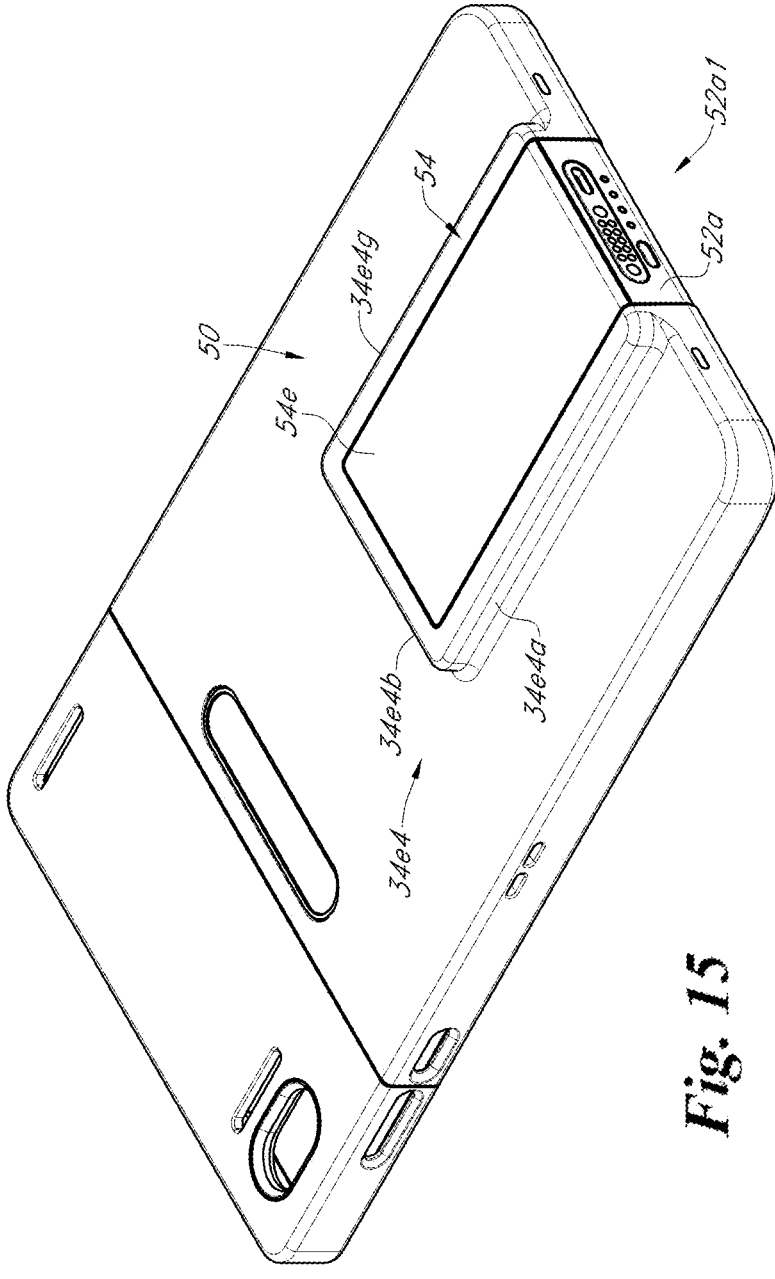
FIG. 15 is a rear-bottom perspective view of the accessory assembly of FIG. 1 coupled with the case assembly of FIG. 12.

Turning to FIG. 15, depicted therein is a rear-bottom perspective view of accessory assembly 50 coupled with device case assembly 30.

Figure 16:
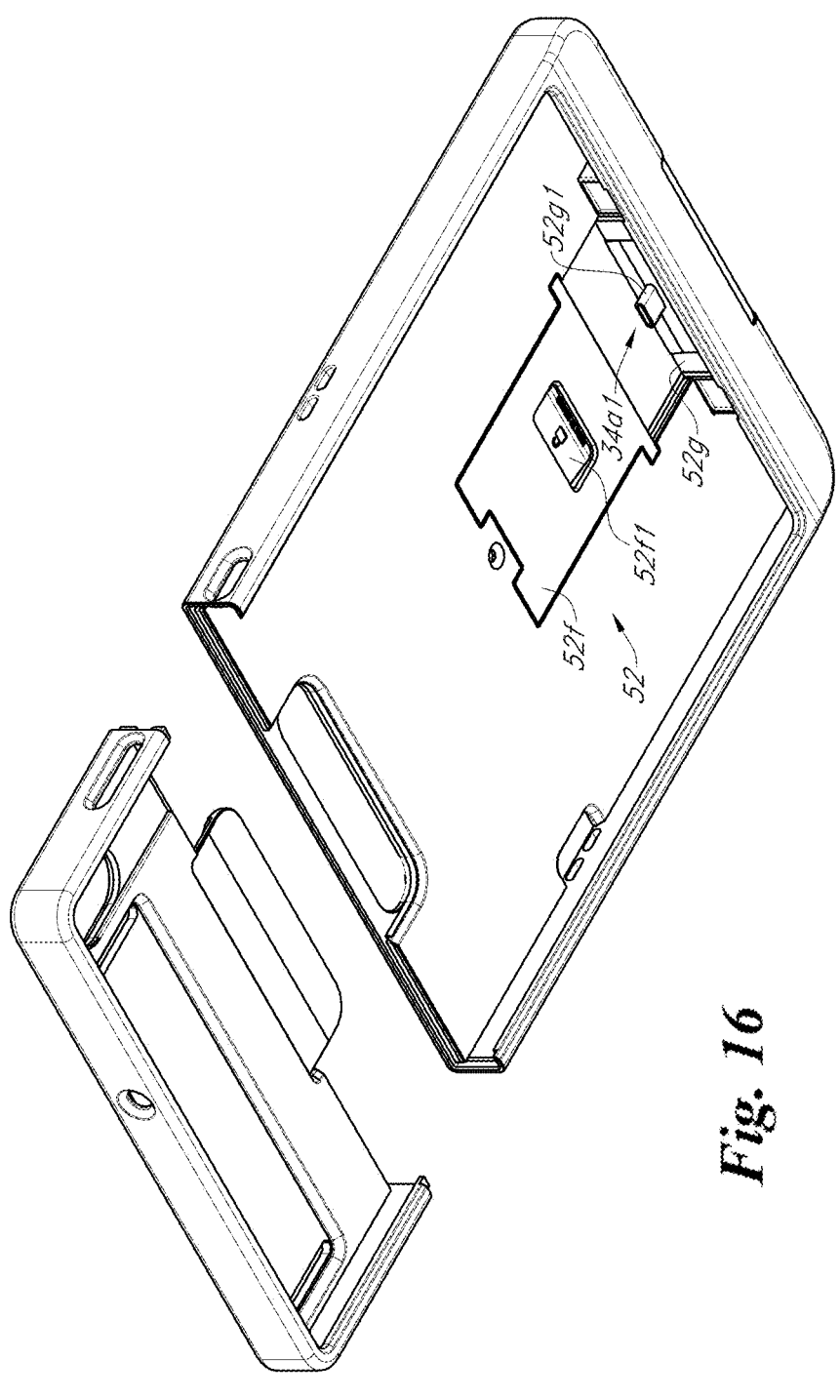
FIG. 16 is a front-top perspective view of the accessory assembly of FIG. 1 coupled with a portion of an exploded view of the case assembly of FIG. 12.

Turning to FIG. 16, depicted therein is a front-top perspective view of accessory assembly 50 coupled with a portion of an exploded view of device case assembly 30.

Figure 17:
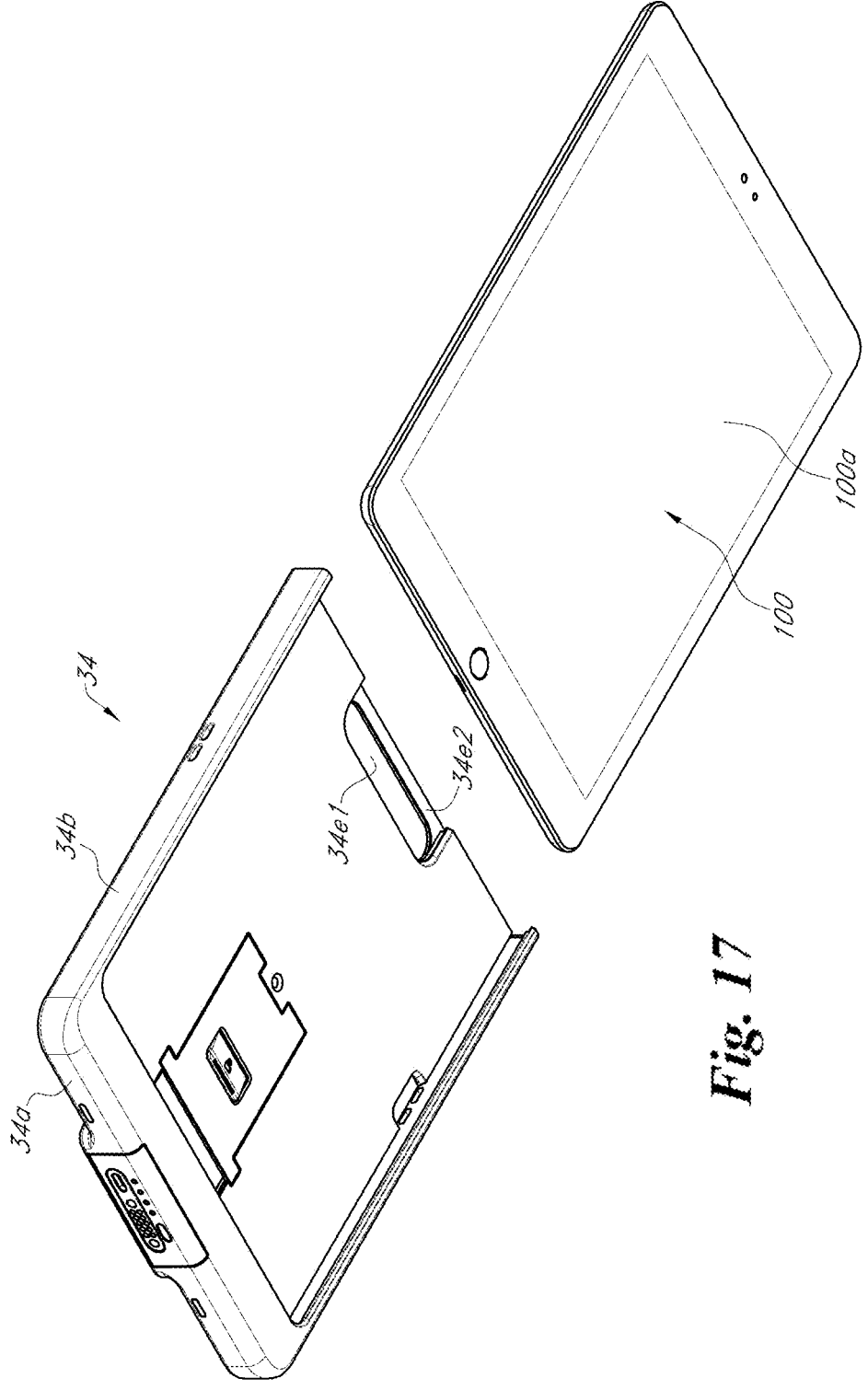
FIG. 17 is a front-rear perspective of a portion of the case assembly of FIG. 12 and an electronic device.

Turning to FIG. 17, depicted therein is a front-rear perspective of a portion of device case assembly 30 and portable electronic tablet device implementation 100 with display 100a.

Figure 18:
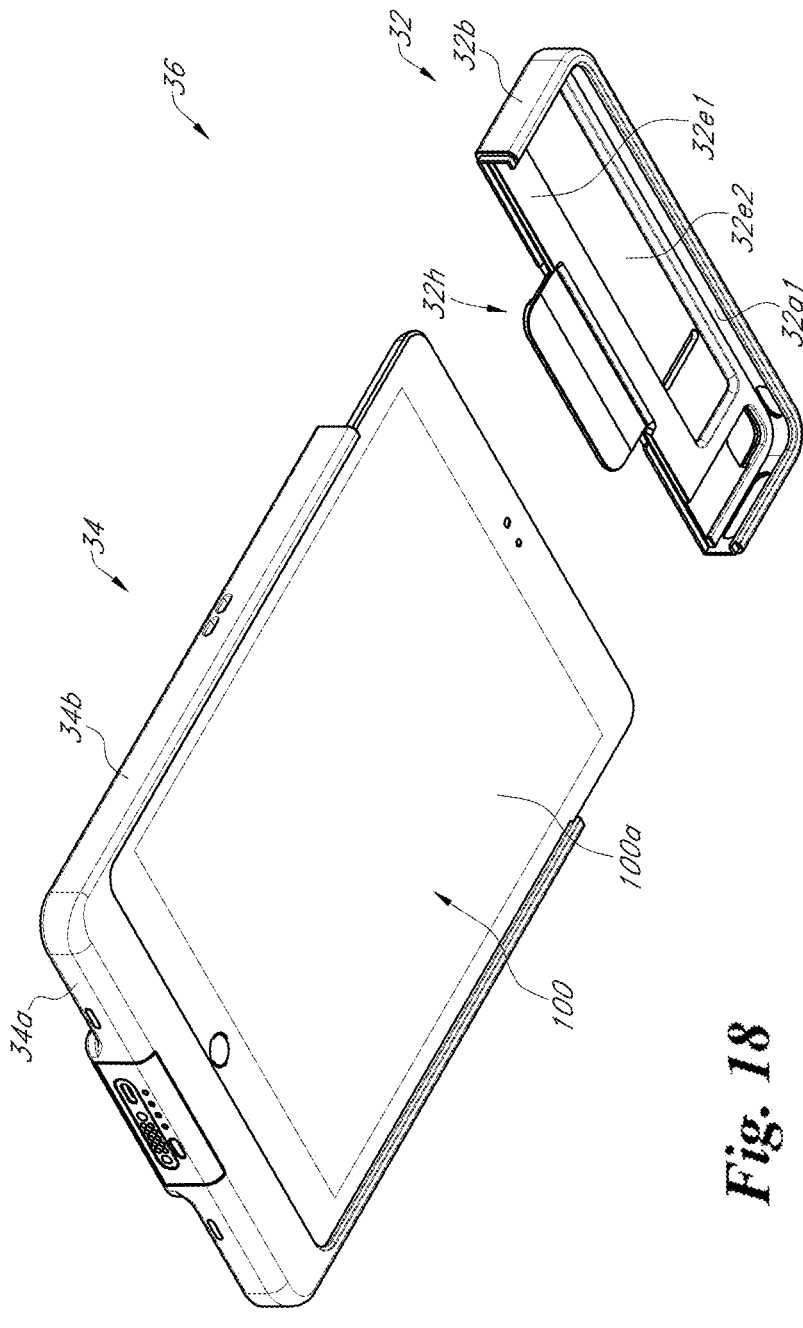
FIG. 18 is a front-rear perspective of a portion of the case assembly of FIG. 12 and the electronic device of FIG. 17.

Turning to FIG. 18, depicted therein is a front-rear perspective of a portion of device case assembly 30 and portable electronic tablet device implementation 100.

Figure 19:
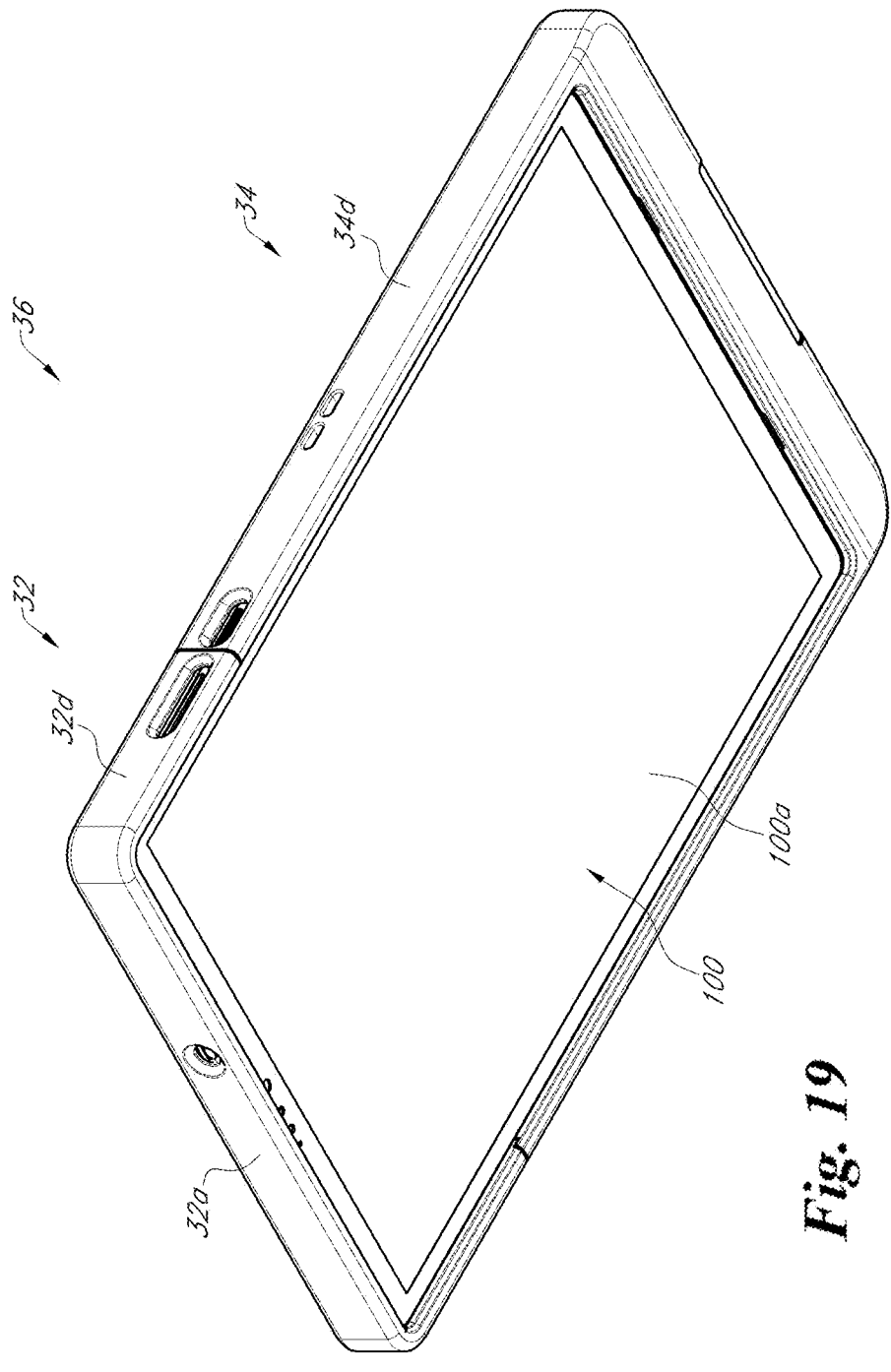
FIG. 19 is a front-rear perspective of a portion of the case assembly of FIG. 12 and the electronic device of FIG. 17.

Turning to FIG. 19, depicted therein is a front-rear perspective of a portion of device case assembly 30 and portable electronic tablet device implementation 100.

Figure 20:
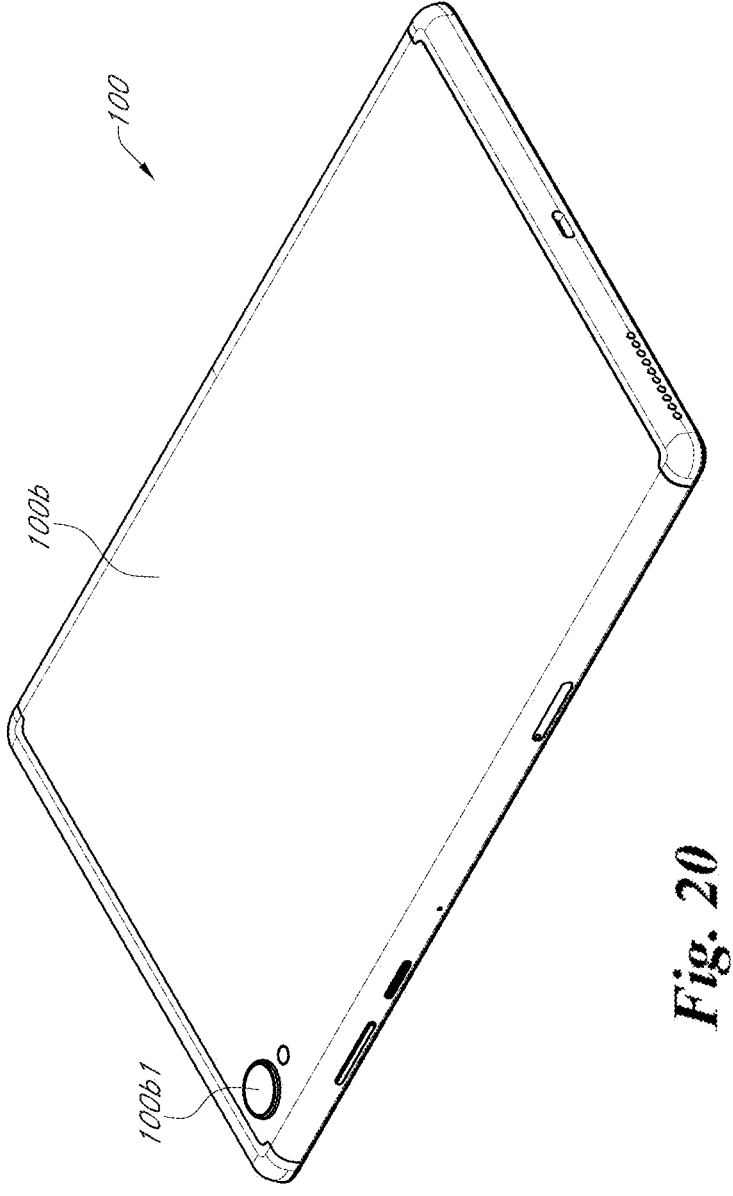
FIG. 20 is a bottom perspective view of the electronic device of FIG. 17.

Turning to FIG. 20, depicted therein is a bottom perspective view of portable electronic tablet device implementation 100. Depicted implementation of portable electronic tablet device implementation 100 is shown to include camera 100b1.

Figure 21:
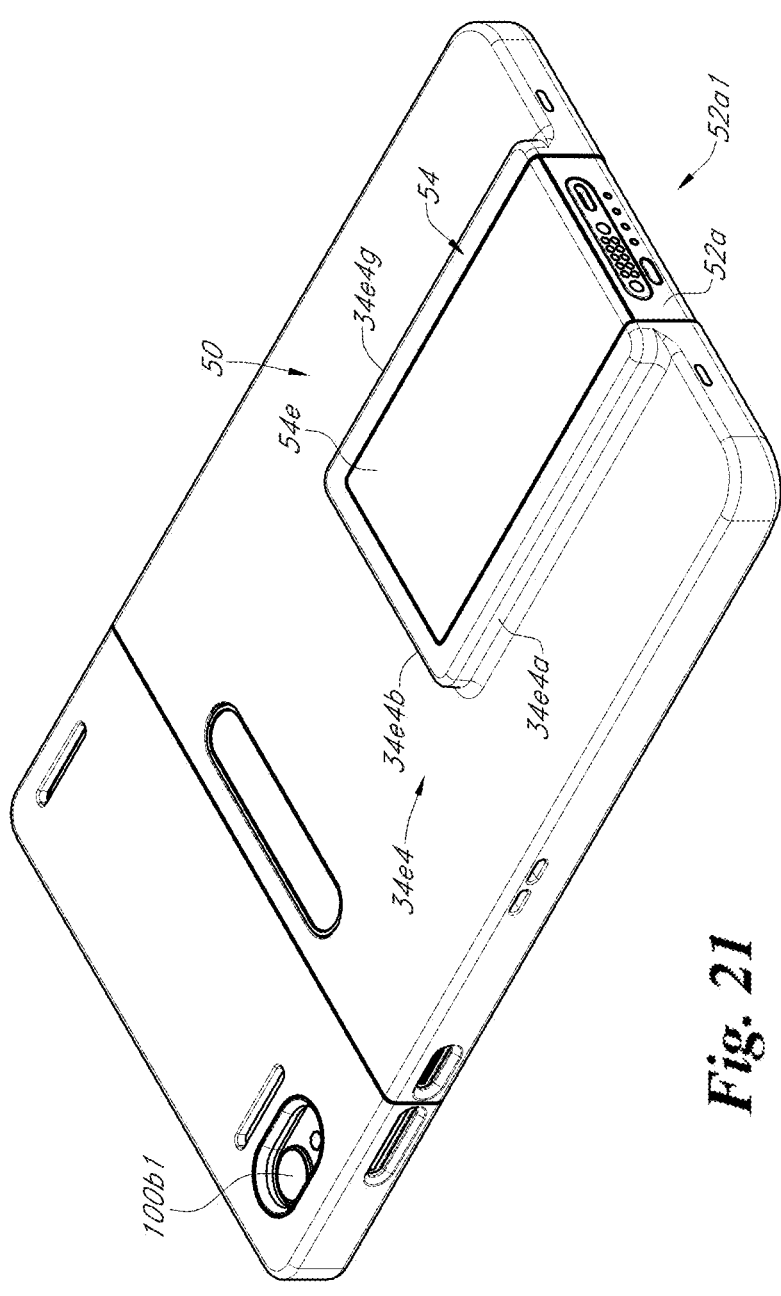
FIG. 21 is a rear-bottom perspective view of the accessory assembly of FIG. 1 coupled with the case assembly of FIG. 12 which is coupled with the electronic device of FIG. 17.

Turning to FIG. 21, depicted therein is a rear-bottom perspective view of accessory assembly 50 coupled with device case assembly 30 which is coupled with portable electronic tablet device implementation 100.

Figure 22:
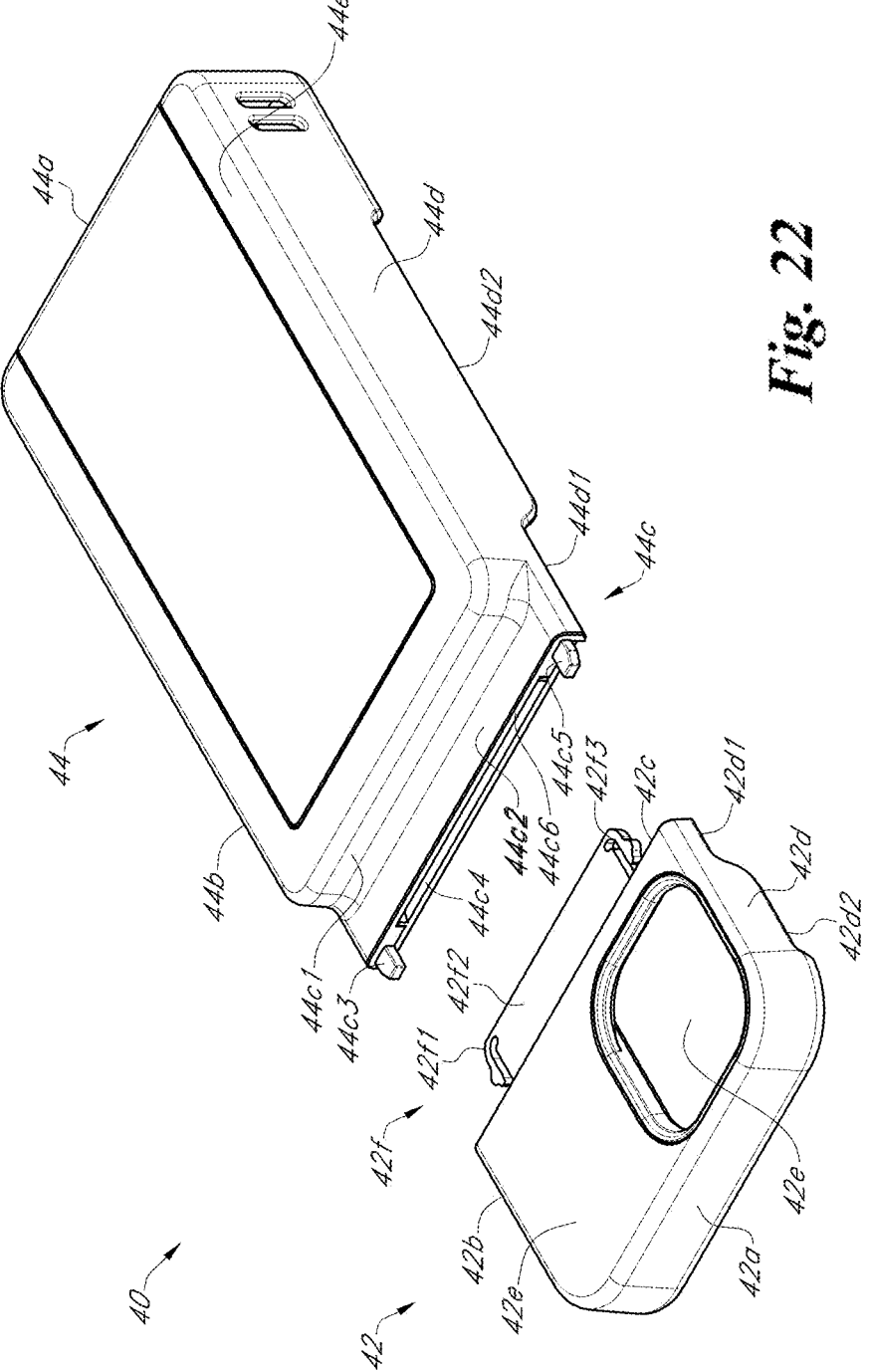
FIG. 22 is a partial-exploded-front-bottom-perspective view of a case assembly.

Turning to FIG. 22, depicted therein is a partial-exploded-front-bottom-perspective view of case assembly 40. Depicted implementation of case assembly 40 is shown to include cap assembly 42, and main assembly 44. Depicted implementation of cap assembly 42 is shown to include side wall 42a, side wall 42b, edge 42c, side wall 42d, aperture 42e, and tab member 42f. Depicted implementation of side wall 42d is shown to include recess 42d1, and recess 42d2. Depicted implementation of tab member 42f is shown to include tab body 42f2 with semi-flexible protrusion 42f1 and semi-flexible protrusion 42f3 extending therefrom.

Depicted implementation of main assembly 44 is shown to include side wall 44a, side wall 44b, side assembly 44c, side wall 44d, and base 44e. Depicted implementation of side assembly 44c is shown to include side wall portion 44c1, extended portion 44c2, protrusion 44c3, aperture 44c4, protrusion 44c5, and edge 44c6. Depicted implementation of side wall 44d is shown to include recess 44d1, and recess 44d2.

Figure 23:
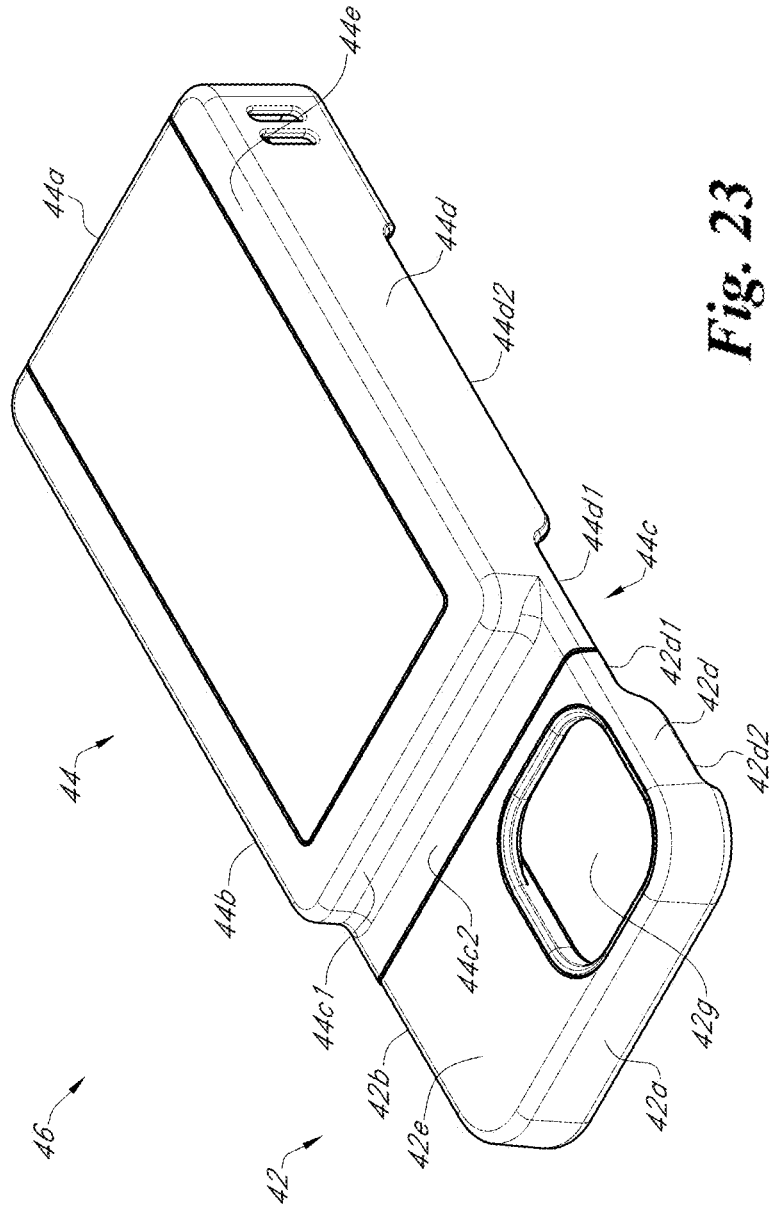
FIG. 23 is a front-bottom-perspective view of the case assembly of FIG. 22.

Turning to FIG. 23, depicted therein is a front-bottom-perspective view of case assembly 40.

Figure 24:
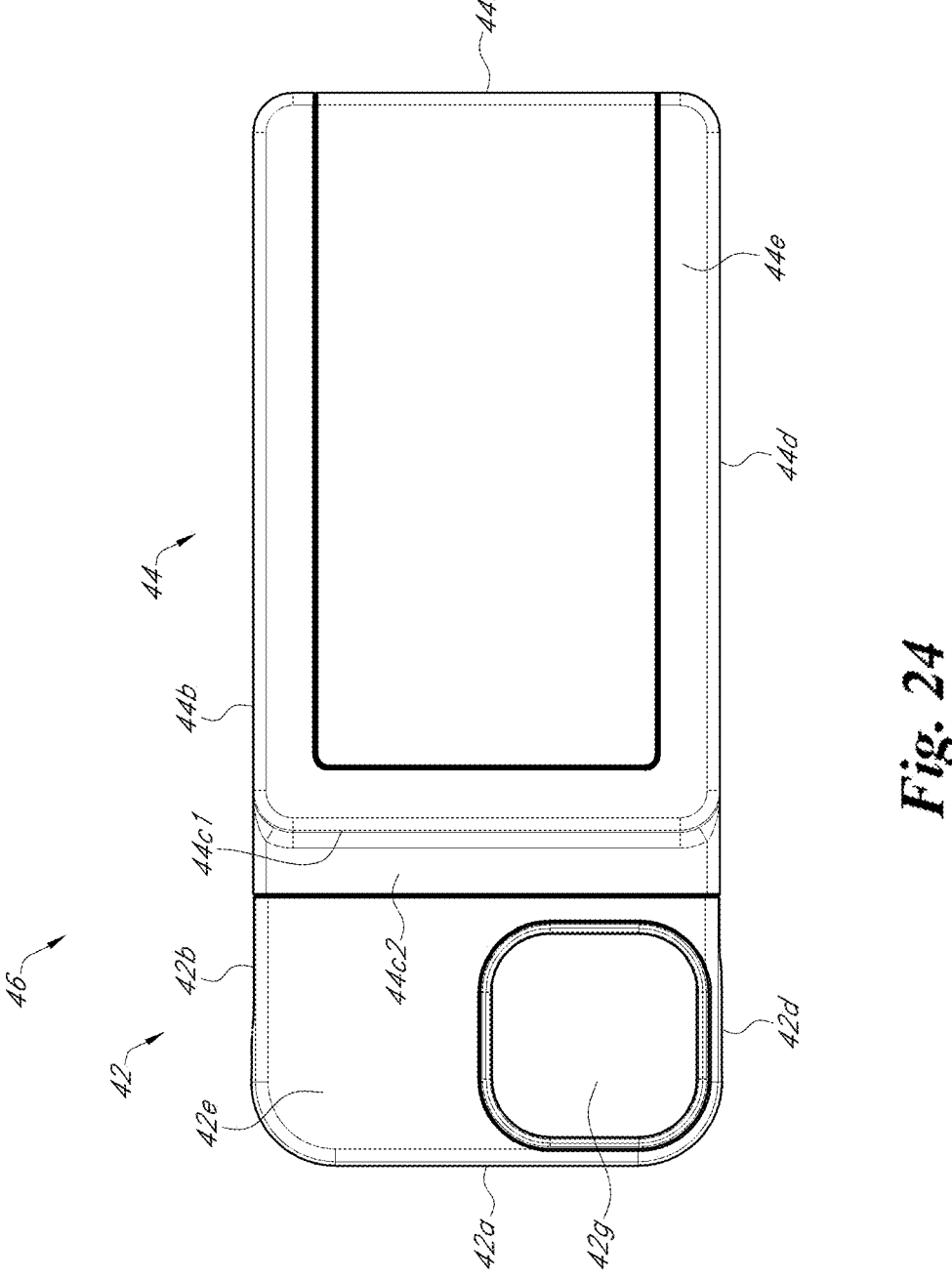
FIG. 24 is a bottom-plan view of the case assembly of FIG. 22.

Turning to FIG. 24, depicted therein is a bottom-plan view of case assembly 40.

Figure 25:
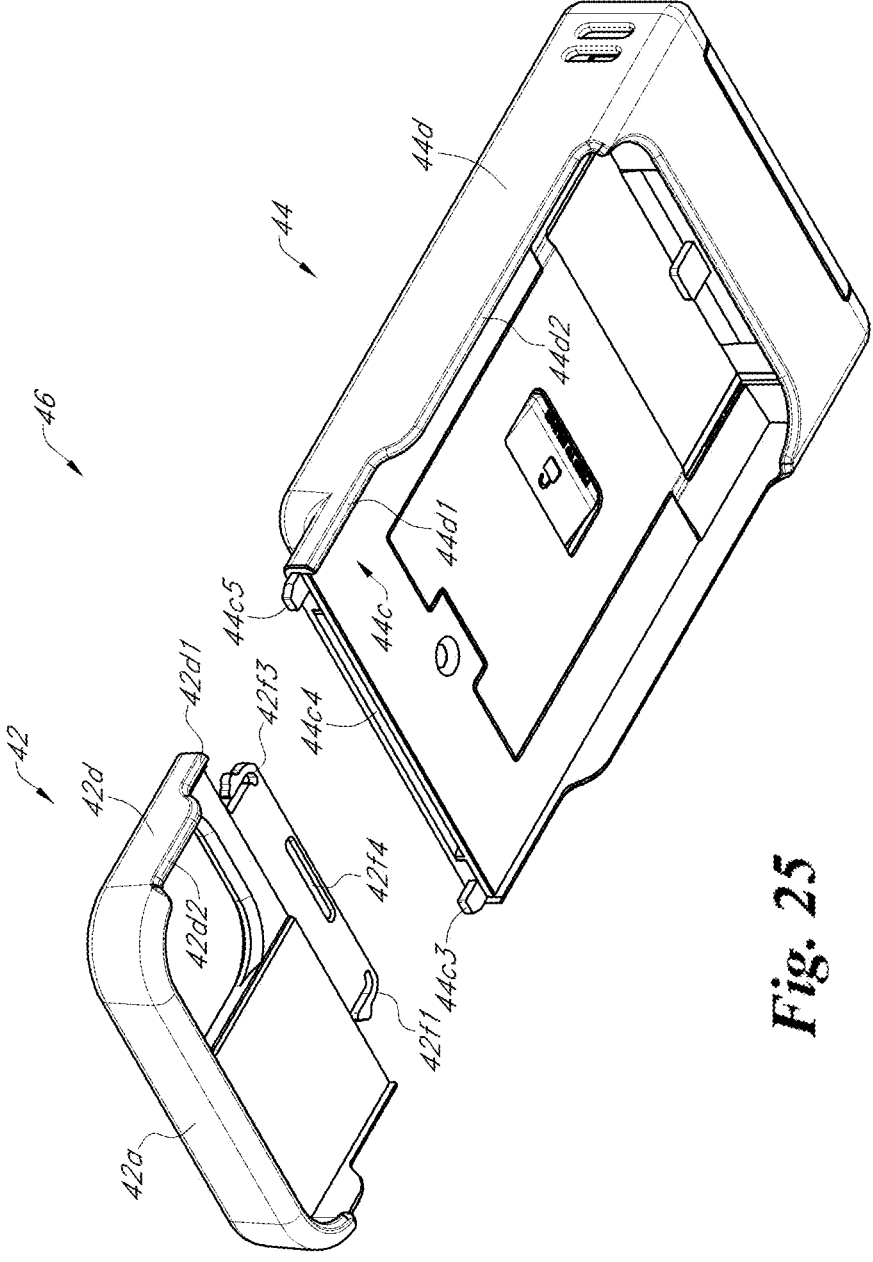
FIG. 25 is a partial-exploded-front-top-perspective view of the case assembly of FIG. 22.

Turning to FIG. 25, depicted therein is a partial-exploded-front-top-perspective view of case assembly 40. Depicted implementation of tab member 42f is shown to include recess 42f4.

Figure 26:
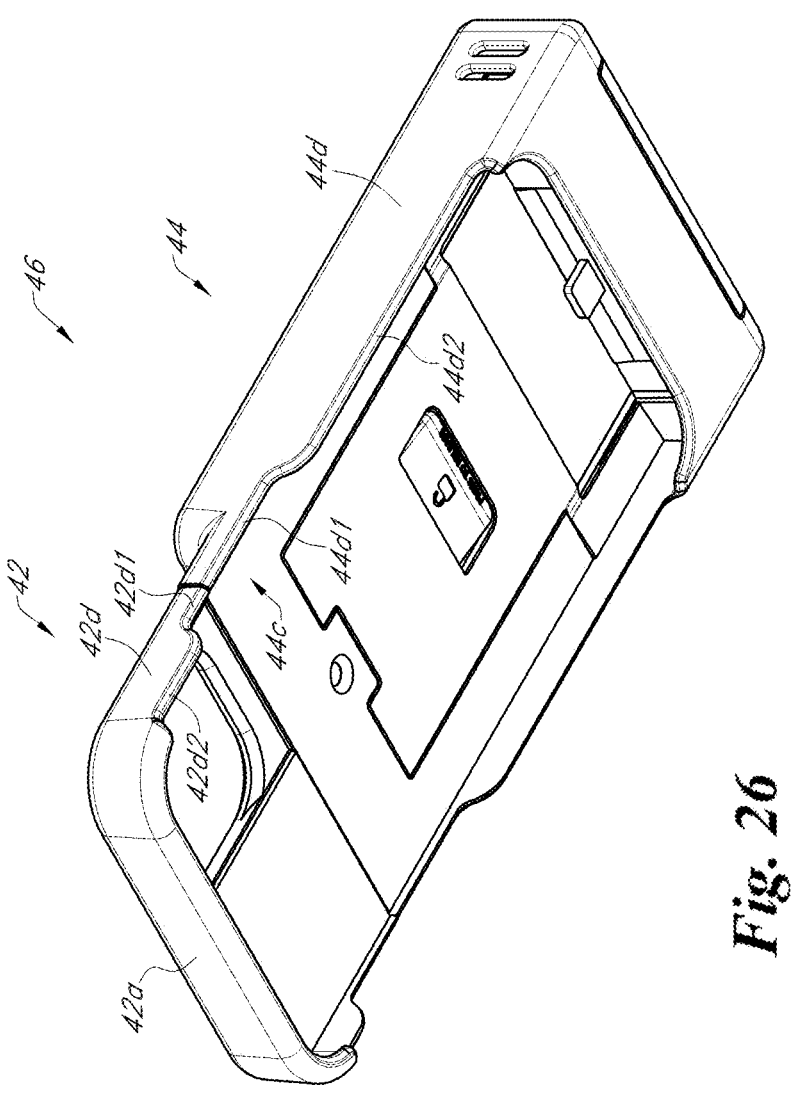
FIG. 26 is a front-top-perspective view of the case assembly of FIG. 22.

Turning to FIG. 26, depicted therein is a front-top-perspective view of case assembly 40.

Figure 27:
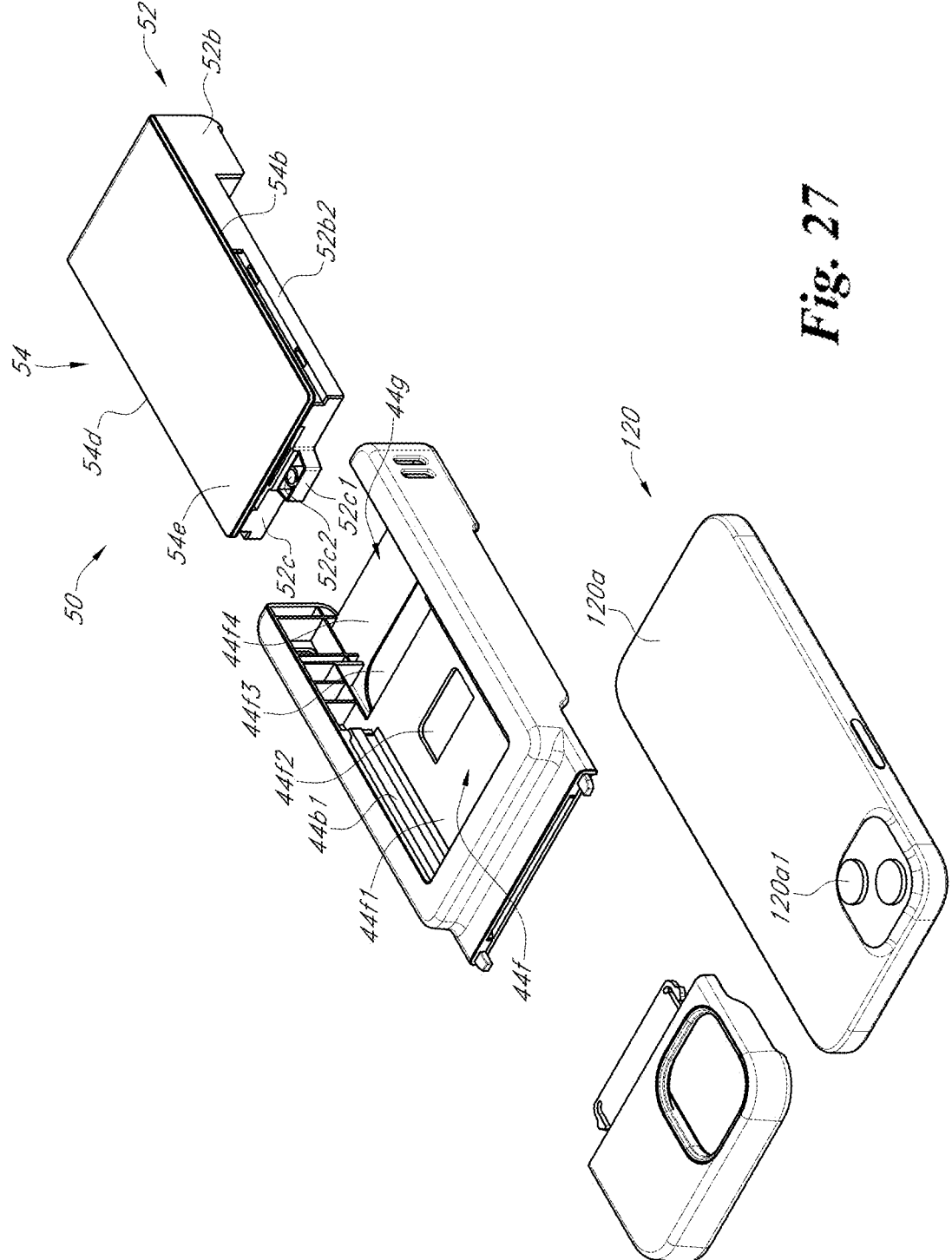
FIG. 27 is an exploded front-bottom perspective view of the case assembly of FIG. 22, the accessory assembly of FIG. 1, and an electronic device.

Turning to FIG. 27, depicted therein is an exploded front-bottom perspective view of case assembly 40, accessory assembly 50, and portable electronic phone device implementation 120. Depicted implementation of main assembly 44 is shown to include elongated protrusion 44b1, and interior area 44f with raised base portion 44f1, aperture 44f2, aperture 44f3, and recessed base portion 44f4. Depicted implementation of portable electronic phone device implementation 120 is shown to include back 120a with camera 120a1.

Figure 28:
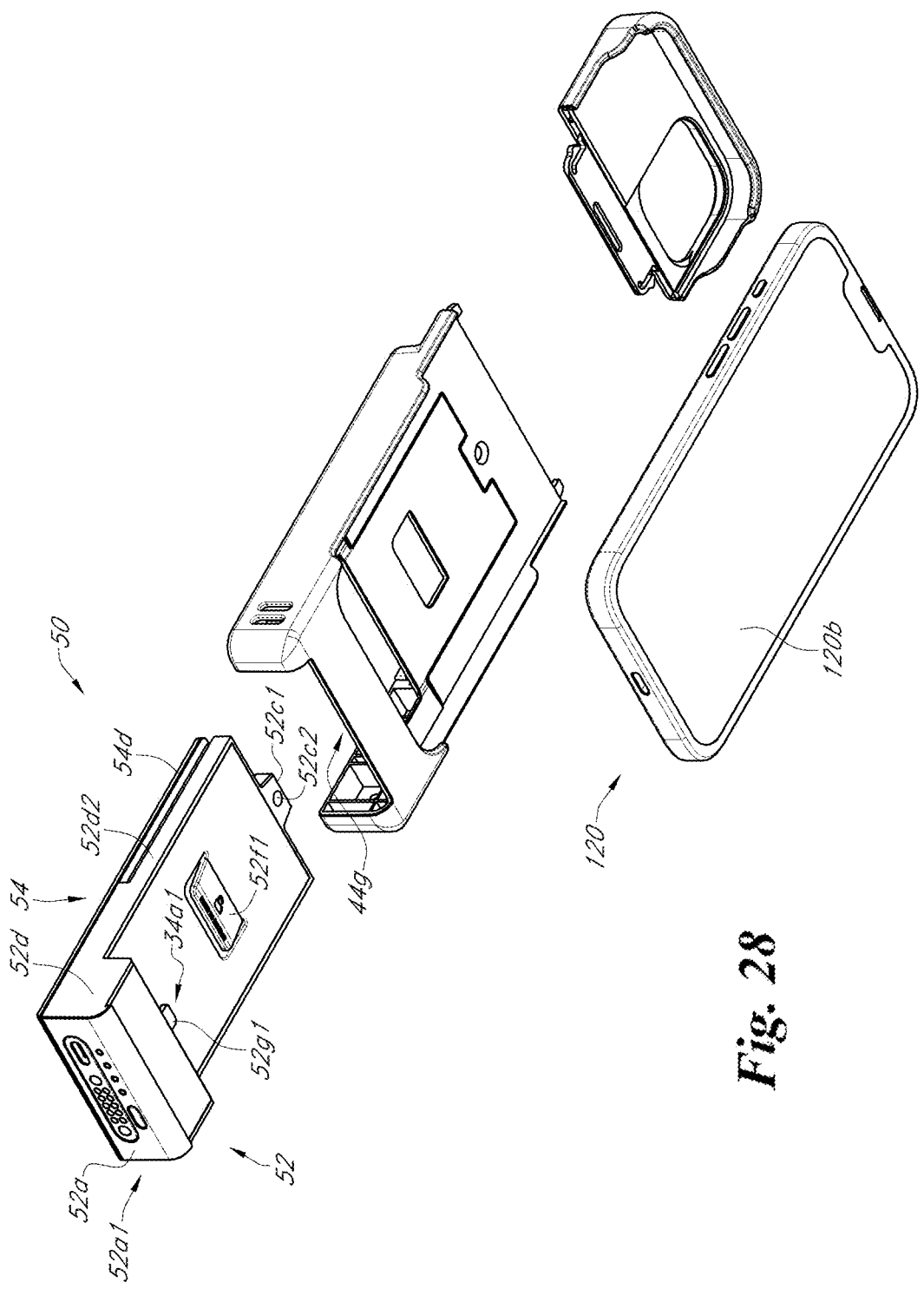
FIG. 28 is an exploded rear-top perspective view of the case assembly of FIG. 22, the accessory assembly of FIG. 1, and an electronic device.

Turning to FIG. 28, depicted therein is an exploded rear-top perspective view of case assembly 40, accessory assembly 50, and portable electronic phone device implementation 120. Depicted implementation of portable electronic phone device implementation 120 is shown to include front 120b.

Figure 29:
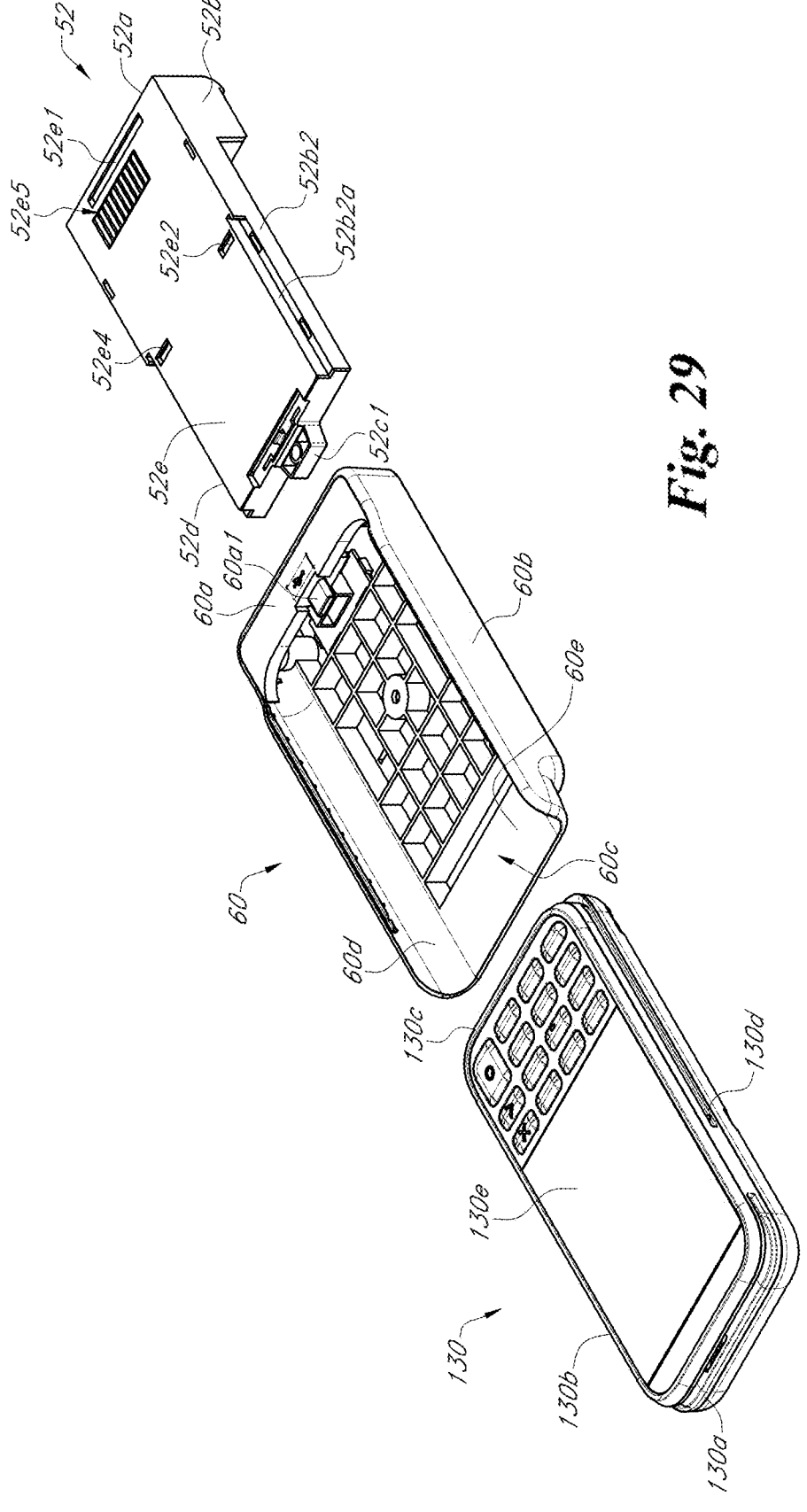
FIG. 29 is an exploded front-bottom perspective view of a portion of the accessory assembly of FIG. 1, an interface assembly, and a keypad assembly.

Turning to FIG. 29, depicted therein is an exploded front-bottom perspective view of a portion of accessory assembly 50, interface assembly 60, and payment card reader assembly 130. Depicted implementation of interface assembly 60 is shown to include end wall 60a with electric plug 60a1, side wall 60b, interior area 60c, side wall 60d, and base 60e. Depicted implementation of payment card reader assembly 130 is shown to include side 130a, side 130b, side 130c, side 130d, and side 130e.

Figure 30:
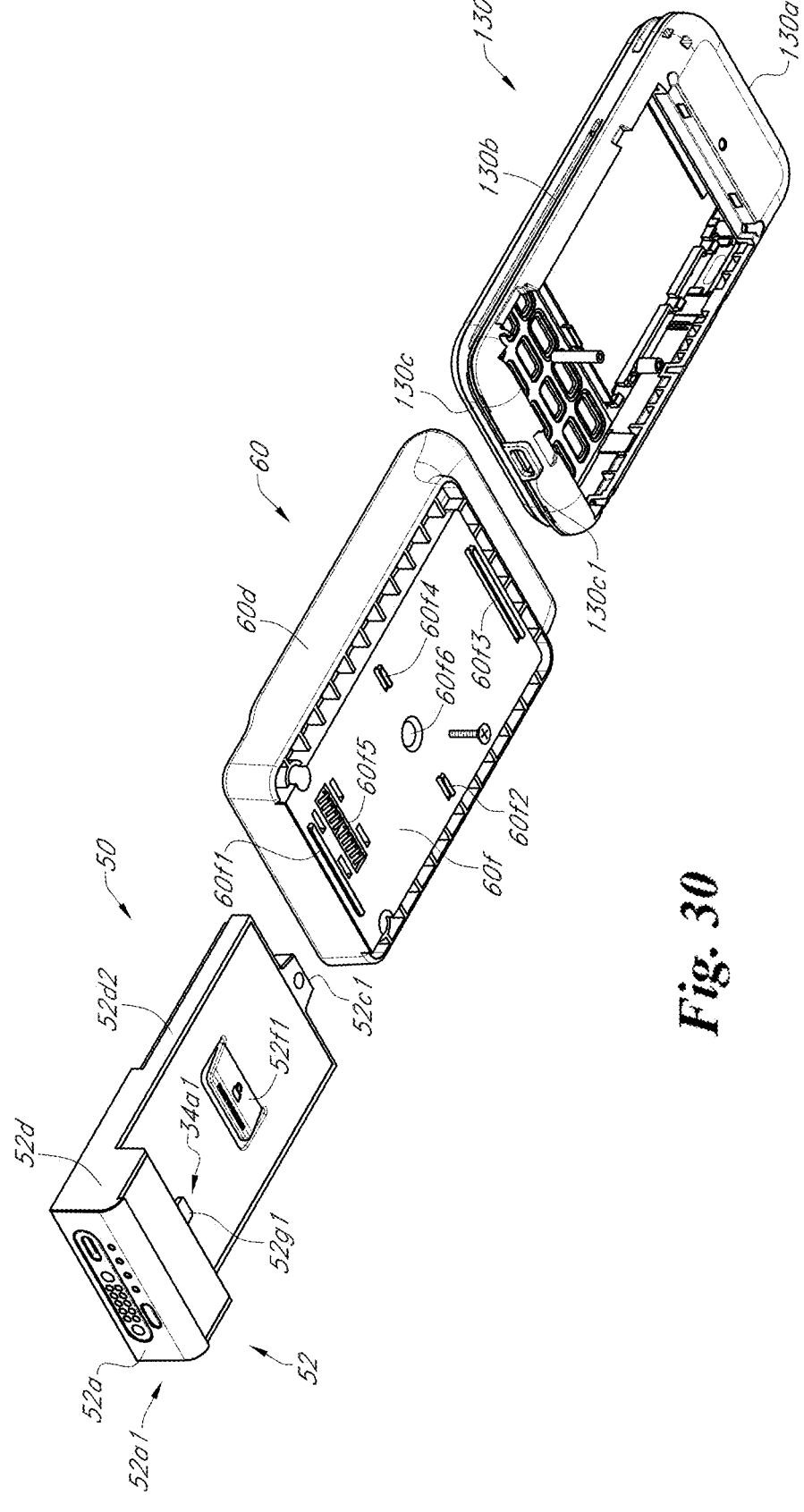
FIG. 30 is an exploded rear-top perspective view of a portion of the accessory assembly of FIG. 1, the interface assembly of FIG. 88, and the keypad assembly of FIG. 29.

Turning to FIG. 30, depicted therein is an exploded rear-top perspective view of a portion of accessory assembly 50, interface assembly 60, and payment card reader assembly 130. Depicted implementation of base 60f is shown to include prong 60/1, prong 60/2, prong 60/3, prong 60/4, electric contacts interface 60/5, and aperture 60/6. In implementations electric contacts interface 60/5 is sized and positioned to engage with electric contacts interface 52e5 when interface assembly 60 is coupled with main assembly 52. Depicted implementation of side 130c is shown to include receptacle 130c1.

Figure 31:
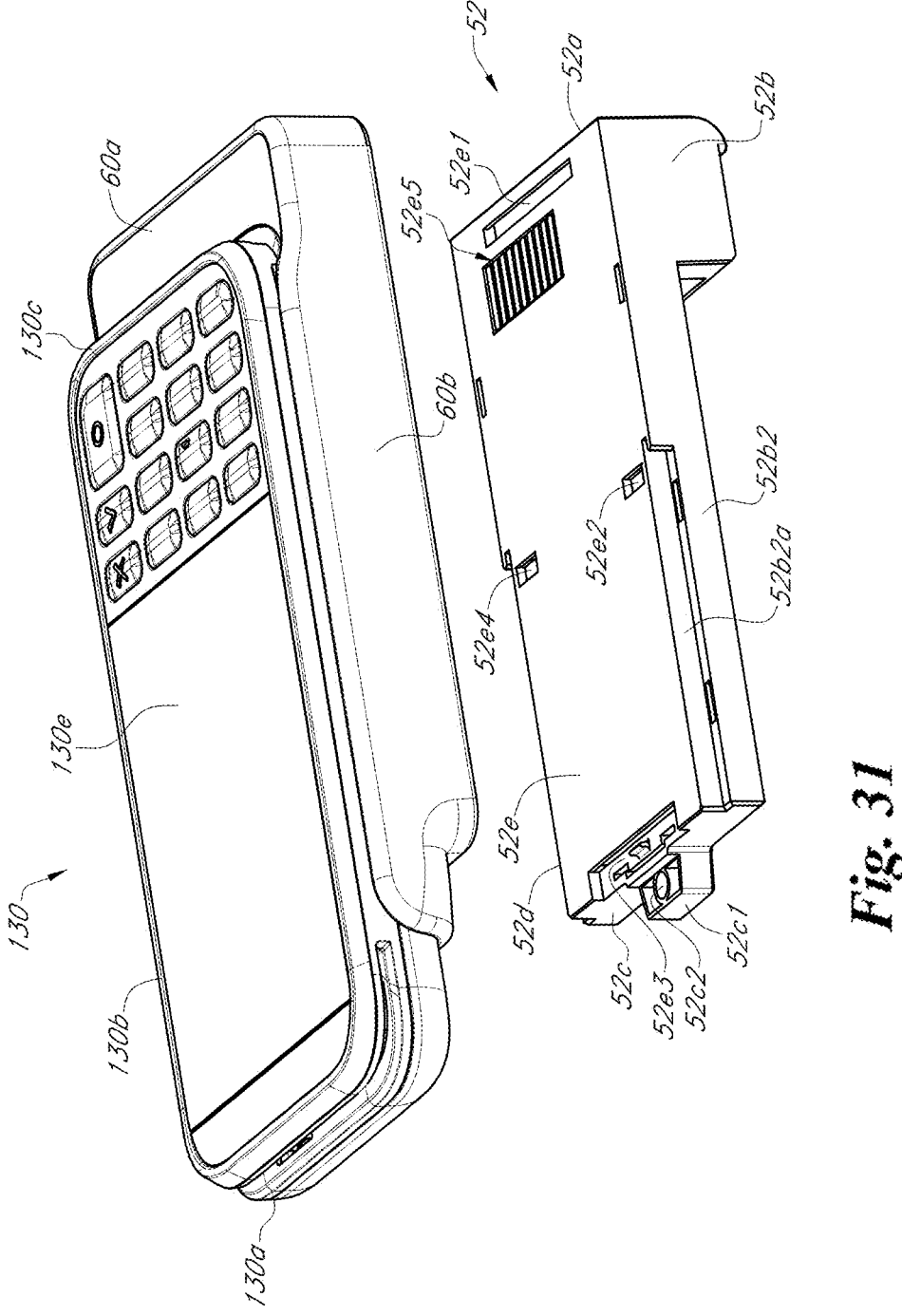
FIG. 31 is a partial exploded front-bottom perspective view of the keypad assembly of FIG. 29 coupled with the interface assembly of FIG. 29, and uncoupled with a portion of the accessory assembly of FIG. 1.

Turning to FIG. 31, depicted therein is a partial exploded front-bottom perspective view of payment card reader assembly 130, coupled with interface assembly 60, and uncoupled with a portion of accessory assembly 50.

Figure 32:
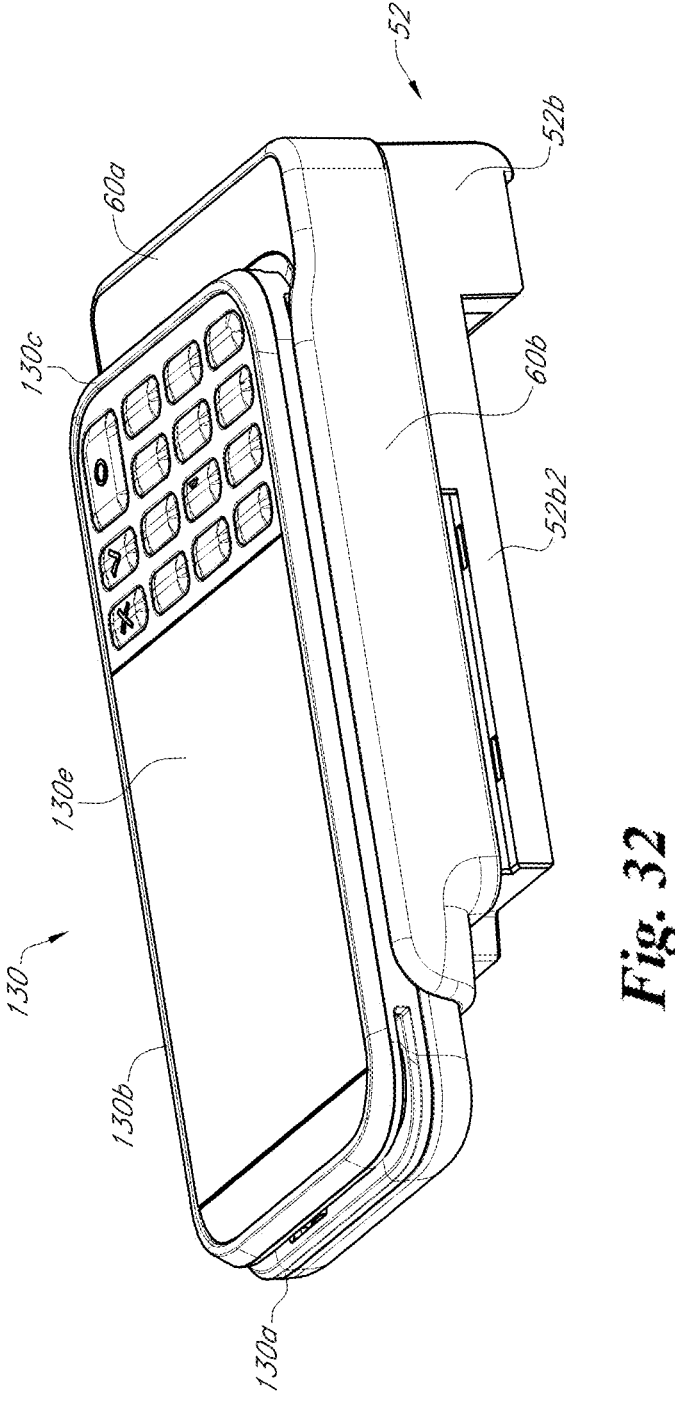
FIG. 32 is a front-bottom perspective view of the keypad assembly of FIG. 29 coupled with the interface assembly of FIG. 29, and coupled with a portion of the accessory assembly of FIG. 1.

Turning to FIG. 32, depicted therein is a front-bottom perspective view of payment card reader assembly 130 coupled with interface assembly 60, and coupled with a portion of accessory assembly 50.

Figure 33:
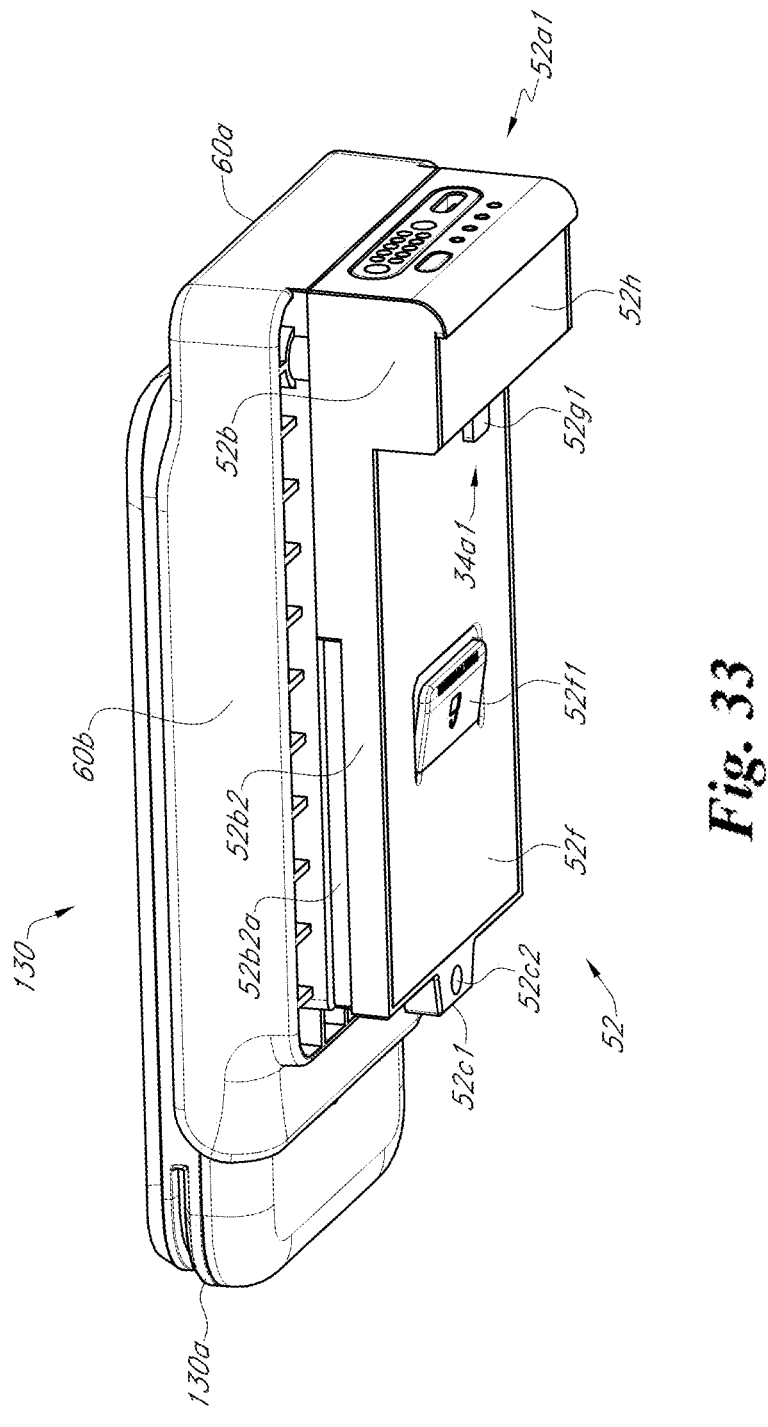
FIG. 33 is a partial exploded rear-top perspective view of the keypad assembly of FIG. 29 coupled with the interface assembly of FIG. 29, and uncoupled with a portion of the accessory assembly of FIG. 1.

Turning to FIG. 33, depicted therein is a partial exploded rear-top perspective view of payment card reader assembly 130, coupled with interface assembly 60, and uncoupled with a portion of accessory assembly 50.

Figure 34:
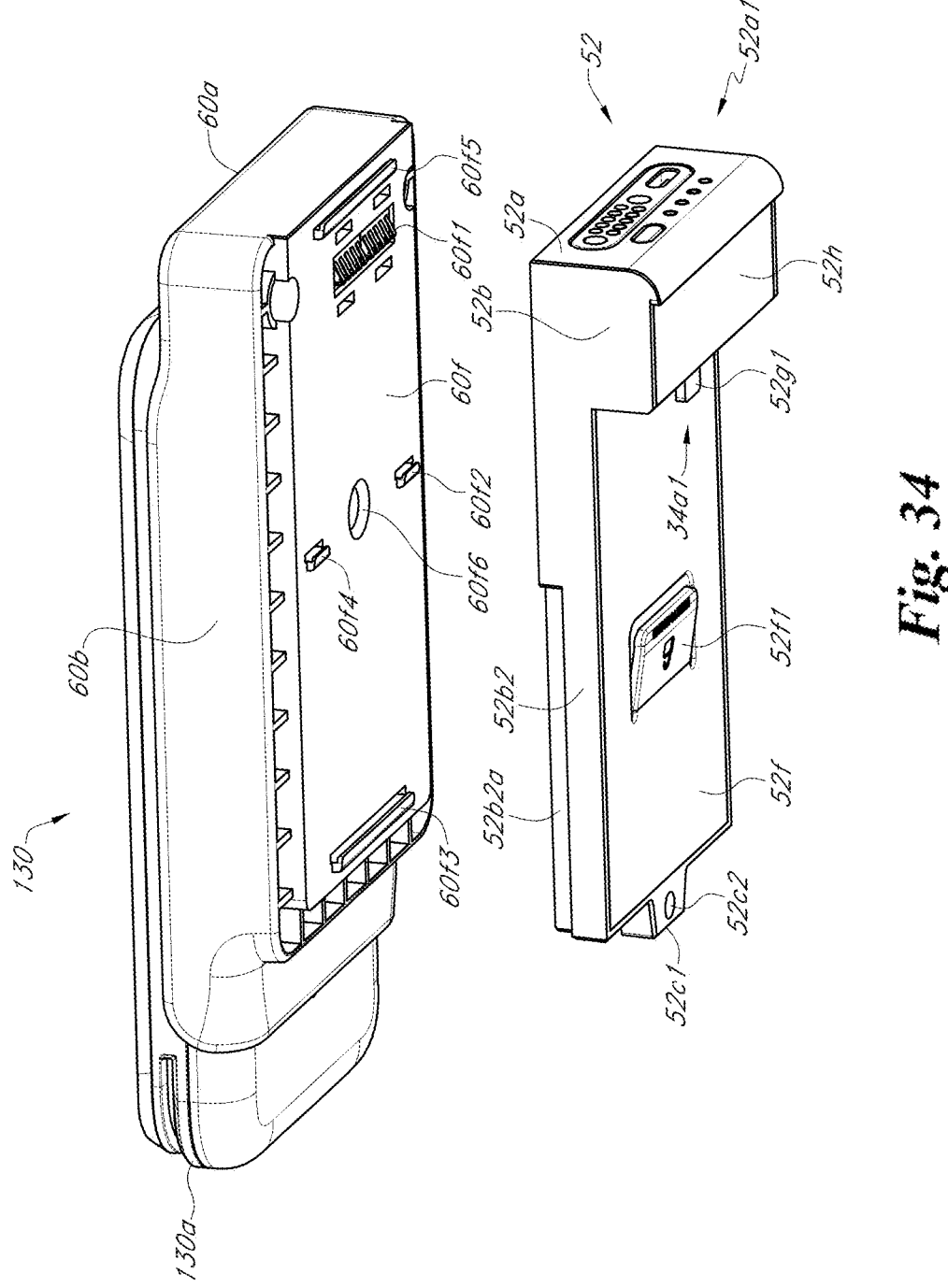
FIG. 34 is a rear-top perspective view of the keypad assembly of FIG. 29 coupled with the interface assembly of FIG. 29, and coupled with a portion of the accessory assembly of FIG. 1.

Turning to FIG. 34, depicted therein is a rear-top perspective view of payment card reader assembly 130 coupled with interface assembly 60, and coupled with a portion of accessory assembly 50.

Figure 35:
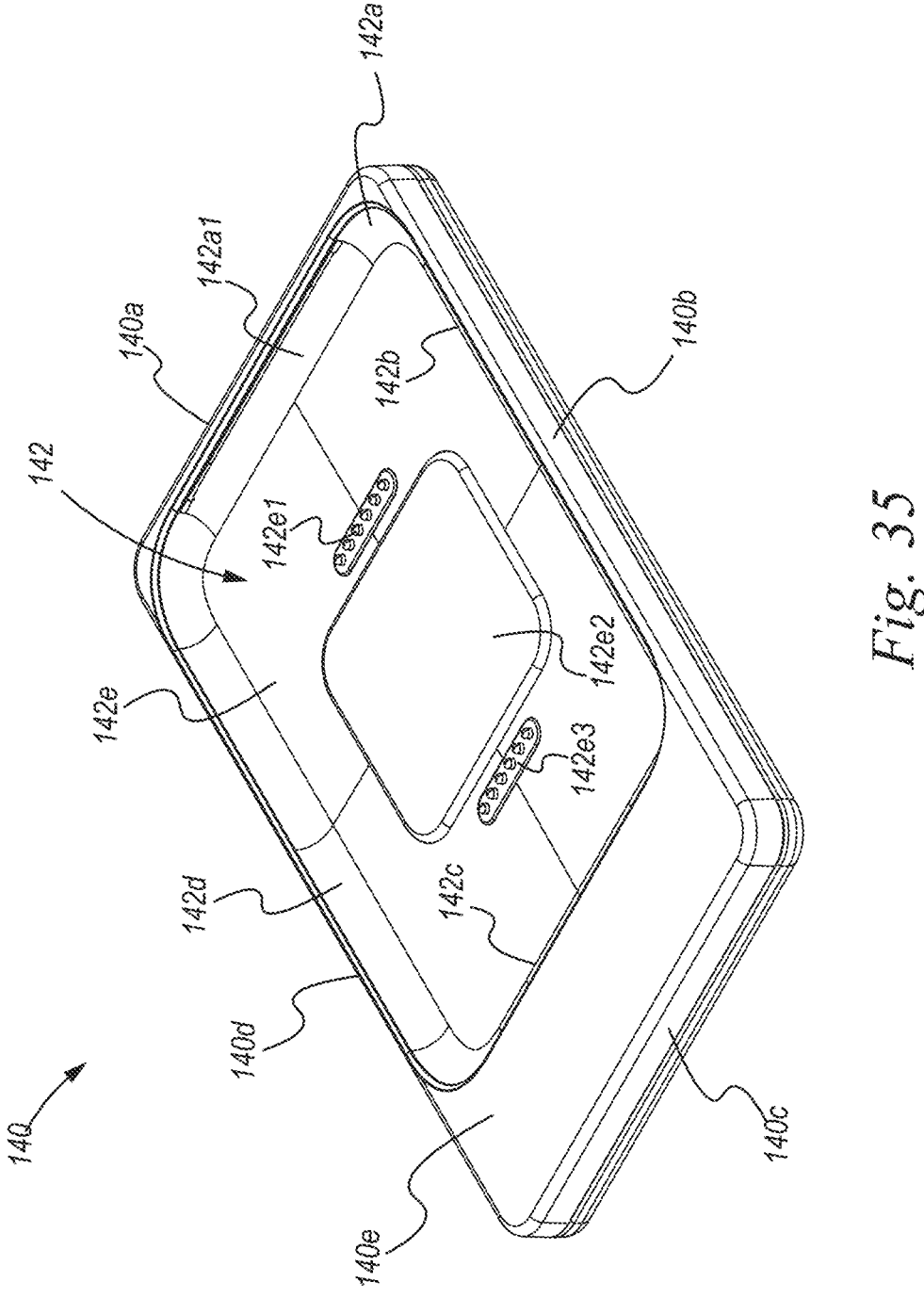
FIG. 35 is a top perspective view of an adapter assembly.

Turning to FIG. 35, depicted therein is a top perspective view of adapter assembly 140. Depicted implementation of adapter assembly 140 is shown to include side 140a, side 140b, side 140c, side 140d, upper face 140e, and depressed portion 142. Depicted implementation of depressed portion 142 is shown to include side 142a with engagement 142a1, side 142b, side 142c, side 142d, and base 142e with electrical interface 142e1, coupling surface 142e2, and electrical interface 142e3.

Figure 36:
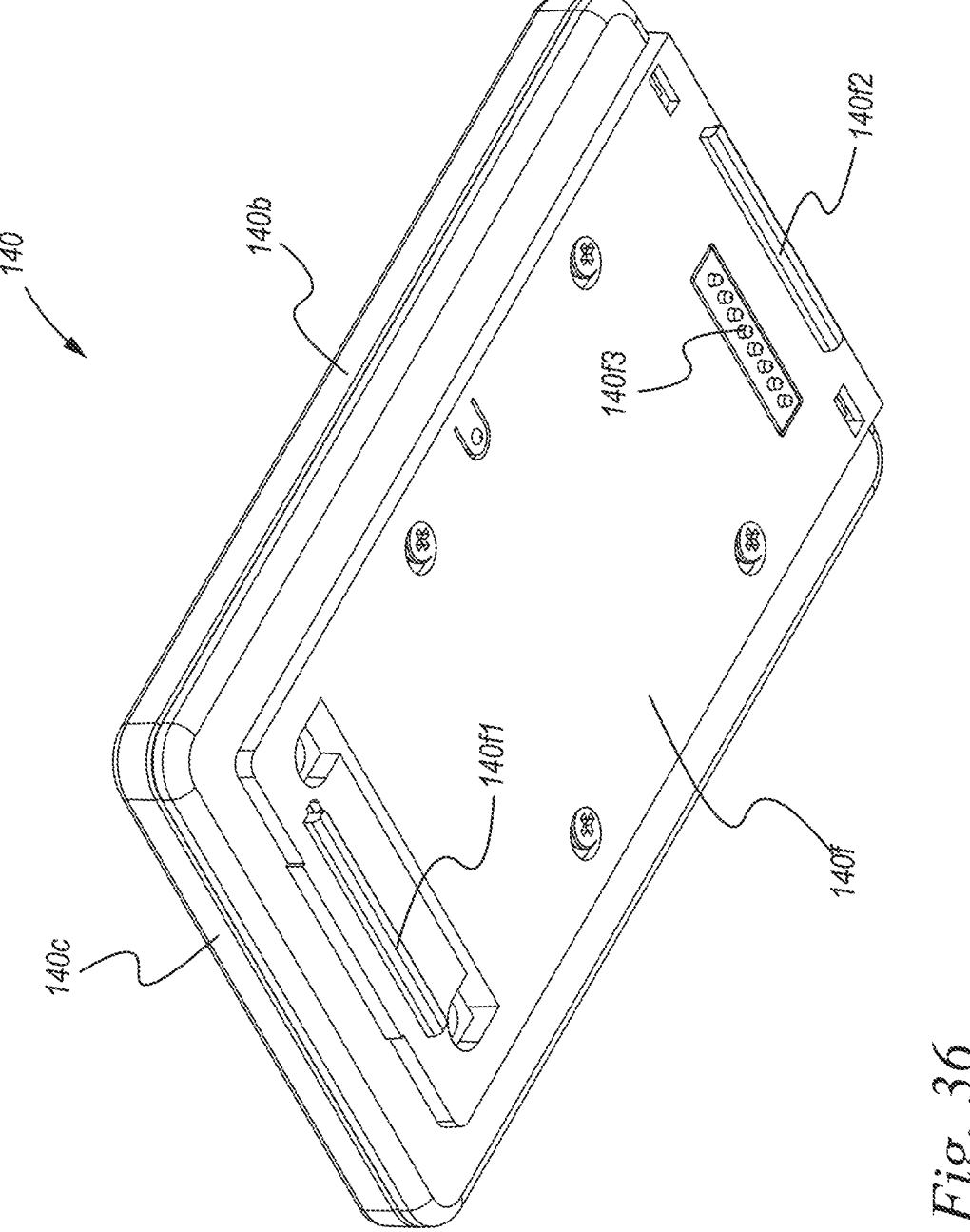
FIG. 36 is a bottom perspective view of the adapter assembly of FIG. 35.

Turning to FIG. 36, depicted therein is a bottom perspective view of adapter assembly 140. Depicted implementation of adapter assembly 140 is shown to include base 140f with engagement rail 140f1, engagement rail 140f2, and electrical interface 140f3.

Figure 37:
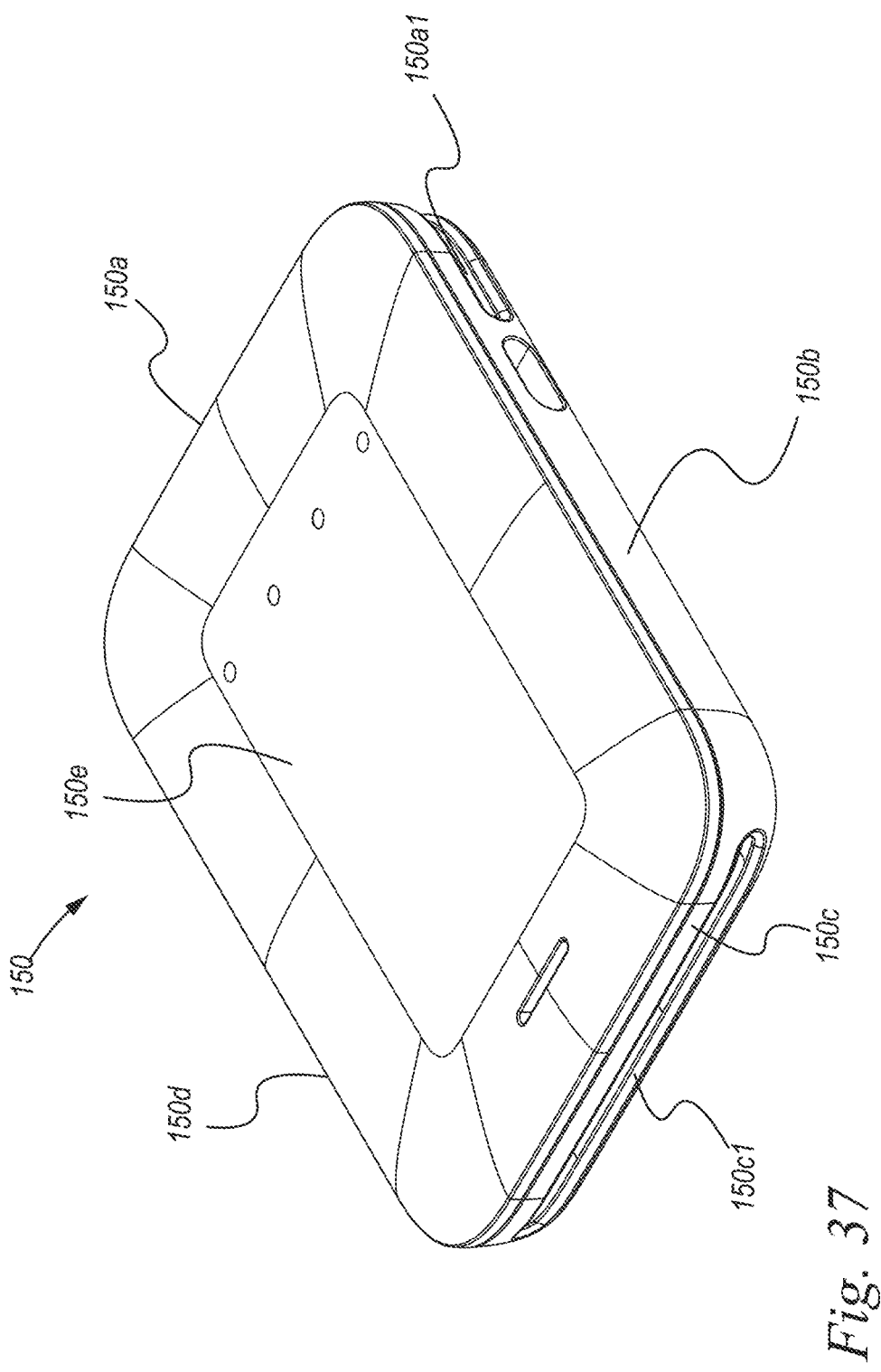
FIG. 37 is a first top perspective view of a card reader assembly.

Turning to FIG. 37, depicted therein is a first top perspective view of card reader assembly 150. Depicted implementation of card reader assembly 150 is shown to include side 150a with card slot 150a1, side 150b, side 150c with card slot 150c1, side 150d, and upper face 150e.

Figure 38:
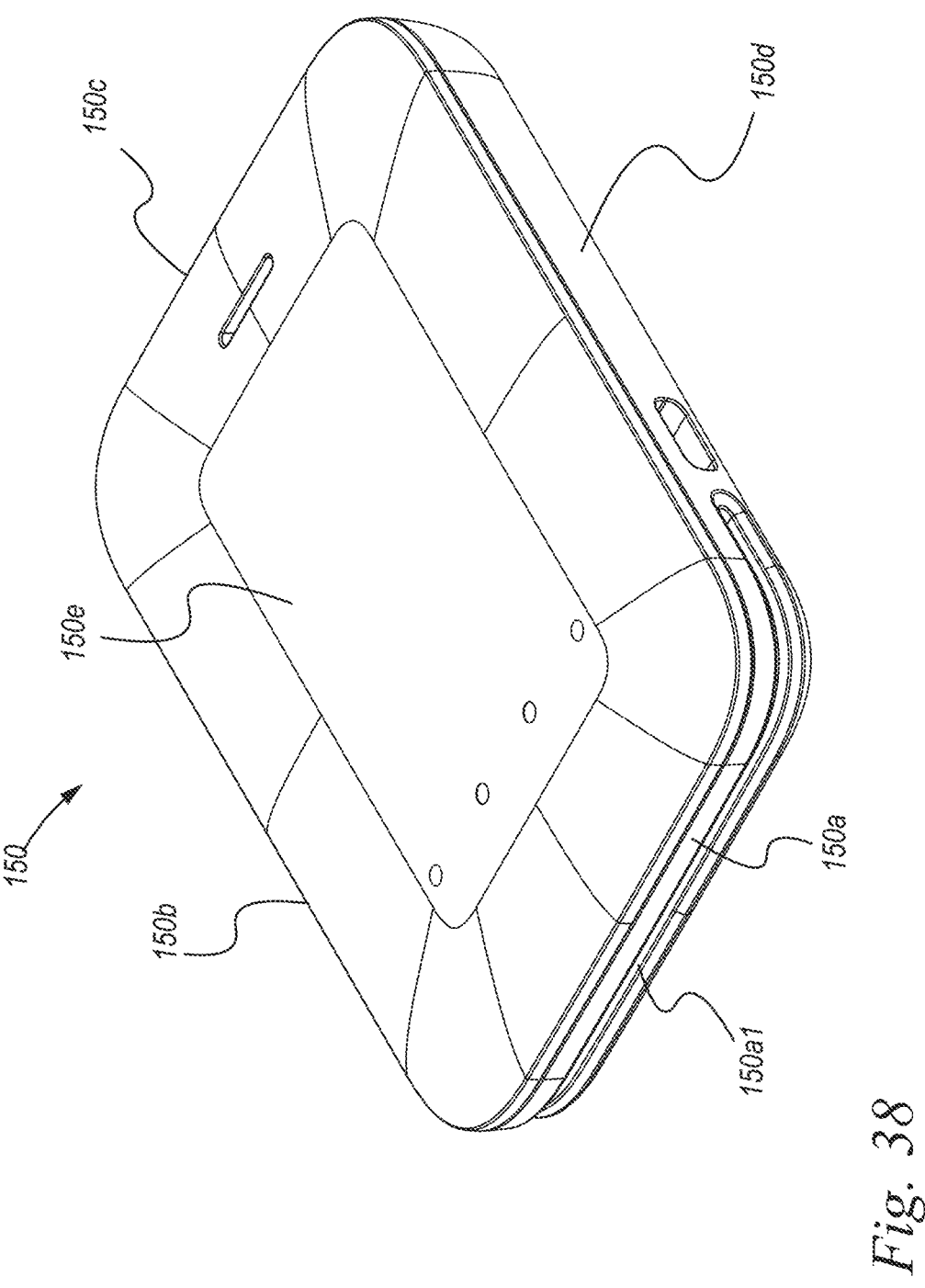
FIG. 38 is a second top perspective view of the card reader assembly of FIG. 37.

Turning to FIG. 38, depicted therein is a second top perspective view of card reader assembly 150.

Figure 39:
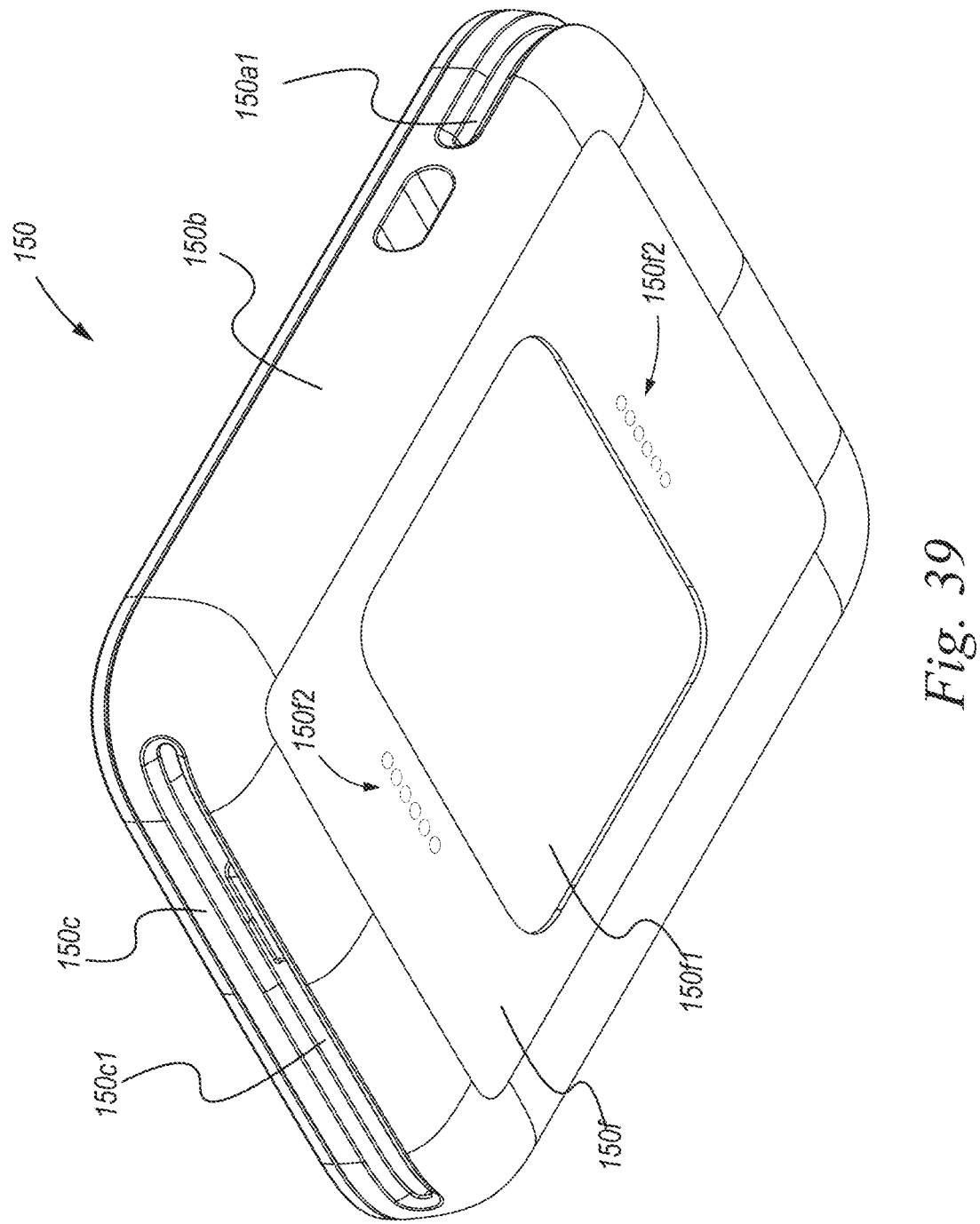
FIG. 39 is a first bottom perspective view of the card reader assembly of FIG. 37.

Turning to FIG. 39, depicted therein is a first bottom perspective view of card reader assembly 150. Depicted implementation of card reader assembly 150 is shown to include lower face 150f with coupling surface 150f1, and electrical interface 150f2.

Figure 40:
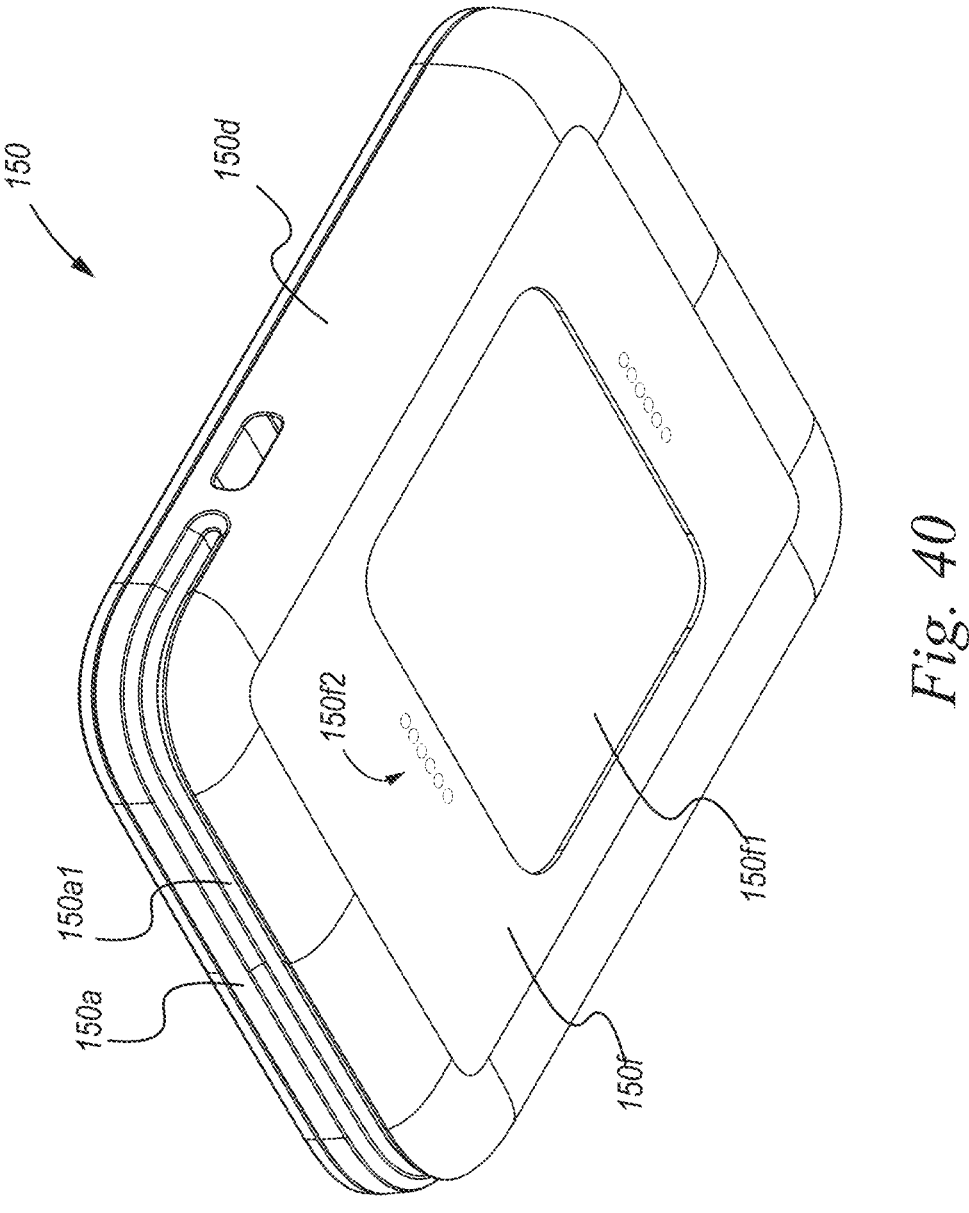
FIG. 40 is a second bottom perspective view of the card reader assembly of FIG. 37.

Turning to FIG. 40, depicted therein is a second bottom perspective view of card reader assembly 150.

Figure 41:
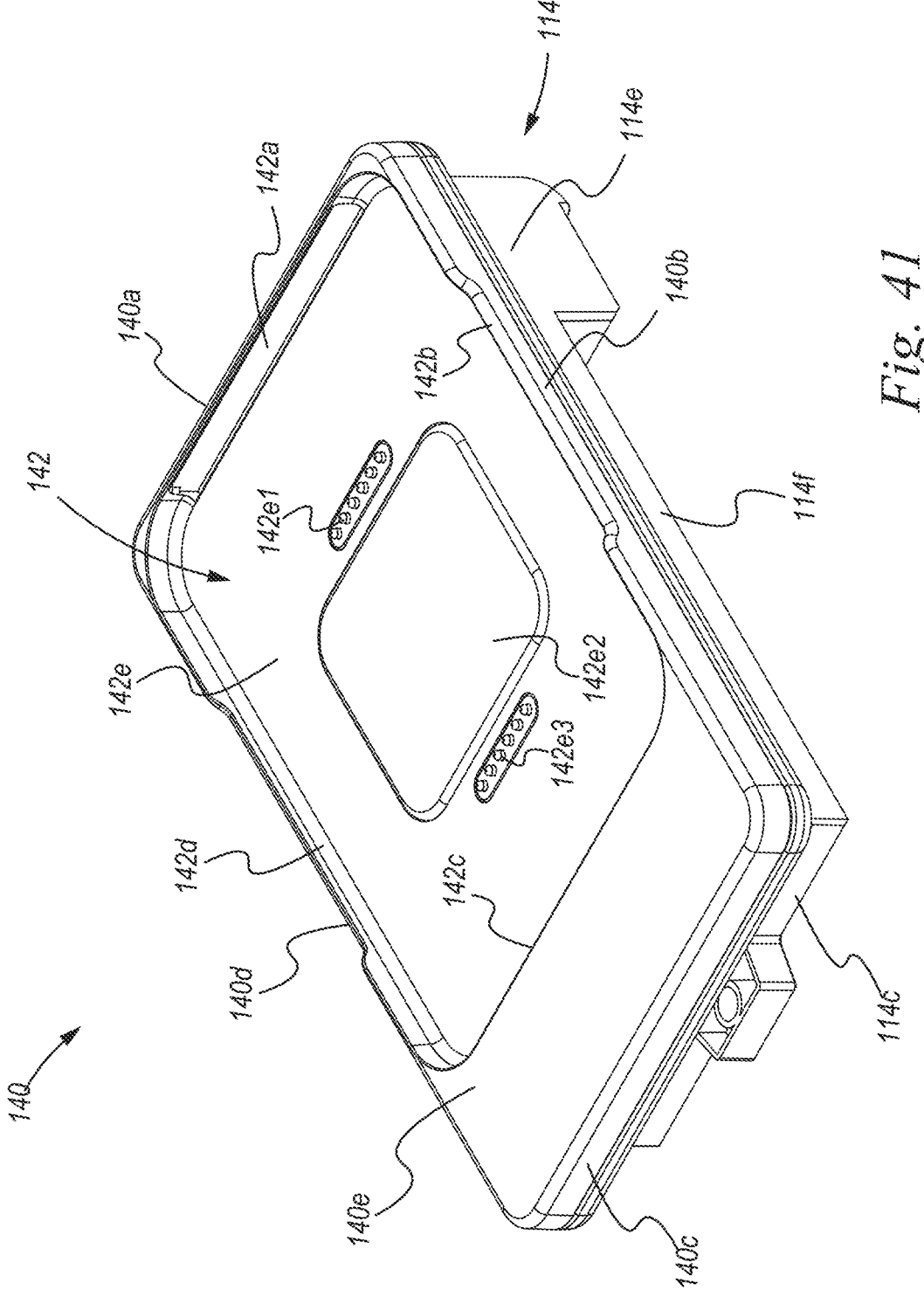
FIG. 41 is a top perspective view of the adapter assembly of FIG. 35 coupled with the accessory assembly of FIG. 1.

Turning to FIG. 41, depicted therein is a top perspective view of adapter assembly 140 coupled with accessory assembly 114.

Figure 42:
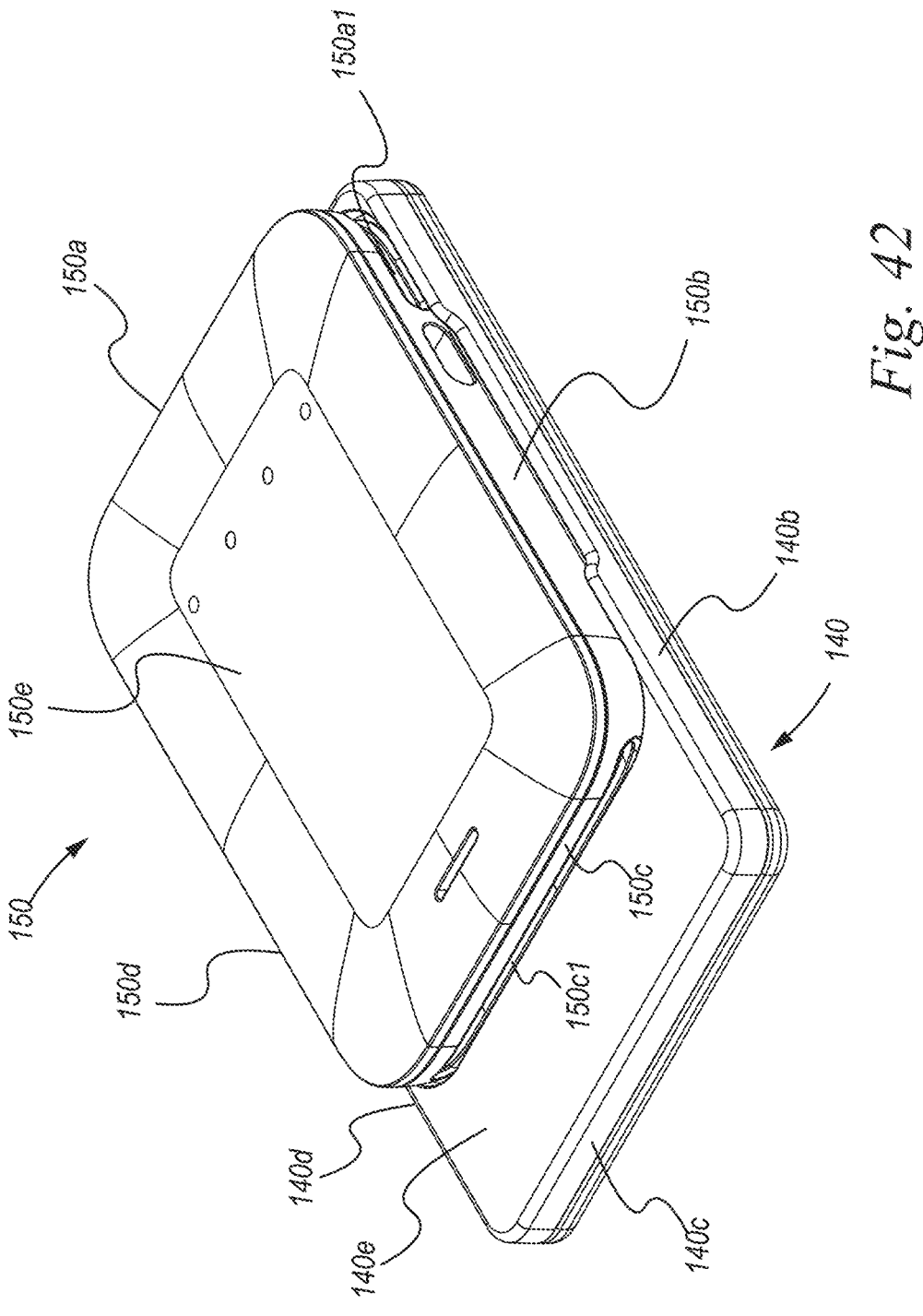
FIG. 42 is a first top perspective view of the card reader assembly of FIG. 37 coupled with the adapter assembly of FIG. 35.

Turning to FIG. 42, depicted therein is a first top perspective view of card reader assembly 150 coupled with adapter assembly 140.

Figure 43:
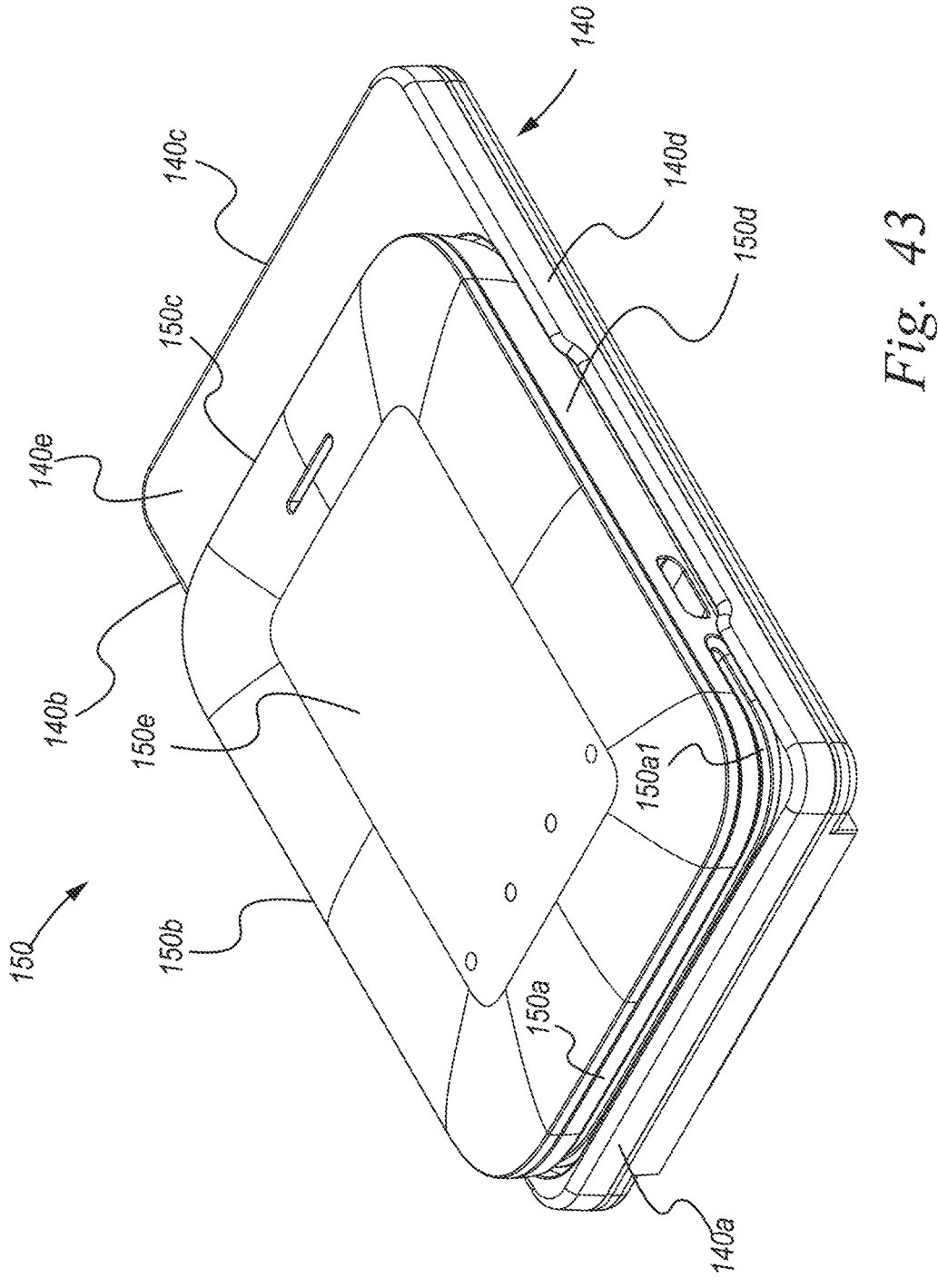
FIG. 43 is a second top perspective view of the card reader assembly of FIG. 37 coupled with the adapter assembly of FIG. 35.

Turning to FIG. 43, depicted therein is a second top perspective view of card reader assembly 150 coupled with adapter assembly 140.

Figure 44:
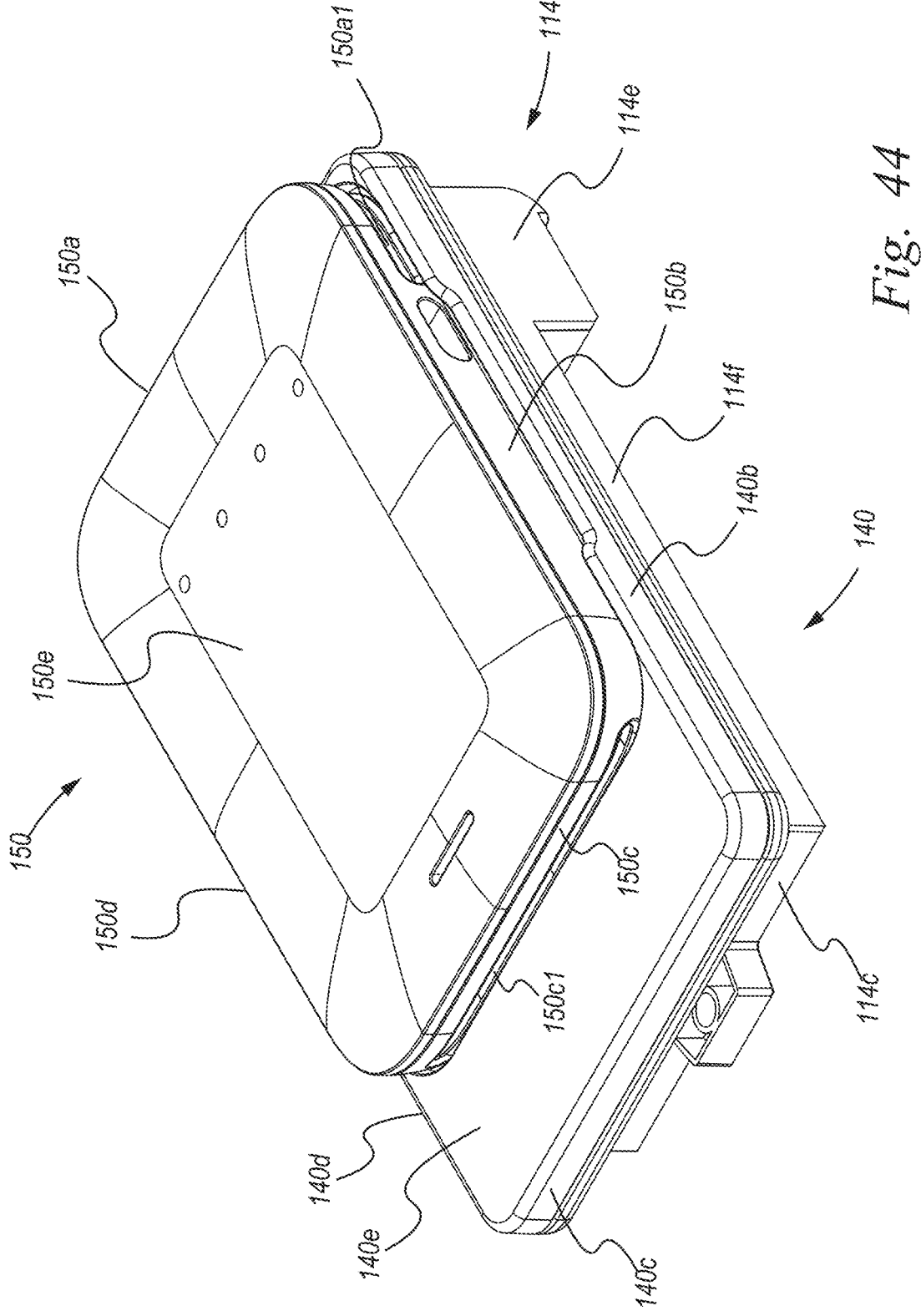
FIG. 44 is a top perspective view of the card reader assembly of FIG. 37 coupled with the adapter assembly of FIG. 35 coupled with the accessory assembly of FIG. 1.

Turning to FIG. 44, depicted therein is a top perspective view of card reader assembly 150 coupled with adapter assembly 140 coupled with accessory assembly 114.

Figure 45:
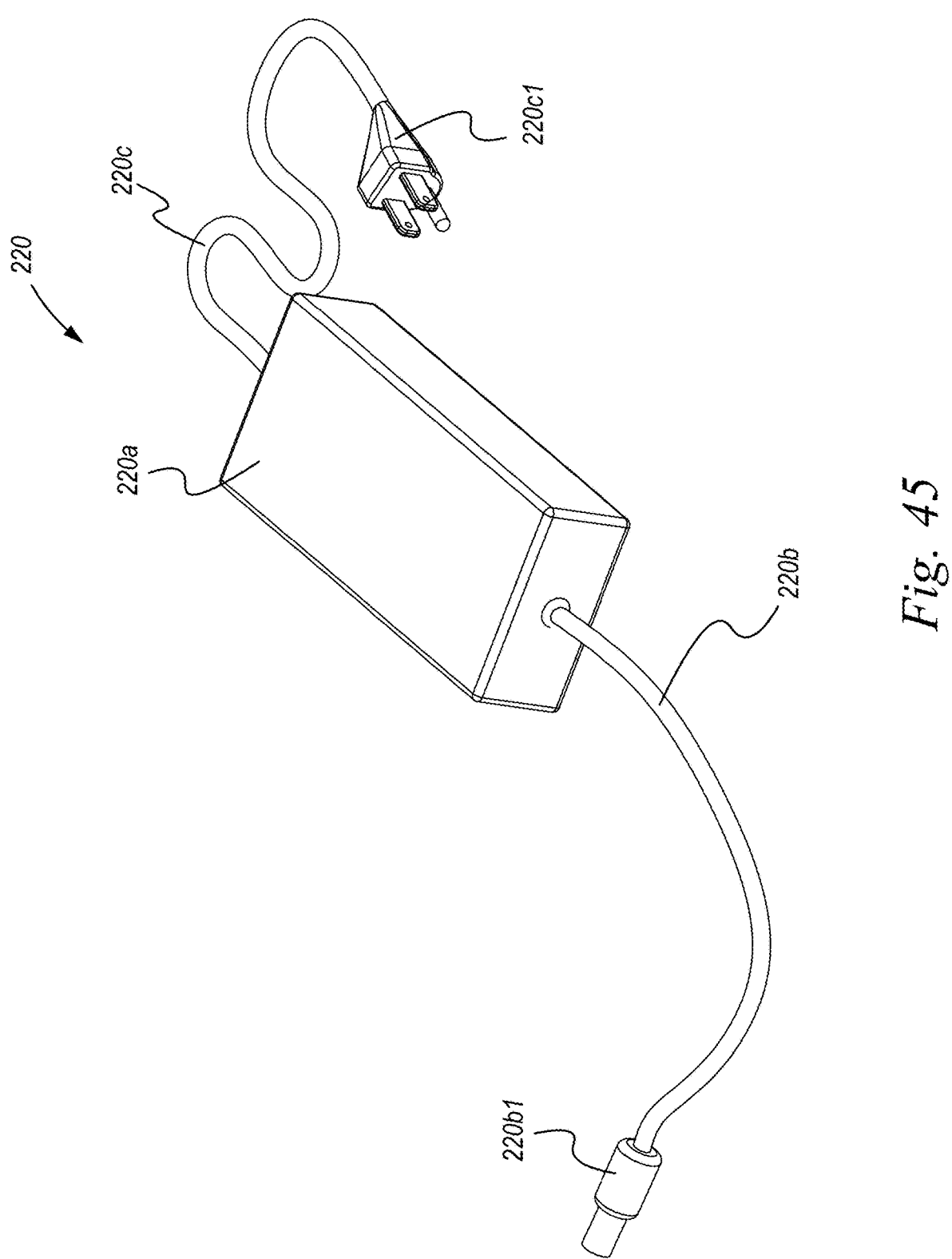
FIG. 45 is a top perspective view of a power adapter.

Turning to FIG. 45, depicted therein is a top perspective view of a power adapter 220 including power brick 220a, DC power cord 220b with DC plug 220b1, and AC power cord 220c with AC plug 220c1.

Figure 46:
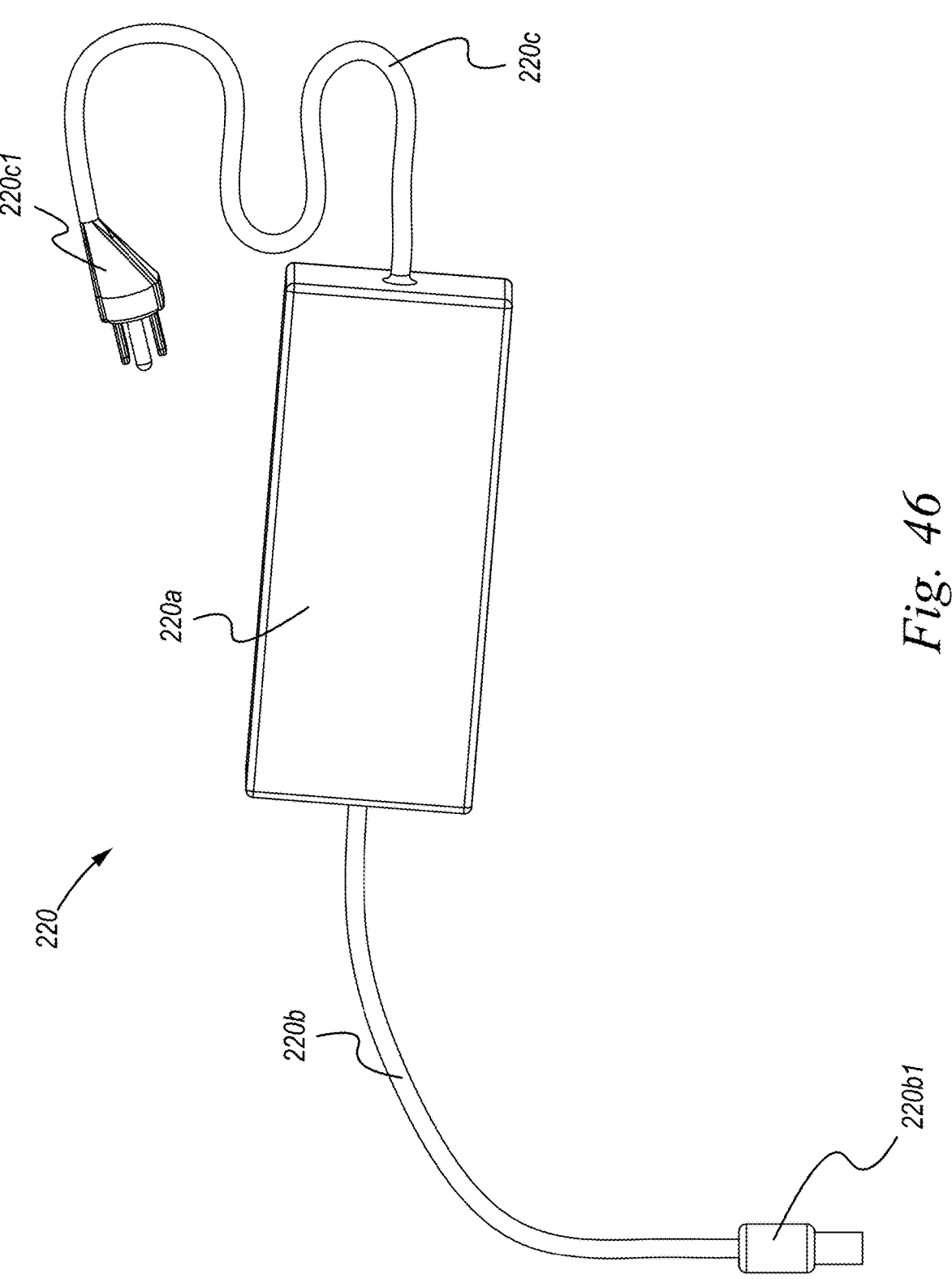
FIG. 46 is a top plan view of the power adapter of FIG. 45.

Turning to FIG. 46, depicted therein is a top plan view of power adapter 220.

Figure 47:
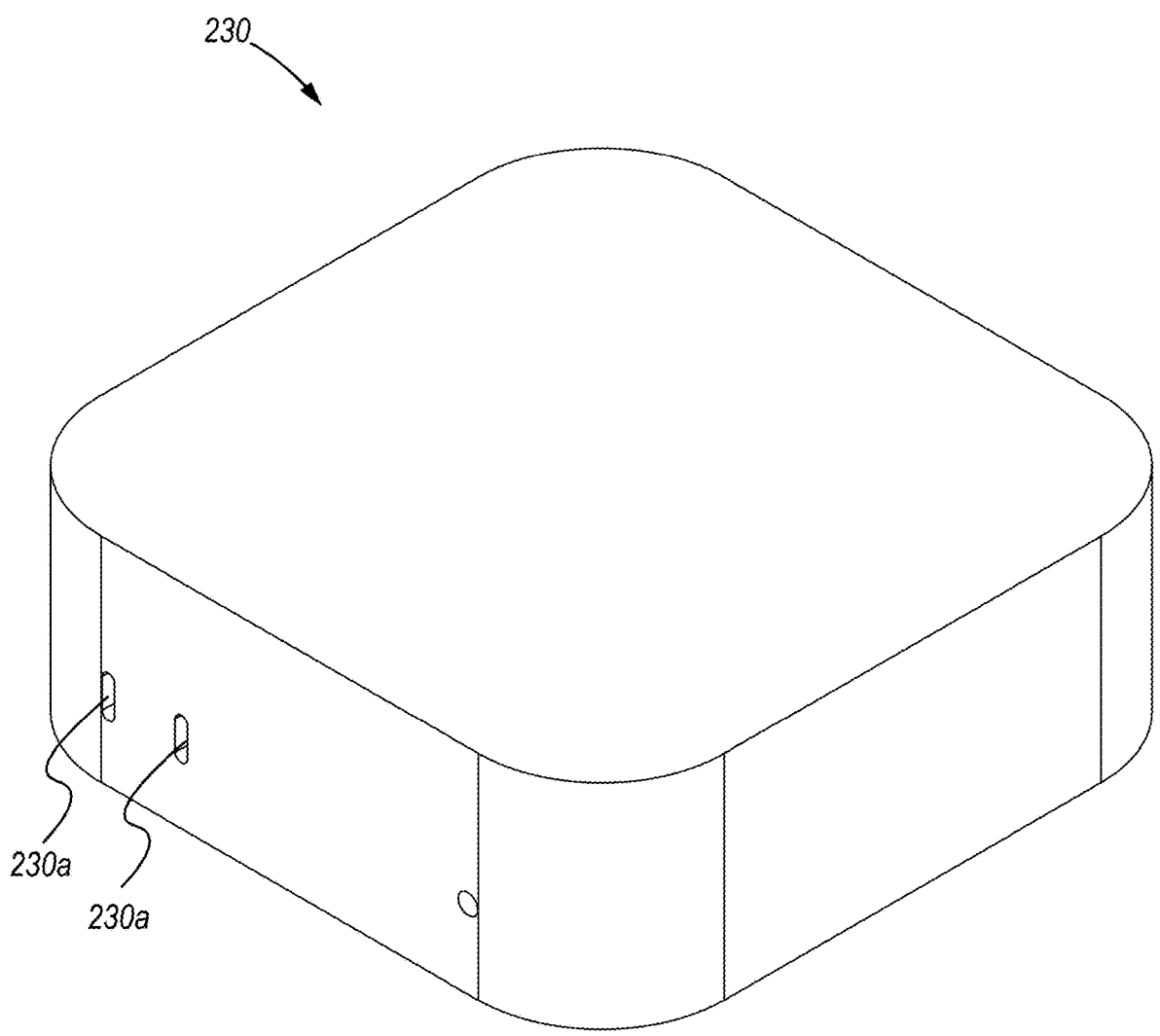
FIG. 47 is a front perspective view of a computer assembly.

Turning to FIG. 47, depicted therein is a front perspective view of computer assembly 230 with elongated member 230a.

Figure 48:
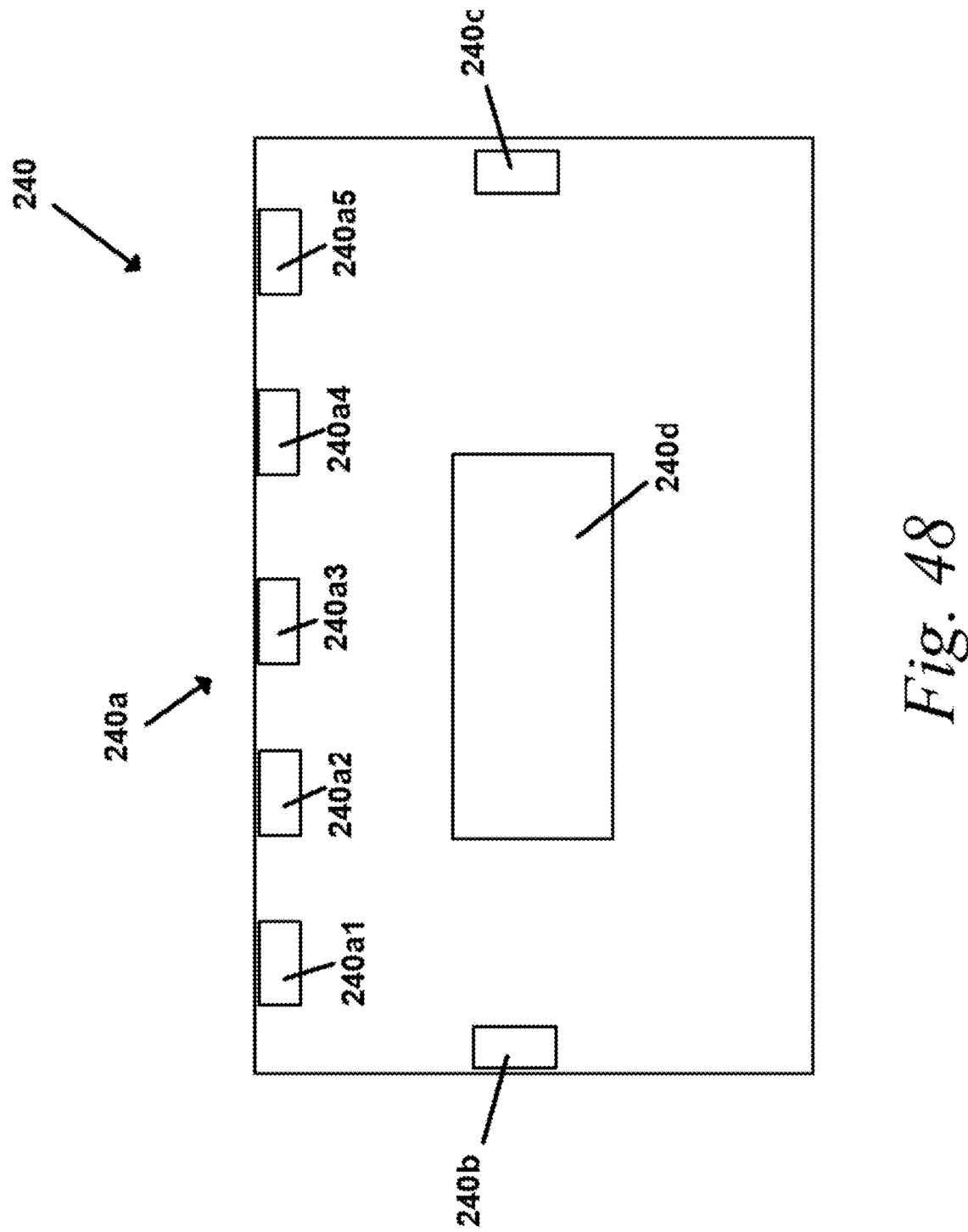
FIG. 48 is a schematic of a circuit assembly.

Turning to FIG. 48, depicted therein is circuit assembly 240 including data-power interface 240a with data-power port 240a1, data-power port 240a2, data-power port 240a3, data-power port 240a4, and data-power port 240a5, DC power input 240b, data port 240c, and circuitry 240d.

Figure 49:
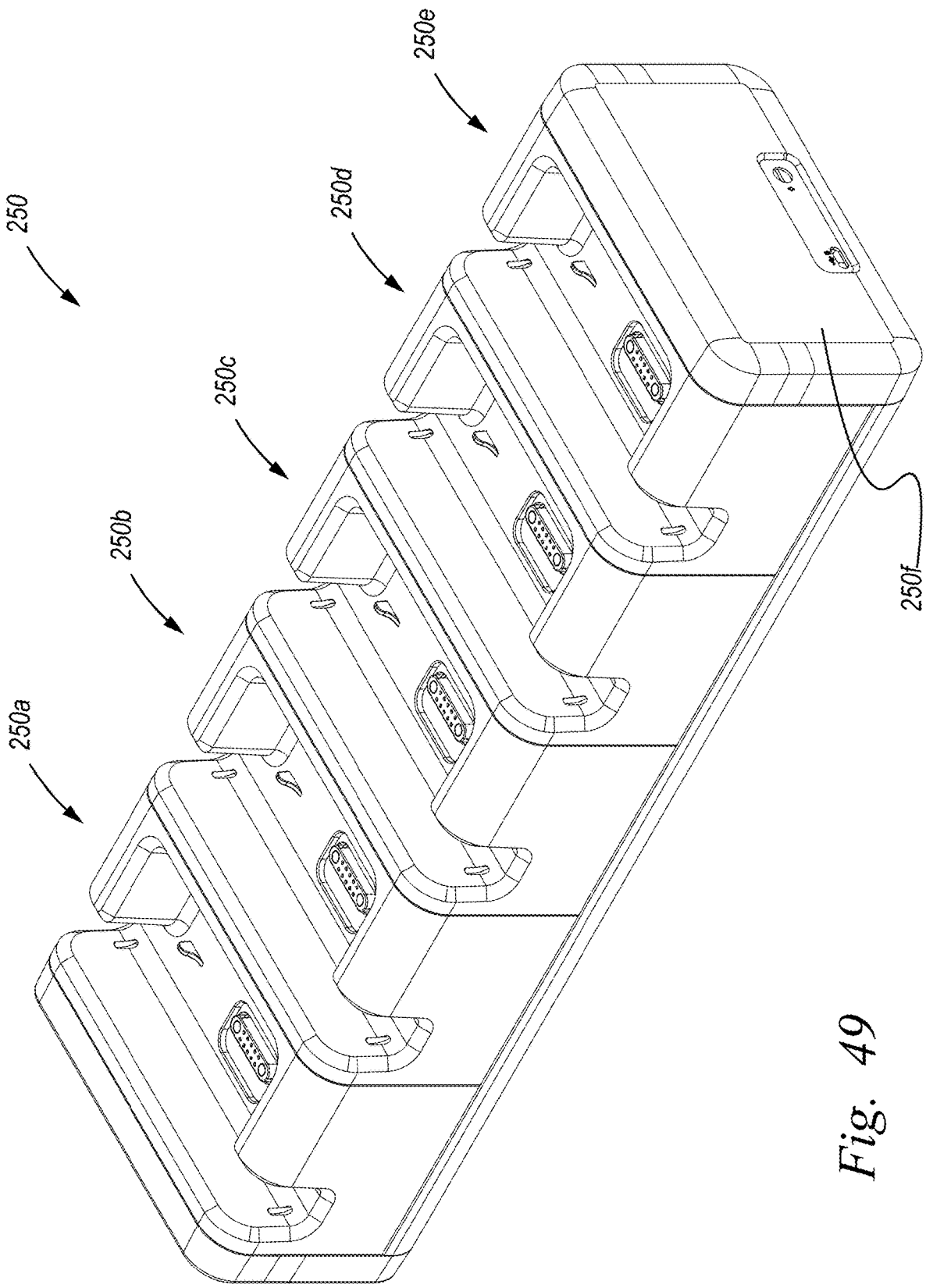
FIG. 49 is a rear perspective view of a device data-power station assembly.

Turning to FIG. 49, depicted therein is a rear perspective view of device data-power station assembly 250 including device bay portion 250a, device bay portion 250b, device bay portion 250c, device bay portion 520d, device bay portion 250e, and side 250f.

Figure 50:
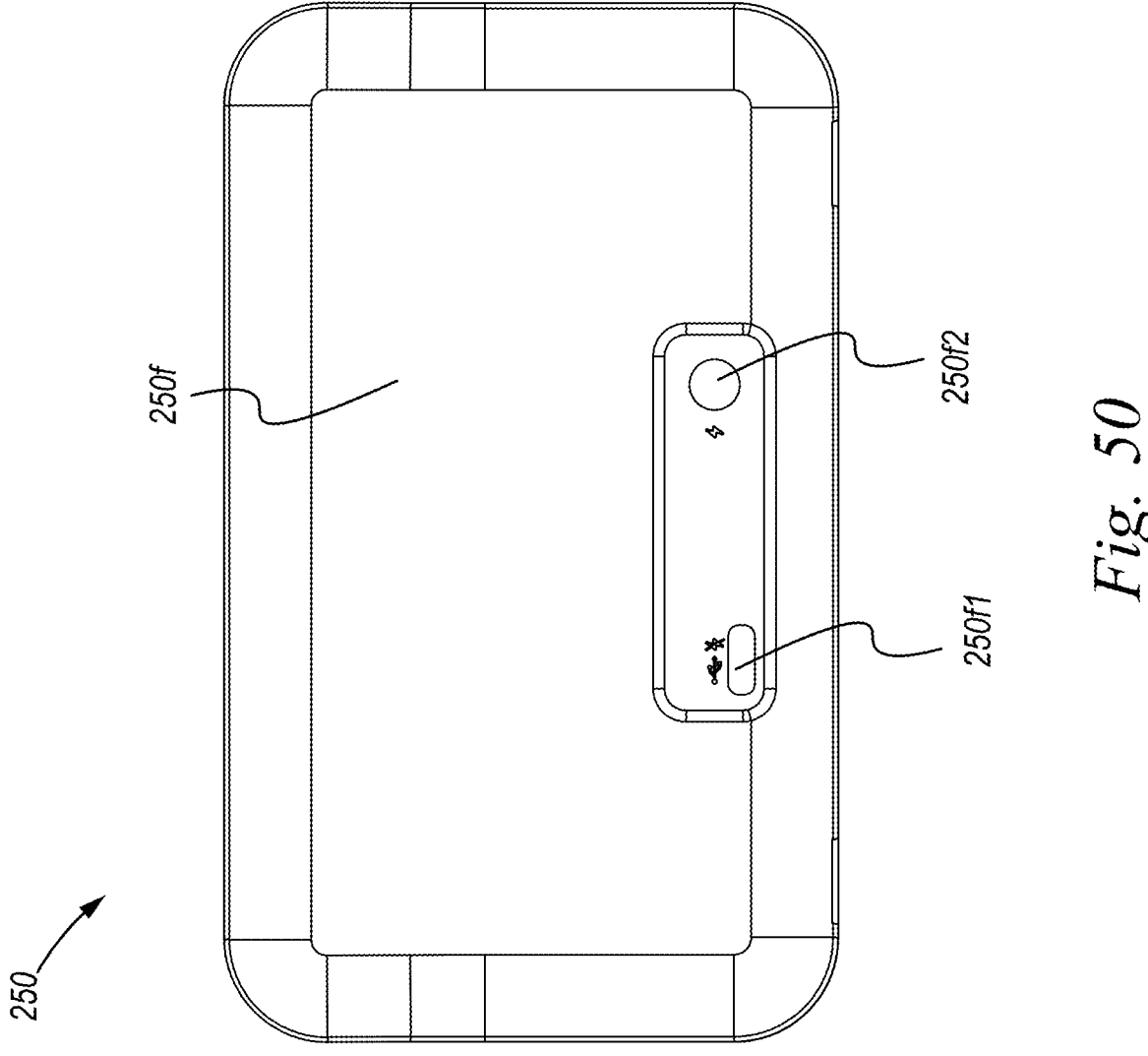
FIG. 50 is a rear elevational view of the device data-power station assembly of FIG. 49.

Turning to FIG. 50, depicted therein is a rear elevational view of device data-power station assembly 250 with data port 250f1 and DC power input port 250f2.

Figure 51:
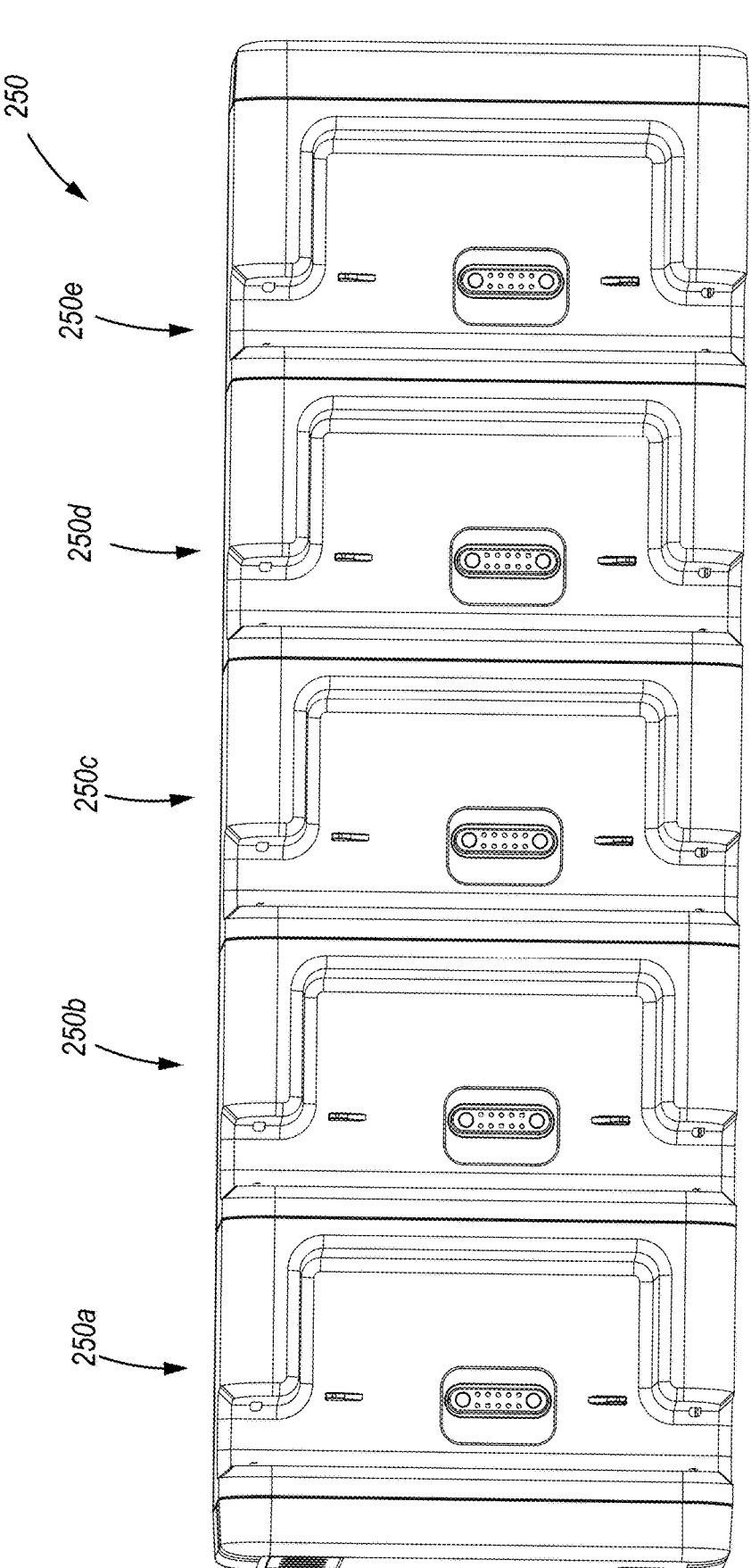
FIG. 51 is a top plan view of the device data-power station assembly of FIG. 49.

Turning to FIG. 51, depicted therein is a top plan view of device data-power station assembly 250.

Figure 52:
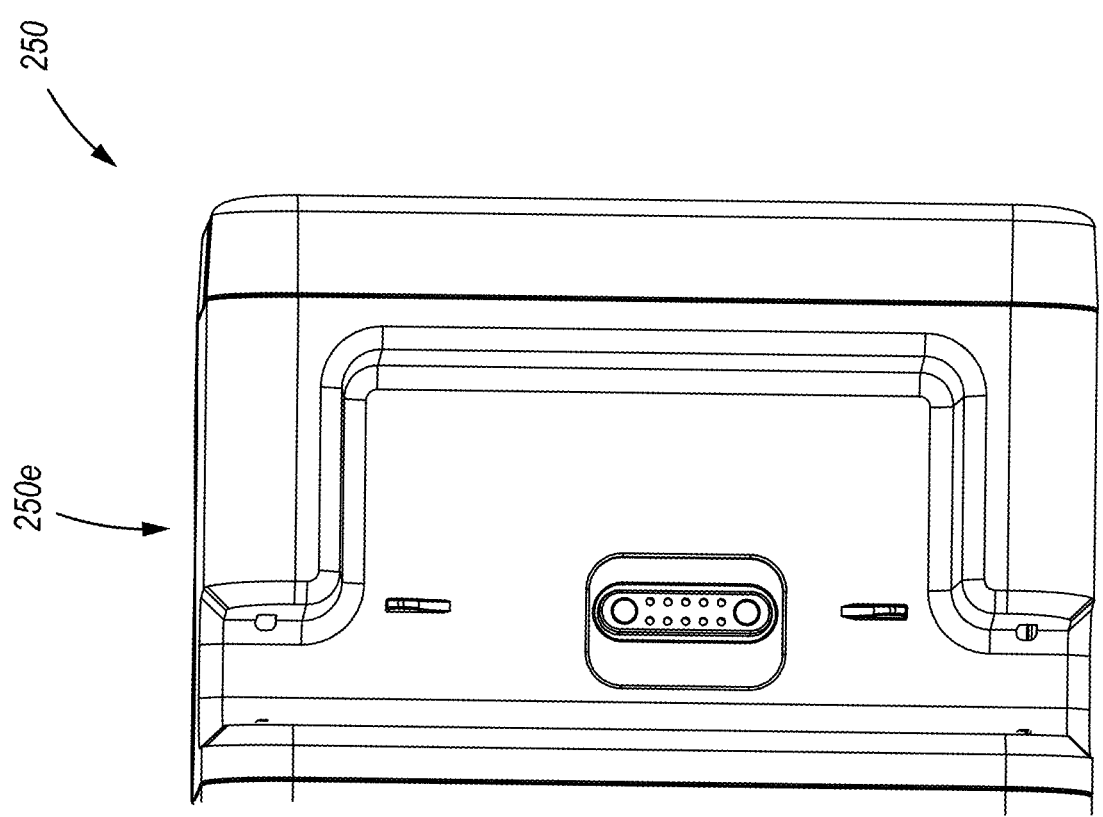
FIG. 52 is a top plan enlarged view of a device bay portion of the device data-power station assembly of FIG. 49.

Turning to FIG. 52, depicted therein is a top plan enlarged view of device bay portion 250e of device data-power station assembly 250.

Figure 53:
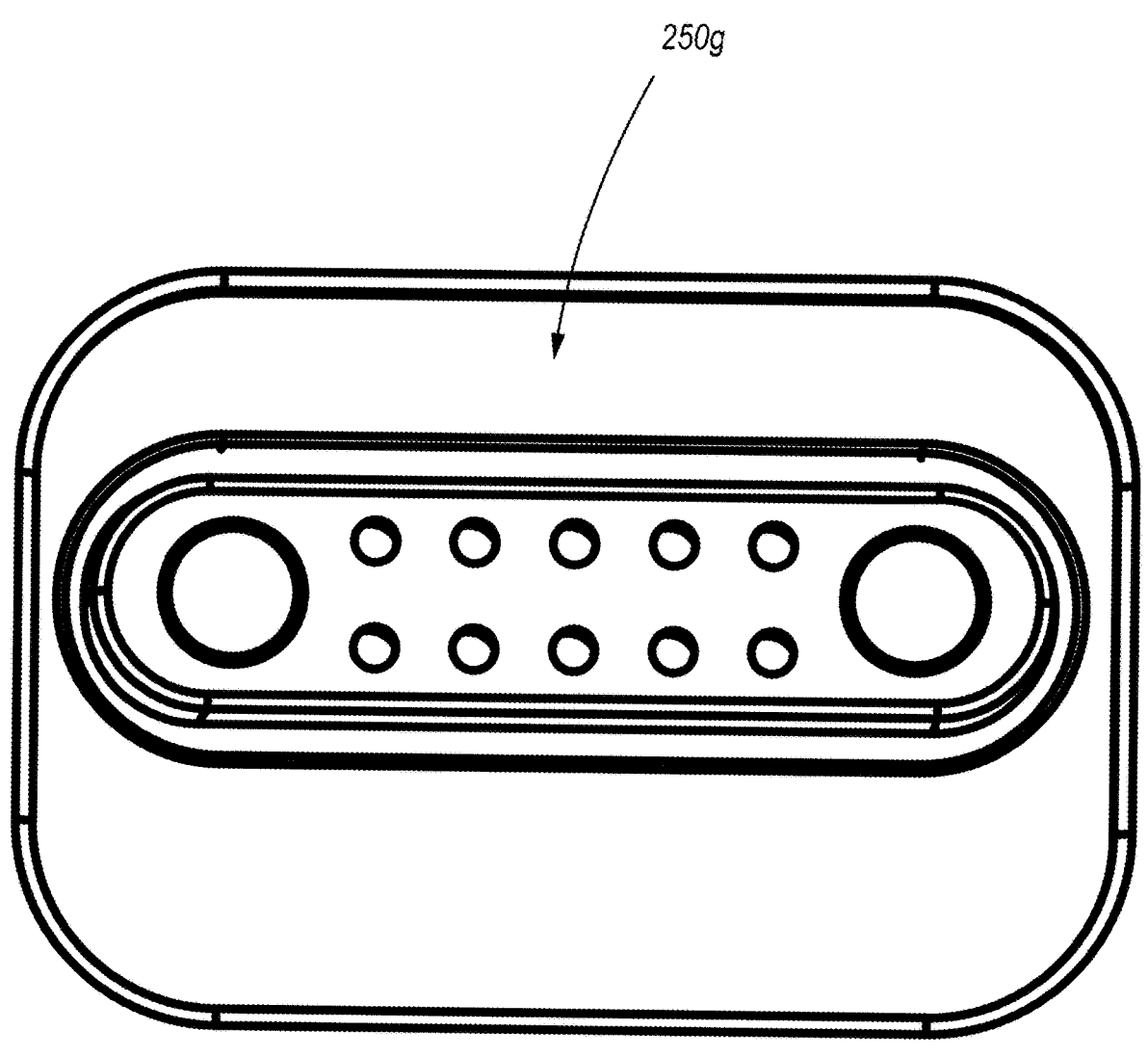
FIG. 53 is a top plan enlarged view of an interface portion of the device bay portion of FIG. 52.

Turning to FIG. 53, depicted therein is a top plan enlarged view of data-power interface 250g of device bay portion 250e of device data-power station assembly 250.

Figure 54:
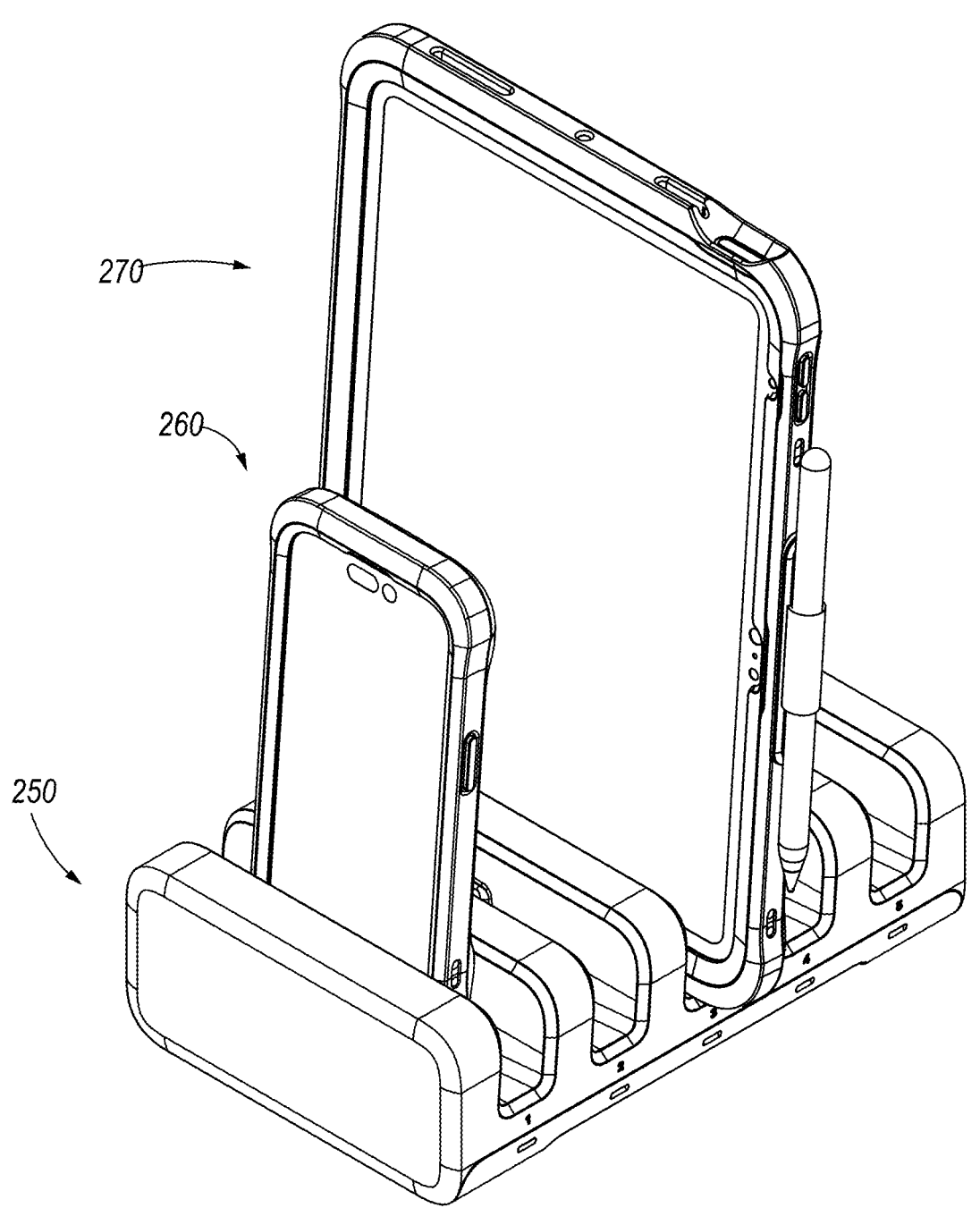
FIG. 54 is a front perspective view of the device data-power station assembly of FIG. 49 coupled with portable electronic devices.

Turning to FIG. 54, depicted therein is a front perspective view of device data-power station assembly 250 coupled with portable electronic device 260 and portable electronic device 270.

Figure 55:
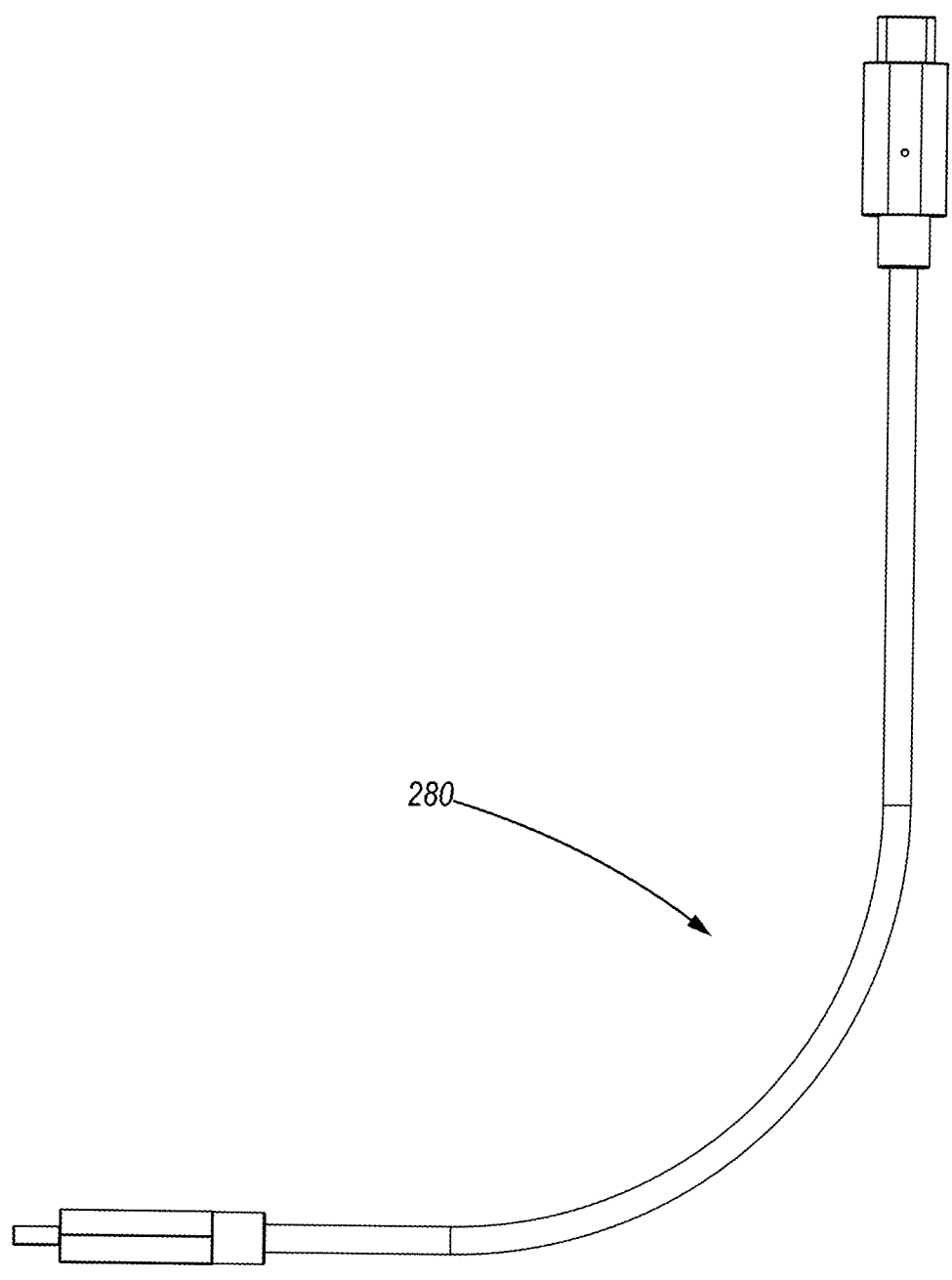
FIG. 55 a top plan view of a data-power cable.

Turning to FIG. 55, depicted therein a top plan view of data cable 280.

Figure 56:
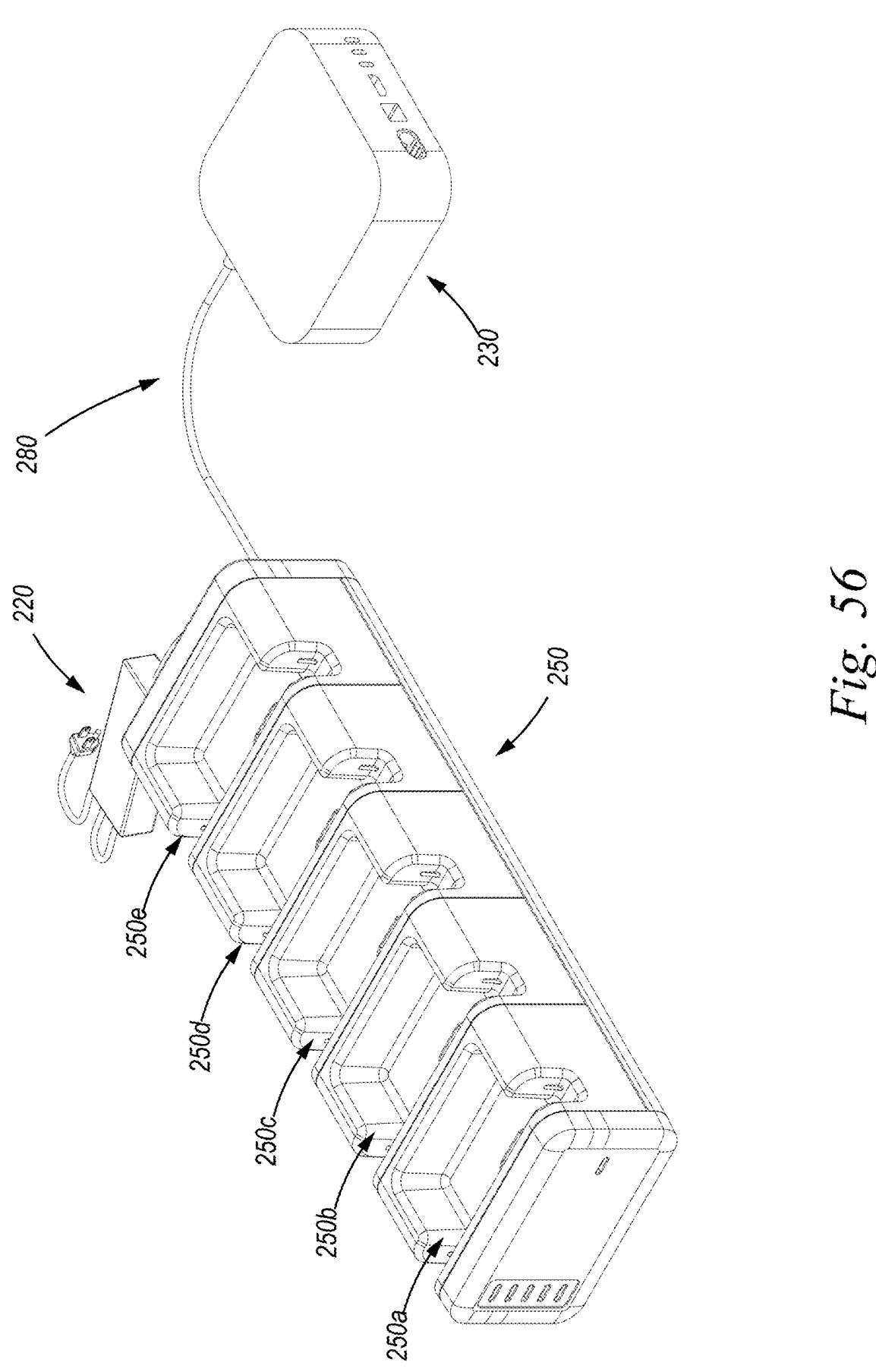
FIG. 56 is a front perspective view of device data-power station assembly of FIG. 49 coupled with the power adapter of FIG. 45 and coupled with the computer assembly of FIG. 47.

Turning to FIG. 56, depicted therein is a front perspective view of device data-power station assembly 250 coupled with power adapter 220 and computer assembly 230.

Figure 57:
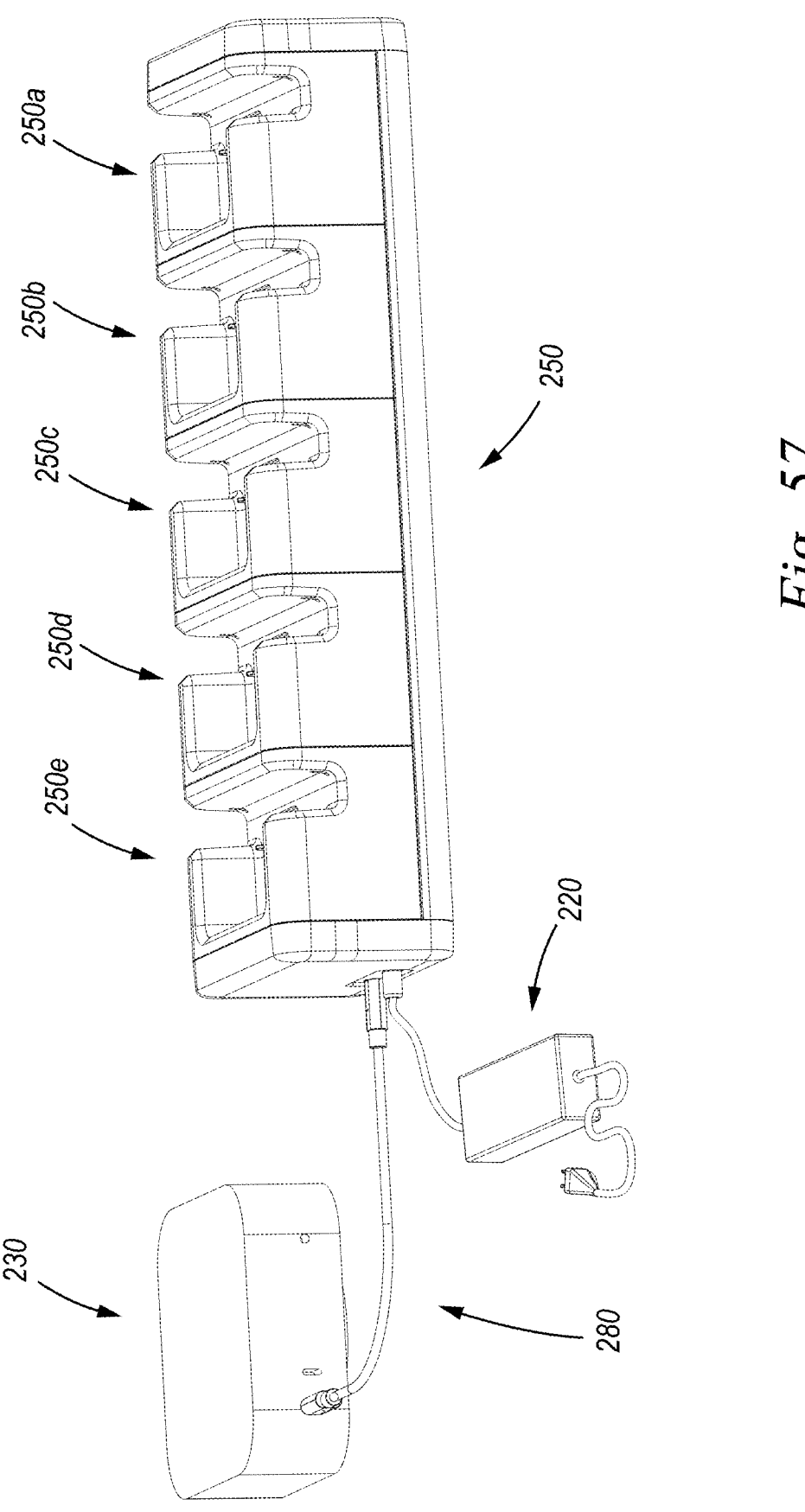
FIG. 57 is a side elevational view of device data-power station assembly of FIG. 49 coupled with the power adapter of FIG. 45 and coupled with the computer assembly of FIG. 47.

Turning to FIG. 57, depicted therein is a side elevational view of device data-power station assembly 250 coupled with power adapter 220 and computer assembly 230.

Figure 58:
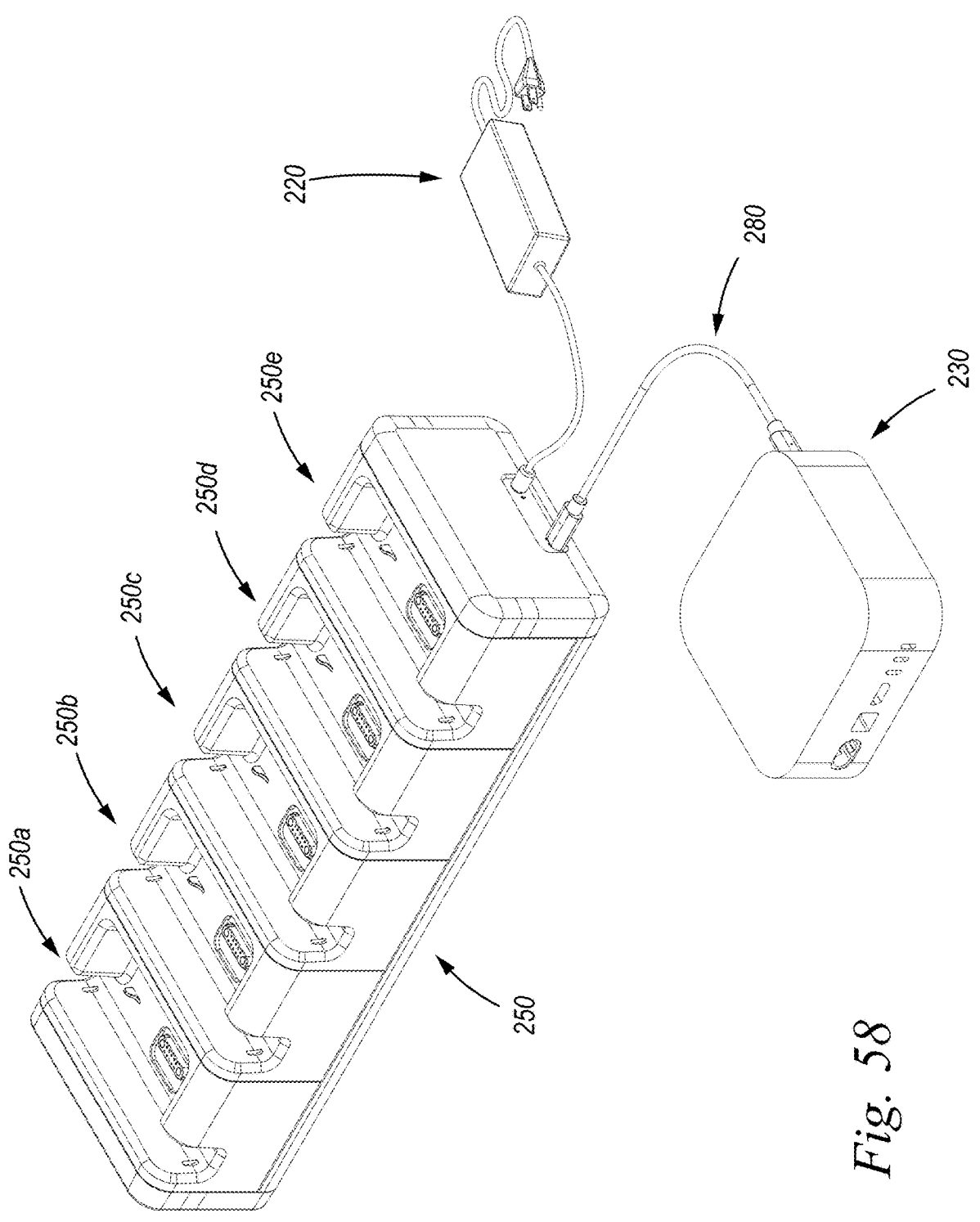
FIG. 58 is a rear perspective view of device data-power station assembly of FIG. 49 coupled with the power adapter of FIG. 45 and coupled with the computer assembly of FIG. 47.

Turning to FIG. 58, depicted therein is a rear perspective view of device data-power station assembly 250 coupled with power adapter 220 and computer assembly 230.

Figure 59:
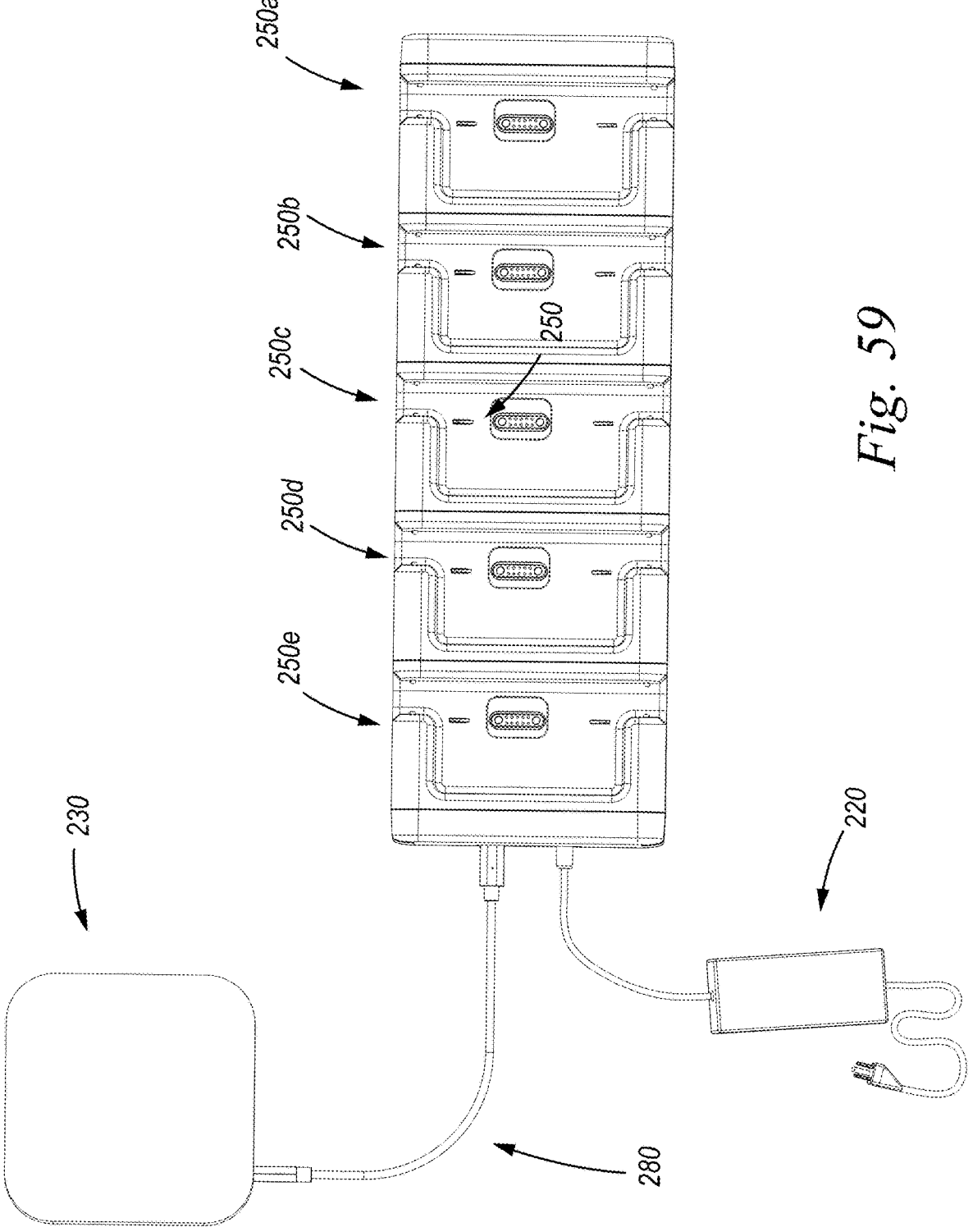
FIG. 59 is a top plan view of device data-power station assembly of FIG. 49 coupled with the power adapter of FIG. 45 and coupled with the computer assembly of FIG. 47.

Turning to FIG. 59, depicted therein is a top plan view of device data-power station assembly 250 coupled with power adapter 220 and computer assembly 230.

Figure 60:
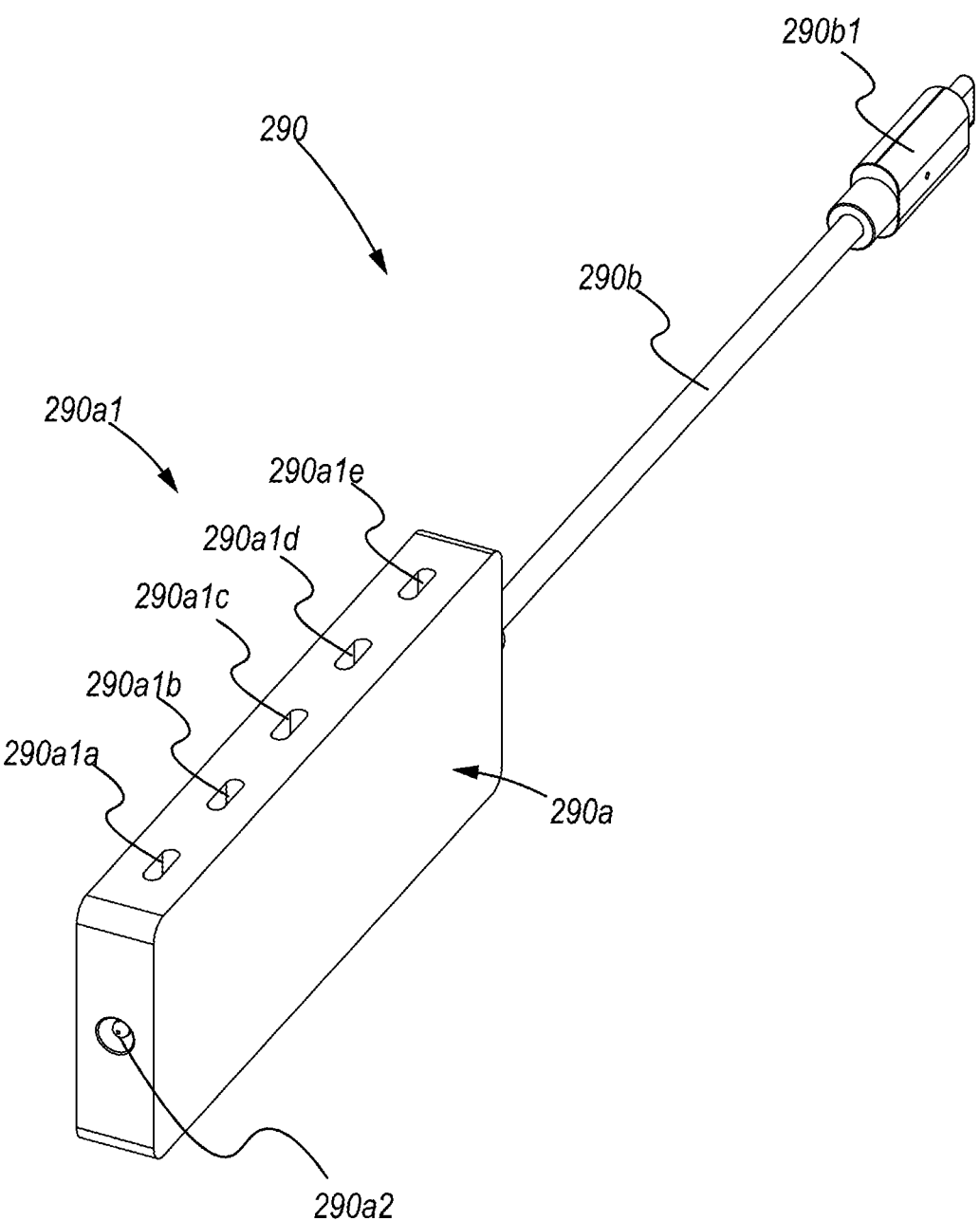
FIG. 60 is a perspective view of a device data-power dongle assembly.
Figure 61:
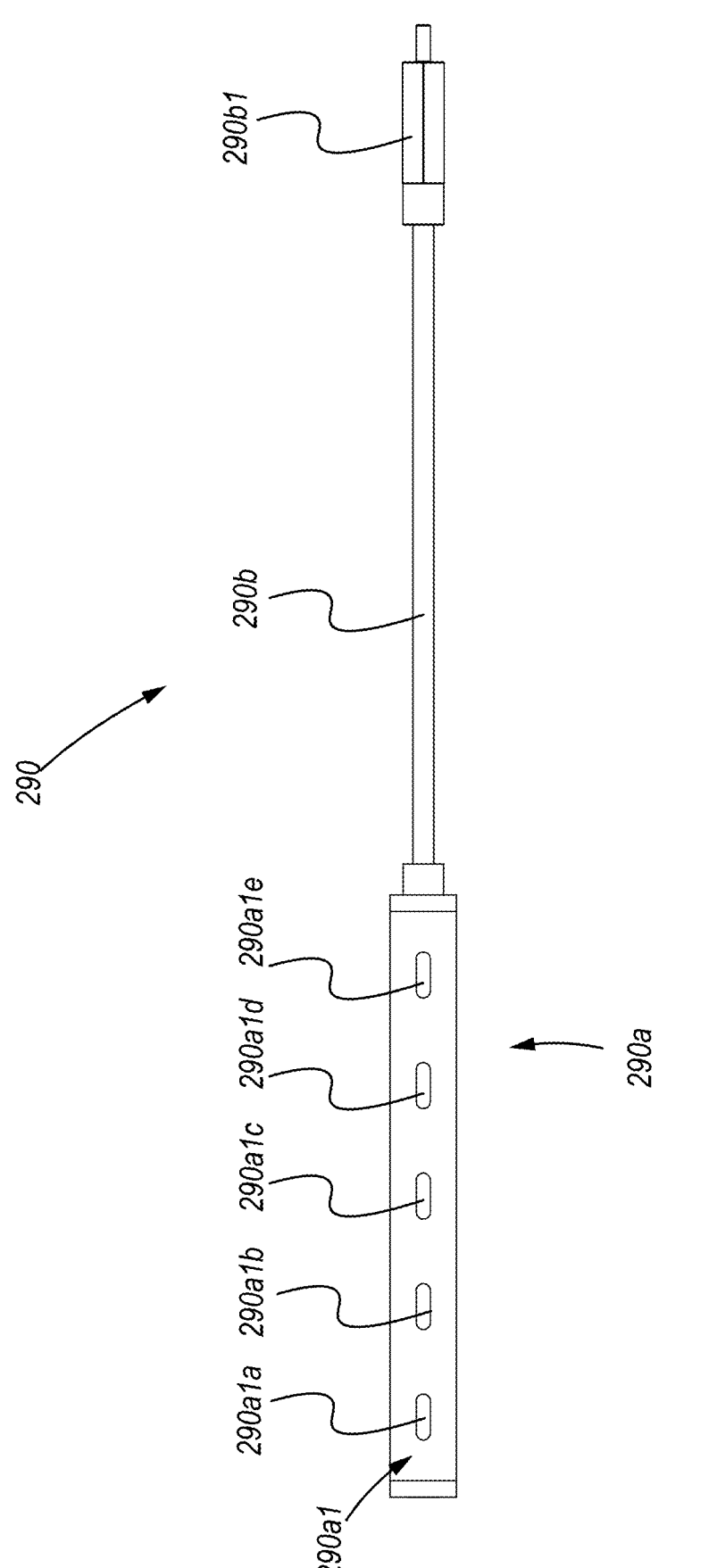
FIG. 61 is a side elevational view of the device data-power dongle assembly of FIG. 60.

Turning to FIG. 60, depicted therein is a perspective view of device data-power dongle assembly 290 including data-power dongle 290a with data-power interface 290a1 having data-power port 290a1a, data-power port 290a1b, data-power port 290a1c, data-power port 290a1d, and data-power port 290a1e, and with DC power input 290a2, and including data cable 290b with data plug 290b1, Turning to FIG. 61, depicted therein is a side elevational view of device data-power dongle assembly 290.

Figure 62:
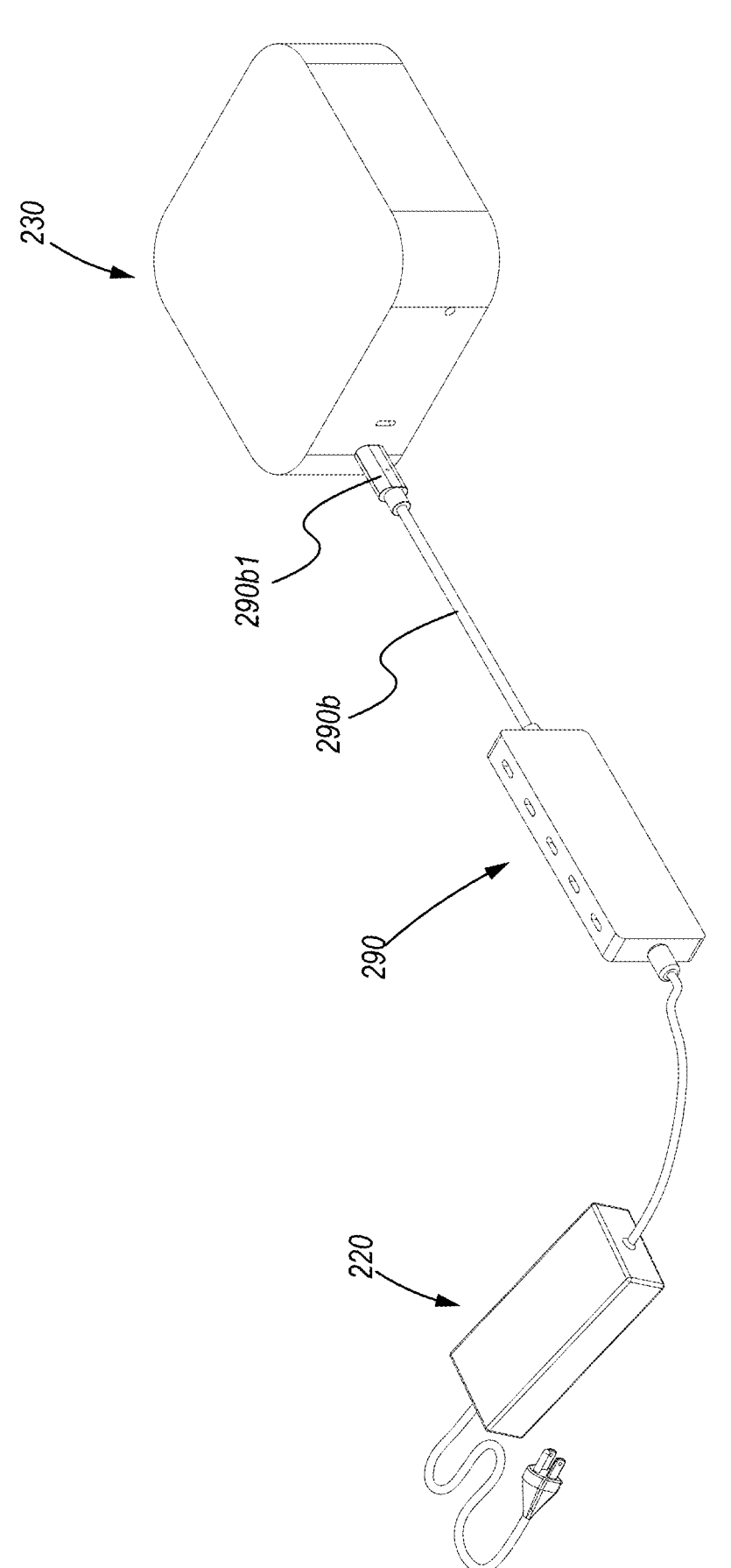
FIG. 62 is a top perspective view of device data-power dongle assembly of FIG. 60 coupled with the power adapter of FIG. 45 and coupled with the computer assembly of FIG. 47.

Turning to FIG. 62, depicted therein is a top perspective view of device data-power dongle assembly 290 coupled with power adapter 220 and coupled with computer assembly 230.

Figure 63:
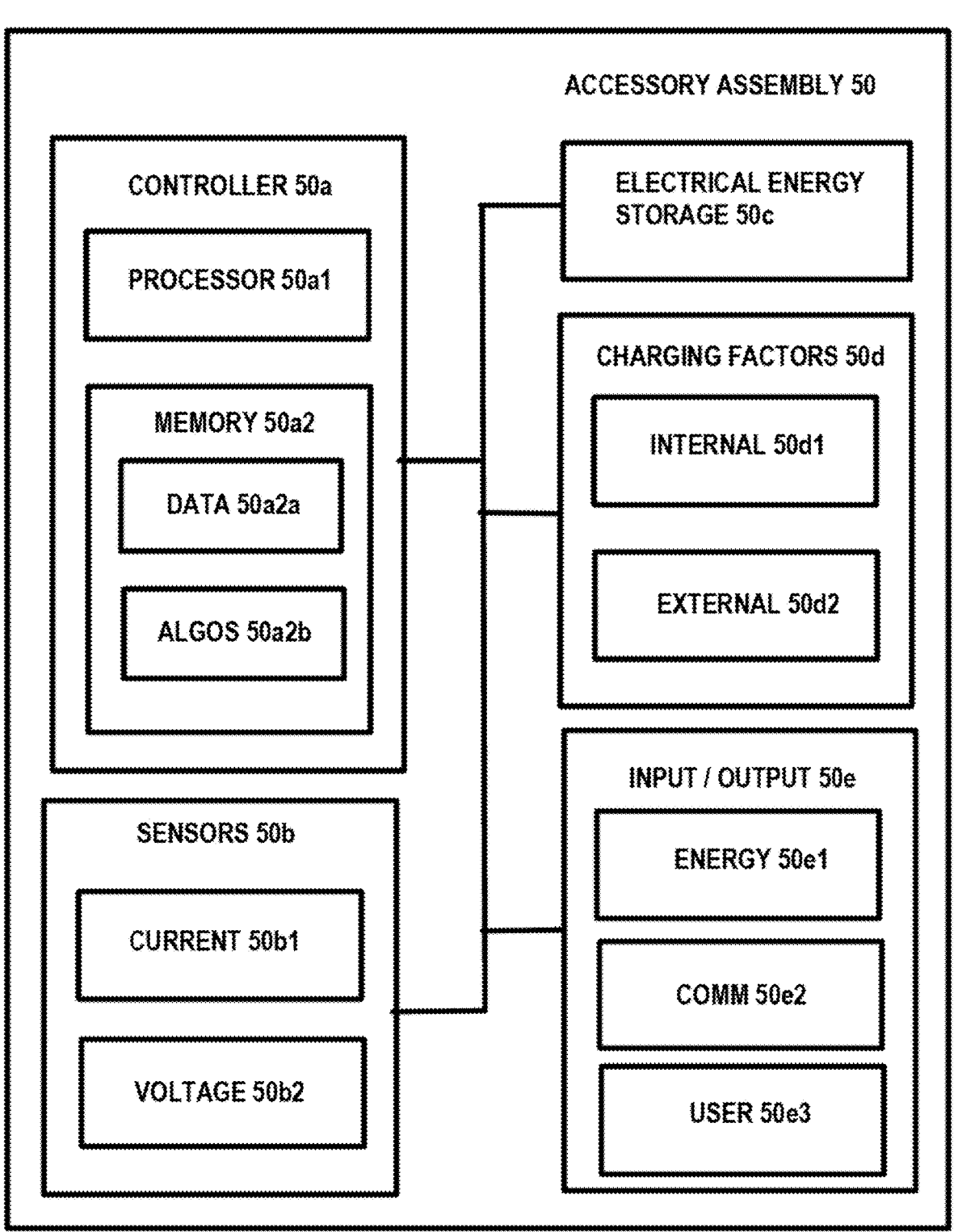
FIG. 63 is a schematic representation of electrically related components of the accessory assembly of FIG. 1.

Turning to FIG. 63, depicted therein is a schematic representation of electrically related components of the accessory assembly 50, which can be configured in various combinations, arrangements, and additions inside of accessory assembly 50. As depicted, implementations of accessory assembly 50 in the shown to include controller 50a, sensors 50b, electrical energy storage 50c, charging factors 50d, and input/output 50e shown to be interconnected. In implementations, interconnection can include various approaches such as involving wires, traces on or more circuit boards such as one or more printed circuit boards, electrical power buses, communication interconnections such as those that convey various communication protocols, etc.

In implementations, controller 50*a* shown to include processor 50*a*1, memory 50*a*2, with data 50*a*2*a*, and algos 50*a*2*b*. In implementations, sensors 50*b* shown to include current sensor 50*b*1 and voltage sensor 50*b*2. In implementations, charging factors 50*d* shown to include internal charging factor 50*d*1 and external charging factor 50*d*2. In implementations, input/output 50*e* shown to include energy input/output 50*e*1, communication input/output 50*e*2, and user input/output 50*e*3.

In implementations, controller 50*a* can performed one or more functions involving operation of accessory assembly 50. For instance, in implementations, controller 50*a* can use information obtained by sensors 50*b* to determine an estimated charging rate, such as in terms of mAh/min or Ah/min, for either internal charging factor 50*d*1 or external charging factor 50*d*2, which controller 50*a* can then evaluate according to a predetermined threshold, optionally also involving a predetermined time period, to inform of status via user input/output 50*e*3 or to otherwise control activation or deactivation regarding at least one of the following charging scenarios: (1) charging by internal charging factor 50*d*1 of electrical energy storage 50*c* using energy obtained from one or more external energy sources, such as electrical energy provided through one or more forms of standard USB, Apple lightning, MagPower USB-C, alternative DC energy sources, AC energy sources, or other energy sources, via input portion of energy input/output 50*e*1; (2) charging by external charging factor 50*d*2 of external electric-based entities, such as including portable electronic tablet device implementation 100, portable electronic phone device implementation 120, and payment card reader assembly 130, via output portion of energy input/output 50*e*1 using energy obtained from electrical energy storage 50*c*; and (3) charging by external charging factor 50*d*2 of external electric-based entities, such as including portable electronic tablet device implementation 100, portable electronic phone device implementation 120, and payment card reader assembly 130, via output portion of energy input/output 50*e*1 using energy obtained from one or more external energy sources, such as electrical energy provided through one or more forms of standard USB, Apple lightning, MagPower USB-C, alternative DC energy sources, AC energy sources, or other energy sources, via input portion of energy input/output 50*e*1. In implementations, internal charging factor 50*d*1 can be activated when controller 50*a* determines in response to detecting an adequate connection to an external power source.

In implementations, controller 50*a* can performed other one or more functions involving operation of accessory assembly 50. For instance, in implementations, controller 50*a* can use at least one of (1) communication input/output 50*e*2 and (2) sensors 50*b* with input portion of energy input/output 50*e*1 to determine operational and/or connection status of external electric-based entities, such as including portable electronic tablet device implementation 100, portable electronic phone device implementation 120, and payment card reader assembly 130, communicatively connected, about to be communicatively connected, or recently communicatively disconnected with accessory assembly 50 to determine subsequent operational control of accessory assembly 50 and/or the external electric-based entities, such as including portable electronic tablet device implementation 100, portable electronic phone device implementation 120, and payment card reader assembly 130. In implementations, such operational control can include at least one of activation of a communication function, deactivation of a communication function, sending communication to external electric-based entities, such as including portable electronic tablet device implementation 100, portable electronic phone device implementation 120, and payment card reader assembly 130, from accessory assembly 50, and receiving communication at accessory assembly 50 from external electric-based entities, such as including portable electronic tablet device implementation 100, portable electronic phone device implementation 120, and payment card reader assembly 130. In implementations, such operational control can include at least one of activation of a communication function, deactivation of a communication function, sending communication protocols and/or data to external electric-based entities, such as including portable electronic tablet device implementation 100, portable electronic phone device implementation 120, and payment card reader assembly 130, from accessory assembly 50, and receiving communication protocols and/or data at accessory assembly 50 from external electric-based entities, such as including portable electronic tablet device implementation 100, portable electronic phone device implementation 120, and payment card reader assembly 130.

In implementations, processor 50*a*1 can include one or more sub-processors, such as a central processing unit (CPU), a digital signal processor (DSP), a graphical processing unit (GPU), an application-specific integrated circuit (ASIC), microprocessor, a field-programmable gate array (FPGA), or any other suitable electronic processing components. In implementations, processor 50*a*1 can receive energy from electrical energy storage 50*c* via internal charging factor 50*d*1 or from an external energy source via external charging factor 50*d*2. In implementations, processor 50*a*1 can obtain data and execute instructions from data 50*a*2*a* and algos 50*a*2*b* of memory 50*a*2, respectively. In implementations, memory 50*a*2 can include at least one computer memory components such as at least one of ROM, RAM, EEPROM, flash memory, or registers. In implementations memory 50*a*2 can be integrated to such as with processor 50*a*1 or be an ASIC or FPGA.

In implementations, if adequately charged, electrical energy storage 50*c* can supply energy to controller 50*a* and sensors 50*b* via internal charging factor 50*d*1 and to external electric-based entities, such as including portable electronic tablet device implementation 100, portable electronic phone device implementation 120, and payment card reader assembly 130, via external charging factor 50*d*2 and via output portion of energy input/output 50*e*1. In implementations electrical energy storage 50*c* can include various conventional cell chemistries to provide suitable voltages and charge durations and charge levels such as in mAh or Ah. In implementations, electrical energy storage 50*c* can include capacitive energy storage such as with a conventional capacitor or super-capacitor.

In implementations, communication input/output 50*e*2 can involve wired or wireless communication with external electric-based entities, such as including portable electronic tablet device implementation 100, portable electronic phone device implementation 120, and payment card reader assembly 130. In implementations, communication input 200*a* portion of user input/output 50*e*3 can include tactile, such as keypad or pushbuttons, audio such as microphone, or any other suitable means for communication input 200*a*.

In implementations, communication output 200*b* portion of user input/output 50*e*3 can include audio (such as buzzer or acoustic speakers) or tactile (such as pulsed vibration actuator modifying pulse frequency, intensity, or duration), or visual output. For instance, in implementations, one or more light emitters (such as conventional light emitting diodes (LED), organic LED, liquid-crystal emitters, e-ink display, etc.) optionally arranged in various patterns such as linearly in series, in matrix configuration, randomly, etc., according to predetermined symbology or particular nomenclature involved. In implementations, communication output 200b versions of user input/output 50e3 can include other visual output, acoustic output. In implementations, controller 50a can provide control to activate or deactivate LED communication output 200b versions of user input/output 50e3 for extended periods of time, flash intermittently, project or emit patterns or characters, or can provide control for intensity of emission by light emitter versions.

Figure 64:
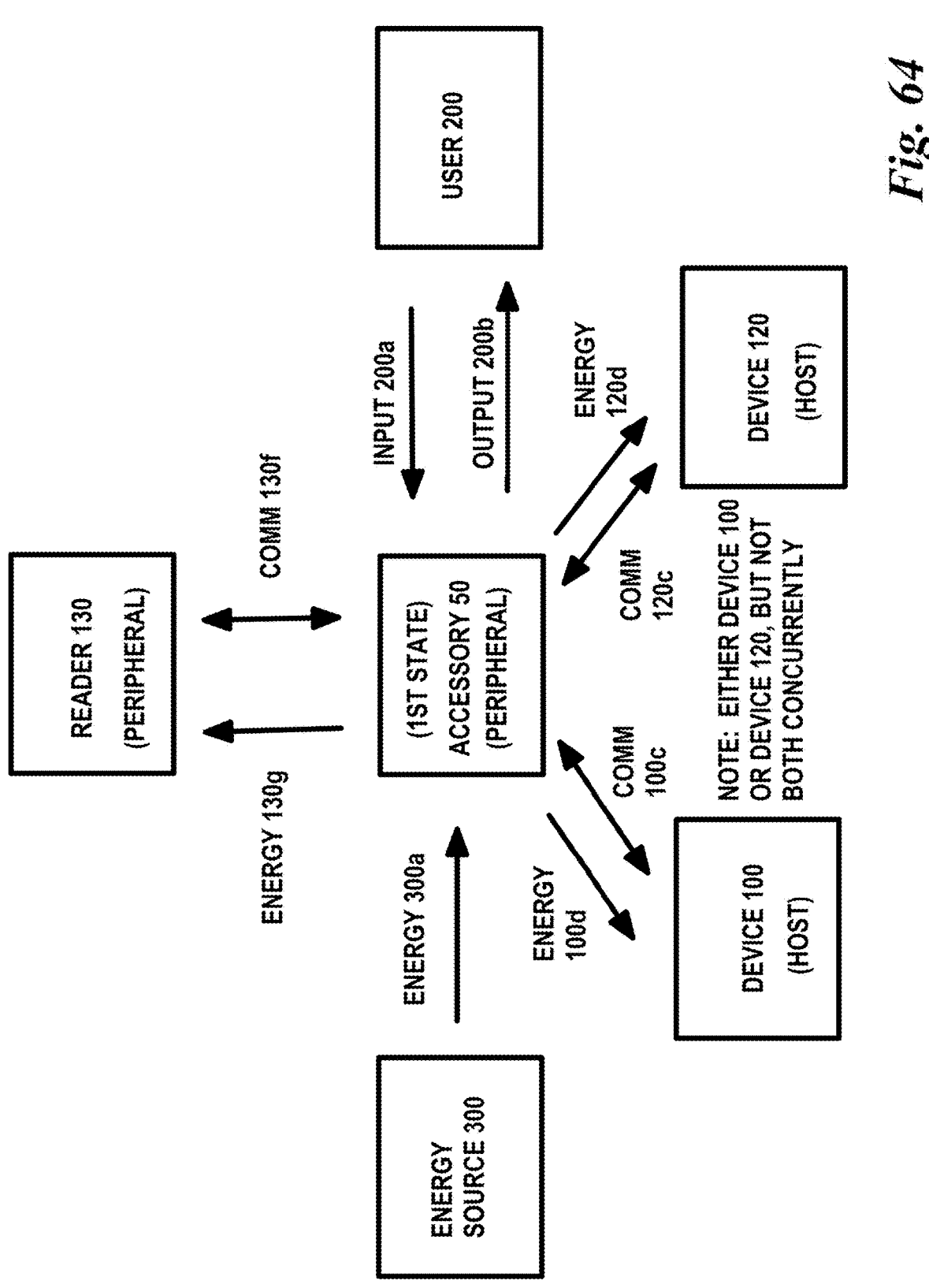
FIG. 64 is a schematic representation of implementations of flows of communication and/or electrical energy regarding the accessory assembly of FIG. 1.

Turning to FIG. 64, depicted therein is a schematic representation of implementations of flows of communication and/or electrical energy when accessory assembly 50 is either physically coupled (e.g., through structural engagement shown in prior figures or overt wiring) or wirelessly coupled (e.g., through IEEE-based or other protocols or energy fields) to portable electronic tablet device implementation 100 (generally known as a form of portable electronic computing device), portable electronic phone device implementation 120 (generally known as a form of portable electronic computing device), payment card reader assembly 130, and/or energy source 300. Also schematic representation of FIG. 36 depicts some implementations to include communication flows with user 200 being interactively engaged with accessory assembly 120.

As depicted, in implementations, electrical-based communication 100c can flow between accessory assembly 50 and portable electronic tablet device implementation 100; and electrical energy 100d can flow from accessory assembly 50 to portable electronic tablet device implementation 100. As depicted, in implementations, electrical-based communication 120c can flow between accessory assembly 50 and portable electronic phone device implementation 120; and electrical energy 120d can flow from accessory assembly 50 to portable electronic phone device implementation 120. As depicted, in implementations, electrical-based communication 130f can flow between accessory assembly 50 and payment card reader assembly 130; and electrical energy 130g can flow from accessory assembly 50 to payment card reader assembly 130. As depicted, in implementations, communication input 200a can flow from accessory assembly 50 to user 200; and communication output 200b can flow from user 200 to accessory assembly 50. As depicted, in implementations, electrical energy 300a can flow from electrical energy source 300 to accessory assembly 50.

In implementations, such components of accessory assembly 50 conduct functions such as activation or deactivation upon a two second button hold of communication input 200a portions or versions of user input/output 50e3, displaying energy storage status using various light patterns of communication output 200b portions or versions of user input/output 50e3 upon single button press of communication input 200a portions or versions of user input/output 50e3. Such light patterns can involve multiple lights to include long pulses or one or more lights being activated to indicate of percentage of electrical charge remaining or charging status of electrical energy storage 50c.

Charging mode can be selected based on manual control such as button pushes to charge only the accessory assembly 50, charge accessory assembly 50 and the portable electronic tablet device implementation 100, charge accessory assembly 50 and portable electronic phone device implementation 120, or accessory assembly 50 only when accessory assembly 50 charge is below a threshold such as ten percent. Other charging modes can include a quick charge which temporarily disables data connectivity between accessary assembly 50 and portable electronic tablet device implementation 100 or portable electronic phone device implementation 120 to allow for faster charging. In implementations the accessory assembly 50 can be put into a data mode only, to allow for a wired data connection between payment card reader assembly 130 and portable electronic tablet device implementation 100 or portable electronic phone device implementation 120.

In implementations accessory assembly 50 conducts various verification routines from data 50a2a of memory 50a2 such as to allow for reliable operations. These routines can include but are not limited to the following such as after a press and hold of such as manual button control of communication input 200a portion of user input/output 50e3 to activate accessory assembly 50, verification of charging is done such as related to certain voltage and/or current levels being supplied to or from the accessory assembly 50. Other verification routines can include whether attached card reader accessory 130 is being charged or whether data connectivity has been established between one or more of accessory assembly 50, portable electronic tablet device implementation 100, portable electronic phone device implementation 120, and payment card reader assembly 130.

Certain communication input 200a from communication input 200a portion of user input/output 50e3 such as a double-press by user 200 of one or more buttons included with implementations of communication input 200a portions of user input/output 50e3 can be sensed by processor 50a1 to deactivate charging of the portable electronic tablet device implementation 100 or portable electronic phone device implementation 120 with subsequent verification. This deactivation of portable electronic device charging can occur while charging of payment card reader assembly 130 or accessory assembly 50 can remain active or data connectivity between the accessory assembly 50 and payment card reader assembly 130 can also remain active. Manual activation of portable electronic device charging can occur through for example double-button-press of input portion of user input/output 50e3 of accessory assembly 50 along with charging and data connectivity with payment card reader assembly 130 remaining active. Even with accessory assembly charging and portable electronic device charging being deactivated, data connectivity may still be active between accessory assembly 50 and payment card reader assembly 130.

In implementations charging can be performed for instance with USB-C cable or an Apple lightening cable in which the accessory assembly is activated through coupling with either cable. Charging status can be indicated though use of status lights for communication output 200b portion of user input/output 50e3. In implementations, electrical energy storage 50c of accessory assembly 50, electrical energy storage of portable electronic tablet device implementation 100 or portable electronic phone device implementation 120, and electrical energy storage of card reader accessory 130 can all be charged simultaneously by accessory assembly 50 via internal charging factor 50d1 and external charging factor 50d2. In implementations, when an electrical energy cable is disconnected the accessory assembly 50 can remain to allow for continued portable electronic device charging and the payment card reader assembly charging along with data connectivity remaining viable between accessory assembly 50, portable electronic tablet device implementation 100 or portable electronic phone device implementation 120, and payment card reader assembly 130. In implementations, for instance, these charging functions can remain even though a USB-C charging cable has been initially unplugged from accessory assembly 50 and flipped over in an inverse physical configuration.

In implementations, user communication input 200*a* to communication input 200*a* portion of user input/output 50*e*3, such as a single-press button procedure, can show charge level of electrical energy storage 50*c* through such as one or more LEDs of communication output 200*b* portion of user input/output 50*e*3. In implementations, user communication input 200*a* to communication input 200*a* portion of user input/output 50*e*3, such as a double-press button procedure, can deactivate portable electronic device charging. In implementations, connecting input portion of energy input/output 50*e*1 of accessory assembly 50 to an electrical energy source for a predetermined amount of time, such as two seconds, and then disconnecting such can activate portable electronic device charging by external device charging factor 50*d*2.

In implementations, disconnecting portable electronic tablet device implementation 100 or portable electronic phone device implementation 120 from accessory assembly 50 can be detected by processor 50*a*1, which can then be based upon this detection deactivate card reader accessory 130. In implementations, the accessory assembly 50 can automatically be deactivated by processor 50*a*1 within a predetermined time frame such as two minutes. In implementations with portable electronic tablet device implementation 100 or portable electronic phone device implementation 120 being in an inactive state and accessory assembly 50 also in an inactive state, if portable electronic tablet device implementation 100 or portable electronic phone device implementation 120 is coupled with accessory assembly 50, processor 50*a*1 of accessory assembly 130 will not activate either the portable electronic tablet device implementation 100 or portable electronic phone device implementation 120, accessory assembly 50, or payment card reader assembly 130.

In implementations, both electrical energy and network connectivity can be furnished via IEEE standards-based power-over-ethernet PoE in which both input portion of energy input/output 50*e*1 and input/output portions of communication input/output 50*e* are wired or wirelessly coupled with an electrical energy source and a network source. For instance, MagPower cabling could provide both to accessory assembly 50 from proper sources. For instance, when accessory assembly 50 has been deactivated and a MagPower or other type cable is coupled with the accessory assembly 50 and a USB hub having ethernet and power available is coupled with the MagPower cable, accessory assembly 50 can be activated processor 50*a*1 for both electrical energy input and network connectivity input. Through this means, charging of accessory assembly 50, portable electronic tablet device implementation 100 or portable electronic phone device implementation 120, and the payment card reader assembly 130 can be had along with availability of network connectivity, such as ethernet connectivity, to them all.

In implementations, in some cases where portable electronic tablet device implementation 100 or portable electronic phone device implementation 120 are active and accessory assembly 50 is inactivate, charging of portable electronic tablet device implementation 100 or portable electronic phone device implementation 120 can be activated by processor 50*a*1 through coupling of accessory assembly 50 with network and electrical energy source such as if a MagPower cable that is coupled with a USB hub having ethernet and electrical energy available, is coupled with accessory assembly, then accessory assembly 50 can be activated by processor 50*a*1. In implementations, these activations can also allow for charging and provide network connectivity to payment card reader assembly 130 and portable electronic tablet device implementation 100 or portable electronic phone device implementation 120.

In implementations, when portable electronic tablet device implementation 100 or portable electronic phone device implementation 120 and accessory assembly 50 are inactive, when portable electronic tablet device implementation 100 or portable electronic device assembly 120, and accessory assembly 50 are coupled together they along with payment card reader assembly 130 will remain inactive through management by processor 50*a*1 of accessory assembly 50.

Following includes implementations of methods performed by implementations of accessory assembly 50 as also described above.

Implementations of accessory assembly 50 can determine activation status of accessory assembly 50 and when portable electronic tablet device implementation 100 or portable electronic phone device implementation 120 is electrical-energy-communication based coupled and structurally coupled with the accessory assembly 50, accessory assembly 50 can control at least a portion of electrical-energy-based charging of the portable electronic tablet device implementation 100 or portable electronic phone device implementation 120 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-energy-based charging of the portable electronic tablet device implementation 100 or portable electronic phone device implementation 120 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the portable electronic tablet device implementation 100 or portable electronic phone device implementation 120 based at least in part on the activation status of the accessory payment card reader assembly 130.

In implementations of accessory assembly 50, accessory assembly 50 can determine activation status of the accessory assembly 50; and accessory assembly 50 can control at least a portion of electrical-energy-based charging of the accessory assembly 50 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-energy-based charging of the accessory assembly 50 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the accessory assembly 50 based at least in part on the activation status of the payment card reader assembly 130.

In implementations of accessory assembly 50, accessory assembly 50 can determine activation status of the accessory assembly 50; and when the payment card reader assembly 130 is electrical-energy-communication-based coupled and structurally coupled with the accessory assembly 50, accessory assembly 50 can control at least a portion of electrical-energy-based charging of the payment card reader assembly 130 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and when the payment card reader assembly 130 is electrical-energy-communication-based coupled and structurally coupled with the accessory assembly 50, accessory assembly 50 can control at least a portion of electrical-energy-based charging of the payment card reader assembly 130 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the payment card reader assembly 130 based at least in part on the activation status of the payment card reader assembly 130.

In implementations of accessory assembly 50, accessory assembly 50 can determine activation status of the accessory assembly 50; and when the portable electronic tablet device implementation 100 or portable electronic phone device implementation 120 is electrical-energy-communication-based coupled and structurally coupled with the accessory assembly 50, accessory assembly 50 can control at least a portion of electrical-communication status of the portable electronic tablet device implementation 100 or portable electronic phone device implementation 120 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-communication-based connectivity of the portable electronic tablet device implementation 100 or portable electronic phone device implementation 120 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and when the portable electronic tablet device implementation 100 or portable electronic phone device implementation 120 is electrical-energy-communication-based coupled and structurally coupled with the accessory assembly 50, accessory assembly 50 can control at least a portion of electrical-communication-based connectivity of the portable electronic tablet device implementation 100 or portable electronic phone device implementation 120 based at least in part on the activation status of the payment card reader assembly 130.

In implementations of accessory assembly 50, accessory assembly 50 can determine activation status of the accessory assembly 50; and accessory assembly 50 can control at least a portion of electrical-communication-based connectivity of the accessory assembly 50 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-communication-based connectivity of the accessory assembly 50 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-communication-based connectivity of the accessory assembly 50 based at least in part on the activation status of the payment card reader assembly 130.

In implementations of accessory assembly 50, accessory assembly 50 can determine activation status of the accessory assembly 50; and when the payment card reader assembly 130 is electrical-energy-communication-based coupled and structurally coupled with the accessory assembly 50, accessory assembly 50 can control at least a portion of electrical-communication-based connectivity of the payment card reader assembly 130 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and when the payment card reader assembly 130 is electrical-energy-communication-based coupled and structurally coupled with the accessory assembly 50, accessory assembly 50 can control at least a portion of electrical-communication-based connectivity of the payment card reader assembly 130 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-communication-based connectivity of the payment card reader assembly 130 based at least in part on the activation status of the payment card reader assembly 130.

In implementations of accessory assembly 50, accessory assembly 50 can determine electrical-energy-communication-based coupling status of the accessory assembly 50 with the portable electronic tablet device implementation 100 or portable electronic phone device implementation 120; and accessory assembly 50 can control at least a portion of electrical-communication-based connectivity of the portable electronic tablet device implementation 100 or portable electronic phone device implementation 120 based at least in part on the electrical-energy-communication-based coupling status of the accessory assembly 50 with the portable electronic tablet device implementation 100 or portable electronic phone device implementation 120.

In implementations of accessory assembly 50, accessory assembly 50 can determine electrical-energy-communication-based coupling status of the accessory assembly 50 with the payment card reader assembly 130; and accessory assembly 50 can control at least a portion of electrical-communication-based connectivity of the payment card reader assembly 130 based at least in part on the electrical-energy-communication-based coupling status of the accessory assembly 50 with the payment card reader assembly 130.

In implementations accessory assembly 50 can determine whether accessory assembly is in a first electrical state or a second electrical state such as whether a particular pin of interface portion 52a1d of exterior electric interface 52a1 of accessory assembly (see FIGS. 3 and 6) is at a grounded voltage level (e.g. first electrical state or alternatively second electrical state) or a high voltage (e.g. 3V or 5V) level (e.g. second electrical state or alternatively first electrical state). Such as using a pull-up resistor method (e.g. pulling a floating voltage to a high voltage such as 3V or 5V), a push-down resistor method (e.g. pushing a floating voltage down to 0V), direct digital read through an analog-to-digital converter) can be used to measure voltage levels and to determine grounding conditions. In implementations internal or external firmware, microcontrollers, or discrete components can be utilized by accessory assembly 50 for such determination. In implementations a pin of data-power interface 250g of device data-power station assembly 250 (see FIG. 53) can be permanently grounded such that accessory assembly 50 can be in the first electrical state when the particular pin of interface portion 52a1d of exterior electric interface 52a1 of accessory assembly 50 discussed above is coupled to the permanently grounded pin of data-power interface 250g when portable electronic tablet device implementation 100 or portable electronic phone device implementation 120 are coupled with device data-power station assembly 250.

In computing and peripheral device interactions, a host device typically refers to a device that controls communication with other connected devices, often referred to as peripherals. In implementations host devices can provide power, data communication, and/or control operations of peripheral devices connected to the host devices. The most common example is how a computer (host) controls USB peripherals like keyboards, mice, or external drives. In these instant cases, a host device generally means controlling and communicating with one or more accessories, for instance, as described above for the cases shown if FIGS. 64 and 65.

In implementations, for instance as shown in FIG. 64, when in a first electrical state is in a first electrical state, accessory assembly 50 and payment card reader assembly 130 as peripheral devices of either portable electronic tablet device implementation 100 (aka "portable electronic computing device") as host device or portable electronic phone device implementation 120 (aka "portable electronic computer device") as host device, can communicate (e.g., either two-way with commands received from host device and data received from peripheral device; or one-way commands from host device or one-way data from peripheral device) and be controlled as peripheral devices of either portable electronic tablet device implementation 100 (aka "portable electronic computing device") as host device or portable electronic phone device implementation 120 (aka "portable electronic computer device") as host device.

Figure 65:
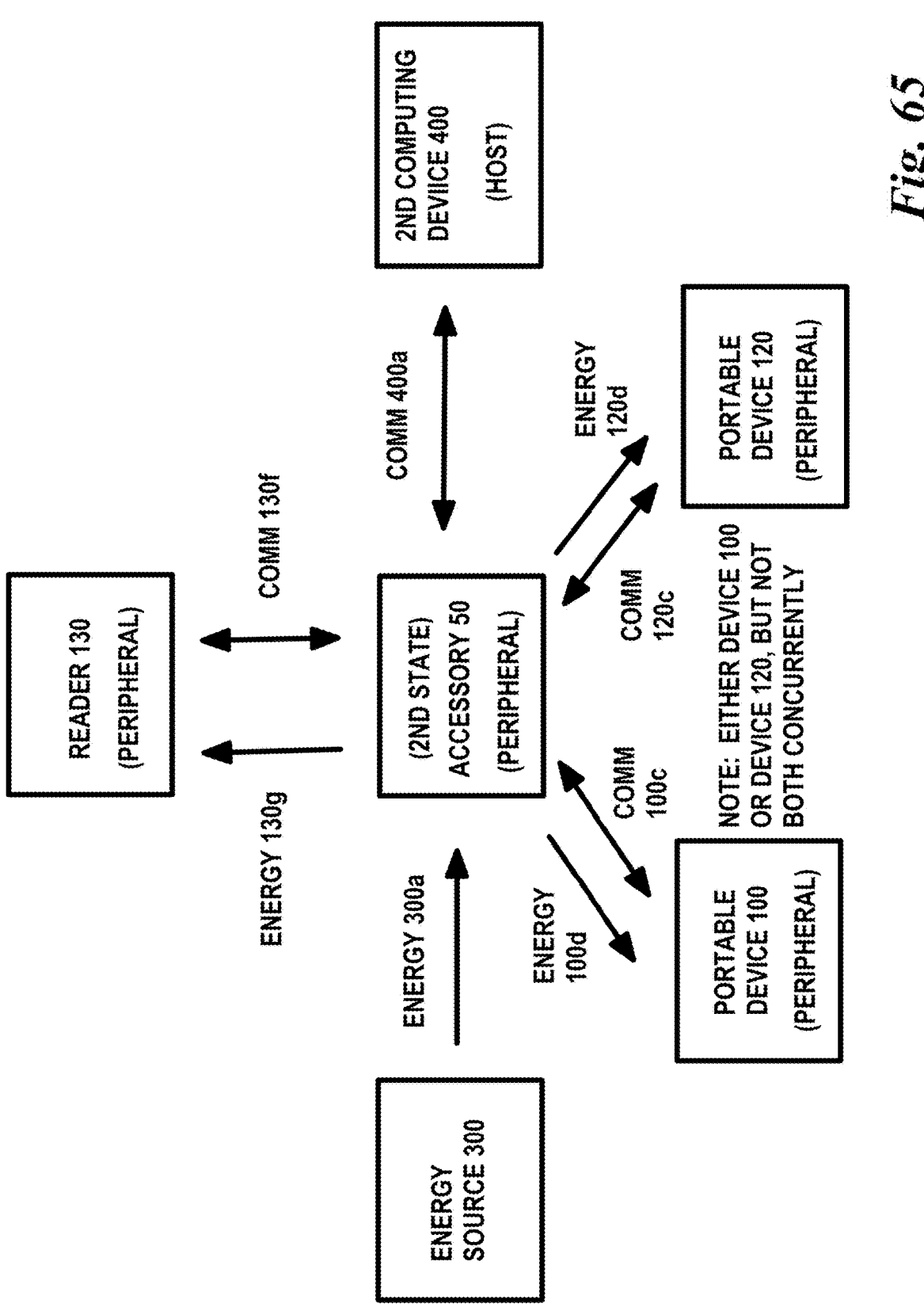
FIG. 65 is a schematic representation of implementations of flows of communication and/or electrical energy regarding the accessory assembly of FIG. 1.

In implementations, for instance as shown in FIG. 65, when in a second electrical state, as peripheral devices, accessory assembly 50, payment card assembly 130, and either portable electronic computing device 100 or portable electronic computing device 120 can communicate (e.g., either two-way with commands received from host device and data received from peripheral device(s); or one-way commands from host device or one-way data from peripheral device(s)) and be controlled as peripheral device(s) of second computing device 400 as host device. In implementations, when accessory assembly 50 is in second electrical state, second computing device 400 can initiate and manage communication with its one or more peripheral devices (e.g. accessory assembly 50, payment card reader 130, and either portable electronic computing device 100 or electronic computing device 120).

In implementations accessory assembly 50 when in first electrical state can serve as a hub peripheral device of either portable electronic computing device 100 as host device or portable electronic computing device 120 as host device in first electrical state of accessory assembly 50 to forward data from or commands to peripheral devices such as payment card reader 130. In implementations accessory assembly 50 when in second electrical state can serve as a hub peripheral device of second computing device 130 as host device to forward data from or commands to payment card reader 130, and either portable electronic computing device 100 or portable electronic computing device 120 as peripheral devices. In implementations two-way communication can occur between second computing device 400, as host device, and one or more peripheral devices including accessory assembly 50 while still distinguishing between host device role and peripheral device role(s). In implementations the amount of one-way or two-way communication is dependent about how accessory assembly 50 manages data flow using protocols, universal serial bus configuration, etc.

In implementations universal serial bus (USB) protocols are used that are based on a host-peripheral model in which one device (the host device) controls communication, while one or more other devices (the peripheral devices) respond to requests from the host device. In implementations the USB host device initiates communication, which can include requesting data and sending commands; manages power distribution; enumerates, which can include detecting and configuring attached peripheral devices. In implementations USB peripheral devices respond to requests from their host device and do not initiate communication on their own. With two-way communication the host device can both send requests and receive data from its peripheral devices, which allows more extensive control of its peripheral devices. With one-way communication the host device pulls data from its peripheral devices, which do not initiate communication to push data to their host device. Again, whether communication is two-way or one-way is dependent upon particular USB implementations involved.

In implementations various USB operating modes and roles can be utilized such as USB On-The-Go (OTG) mode, which allows devices such as portable electronic computing devices 100 and 120 to switch roles between being host device and peripheral device. In implementations USB Accessory Role Switch can occur based on host or peripheral connection type or based in firmware programming of the accessory assembly 50. In implementations, with accessory assembly 50 being in second electrical state, second computing device 400 could dictate what data is exchanged and may restrict interactions between payment card reader assembly 130 and portable electronic computing devices 100 or 120 such as in some implementations fully restricting interaction between payment card reader assembly 130 and portable electronic computing devices 100 or 120. In implementations accessory assembly 50 can be configured as a passive hub such that all data is forwarded through accessory assembly 50. In implementations accessory assembly 50 can be configured as an active hub such that some data may be controlled by accessory assembly 50 as far as whether it is forwarded or when it is forwarded.

In implementations one or more USB device classes are chosen to execute implementations described herein. USB device classes include Mass Storage Class (MSC), Human Interface Device (HID), Communications Device Class (CDC), Media Transfer Protocol/Picture Transfer Protocol (MTP/PTP). In implementations MTP/PTP protocol can be used for one-way communication by portable electronic computing devices 100 or 120 with second computing device 400 when accessory assembly 50 is in second electrical state. In implementations MSC protocol can be used by portable electronic computing devices 100 or 120 are in host device mode to provide two-way communication and to control accessory assembly 50 and payment card reader assembly 130 when accessory assembly 50 is in first electrical state. In implementations MTP protocol can be used with portable electronic computing devices 100 or 120 being in peripheral device mode with second computing device 400 pulling data either one of them when accessory assembly 50 is in second electrical state.

Figure 66:
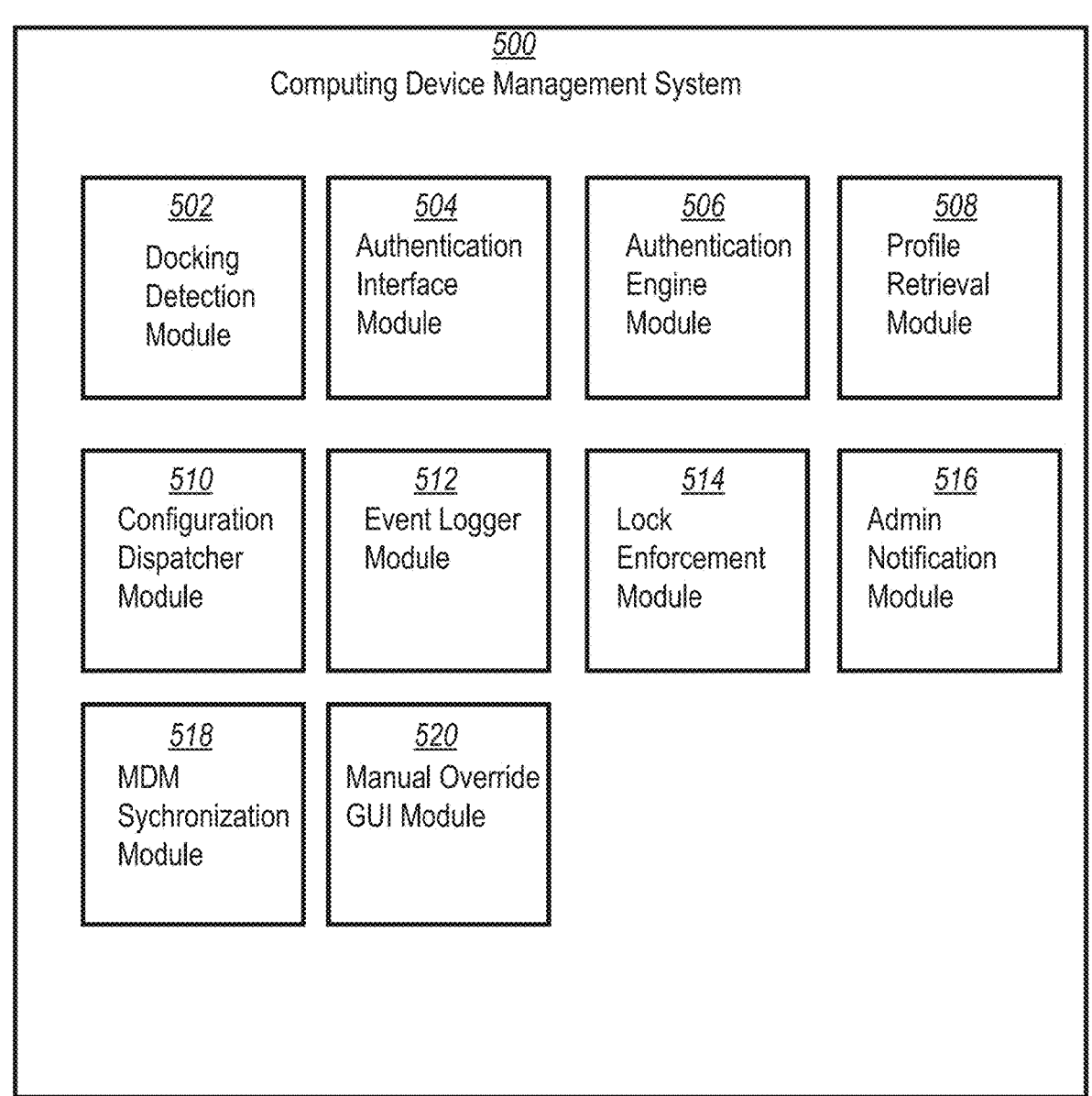
FIG. 66 is a schematic representation of a computing device management system.

Turning to FIG. 66, depicted therein is a schematic representation of a computing device management system 500 being supported by the second computing device 400 operating in host mode of FIG. 65. Device management system 500 is depicted to include docking detection module 502, authentication interface module 504, authentication engine module 506, profile retrieval module 508, configuration dispatcher module 510, event logger module 512, lock enforcement module 514, administration notification module 516, MDM synchronization module, and manual override GUI module 520.

In implementations, Docking Detection Module 502 is responsible for continuously monitoring the Universal Serial Bus (USB) or other physical connection ports on the host system. It listens for USB connection events that indicate the docking of a tablet device. This module identifies the tablet by querying the USB descriptors, such as Universal Device Identifier (UDID), MAC address, or serial number, and signals other modules to initiate authentication and configuration processes.

In implementations, Authentication Interface Module 504 interfaces with external authentication peripherals such as ID card readers, biometric scanners, or Near Field Communication (NFC) devices. It captures the user's credentials, sanitizes them, and securely forwards the information to the Authentication Engine. This module supports multiple protocols, including Human Interface Device (HID) for card readers and USB Peripheral (USB-P) for biometric devices, ensuring secure communication during the user authentication process.

In implementations, Authentication Engine Module 506 validates the user's credentials by interfacing with a secure identity provider, such as Lightweight Directory Access Protocol (LDAP), Active Directory (AD), or Security Assertion Markup Language (SAML)-compliant systems. The credentials are evaluated for validity, and once verified, the module generates a session token that grants the user access to the tablet's configuration and operational environment. This process ensures secure and compliant authentication.

In implementations, Profile Retrieval Module 508 is responsible for retrieving the user's specific configuration profile after successful authentication. The module communicates with a Mobile Device Management (MDM) server or a centralized profile repository. It uses Representational State Transfer (REST) or Remote Procedure Call (RPC) APIs to request user-specific settings, including allowed applications, network policies, and UI preferences, which are then passed to the Configuration Dispatcher.

In implementations, Configuration Dispatcher Module 510 is tasked with securely transmitting the user's configuration to the tablet. After receiving the profile data from the Profile Retrieval Module, it formats the configuration into a device-compatible structure, such as JavaScript Object Notation (JSON) or Extensible Markup Language (XML). The module then sends the configuration to the tablet using a Transport Layer Security (TLS)-encrypted Hypertext Transfer Protocol Secure (HTTPS) connection, or through Apple Device Management (Apple MDM) or Android Device Policy Manager (Android EMM) APIs, depending on the tablet's operating system.

In implementations, Event Logger Module 512 tracks all events and interactions related to tablet docking, authentication, profile application, and undocking. This module records events in a tamper-resistant log system, ensuring each action is logged with a timestamp, user identification, and device information. Logs are optionally synchronized with a Security Information and Event Management (SIEM) system for real-time monitoring, compliance reporting, and security auditing.

In implementations, Lock Enforcement Module 514 is invoked whenever the tablet undocks or when a security event, such as an authentication failure, is detected. The module constructs and securely transmits a lock command to the tablet, either through USB-over-IP or Wi-Fi Direct. This command may include instructions to disable user interaction, encrypt data, or trigger a system wipe, ensuring compliance with organizational security policies.

In implementations, Admin Notification System 516 is responsible for alerting system administrators when critical events occur, such as lock/unlock actions, failed authentication attempts, or configuration mismatches. Alerts are sent via Simple Mail Transfer Protocol (SMTP) for email notifications, Webhook endpoints for real-time updates, or Simple Network Management Protocol (SNMP) traps to notify administrators of issues that require attention.

In implementations, MDM Synchronization Module 518 establishes a communication channel between the host software and the Mobile Device Management (MDM) system. It synchronizes device information, user assignments, and configuration profiles with the MDM server, ensuring that all devices are compliant with organizational policies. The client uses OAuth 2.0-authenticated RESTful requests for secure data transmission, ensuring the latest configurations and policies are applied across all devices.

In implementations, Manual Override Graphical User Interface (GUI) Module 520 provides system administrators with the ability to manually assign users to tablets, override lock commands, and initiate remote unlocks. The GUI is integrated with the Docking Detection Module and MDM Synchronization Client, allowing administrators to manage tablet assignments directly from a central console. This module ensures that manual overrides are logged with administrative metadata, preserving an audit trail for compliance purposes.

Interaction Summary: SLED, iPad, Mac Host Software, and MDM Server. In the described multi-device management system, a Smart Dock (SLED) interfaces directly with iPads through USB-C connections. The SLED is responsible for initiating communication with the iPad and relaying essential identifiers such as the UDID (Unique Device Identifier) and serial number to a central Mac-based host application. This interaction typically leverages Apple's Lockdown protocol and related components such as usbmuxd (USB multiplexing daemon) and Apple Mobile Device Service (AMDS). For this communication to be authorized, the SLED must either be part of Apple's MFi (Made for iPhone/iPad) program, or the iPad must host a cooperating app that facilitates secure data relay through public APIs.

Two primary trust and communication flows exist: app-assisted and firmware-only (direct protocol). In the app-assisted model, an iPad-side application-installed by enterprise IT or via MDM-accesses identifiers using system APIs (such as identifierForVendor) and securely forwards them to the SLED. In the firmware-only model, a fully MFi-certified SLED with licensed firmware speaks directly to iOS using the Lockdown protocol, allowing the SLED to request and receive device identifiers through encrypted, handshake-based sessions. This approach does not require any application on the iPad, but it does require the SLED to manage certificate-based pairing, USB multiplexing, and trust state negotiation.

By default, iOS devices will not allow USB accessories to access sensitive information unless the user has explicitly tapped "Trust This Computer" or unless the iPad is enrolled in Supervised Mode. Supervised Mode, configured via MDM or Apple Configurator, allows preauthorization of trusted accessories by provisioning configuration profiles that recognize the SLED's accessory ID. This configuration suppresses the trust dialog entirely, enabling seamless operation without user interaction. Once the trust state is confirmed, the SLED may transmit the device's UDID and serial number directly to the host Mac application.

The host Mac application acts as the system's coordination hub. Upon receiving the UDID and serial number from a docked iPad, it uses this data to associate a specific user identity—obtained from an external authentication mechanism such as an ID card reader—with the iPad. The host then pushes a personalized configuration to the iPad, such as setting a user-specific wallpaper. This operation may be executed locally via the Apple Mobile Device Framework or remotely via MDM command channels.

Simultaneously, the Mac notifies a connected Mobile Device Management (MDM) server of the assignment. MDM systems support remote actions such as enforcing Supervised Mode, pushing configuration profiles, locking or wiping devices, and logging assignment events. If a user undocks an iPad without proper authentication, the Mac detects the disconnect event through USB monitoring and either sends a local lock command (if the iPad is on the same network) or issues a remote lock instruction through the MDM platform.

Every component operates within a layered security model. The SLED firmware must securely implement Apple's private USB protocols. The Mac software uses authenticated API tokens (e.g., OAuth 2.0) to communicate with the MDM server over TLS-encrypted channels. The MDM maintains device state, user mappings, and audit logs, and serves as the authoritative source of truth for all fleet-wide actions.

This ecosystem of tightly integrated agents-including hardware trust anchors (MFi-certified SLEDs), cryptographically signed tokens, supervised iOS profiles, and cloud-based MDM systems-enables automated and secure device provisioning, identity-based access control, and tamper-resistant operational workflows in environments such as hospitals, schools, and industrial fleets.

Interaction Summary: Smart Dock, Android Tablet, Host Software, and EMM Server. In an Android-based multi-device environment, a USB-connected smart dock (analogous to the SLED) communicates with an Android tablet to obtain device-specific information and coordinate authentication, configuration, and access control. The dock typically connects via USB OTG (On-The-Go) and enumerates as a USB host accessory, while the Android device functions as the USB client.

When an Android tablet is docked, the smart dock initiates communication using Android Open Accessory (AOA) protocol or custom USB vendor-specific interfaces. Device identification is generally performed by reading hardware-level descriptors such as Android ID, serial number, or a cryptographic Device ID exposed by the OS. Unlike iOS, Android allows a wider range of device information to be retrieved via the ADB interface, system APIs, or internal device services—but such access is gated by device policies and security permissions.

To protect sensitive data and prevent unauthorized access, most enterprise deployments configure Android devices using Enterprise Mobility Management (EMM) systems like Android Enterprise, Samsung Knox, or VMware Workspace ONE. These platforms enable device owner mode, enforce Work Profile separation, and allow pre-approval of trusted USB peripherals via USB port access policies or device admin privileges.

The smart dock itself may contain firmware capable of issuing USB bulk or control transfer commands to retrieve device identifiers, initiate session handshakes, or monitor connection state. However, due to Android's increasingly locked-down USB stack, most deployments require a companion service app installed on the tablet. This app communicates with the dock over USB or Bluetooth using a known protocol and is granted permissions to access device identifiers and user context. The app then forwards the retrieved data to the host Mac or PC.

The host software running on the Mac or PC coordinates system behavior. Upon receiving tablet identifiers from the smart dock or companion app, the host consults an external authentication source (such as an ID badge reader) to determine which user is permitted to take the device. Once a user is authenticated, the host assigns the tablet and may apply user-specific configurations such as setting wallpapers, pushing launcher layouts, or configuring Wi-Fi credentials. These updates are either sent through the companion app using Android's Device Policy Manager APIs, or pushed via the EMM's API if the tablet has connectivity.

The host also logs assignment and status updates by sending events to the EMM server via its RESTful API, using OAuth2-secured tokens. These include events like docking, authentication, configuration, undocking, and returns. If an Android tablet is undocked without a valid user authentication event, the host detects this through USB detachment or power loss. It then sends an immediate lock command to the tablet-either through the companion app if the tablet remains on the LAN, or by instructing the EMM server to push a Remote Lock, Work Profile freeze, or Enterprise Wipe command over the internet.

Security is enforced at multiple levels. The tablet runs in Device Owner mode with USB debugging disabled and restricted installation policies. The dock uses digitally signed firmware and communicates over secure channels (USB with signature verification or Bluetooth with pairing authentication). The host software stores authentication tokens in a secure enclave or operating system keychain. All API calls to the EMM platform are performed over TLS 1.2+ connections and include audit-logged headers and payloads. Additionally, logs are stored locally in encrypted SQLite databases for fallback synchronization in case of network outages.

This Android architecture allows for scalable, secure fleet management of tablets in shared environments such as retail kiosks, logistics depots, and field service operations. By combining trusted firmware, authenticated USB communications, device policy enforcement, and centralized cloud management, the system provides robust control over device access, personalization, and security remediation.

Turning to FIG. 67, depicted therein is a representative flow diagram associated with aspects of a device data-power station assembly involving method 700 including step 702 determining at least one docking event to have occurred when at least one computing device is docked to at least one data-power interface of at least one device data-power station assembly, step 702's substep 702a monitoring the at least one data-power interface for at least one physical connection event using at least one of voltage level sensing and data line handshake detection, step 702's substep 702b when the at least one docking event is determined to have occurred, identifying the at least one docked computing device by extracting at least one unique device identifier (e.g., MAC address, UUID, or USB descriptor) via enumeration, step 704 authenticating at least one party via an external authentication interface, step 704's substep 704a prompting the at least one party to input at least one party credential using at least one connected biometric scanner, ID card reader, or PIN input device, step 704's substep 704b validating the at least one party credential with respect to at least one secured identity database using at least one authentication protocol (e.g., LDAP or OAuth), step 706 retrieving at least one party-specific configuration profile from at least one centralized management server based on the credential validation, step 706's substep 706a sending at least one query to at least one Mobile Device Management (MDM) server, step 706's substep 706b receiving configuration data including at least one of home screen layout, allowed applications, and security policies in at least one structured format (e.g., XML or JSON), step 708 updating at least one interface of the at least one docked computing device based on the configuration profile, step 708's substep 708a transmitting profile data to the docked computing device over at least one secure channel (e.g., TLS), step 708's substep 708b instructing at least one operating system or system agent of the docked computing device to apply at least one configuration, interface update, or access control, step 710 synchronizing session data with at least one MDM system, step 710's substep 710a logging at least one assignment correspondence between the computing device and the party credential with at least one timestamp and metadata, and step 710's substep 710b sending the logging information to at least one MDM system for audit and compliance tracking.

Referring to the method depicted in FIG. 67, step 702 includes detecting when a tablet or similar computing device is docked to a data-power interface of a docking station assembly. Substep 702a includes monitoring the interface using low-level electrical signal sensing-such as detecting voltage transitions on USB VBUS or data lines, or impedance variations on proprietary contact terminals—to identify a physical docking event. Substep 702b includes identifying the docked computing device by querying enumeration data such as USB descriptor tables, unique device identifiers (UDIDs), or MAC addresses. Step 704 involves authenticating at least one party through an external authentication interface. Substep 704a includes prompting the party via a host interface to present credentials using a connected device such as a biometric fingerprint scanner, CAC reader, or PIN entry peripheral. Substep 704b includes validating the credential by querying a secure identity service, such as an LDAP server or OAuth 2.0 identity provider. Step 706 includes retrieving a party-specific configuration profile from a management server. Substep 706a includes sending an authenticated query to a Mobile Device Management (MDM) API using a session token. Substep 706b includes receiving the configuration profile as a structured package (e.g., JSON or XML) specifying home screen layouts, app permissions, and security policies. Step 708 includes applying this configuration to the docked computing device. Substep 708a includes encrypting the configuration data using TLS and transmitting it via USB-over-IP or HTTPS. Substep 708b includes invoking the device's MDM agent or platform-native configuration engine to apply updates such as user interface customization and access control enforcement. Step 710 includes synchronizing session state with the MDM system. Substep 710a includes logging the association between the party and the docked device with a timestamp from an NTP-synchronized source. Substep 710b includes pushing session metadata-including device ID, user ID, and profile hash—to the MDM server via a secure REST API for audit purposes.

Turning to FIG. 68, depicted therein is a representative flow diagram associated with method 720 including step 722 authenticating party data associated with at least one party of the docked computing device via an external authentication interface including at least one identification card reader, step 722's substep 722*a* initiating at least one scanning session with the identification card reader via at least one USB-connected smart card reader using CCID protocol to receive scanned card data, step 722's substep 722*b* encrypting the identification card data using RSA, and step 722's substep 722*c* sending the identification card data to at least one LDAP-based directory service for identity verification.

Referring to the method shown in FIG. 68, step 722 includes authenticating the party using an ID card reader as the external authentication interface. Substep 722*a* includes initializing a Personal Computer/Smart Card (PC/SC) driver stack to communicate with the USB-connected smart card reader. Upon card insertion, the device initiates an Answer To Reset (ATR) handshake and reads embedded credentials via the Chip Card Interface Device (CCID) protocol. Substep 722*b* includes encrypting the extracted credential-such as an X.509 certificate or Common Access Card (CAC) token-using RSA-2048 encryption. Substep 722*c* includes submitting the encrypted credential to an identity provider (e.g., LDAP or Active Directory Federation Services) via a Transport Layer Security (TLS) 1.3-secured connection for authentication and directory lookup.

Turning to FIG. 69, depicted therein is a representative flow diagram associated with method 730 including step 732 when a docking event is determined to have occurred, logging the docking event with at least one secure timestamp and party metadata, step 732's substep 732*a* triggering at least one local system process to capture system time using an NTP-synchronized time service, and step 732's substep 732*b* logging the system time, party credential, authenticated party ID, and unique device identifier in at least one tamper-evident audit trail.

With reference to FIG. 69, step 732 includes logging the docking event upon confirmation of a physical connection. Substep 732*a* includes using a USB event listener to detect the docking event and triggering a timestamp capture using a Network Time Protocol (NTP)-synchronized system clock. Substep 732*b* includes writing a structured log entry containing the timestamp, unique device identifier (UDID), and authenticated party ID to a tamper-evident log file or secure database. The log entry is cryptographically sealed using a digital signature or hash-based message authentication code to preserve integrity and resist post-write tampering.

Turning to FIG. 70, depicted therein is a representative flow diagram associated with method 740 including step 742 authenticating party data via at least one biometric validation interface, step 742's substep 742*a* capturing fingerprint image using at least one biometric fingerprint scanner in high-resolution template format, and step 742's substep 742*b* matching the captured fingerprint to at least one stored template using either a local biometric engine or cloud-based identity server.

As illustrated in FIG. 70, step 742 involves authenticating the party using at least one biometric validation interface. Substep 742*a* includes capturing a high-resolution fingerprint image via a USB-connected fingerprint scanner compliant with ISO/IEC 19794-2 biometric data interchange standards. Substep 742*b* includes processing the captured fingerprint using a local biometric engine or forwarding it to a cloud-based identity server for template matching. The matching process extracts minutiae points and compares them against encrypted reference templates. Upon a successful match, the system generates a signed authentication token, which is passed to the broader credential validation workflow.

Figure 71:
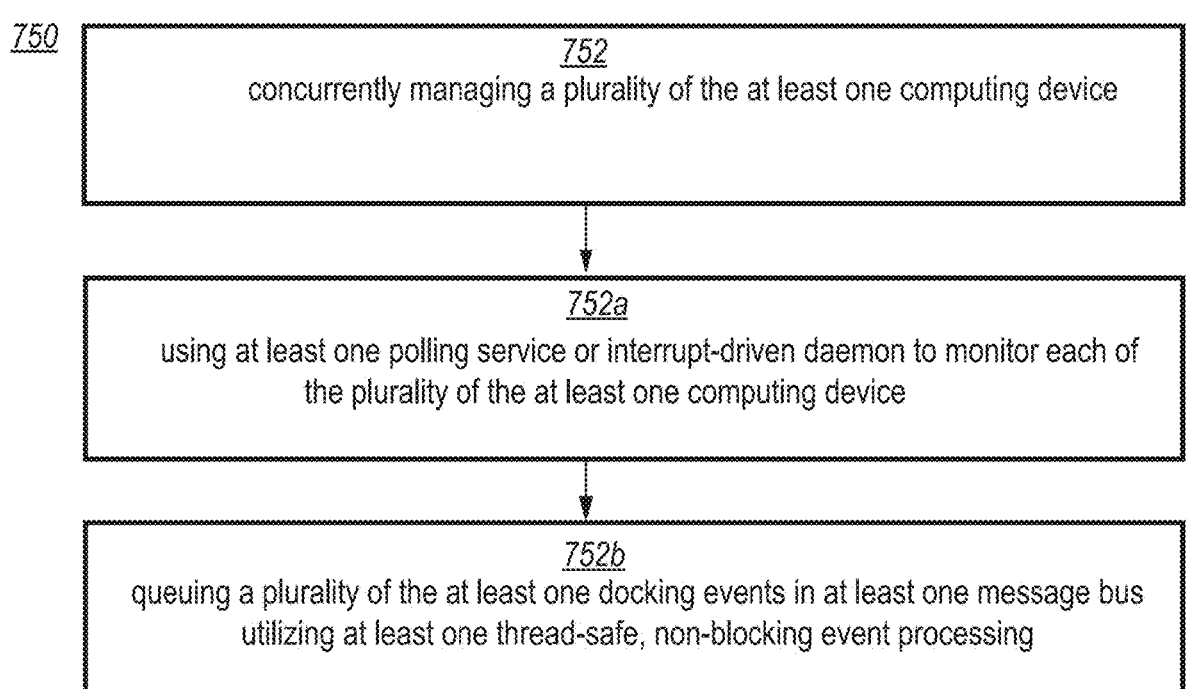
FIG. 71 is a representative flow diagram associated with aspects of the accessory assembly of FIG. 66.

Turning to FIG. 71, depicted therein is a representative flow diagram associated with method 750 including step 752 concurrently managing a plurality of computing devices, step 752's substep 752*a* using at least one polling service or interrupt-driven daemon to monitor each device, and step 752's substep 752*b* queuing a plurality of docking events in at least one message bus utilizing at least one thread-safe, non-blocking event processing method.

As shown in FIG. 71, step 752 includes managing multiple docking station connections simultaneously. Substep 752*a* includes instantiating parallel threads or subprocesses on the host system, each monitoring a separate USB or serial interface via polling services or interrupt-driven daemons. Substep 752*b* includes queuing docking events in a centralized message bus, using mutexes and non-blocking I/O routines to ensure thread-safe interaction with shared session state data. The system is designed to support scalable event handling across numerous concurrent device connections.

Figure 72:
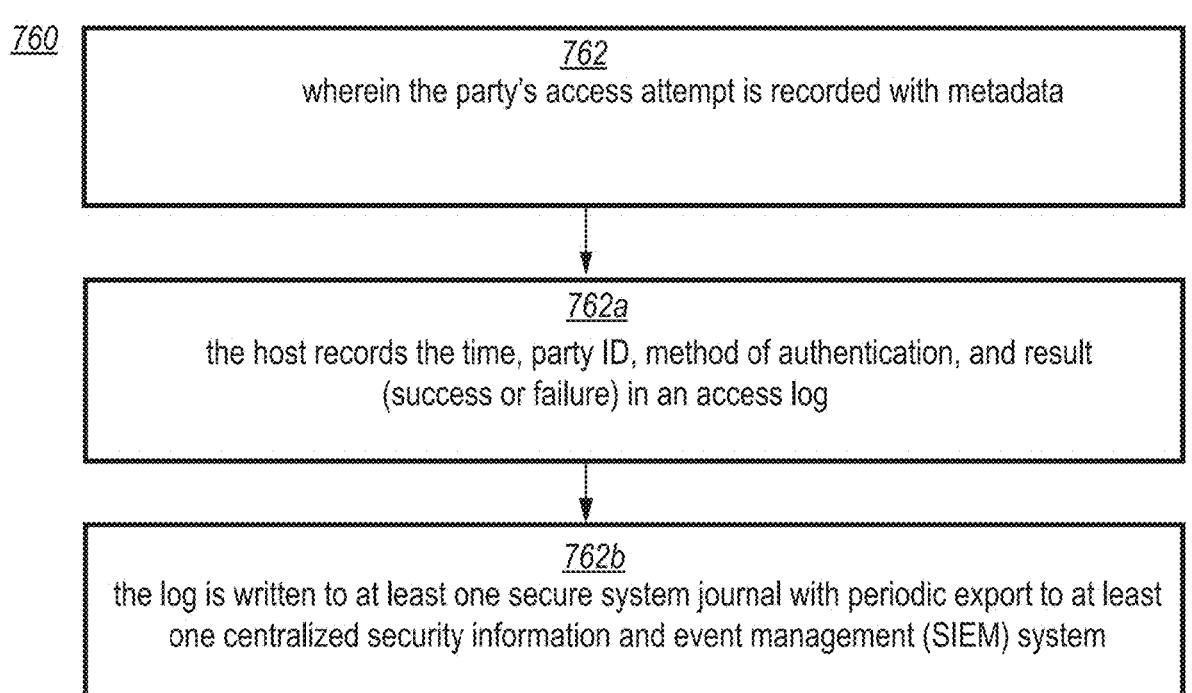
FIG. 72 is a representative flow diagram associated with aspects of the accessory assembly of FIG. 66.

Turning to FIG. 72, depicted therein is a representative flow diagram associated with method 760 including step 762 wherein the party's access attempt is recorded with metadata, step 762's substep 762*a* recording the time, party ID, authentication method, and result (success or failure) in an access log, and step 762's substep 762*b* writing the log to at least one secure system journal with periodic export to at least one centralized Security Information and Event Management (SIEM) system.

As shown in FIG. 72, step 762 includes logging each party's access attempt, regardless of whether access was granted or denied. Substep 762*a* includes capturing key metadata—such as the precise timestamp, party identifier, authentication method (e.g., biometric or ID card), and result (success or failure)—and appending this information to an access log. Substep 762*b* includes formatting the log entry according to industry standards such as Common Event Format (CEF) or syslog and securely transmitting the entry to a centralized SIEM (Security Information and Event Management) system. Secure Syslog (RFC 5425) or equivalent encrypted transport is used to ensure log integrity during transmission.

Figure 73:
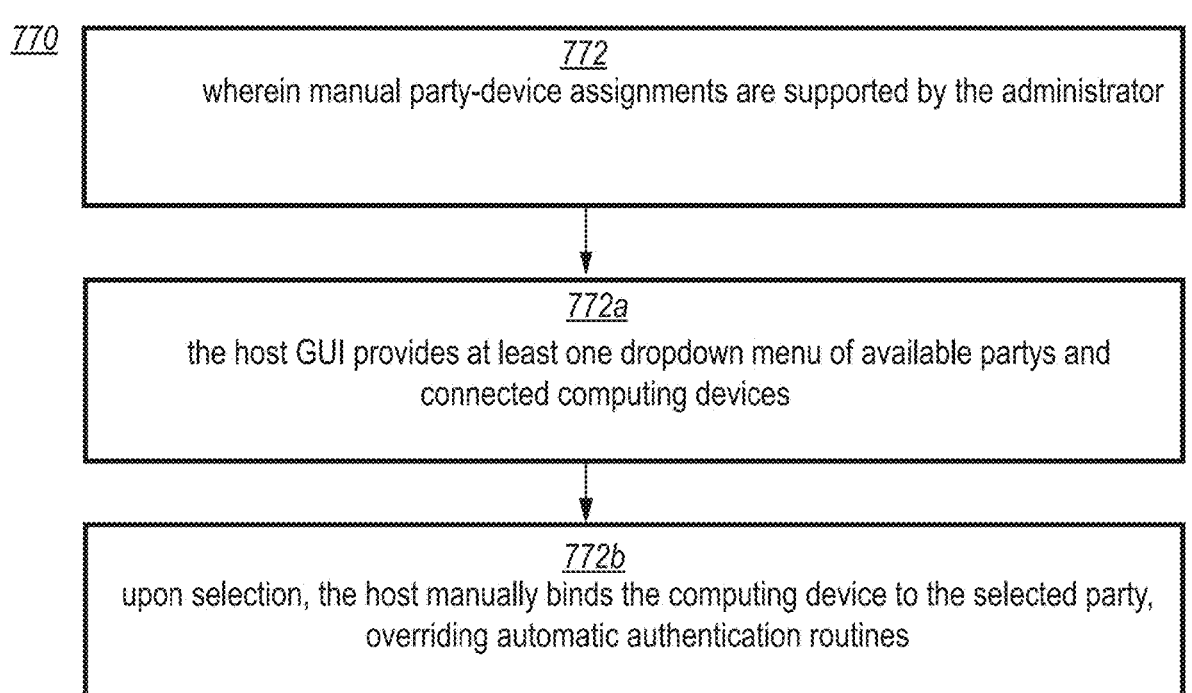
FIG. 73 is a representative flow diagram associated with aspects of the accessory assembly of FIG. 66.

Turning to FIG. 73, depicted therein is a representative flow diagram associated with method 770 including step 772 wherein manual party-device assignments are supported by an administrator, step 772's substep 772*a* presenting a dropdown menu of available parties and connected devices via a host GUI, and step 772's substep 772*b* upon selection, manually binding the computing device to the selected party, overriding automatic authentication routines.

Referring to FIG. 73, step 772 includes enabling manual assignment of computing devices to users by an authorized administrator. Substep 772*a* includes presenting a graphical interface on the host system that displays available parties and currently docked computing devices via dropdown menus or selection panels. Substep 772*b* includes binding a selected party to a docked computing device upon user selection in the interface. This override bypasses automatic authentication mechanisms, while logging the manual assignment event with the administrator's credentials and time of action to maintain auditability.

Figure 74:
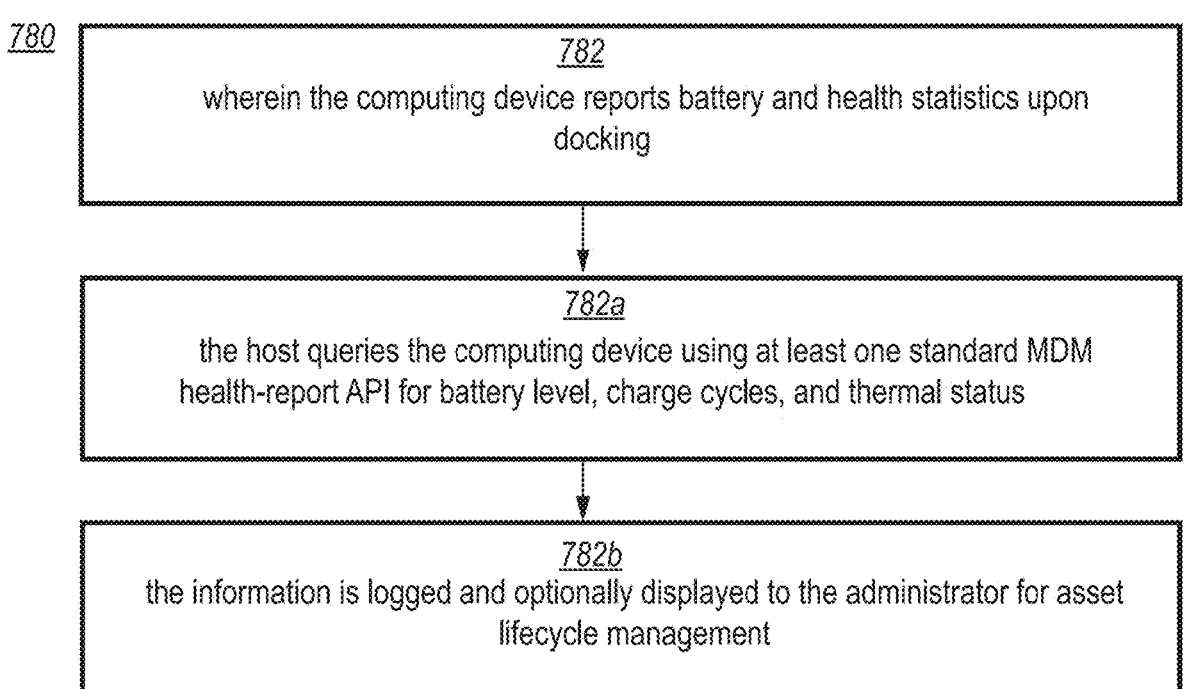
FIG. 74 is a representative flow diagram associated with aspects of the accessory assembly of FIG. 66.

Turning to FIG. 74, depicted therein is a representative flow diagram associated with method 780 including step 782 wherein the computing device reports battery and health statistics upon docking, step 782's substep 782*a* querying the computing device using at least one standard MDM health-report API for parameters such as battery level, charge cycles, and thermal status, and step 782's substep 782*b* logging the information and optionally displaying it to the administrator for asset lifecycle management.

As illustrated in FIG. 74, step 782 includes reporting battery and health metrics from the computing device upon docking. Substep 782*a* includes issuing a query from the host system to the docked device using a Mobile Device Management (MDM) health-reporting API to retrieve parameters such as current battery level, number of charge cycles, and thermal condition. Substep 782*b* includes logging the retrieved data in the asset management subsystem and optionally displaying the statistics on an administrative dashboard. Devices exhibiting values outside acceptable thresholds may be flagged for maintenance or decommissioning.

Figure 75:
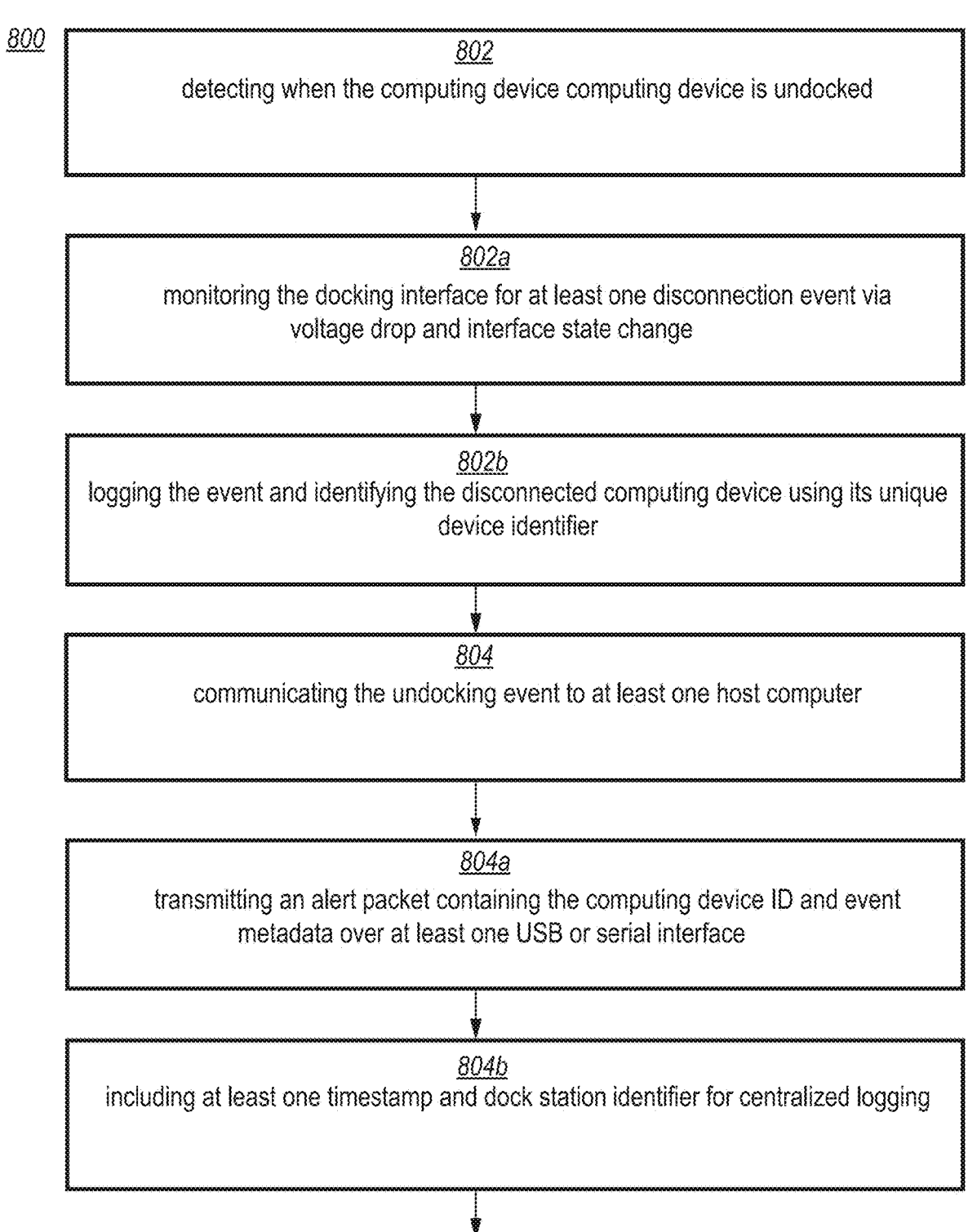
FIG. 75 is a representative flow diagram associated with aspects of the accessory assembly of FIG. 66.

Turning to FIG. 75, depicted therein is a representative flow diagram associated with method 800 including step 802 detecting when the computing device is undocked, step 802's substep 802*a* monitoring the docking interface for disconnection events via voltage drop or interface state change, step 802's substep 802*b* logging the event and identifying the disconnected device via unique identifier, step 804 communicating the undocking event to a host computer, step 804's substep 804*a* transmitting an alert packet containing device ID and event metadata over at least one USB or serial interface, step 804's substep 804*b* including at least one timestamp and dock station identifier for centralized logging, step 806 issuing a remote lock command to the computing device, step 806's substep 806*a* constructing a lock instruction payload encoded with at least one disable command, step 806's substep 806*b* transmitting the payload via an encrypted channel such as AES-256 over TLS, step 808 locking the computing device, step 808's substep 808*a* receiving the lock command by the device agent, and step 808's substep 808*b* enforcing at least one secure lock screen, disabling party interaction, and triggering full-disk encryption if not already active.

As depicted in FIG. 75, step 802 includes detecting when the computing device is physically undocked from the station. Substep 802*a* includes monitoring for disconnection via voltage drop detection on USB power lines or disconnection events raised by the USB device driver. Substep 802*b* includes logging the undocking event and identifying the device using its unique identifier previously associated during the session. Step 804 includes notifying the host system of the undocking. Substep 804*a* includes creating an alert packet containing metadata such as the device ID, timestamp, and dock identifier, formatted in JSON or CBOR. Substep 804*b* includes transmitting this packet over a USB or serial interface for central logging. Step 806 includes initiating a lock command. Substep 806*a* includes generating a secure lock instruction wrapped in an AES-256-encrypted payload and digitally signed. Substep 806*b* includes sending the lock payload over a TLS channel with mutual authentication using X.509 certificates. Step 808 includes enforcing the lock on the computing device. Substep 808*a* includes the device agent receiving and decrypting the command. Substep 808*b* includes invoking secure locking procedures such as presenting a secure overlay, disabling input, and triggering full-disk encryption protocols.

Figure 76:
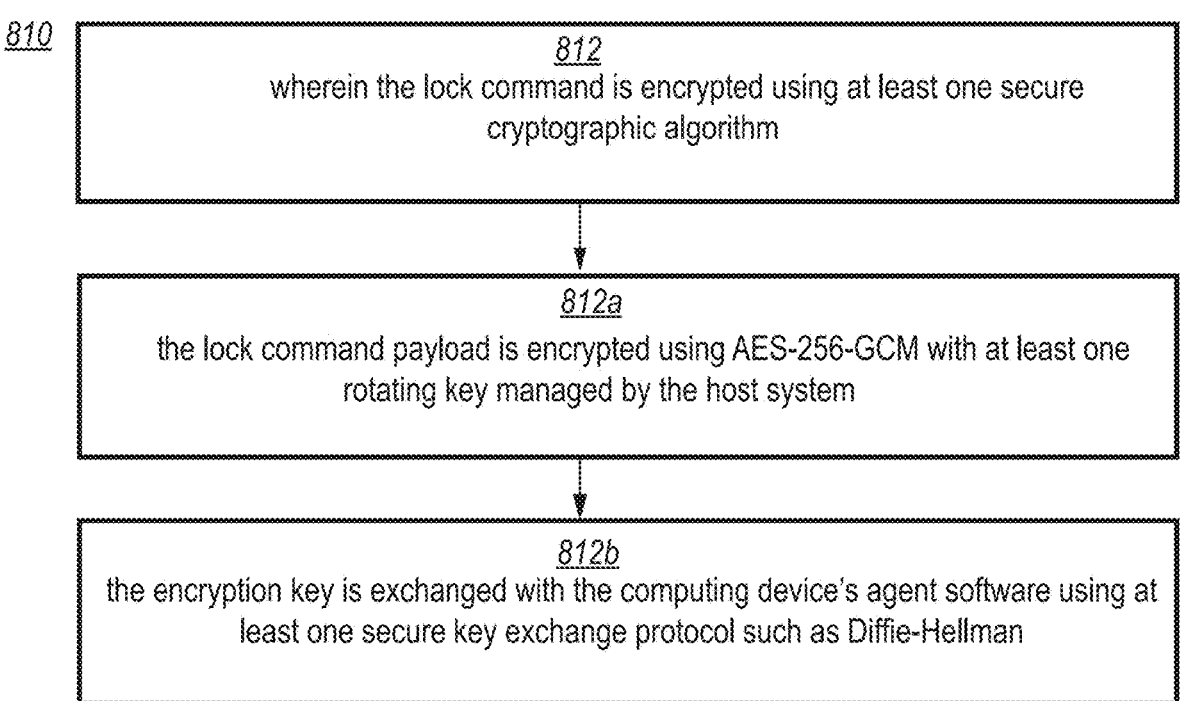
FIG. 76 is a representative flow diagram associated with aspects of the accessory assembly of FIG. 66.

Turning to FIG. 76, depicted therein is a representative flow diagram associated with method 810 including step 812 wherein the lock command is encrypted using at least one secure cryptographic algorithm, step 812's substep 812*a* encrypting the lock command payload using AES-256-GCM with at least one rotating key managed by the host system, and step 812's substep 812*b* exchanging the encryption key with the computing device's agent software using at least one secure key exchange protocol such as Diffie-Hellman.

As illustrated in FIG. 76, step 812 includes encrypting the lock command for enhanced device security. Substep 812*a* includes generating the lock payload as a structured object (e.g., JSON) with embedded instructions to disable the interface and optionally trigger disk encryption. The payload is encrypted using AES-256 in Galois/Counter Mode (GCM) with a session key that rotates per device session. Substep 812*b* includes securely exchanging the session key using an ephemeral key agreement protocol such as Elliptic Curve Diffie-Hellman (ECDH), and transmitting the encrypted payload over a mutually authenticated TLS channel to the computing device's agent software.

Figure 77:
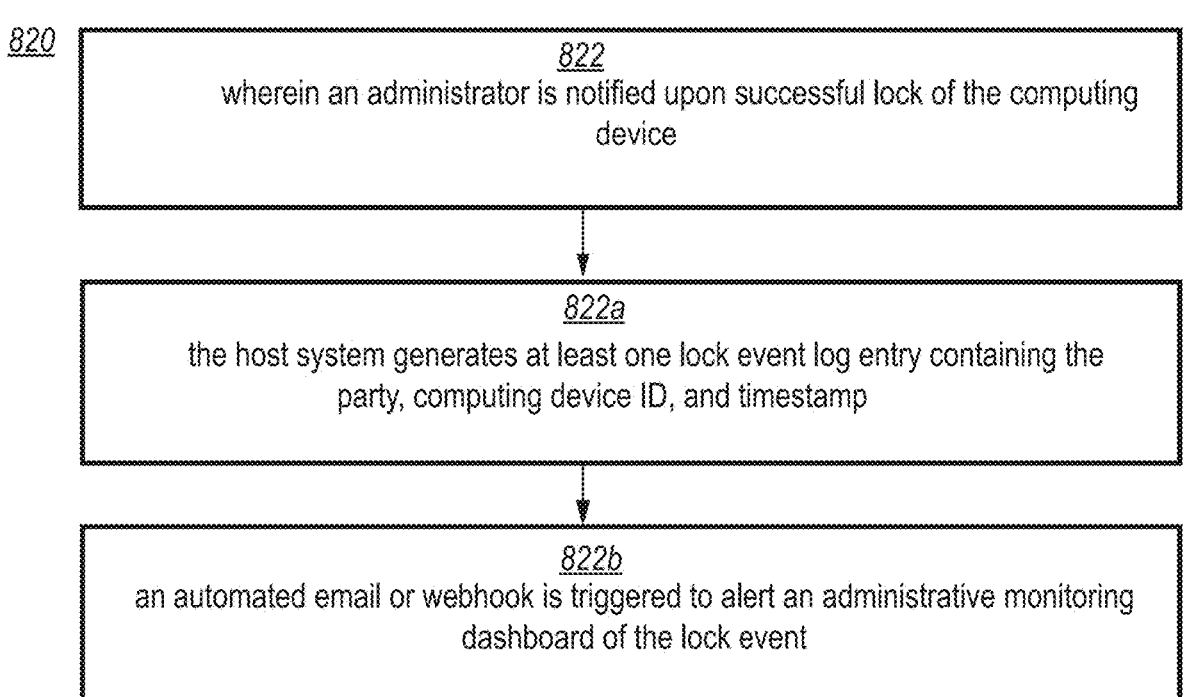
FIG. 77 is a representative flow diagram associated with aspects of the accessory assembly of FIG. 66.

Turning to FIG. 77, depicted therein is a representative flow diagram associated with method 820 including step 822 wherein an administrator is notified upon successful locking of the computing device, step 822's substep 822*a* generating at least one lock event log entry including the party, computing device ID, and timestamp, and step 822's substep 822*b* triggering an automated email or webhook to alert an administrative monitoring dashboard of the lock event.

Referring to FIG. 77, step 822 includes notifying an administrator when a computing device is successfully locked. Substep 822*a* includes generating a log entry containing key metadata such as the device identifier, associated party ID, timestamp, and lock reason (e.g., undocking or timeout). Substep 822*b* includes forwarding this event notification to an administrator via a configured webhook, email (SMTP), or SMS alert. The log entry is also persisted in an audit trail and optionally synchronized with centralized monitoring dashboards for real-time awareness and compliance review.

Figure 78:
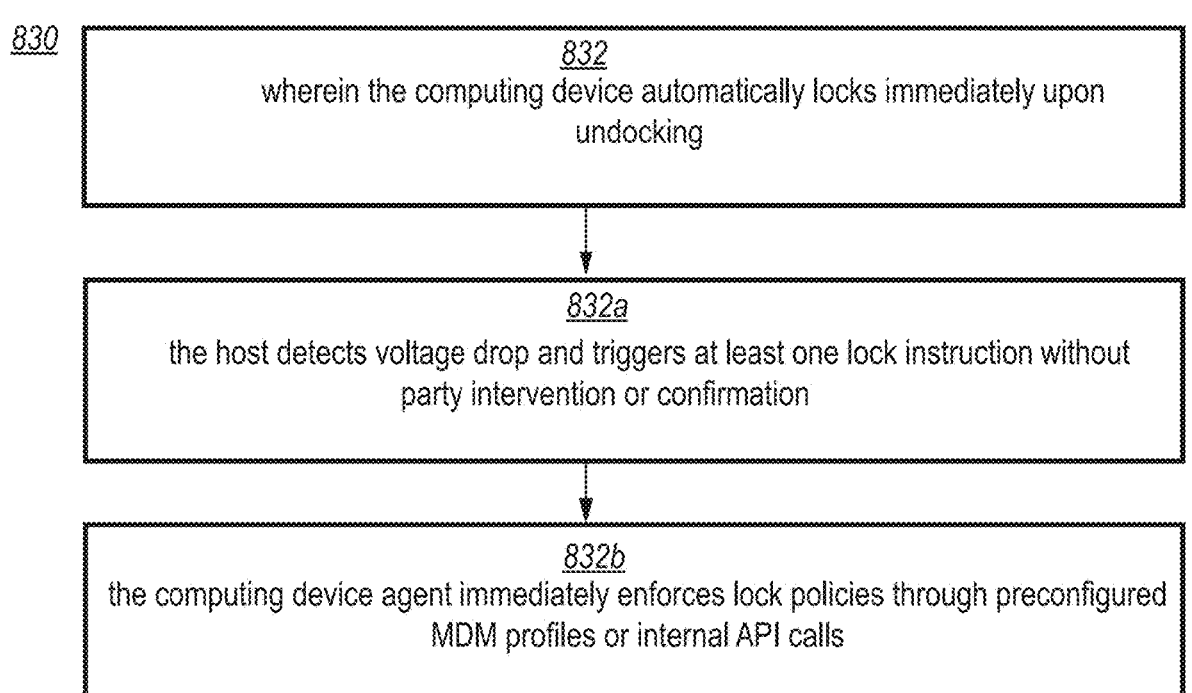
FIG. 78 is a representative flow diagram associated with aspects of the accessory assembly of FIG. 66.

Turning to FIG. 78, depicted therein is a representative flow diagram associated with method 830 including step 832 wherein the computing device automatically locks immediately upon undocking, step 832's substep 832*a* detecting voltage drop and triggering a lock instruction without party intervention or confirmation, and step 832's substep 832*b* wherein the computing device agent immediately enforces lock policies via preconfigured MDM profiles or internal API calls.

As shown in FIG. 78, step 832 includes automatically locking the computing device immediately after an undocking event is detected. Substep 832*a* includes binding a hardware interrupt handler to a physical signal such as a USB ID pin or GPIO disconnect event line. When triggered, the handler initiates a lock sequence without requiring any host-side processing or user confirmation. Substep 832*b* includes the computing device's agent invoking preconfigured security policies-such as full-disk encryption or session lockdown-using MDM-managed enforcement rules or internal operating system APIs. The response time is designed to be sub-second, minimizing unauthorized access windows.

Turning to FIG. 79, depicted therein is a representative flow diagram associated with method 840 including step 842 wherein a lock override command is available for authorized administrators, step 842's substep 842*a* presenting an unlock option via the host interface, accessible only with admin-level credentials or two-factor authentication, and step 842's substep 842*b* upon successful validation, transmitting an unlock command to the computing device agent to reverse the lock state and re-enable access.

As shown in FIG. 79, step 842 includes providing a mechanism for administrative override of a previously issued lock command. Substep 842*a* includes presenting an unlock option through the host system's administrative interface, which is accessible only after successful authentication using admin-level credentials or multi-factor authentication such as a Time-based One-Time Password (TOTP). Substep 842*b* includes generating and transmitting a digitally signed unlock payload to the device's agent using the same AES-encrypted and mutually authenticated TLS channel originally used to deliver the lock instruction. Upon receipt and signature validation, the device reverses its lock state and restores user access.

Turning to FIG. 80, depicted therein is a representative flow diagram associated with method 850 including step 852 wherein the host system enforces at least one grace period before a lock command is sent, step 852's substep 852*a* initiating a countdown timer upon undocking to allow a preset interval (e.g., 30 seconds) for re-docking before locking is enforced, and step 852's substep 852*b* if re-docking does not occur within the grace period, finalizing and transmitting the lock command securely.

Referring to FIG. 80, step 852 introduces a grace period before a lock command is executed following an undocking event. Substep 852*a* includes initiating a countdown timer (e.g., 30 seconds) when the disconnection is detected, providing the party a brief opportunity to re-dock the device without triggering a lock. Substep 852*b* includes monitoring for reconnection during the countdown and, if none occurs, finalizing the lock payload and transmitting it to the device using the secure encryption and transport protocols previously described. This mechanism reduces false positives and improves user experience in transient undocking scenarios.

Figure 81:
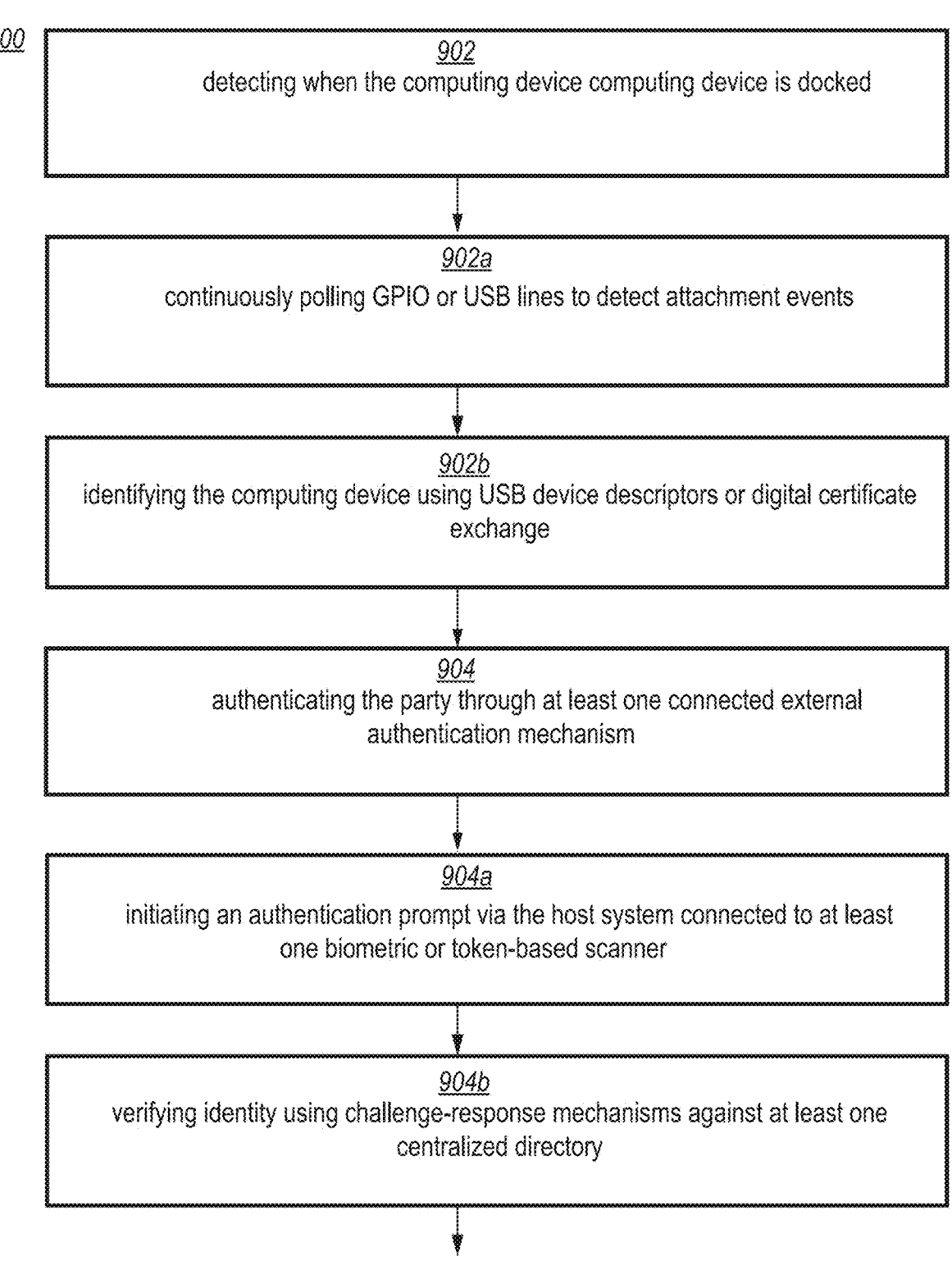
FIG. 81 is a representative flow diagram associated with aspects of the accessory assembly of FIG. 66.
Figure 81A:
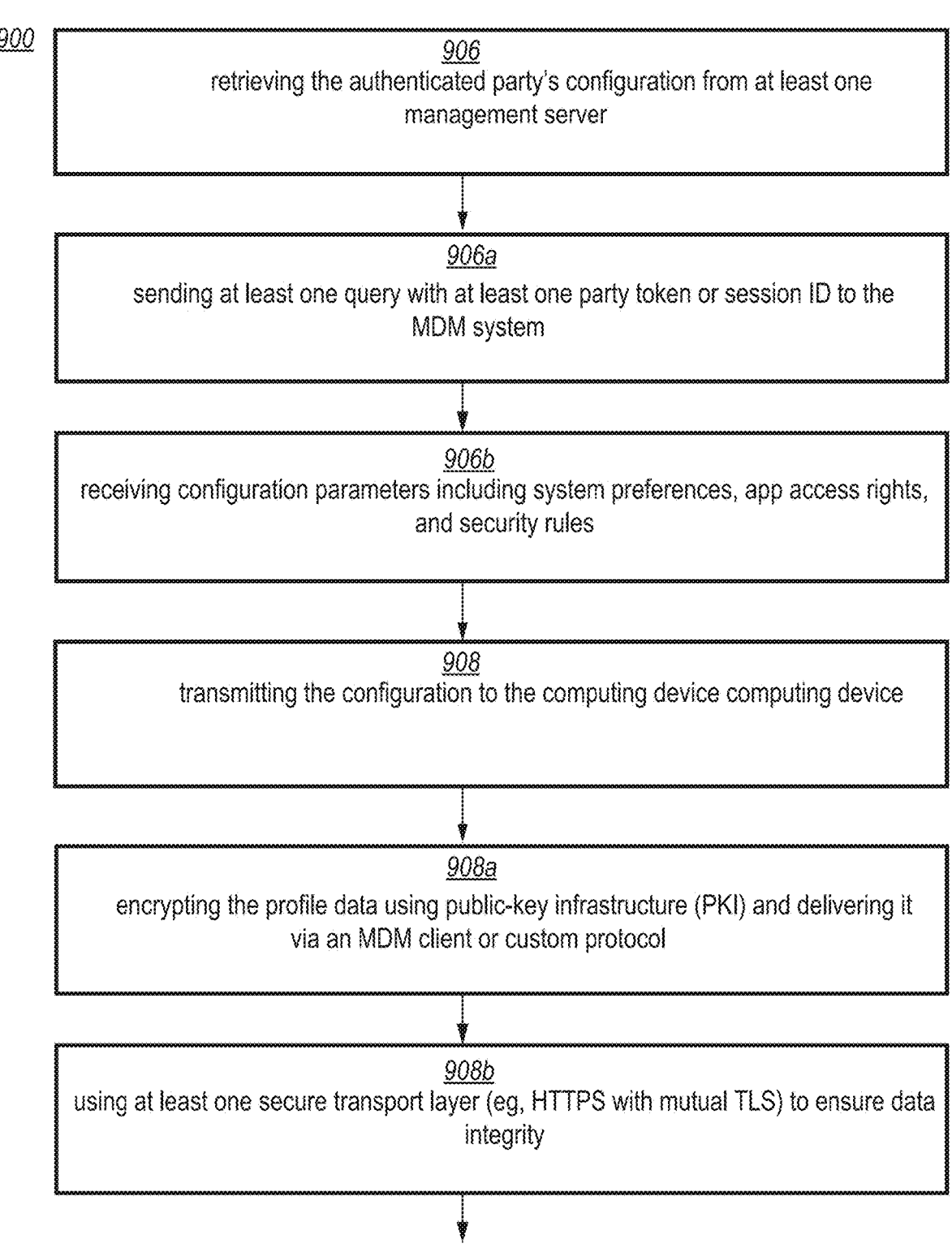
FIG. 81A is a representative flow diagram associated with aspects of the accessory assembly of FIG. 66.
Figure 81B:
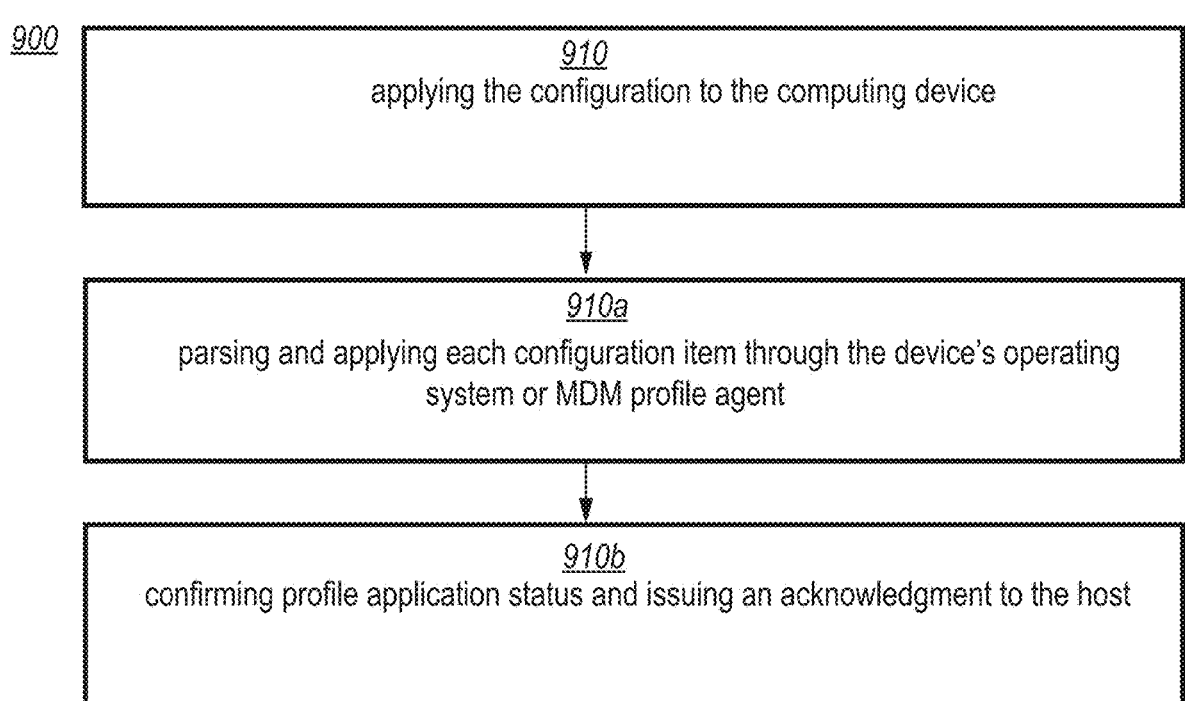
FIG. 81B is a representative flow diagram associated with aspects of the accessory assembly of FIG. 66.

Turning to FIG. 81, depicted therein is a representative flow diagram associated with method 900 including step 902 detecting when the computing device is docked, step 902's substep 902*a* continuously polling GPIO or USB lines for attachment events, step 902's substep 902*b* identifying the computing device using USB descriptors or digital certificate exchange, step 904 authenticating the party via an external authentication mechanism, step 904's substep 904*a* initiating a prompt via the host system using a biometric or token-based scanner, step 904's substep 904*b* verifying identity using a challenge-response mechanism against a centralized directory, step 906 retrieving the authenticated party's configuration from a management server, step 906's substep 906*a* sending a query with a party token or session ID to an MDM system, step 906's substep 906*b* receiving configuration parameters including preferences, access rights, and security rules, step 908 transmitting the configuration to the computing device, step 908's substep 908*a* encrypting the profile using public-key infrastructure (PKI) and delivering it via an MDM client or protocol, step 908's substep 908*b* ensuring data integrity through secure transport layers such as HTTPS with mutual TLS, step 910 applying the configuration on the computing device, step 910's substep 910*a* parsing and applying each configuration item via the operating system or MDM agent, and step 910's substep 910*b* confirming profile application and issuing acknowledgment to the host.

As illustrated in FIG. 81, the method includes updating the configuration of a docked computing device based on successful party authentication. Step 902 includes detecting a docking event by continuously polling USB status registers or GPIO lines. Substep 902*a* captures hardware connection events, while substep 902*b* involves identifying the device using USB descriptors or mutual certificate-based authentication. Step 904 includes initiating user authentication. Substep 904*a* involves presenting a prompt via a biometric scanner or secure token reader. Substep 904*b* includes performing a challenge-response identity check using protocols such as FIDO2 or SRP against a centralized directory. Step 906 includes retrieving a personalized configuration. Substep 906*a* sends a signed query with a session token to the MDM server. Substep 906*b* returns parameters such as app permissions, branding assets, and network rules. Step 908 involves transmitting the configuration to the device. Substep 908*a* includes encrypting the configuration using PKI with the device's public key and delivering it through a secure MDM protocol. Substep 908*b* ensures integrity via mutually authenticated HTTPS. Step 910 includes applying the received configuration. Substep 910*a* includes parsing and implementing the policies using the device's MDM agent or OS management layer. Substep 910*b* sends an acknowledgment back to the host confirming successful application.

Figure 82:
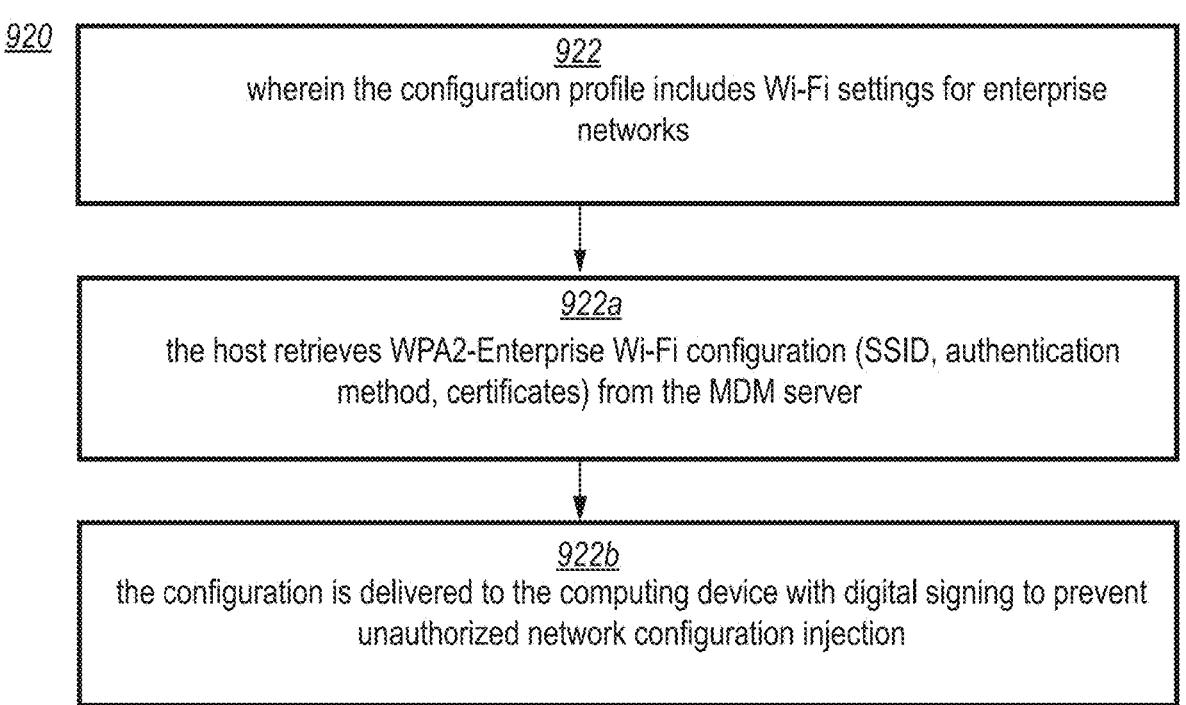
FIG. 82 is a representative flow diagram associated with aspects of the accessory assembly of FIG. 66.

Turning to FIG. 82, depicted therein is a representative flow diagram associated with method 920 including step 922 wherein the configuration profile includes Wi-Fi settings for enterprise networks, step 922's substep 922*a* retrieving WPA2-Enterprise Wi-Fi configuration data (including SSID, authentication method, and certificates) from the MDM server, and step 922's substep 922*b* delivering the configuration to the computing device with digital signing to prevent unauthorized injection of network settings.

As illustrated in FIG. 82, step 922 includes embedding enterprise Wi-Fi settings within the configuration profile delivered to the computing device. Substep 922*a* includes retrieving a Wi-Fi profile from the MDM server, comprising parameters such as SSID, authentication type (e.g., EAP-TLS), and required certificates (e.g., in PKCS #12 format). Substep 922*b* includes delivering the configuration to the computing device using a secure channel and applying digital signatures to prevent unauthorized tampering or injection of rogue network configurations. Platform-native wireless configuration APIs such as WifiEnterpriseConfig on Android or com.apple.wifi.managed on iOS are used to apply the profile.

Turning to FIG. 83, depicted therein is a representative flow diagram associated with method 930 including step 932 wherein the computing device updates its home screen layout based on party preferences, step 932's substep 932*a* configuring icon grid positions and folder arrangements retrieved from the party's MDM profile, and step 932's substep 932*b* applying the layout using the computing device's mobile device agent through native OS management APIs, such as Android's DevicePolicyManager or iOS MDM APIs.

As shown in FIG. 83, step 932 includes updating the home screen layout of the computing device based on user-specific preferences. Substep 932*a* includes retrieving layout configuration data from the user's MDM profile, which may specify icon grid arrangement, folder groupings, docked applications, and wallpaper preferences, typically in a structured format like JSON or XML. Substep 932*b* includes applying the layout using platform-native device management frameworks-such as Android's DevicePolicyManager or iOS's managed configuration payloads-executed through the mobile device agent or equivalent MDM client software.

Turning to FIG. 84, depicted therein is a representative flow diagram associated with method 940 including step 942 further comprising confirmation of successful configuration application on the computing device, step 942's substep 942*a* wherein the device agent sends a status message back to the host indicating the result of each configuration action (e.g., success or failure), and step 942's substep 942*b* logging this confirmation on the host system and marking the device as either compliant or non-compliant within the MDM administrative dashboard.

Referring to FIG. 84, step 942 includes confirming whether configuration settings have been successfully applied on the computing device. Substep 942*a* includes receiving a structured status response from the device's MDM agent, detailing results for each configuration element-such as success flags, error codes, or hash verifications of applied profiles. Substep 942*b* includes parsing this response and updating the host's compliance tracking system. The result may be displayed in an administrative dashboard and optionally synchronized with the backend MDM server to maintain a record of policy conformance.

Figure 85:
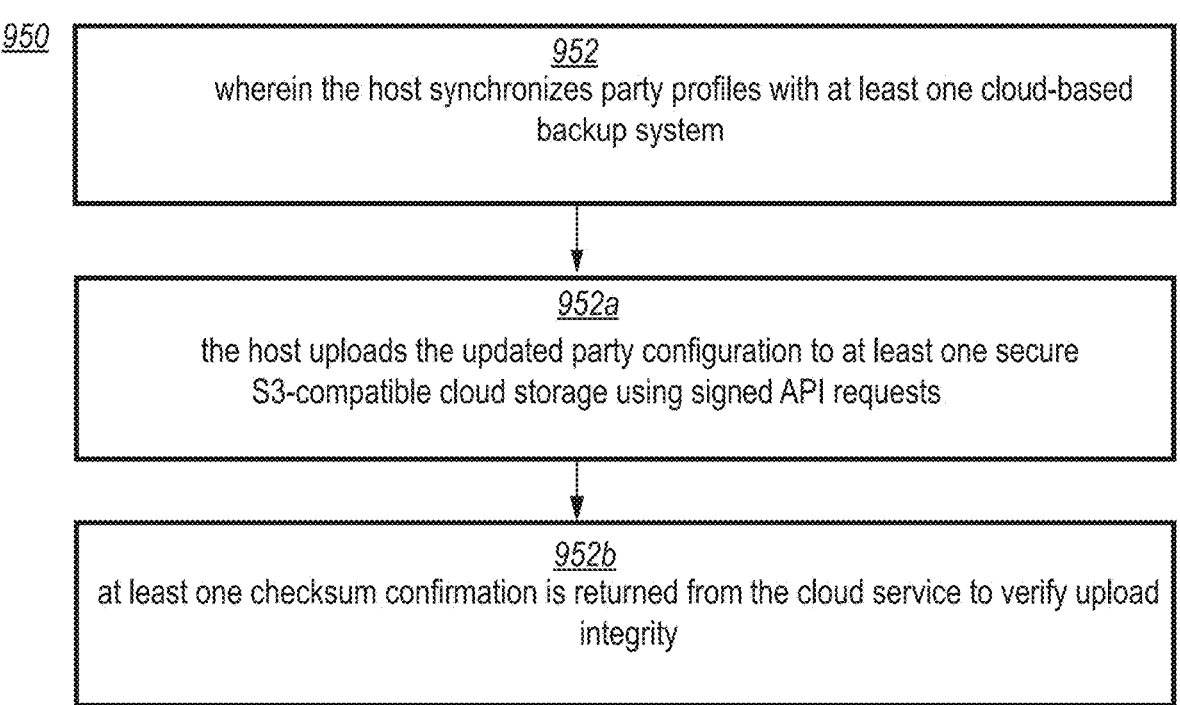
FIG. 85 is a representative flow diagram associated with aspects of the accessory assembly of FIG. 66.

Turning to FIG. 85, depicted therein is a representative flow diagram associated with method 950 including step 952 wherein the host synchronizes party profiles with at least one cloud-based backup system, step 952's substep 952*a* uploading the updated party configuration to a secure S3-compatible cloud storage using signed API requests, and step 952's substep 952*b* receiving at least one checksum confirmation from the cloud service to verify the integrity of the uploaded data.

As illustrated in FIG. 85, step 952 includes synchronizing user configuration profiles with cloud-based storage systems. Substep 952*a* includes serializing the updated configuration profile into a cloud-compatible format (e.g., JSON object) and uploading it to an S3-compatible storage bucket via a signed HTTPS request. Substep 952*b* includes receiving an acknowledgment from the cloud provider, such as a checksum confirmation or HTTP success code, to verify upload integrity. This process ensures availability of user profiles for recovery or transfer across managed environments.

Figure 86:
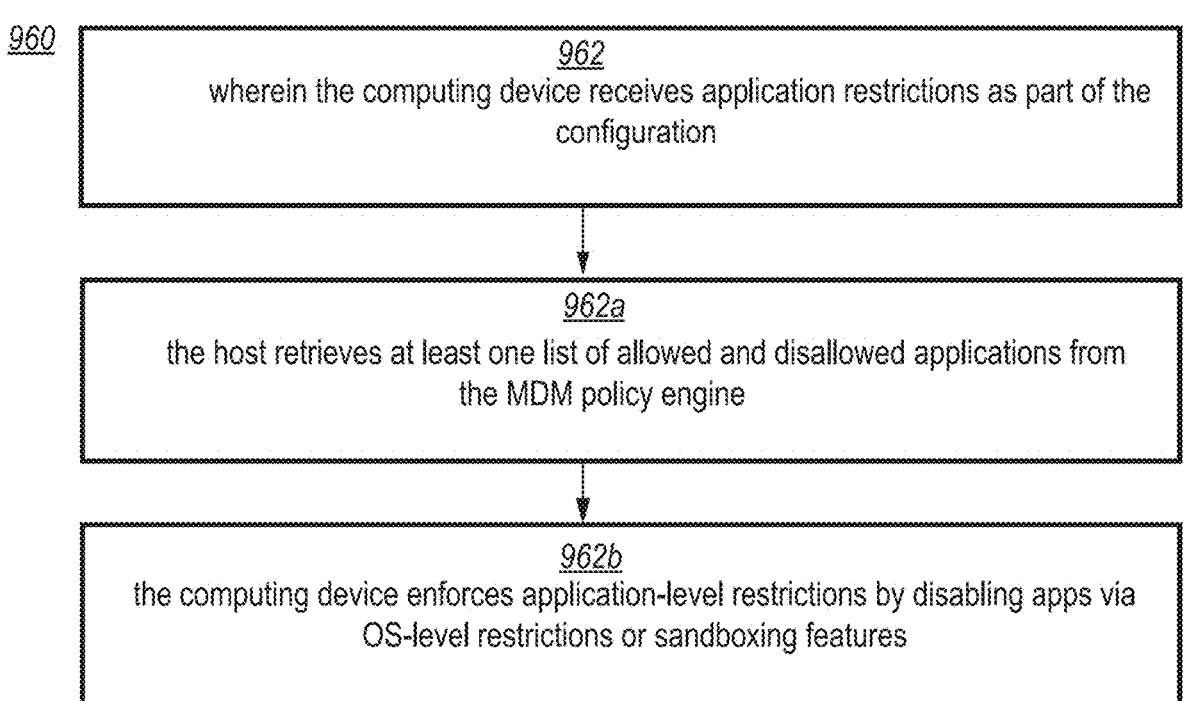
FIG. 86 is a representative flow diagram associated with aspects of the accessory assembly of FIG. 66.

Turning to FIG. 86, depicted therein is a representative flow diagram associated with method 960 including step 962 wherein the computing device receives application restrictions as part of the configuration, step 962's substep 962*a* retrieving from the MDM policy engine a list of allowed and disallowed applications, and step 962's substep 962*b* enforcing these restrictions by disabling disallowed apps through OS-level controls or application sandboxing features, thereby ensuring policy compliance during managed use.

As depicted in FIG. 86, step 962 includes enforcing application-level restrictions on the computing device as part of the configuration process. Substep 962*a* includes querying the MDM policy engine for a list of explicitly allowed and disallowed applications, serialized as a structured profile object. Substep 962*b* includes delivering this list to the device and invoking OS-level enforcement mechanisms-such as Android's PackageManager or iOS's Managed App Configuration profiles—to restrict access to non-compliant applications, disable unauthorized installs, or sandbox high-risk software, thereby maintaining compliance with organizational policy.

In accordance with embodiments of the invention, the host computing system identifies each tablet computing device at the moment of docking through the extraction of one or more unique device identifiers. These identifiers include, but are not limited to, the Universal Serial Bus (USB) serial number, the Universally Unique Identifier (UUID), and in certain configurations, the Media Access Control (MAC) address. Upon detection of a physical connection event, the Device Discovery Module queries the USB interface and performs a standard enumeration process using operating system-level drivers-such as IOKit on macOS or SetupAPI on Windows—to obtain the device's vendor ID (VID), product ID (PID), and serial number string descriptor. If available, the serial number is recorded as the primary identifier for the session.

In parallel, the docking system may invoke additional identification methods. For instance, on Android tablets, the host system may use Android Debug Bridge (ADB) commands or MDM client queries to retrieve the device's UUID, which is generally unique across factory resets and can provide greater persistence than a USB serial number alone. In scenarios where the tablet communicates over a network (e.g., via Wi-Fi), the MAC address may be captured from network interface properties using low-level socket or SNMP queries. While MAC addresses are susceptible to spoofing or dynamic reassignment, they can serve as supplementary identifiers for cross-verification purposes.

The collected identifiers are processed by the Session Tracker and stored alongside the authenticated user ID, timestamp, and dock station ID in a secure session log. These identifiers are also included in messages sent to the Mobile Device Management (MDM) system to ensure consistent tracking across device usage cycles. Where applicable, the identifiers are hashed or encrypted in storage and during transmission to maintain data security and compliance with privacy regulations.

On Android-based tablets, the UUID may be retrieved via system-level access through a host-connected Android Debug Bridge (ADB) interface or a pre-installed Mobile Device Management (MDM) client. When using ADB, the host computer invokes the adb shell settings get secure android_id command, which returns a device-specific 64-bit hexadecimal string assigned by the operating system. Alternatively, a signed API request to the MDM agent on the tablet may return the UUID or Android ID via a device profile query. These identifiers are cached locally by the Device Discovery Manager for session correlation and profile delivery.

On iOS-based tablets, direct access to the device's UUID is restricted by Apple's security model. As an alternative, the host system obtains a persistent device identifier using Apple's Configuration Profiles, Apple Configurator, or via the Apple MDM protocol. When the tablet is enrolled in MDM, a Unique Device Identifier (UDID) is returned in the device's enrollment response. This UDID—distinct from the iOS app-specific identifiers—is stored securely and used for device-user matching. In both supervised and unsupervised modes, the UDID remains a stable and reliable identifier for audit logging and configuration enforcement.

In some embodiments, the host system employs a fallback hierarchy for device identification to ensure robustness. First, the USB serial number is used if it is present and conforms to expected formats. If unavailable, the host attempts to query the UUID or UDID depending on the tablet's OS. Failing those, the host may resort to capturing the MAC address of the tablet's primary network interface using OS-specific discovery tools or network stack interrogation. Each identifier is validated using pattern recognition logic and compared against a whitelist or known device registry.

Once an identifier is successfully extracted, it is appended to a device session record, which includes metadata such as dock port ID, timestamp, and the authenticated user's identity. This record is stored locally in an encrypted log and is also transmitted to the Mobile Device Management (MDM) server as part of the session synchronization payload. The payload is formatted in JSON or XML and includes cryptographic integrity fields (e.g., HMAC signatures) to prevent tampering.

For compliance with data privacy standards (such as GDPR or HIPAA), the system supports anonymization or pseudonymization of stored device identifiers. For example, the raw UUID may be hashed using SHA-256 and stored only in derived form unless explicit administrative privileges are granted. This provides a balance between persistent device tracking and regulatory obligations around user/device anonymity.

Enumeration refers to the process of identifying or listing items in a systematic manner, often by assigning each item a unique identifier or value. Specifically, in computing devices like tablets, enumeration typically refers to the process of detecting and identifying a device by reading its properties (such as a unique identifier like a MAC address, UUID, or USB descriptor) during the connection process. For example, when a tablet is docked to a host computer, the host may use enumeration to recognize the device and retrieve details like its unique device ID (e.g., UUID or MAC address), which allows the system to identify and interact with the tablet appropriately. So, enumeration in this context means the process by which the system detects and gathers identifying information about the tablet when it connects or docks.

Authentication Tokens. When a user authenticates through a connected peripheral device (e.g., smart card reader, biometric scanner), the Authentication Manager module on the host system generates an authentication token to securely represent the user's session. This token may be a JSON Web Token (JWT), a SAML assertion, or a proprietary session key, depending on system architecture. The token includes claims such as user ID, role, timestamp, and authentication method, and is signed using the host's private key or a shared secret.

Upon generation, the authentication token is passed securely to other modules such as the Profile Retrieval Engine and the MDM Synchronization Client. The token is transmitted over encrypted channels (e.g., TLS 1.3) and is used to authorize requests such as profile queries and session reporting. Token lifespan is managed via short expiration intervals and refresh tokens, ensuring both responsiveness and security.

For added integrity, the token may include a device-bound attribute (e.g., UDID, MAC address, or USB serial number) and be validated by both the host software and MDM backend. Failed or expired tokens are logged, and retry attempts are throttled to prevent brute-force replay attacks.

Device Configuration Response Validation. After transmitting a configuration profile to the tablet, the Configuration Dispatcher module awaits an acknowledgment from the tablet's local agent or OS API. This response typically includes a success/failure code, a timestamp, and a hash of the applied configuration.

The host software compares this hash to the original configuration payload using a SHA-256 or SHA-3 checksum. A match indicates that the profile was received and applied without modification. If there is a mismatch, the system may re-send the payload or flag the event for administrative review.

Some configuration elements (e.g., app restrictions, Wi-Fi settings) are tested using command-line probes or API introspection commands. For example, the host may query the tablet via ADB or Apple Configurator to verify that certain profiles are listed as active and that system state reflects the intended policy.

Each configuration confirmation is logged by the Event Logger, linked to the session ID and stored in tamper-evident format. This record supports audit trails and compliance reporting (e.g., NIST 800-53 or ISO/IEC 27001).

MDM Profile Synchronization. The MDM Synchronization Client ensures real-time alignment between the tablet's configuration state and the central Mobile Device Management (MDM) system. Upon authentication and docking, it sends a device assignment event to the MDM server, which includes the user ID, device ID, authentication token, and timestamp. When a configuration profile is retrieved from the MDM or generated locally, the MDM Sync Interface logs a profile push event using RESTful API calls to the MDM backend. These include status codes, expected settings hash, and device acknowledgment status.

If the MDM server mandates compliance validation, the host periodically re-queries the tablet for its current configuration and compares it to the MDM baseline. Discrepancies may result in automatic re-application of profiles or lock commands.

For disconnected or roaming tablets, the host software maintains a queue of unsynchronized events and flushes this queue when connectivity is restored. Upload retries use exponential backoff and may switch to an alternate endpoint (e.g., backup MDM relay).

All synchronization records are timestamped using a Network Time Protocol (NTP)-synchronized system clock and include cryptographic message authentication codes (MACs) to ensure authenticity and prevent tampering.

Administrative Override Workflows. In some embodiments, the system includes an Administrative Control Interface accessible through a secure desktop or web-based console. This interface is authenticated using administrator credentials protected by role-based access control (RBAC) and optionally by two-factor authentication (2FA) mechanisms, such as time-based one-time passwords (TOTP) or hardware tokens.

When a tablet is locked due to a policy-triggered event (e.g., undocking without authentication), an administrator may invoke an override command via the interface. This action first verifies the administrator's permissions against a local or remote identity directory (e.g., LDAP or Azure Active Directory).

Upon approval, the system constructs a digitally signed unlock command containing metadata such as the reason for override, the administrator's ID, the target tablet's ID, and a nonce to prevent replay. This command is transmitted to the tablet using a secure TLS channel and authenticated using the host's private signing key and the tablet's trusted certificate authority (CA).

The system logs the override event-including the unlock timestamp, admin ID, and reason code-into a tamper-evident audit journal and optionally notifies compliance personnel via webhook or email alerts.

Configuration Rollback Mechanisms. In the event of a failed configuration deployment or misconfiguration detected by the user or device agent, the system supports a rollback routine. This mechanism is coordinated by the Configuration Dispatcher module in conjunction with the Profile Manager.

Each time a new configuration is applied, the host software archives the previous profile state in a local or cloud-based rollback store, along with a cryptographic hash and timestamp. This enables deterministic restoration of a known good state.

If an error is reported (e.g., app launch failure, display error, policy violation), the tablet sends a rollback request token to the host, which matches the request with a stored prior configuration version. The dispatcher verifies compatibility (e.g., OS version, device capabilities) and re-applies the previous profile using the same secure transport and validation checks as used during normal profile application.

Rollback attempts are rate-limited and subject to admin policy constraints. Each attempt is logged by the Event Logger, and optionally flagged for manual inspection if multiple rollbacks are attempted within a short interval.

Internal Inter-Module Communication Protocols. The host software executes multiple asynchronous modules that must exchange messages securely and reliably. To achieve this, the system includes an Internal Messaging Bus (IMB) implemented as an event-driven message broker with topic-based routing and in-memory queues.

Each module-such as the Dock Monitor, Authentication Engine, Configuration Dispatcher, and Lock Control Module-subscribes to predefined topics and publishes events as structured messages. Messages may be encoded using Protocol Buffers, JSON, or CBOR for compactness and standardization.

To ensure message integrity, each published message is signed using HMAC (Hash-based Message Authentication Code) and includes a monotonic sequence number or logical timestamp for replay prevention. The IMB supports message persistence for crash recovery and is designed to re-deliver unacknowledged messages upon restart.

Inter-module dependencies are minimized using a decoupled architecture, allowing modules to be restarted, upgraded, or replaced without disrupting the overall service flow. Diagnostic tools integrated into the IMB monitor queue length, delivery latency, and message trace paths for debugging and performance tuning.

The IMB ensures fault isolation; for example, if the MDM Sync Module stalls due to external network latency, the Authentication Manager and Dock Monitor can continue to function normally. This architecture supports scalability and system resilience in enterprise environments.

Session Timeout and Auto-Logout Handling. In accordance with some embodiments, the host software includes a Session Lifecycle Manager that tracks the duration of each authenticated session between a user and a docked tablet. Once a user is successfully authenticated and configuration is applied, a session start timestamp is recorded.

The system references enterprise policy settings-retrieved either from local configuration or the MDM server—that define a maximum session timeout period (e.g., 30 minutes of idle time or 60 minutes of total use). These parameters are dynamically adjustable and can vary by user role or device classification.

The Session Lifecycle Manager uses system timers and event listeners to detect inactivity. Inactivity is defined by absence of user interaction with the tablet, such as lack of touch input, keyboard activity, or app transitions. This status is determined using APIs provided by the MDM client agent or the tablet's native OS (e.g., Android UsageStatsManager or iOS UIApplication event notifications).

When a timeout is detected, the system executes a secure auto-logout or lock procedure, equivalent to an undocking event. This includes triggering the Lock Enforcement Module, logging the event, and notifying the administrator. Optionally, the tablet displays a warning prompt 60 seconds before forced logout, allowing the user to reset the timer by interacting with the device.

Offline Queuing and Deferred Synchronization. To ensure robust operation in intermittent or offline network environments, the host software incorporates an Offline Queue Manager responsible for buffering unsent logs, configuration status updates, and user assignment events.

Events that would normally be pushed to the MDM server or cloud-based profile repository are instead serialized into encrypted queue entries. Each queue item contains: an event type (e.g., docked, authenticated, locked), a timestamp, a cryptographic signature or checksum, and a retry counter.

The Offline Queue Manager uses an exponential backoff algorithm to attempt redelivery when network connectivity is restored. A dedicated Health Check Daemon pings external endpoints (e.g., MDM server, identity provider) and signals the queue manager when conditions are suitable for replay. Upon successful transmission, the server acknowledges receipt via a signed status message, allowing the queue entry to be safely discarded. Failed messages are retained up to a configurable maximum and flagged in system diagnostics for administrator review.

This design ensures no loss of audit-critical events and preserves causal ordering of transactions (e.g., authentication must precede profile sync) even in high-latency or partitioned environments.

Remote Wipe Command Issuance and Safeguards. In enhanced security environments, the system supports the issuance of a Remote Wipe Command to the tablet computing device. This capability is typically reserved for scenarios involving unauthorized access, prolonged offline status, or administrative override. The wipe command is generated by the Security Enforcement Module, either automatically (based on predefined conditions) or manually (through the Admin Override GUI). The command is formatted as a digitally signed and encrypted payload containing: A wipe reason code, Device identifier (e.g., UDID or MAC), Optional delay timer or confirmation requirement, Administrator identity.

The tablet agent receives the command via the MDM client channel or direct USB/Wi-Fi transport. It validates the signature using a pre-installed certificate and evaluates any deferral logic (e.g., wait 10 minutes or require physical confirmation via button press).

Once validated, the wipe process begins, invoking platform-specific secure erase functions (e.g., RecoveryMode.eraseDevice( ) on iOS or RecoverySystem.wipeData( ) on Android Enterprise). These APIs ensure irreversible data removal and restore the tablet to factory default or enterprise-defined baseline. The wipe event is logged locally (if possible) and synchronized with the MDM system upon reconnection. A separate audit entry is generated for the issuing administrator, which includes the command's digital signature, timestamp, and post-wipe verification hash (if available).

System Health Monitoring and Diagnostics. In some embodiments, the host software includes a System Health Monitor Module responsible for tracking the operational status of all components, including the SLED interface, connected tablets, MDM communication link, and authentication peripherals. This module collects both periodic and event-triggered diagnostic metrics. For example, the module monitors power supply voltages, USB port enumeration status, driver health, certificate expiry, and network latency to the MDM server.

These checks are performed at configurable intervals using a mix of polling and interrupt-based monitoring. In the event of a detected fault-such as a failed authentication device, inability to reach the MDM, or SLED communication dropout—the System Health Monitor logs the issue and can optionally escalate via the Notification and Alerting Module, which issues alerts through email, webhooks, or SNMP.

Health status indicators are also exposed via a graphical diagnostic interface or RESTful API, allowing IT administrators to visualize system integrity and preemptively address issues that may affect authentication or docking workflows. Logged health metrics may be exported to third-party SIEM systems or retained locally for post-incident analysis.

Fallback Authentication Mechanisms. To ensure uninterrupted operation in scenarios where the primary authentication mechanism is unavailable (e.g., biometric scanner hardware failure), the system supports fallback authentication pathways. Upon failed or unresponsive primary authentication, the Authentication Manager consults a predefined fallback policy that may authorize the use of: a one-time PIN delivered via secure messaging, a secondary ID card swipe using a backup reader, username/password prompt with time-limited access, external authentication via SSO web portal.

These fallback methods are implemented using pluggable drivers that adhere to the same secure transmission and verification standards as primary methods (e.g., LDAP bind, OAuth2 login, SAML assertion validation). All fallback attempts are distinctly logged by the Event Logger, marked with metadata that identifies the fallback path used and the reason for its invocation. Enterprise policies may limit fallback usage frequency, require approval before activation, or mandate multi-factor authentication in such cases.

Multi-User Rotation and Session Reuse. In multi-user shared environments—such as hospitals, classrooms, or field-service operations—the system supports rapid user rotation with minimal latency or configuration overhead. When a second user docks the same tablet previously used by another authenticated session, the host software: detects the docking event (via USB/SLED interface), prompts for new user authentication, validates the credentials, and triggers a complete session reset on the tablet.

This reset includes de-provisioning the prior user's configuration, removing app-level personalization, clearing cached credentials, and restoring device state to a neutral baseline. The Event Logger Module maintains a history of recent sessions per tablet and ensures that configurations are never carried over without explicit administrative override. Optional session image snapshots may be used to preserve a user's prior settings for quick reuse if the same user returns shortly afterward. This approach allows institutions to rotate devices among multiple users without requiring full wipes or factory resets, maintaining both personalization and security with efficient state transitions.

Integration with Third-Party MDM Systems. In certain embodiments, the docking management system is designed for seamless integration with third-party Mobile Device Management (MDM) platforms, ensuring broad compatibility and extended functionality in heterogeneous IT environments. This integration is achieved using standardized APIs and protocols supported by most MDM systems, such as RESTful HTTP APIs, SOAP, or proprietary communication layers (e.g., Microsoft Intune, VMware Workspace ONE, or Jamf). When a tablet is docked, the MDM Synchronization Client module of the host software queries the third-party MDM server for any user-specific configuration updates or device management policies. Upon successful authentication, the MDM server returns a configuration profile containing user-specific settings, app whitelists, security policies, and allowed network settings.

This profile is then applied to the tablet using MDM-specific delivery methods, such as Apple's MDM protocol for iOS or Android Enterprise APIs for Android-based tablets. The host software ensures the tablet complies with enterprise policies by applying settings such as encryption, app restrictions, VPN configuration, and home screen layouts.

Data transmission between the host system and the third-party MDM is secured using TLS encryption to ensure confidentiality, integrity, and authenticity of all communications. Additionally, audit logs containing session timestamps, user ID mappings, and configuration changes are transmitted to the MDM server for compliance tracking and real-time policy enforcement.

Through integration with third-party MDM systems, the disclosed system enables centralized control over device settings, user profiles, and compliance enforcement, allowing enterprises to streamline device management, reduce administrative overhead, and ensure consistent application of security policies across multiple tablet devices.

Automated Firmware Updates. The system supports automated firmware updates for tablets, ensuring that devices are running the latest security patches, feature improvements, and bug fixes. The Firmware Update Module within the host software is responsible for detecting when tablets are docked and checking for firmware update availability from a remote server or enterprise repository. Upon docking, the Host Software Agent first queries the tablet's firmware version, comparing it with the latest version stored in a centralized firmware database or MDM repository. If the tablet firmware is outdated, the agent initiates the update process.

The update process includes retrieving the firmware package (e.g., in ZIP or IMG format) from the server, verifying its integrity using SHA-256 checksums or digital signatures, and ensuring it is compatible with the device model. The firmware package is then transmitted to the tablet over a secure connection, using TLS encryption to safeguard the data during transmission.

After the tablet receives the update, the Host Software Agent triggers the installation process, ensuring that the tablet properly applies the firmware and reboots as necessary. The agent monitors the update progress and reports the success or failure of the operation back to the host system. In the event of an update failure, the system may initiate rollback procedures or send an alert to administrators through the Admin Notification System.

The system also supports scheduled firmware updates, allowing administrators to set specific intervals or maintenance windows for updating devices, minimizing disruptions to end users. Additionally, the entire process is logged by the Event Logger and can be synchronized with the MDM for auditing and compliance tracking.

Certificate/Key Rotation Procedures. To enhance security and ensure long-term trustworthiness of communications, the system includes automated certificate and key rotation procedures. These procedures ensure that encryption keys and certificates used by the host software, MDM server, and tablets remain secure and up-to-date.

The Authentication Engine Module within the host software periodically checks the expiration dates of TLS certificates, OAuth tokens, and encryption keys used in communications between the host system, SLED, tablets, and MDM. If any certificate or key is nearing expiration, the system triggers an automated process to request new certificates or keys from a trusted certificate authority (CA) or enterprise key management system (KMS).

Once the new certificates or keys are obtained, the system initiates a secure re-keying process to replace the old certificates with the new ones. This process involves securely transmitting the new certificates to the relevant tablets, ensuring all MDM API connections, device management communications, and user authentication sessions remain protected by the latest cryptographic standards.

The system also supports key rotation policies that ensure keys are periodically changed, even without expiration. This can be configured by administrators to automatically rotate keys based on a defined schedule (e.g., every 30, 60, or 90 days). The key rotation process is designed to be seamless to end users and transparent to the tablets, ensuring no disruptions to their functionality.

Logs of certificate and key rotations are stored in the Event Logger and can be reviewed for compliance audits, ensuring that all cryptographic materials are properly rotated and not subject to long-term exposure. Additionally, the system may notify administrators of successful or failed key rotations, ensuring continuous security oversight.

Device Re-Provisioning. The system supports device re-provisioning to ensure that tablets can be returned to a usable state in case of factory resets, errors, or change of ownership. This process allows the tablets to be configured automatically upon docking, ensuring consistency across devices and making it possible to re-apply user profiles and configurations seamlessly. Upon the detection of a factory reset or device wipe event, the Host Software Agent identifies the device using its unique identifier (e.g., MAC address, UUID, or serial number) and verifies the device's registration status in the central repository. If the device has been reset or decommissioned, the system initiates the re-provisioning process.

The agent queries the Mobile Device Management (MDM) system for a fresh user profile or default configuration, ensuring that the tablet is correctly provisioned with all necessary settings, applications, and network access. The profile retrieval process follows the same secure communication protocols as outlined in previous steps (e.g., using OAuth2 tokens or mutual TLS authentication) to ensure secure data transmission.

The configuration is transmitted to the tablet using secure communication channels (such as USB over ADB, Wi-Fi Direct, or HTTPS), and the Configuration Engine on the host system ensures that the tablet receives and applies the settings appropriately. If the tablet is running a supported operating system (e.g., iOS, Android, or Windows 10/11), the settings are enforced via MDM-compatible APIs, such as Android Enterprise or Apple MDM.

If any issues arise during the re-provisioning process, the Event Logger captures detailed information about the failure, including timestamps, device identifiers, and error codes. Administrators are notified through the Admin Notification System, and the MDM system logs the event for auditing purposes.

Device re-provisioning is an essential feature for environments that require devices to be reused by multiple users, ensuring that all settings are properly reset and configured according to the enterprise's security policies and compliance requirements.

Data Wipe Functionality. The system includes data wipe functionality to ensure that all sensitive data is securely erased from a tablet when it is undocked or decommissioned. This feature is crucial in environments where devices are shared among multiple users and where data security is paramount.

When a tablet is undocked, either due to user action or a security event (such as failed authentication or the device being tampered with), the Lockdown Service triggers a data wipe command. This command instructs the tablet to securely erase all personal and application data stored on the device, including cached files, user credentials, and local configurations.

The data wipe command is constructed by the Lock Enforcement Module, which ensures that the device is properly sanitized according to established security standards. The command may include several operations, such as:

The data wipe command is transmitted to the tablet over a secure communication channel, such as USB or Wi-Fi, ensuring that no sensitive data is exposed during the process. The MDM Synchronization Client on the tablet handles the command by invoking operating system-level APIs or using third-party enterprise software to securely delete data.

Upon completion, the tablet sends a confirmation message back to the host system or MDM server, ensuring that the wipe operation was successful. This confirmation includes a status report detailing whether the wipe was fully completed or if any errors occurred during the process.

In the event of a failed wipe attempt, the system may issue a secondary command to attempt a more thorough wipe, or alert administrators of the failure via the Admin Notification System. Additionally, all data wipe events are logged by the Event Logger, providing a detailed, timestamped record for security auditing purposes.

This data wipe functionality is critical in meeting data privacy regulations and ensuring that no residual data is left behind on the device when it is returned to the fleet, reallocated, or decommissioned. The system's ability to perform remote data wipes enhances the security of the overall environment and reduces the risk of unauthorized access to sensitive user information.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for managing the docking and authentication of a tablet computing device in a multi-device charging environment, comprising:

determining at least one docking event to have occurred when at least one computing device being uniquely identified is docked to at least one data-power interface of at least one device data-power station assembly;

authenticating at least one party associated with the at least one docked computing device via an external authentication interface;

retrieving at least one party-specific configuration profile from at least one centralized management server based on the validating the at least one party credential;

transmitting the at least one party-specific configuration profile from at least one computing system to the at least one docked computing device; and applying the at least one party-specific configuration profile to configure at least one interface of the at least one docked computing device; and in response to at least one of (i) the determining the at least one docking event and (ii) the authenticating the at least one party, generating session data including at least one of device identification data and data associated with the at least one party, and synchronizing the session data with at least one Mobile Device Management (MDM) system.

2. The method of claim 1 wherein, the authenticating via the external authentication interface includes authenticating the at least one party via at least one identification card reader configured to communicate credential data to an authentication engine module using a Human Interface Device (HID) protocol.

3. The method of claim 1 further comprising:

when the at least one docking event is determined to have occurred, logging the at least one docking event with at least one secure timestamp and party metadata.

4. The method of claim 1 further comprising:

authenticating the at least one party associated with the at least one docked computing device via at least one biometric validation interface comprising at least one biometric scanner that securely forwards captured biometric credential data to an authentication engine module.

5. The method of claim 1 further comprising:

concurrently managing a plurality of the at least one computing device using a plurality of docking stations each assigned a unique identifier, and tracking which user is assigned to each computing device during a session.

6. The method of claim 1 wherein the party's access attempt is recorded with metadata including at least one device identifier, at least one user identifier, and at least one action result.

7. The method of claim 1 wherein manual party-device assignments are supported by an administrator module accessible through a graphical user interface that provides an overview of active devices, user sessions, and security states.

8. The method of claim 1 further comprising receiving computing device reports regarding battery and health statistics upon docking of the computing device.

9. A method for managing the docking and authentication of a tablet computing device in a multi-device charging environment, comprising:

detecting when the computing device is docked;

authenticating the party through at least one connected external authentication mechanism;

retrieving the authenticated party's configuration from at least one management server;

transmitting the configuration from at least one computing system to the computing device; and applying the configuration to configure at least one interface of the computing device.

10. The method of claim 9 wherein, the configuration profile includes Wi-Fi settings for enterprise networks, including enterprise Wi-Fi credentials.

11. The method of claim 9 wherein, the computing device updates its home screen layout based on party preferences included in the authenticated party's configuration.

12. The method of claim 9 further comprising, generating confirmation of successful configuration application on the computing device.

13. The method of claim 9 wherein, the host synchronizes party profiles with at least one cloud-based backup system.

14. A method for managing the docking and authentication of a tablet computing device in a multi-device charging environment, comprising:

determining at least one docking event to have occurred when at least one computing device being uniquely identified is docked to at least one data-power interface of at least one device data-power station assembly;

authenticating at least one party associated with the at least one docked computing device via an external authentication interface;

validating at least one party credential associated with the at least one party;

validating at least one party credential associated with the at least one party;

retrieving at least one party-specific configuration profile from at least one centralized management server based on the validating the at least one party credential;

transmitting, from at least one computing system, configuration data corresponding to the at least one party-specific configuration profile to the at least one docked computing device;

applying the configuration data to configure at least one interface of the at least one docked computing device based on the at least one party-specific configuration profile;

logging at least the at least one docking event and at least one association between the at least one docked computing device and the at least one party credential with at least one timestamp and metadata; and synchronizing session data regarding the at least one docked computing device and the at least one party credential with at least one Mobile Device Management (MDM) system.

15. The method of claim 14, wherein the uniquely identified includes identifying the at least one docked computing device by querying at least one of USB descriptor data, a unique device identifier (UDID), or a MAC address.

16. The method of claim 14, wherein the validating includes validating the at least one party credential by querying at least one secure identity service including at least one of an LDAP server or an OAuth identity provider.

17. The method of claim 14, wherein the transmitting includes encrypting the configuration data using TLS and transmitting the encrypted configuration data to the at least one docked computing device.

18. The method of claim 14, wherein the logging includes generating a logging record including device identification data, user identification data, and a profile hash.

19. The method of claim 14, wherein the synchronizing includes pushing at least a portion of the session data to at least one MDM server via a secure API for audit.

\* \* \* \* \*